United States Patent
Okuno et al.

(10) Patent No.: US 12,031,087 B2
(45) Date of Patent: Jul. 9, 2024

(54) OXYGENATED SOLVENTS FOR IMPROVED PRODUCTION OF OIL AND GAS

(71) Applicant: Board of Regents, The University of Texas System, Austin, TX (US)

(72) Inventors: Ryosuke Okuno, Austin, TX (US); Gayan Aruna Abeykoon, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 40 days.

(21) Appl. No.: 17/441,223

(22) PCT Filed: Mar. 20, 2020

(86) PCT No.: PCT/US2020/023920
§ 371 (c)(1),
(2) Date: Sep. 20, 2021

(87) PCT Pub. No.: WO2020/191319
PCT Pub. Date: Sep. 24, 2020

(65) Prior Publication Data
US 2022/0154067 A1    May 19, 2022

Related U.S. Application Data

(60) Provisional application No. 62/822,043, filed on Mar. 21, 2019.

(51) Int. Cl.
*E21B 43/16* (2006.01)
*C09K 8/584* (2006.01)
(Continued)

(52) U.S. Cl.
CPC .............. *C09K 8/584* (2013.01); *C09K 8/594* (2013.01); *E21B 43/164* (2013.01); *E21B 43/168* (2013.01); *E21B 43/24* (2013.01)

(58) Field of Classification Search
CPC ........ C09K 8/584; E21B 43/164; E21B 43/24
(Continued)

(56) References Cited

U.S. PATENT DOCUMENTS

| 3,163,213 A | 12/1964 | Bernard |
| 3,163,214 A | 12/1964 | Csaszar |

(Continued)

FOREIGN PATENT DOCUMENTS

| WO | 2017/040903 A1 | 3/2017 |
| WO | 2020/191319 A1 | 9/2020 |

OTHER PUBLICATIONS

Wang, et al., 2018. "Aqueous Solution of Ketone for Enhanced Water Imbibition in Shale Reservoirs." Paper presented at the SPE Europec featured at 82nd EAGE Conference and Exhibition, Amsterdam, The Netherlands, Oct. 2021. Paper No. SPE-205154-MS. DOI: 10.2118/205154-MS.

(Continued)

*Primary Examiner* — Zakiya W Bates
*Assistant Examiner* — Ashish K Varma
(74) *Attorney, Agent, or Firm* — Kilpatrick Townsend & Stockton LLP

(57) ABSTRACT

Described herein are techniques, methods, and systems for producing hydrocarbons from a reservoir and, particularly, from subterranean formations. The disclosed techniques employ oxygenated solvents, such as ketones, to improve or enhance oil or hydrocarbon production from subterranean formations. In some cases, ketones can be used in combination with surfactants to improve or enhance oil or hydrocarbon from subterranean formations.

21 Claims, 60 Drawing Sheets

(51) Int. Cl.
  *C09K 8/594* (2006.01)
  *E21B 43/24* (2006.01)
(58) Field of Classification Search
  USPC ........................................................ 166/303
  See application file for complete search history.

(56) References Cited

U.S. PATENT DOCUMENTS

| | | | |
|---|---|---|---|
| 4,042,030 | A | 8/1977 | Savins et al. |
| 4,979,564 | A | 12/1990 | Kalpakci et al. |
| 7,559,372 | B2 | 7/2009 | Cobb |
| 9,412,023 | B1 | 8/2016 | Hurley |
| 9,845,669 | B2 | 12/2017 | Miller et al. |
| 2004/0177958 | A1 | 9/2004 | Shpakoff et al. |
| 2008/0051551 | A1* | 2/2008 | Pope ........................ C09K 8/68 528/226 |
| 2010/0012331 | A1* | 1/2010 | Larter ................... E21B 43/243 166/401 |
| 2012/0160487 | A1 | 6/2012 | Barnes et al. |
| 2014/0284057 | A1 | 9/2014 | Champagne et al. |
| 2015/0000909 | A1* | 1/2015 | Sanders .................. E21B 43/16 166/270.1 |
| 2015/0083398 | A1 | 3/2015 | Dawson |
| 2015/0152718 | A1* | 6/2015 | Chakrabarty ........... E21B 43/16 166/268 |
| 2015/0167437 | A1* | 6/2015 | Dawson .................. E21B 43/40 166/305.1 |
| 2016/0237798 | A1 | 8/2016 | Sanders et al. |

OTHER PUBLICATIONS

Wang, et al., 2020. "The Effect of Phase Distribution on Imbibition Mechanisms for Enhanced Oil Recovery in Tight Reservoirs." Paper presented at the SPE Improved Oil Recovery Conference, Virtual, Aug. 2020. Paper No. SPE-200431-MS. DOI: 10.2118/200431-MS.
International Search Report and Written Opinion dated Jun. 17, 2020 in International Patent Application No. PCT/US2020/023920 (008610WO), 19 pages.
International Preliminary Report on Patentability dated Sep. 30, 2021 in International Patent Application No. PCT/US2020/023920 (008610WO), 14 pages.
Arguelles-Vivas, et al., 2020. "Enhancement of Water Imbibition in Shales by use of Ketone Solvent." Paper presented at the SPE International Conference and Exhibition on Formation Damage Control, Lafayette, Louisiana, USA, Feb. 2020. Paper No. SPE-199322-MS. DOI: 10.2118/199322-MS.
Adibhatla, B., et al., Parametric Analysis of Surfactant-Aided Imbibition in Fractured Carbonates. J. Colloid Interface Sci. 2008, 317 (02), 513-522.
Akin, S., et al., 2000. Spontaneous Imbibition Characteristics ofDiatomite. Journal of Petroleum Science and Engineering 25: 149-165.
Alfarge, D., et al., 2018. Miscible Gases Based EOR in Unconventional Liquids Rich Reservoirs: What We Can Learn. Presented at SPE International Heavy Oil Conference and Exhibition, Kuwait City, Kuwait, Dec. 10-12, 2018.
Alfarge, D.; et al., IOR Methods in Unconventional Reservoirs of North America: Comprehensive Review. Proceedings of the SPE Western Regional Meeting; Bakersfield, CA, Apr. 23-27, 2017; SPE-185640-MS, DOI: 10.2118/185640-MS.
Alharthy, N., et al., 2015. Enhanced Oil Recovery in Liquid-Rich Shale Reservoirs: Laboratory to Field. Presented at SPE annual technical conference and exhibition, Houston, Texas, USA, Sep. 28-30, 2015.
Alvarez, J., et al., 2016. Wettability, Oil and Rock Characterization of the Most Important Unconventional Liquid Reservoirs in the United States and the Impact on Oil Recovery. Presented at Unconventional Resources Technology Conference, San Antonio, Texas, USA, Aug. 1-3, 2016.

Alvarez, J. et al., 2017. Wettability Alteration and Spontaneous Imbibition in Unconventional Liquid Reservoirs by Surfactant Additives. SPE Reservoir Evaluation & Engineering, 20(01): 107-117.
Alvarez, J., et al., 2018a. Improving Oil Recovery in the Wolfcamp Reservoir by Soaking/Flowback Production Schedule With Surfactant Additives. SPE Reservoir Evaluation & Engineering, 21(04): 1-083.
Alvarez, J., et al., 2018b. The Impact of Surfactant Imbibition and Adsorption for Improving Oil Recovery in the Wolfcamp and Eagle Ford Reservoirs. SPE Journal, 23(06): 2103-2117.
Anderson, W. G. 1986a. Wettability Literature Survey—Part 1: Rock/Oil/Brine Interactions and the Effects of Core Handling on Wettability. Journal of Petroleum Technology 38(10): 1125-1144.
Anderson, W. G. 1986b. Wettability Literature Survey—Part 2: Wettability Measurement. Journal of Petroleum Technology 38(11): 1246-1262.
Baek, K.; et al., Application of Ultra-Short Hydrophobe Surfactants with Cosolvent Characters for Heavy Oil Recovery. Energy Fuels 2019, 33 (9), 8241-8249.
Bowker, K. A. 2003. Recent developments of the Barnett shale play. Fort Worth Basin: West Texas Geological Society Bulletin 42(6): 4-11.
Buckley, J. S.; et al., Mechanisms of Wetting Alteration by Crude Oils. SPE J. 1998, 3 (01), 54-61.
Chahardowli, M.; et al., A Novel Enhanced Oil Recovery Technology Using Dimethyl Ether/Brine: Spontaneous Imbibition in Sandstone and Carbonate Rocks. Proceedings of the SPE Annual Technical Conference and Exhibition; Dubai, United Arab Emirates, Sep. 26-28, 2016; SPE-181340-MS, DOI: 10.2118/181340-MS.
Chahardowli, M.; et al., Solvent-Enhanced Spontaneous Imbibition in Fractured Reservoirs. Proceedings of the EAGE Annual Conference & Exhibition Incorporating SPE Europec; London, U.K., Jun. 10-13, 2013; SPE-164908-MS, DOI: 10.2118/164908-MS.
Chen, C., et al., 2014. Effect of Reservoir Heterogeneity on Primary Recovery and C02 Huffn'Puff Recovery in Shale-Oil Reservoirs. SPE Reservoir Evaluation & Engineering, 17(03): 404-413.
Cil, M., et al., 1998. An Examination of Countercurrent Capillary Imbibition Recovery from Single Matrix Blocks and Recovery Predictions by Analytical Matrix/fracture Transfer Functions. Presented at the SPE Annual Technical Conference and Exhibition, New Orleans, Lousiana, USA, Sep. 27-30. SPE-49005-MS.
Cronin, M., et al., 2018. Diffusion-Dominated Proxy Model for Solvent Injection in Ultratight Oil Reservoirs. SPE Journal.
Curtis, M. E., et al., 2012. Microstructural Investigation of Gas Shales in Two and Three Dimensions Using Nanometer-Scale Resolution Imaging Microstructure of Gas Shales. AAPG Bulletin, 96(4): 665-677.
Gamadi, T. D., et al., 2013. An Experimental Study of Cyclic Gas Injection to Improve Shale Oil Recovery. Presented at SPE annual technical conference and exhibition, New Orleans, Lousiana, USA, Sep. 30-Oct. 2, 2013.
Gao, Z., et al., 2016. Initial water saturation and imbibition fluid affect spontaneous imbibition into Barnett shale samples. Journal of Natural Gas Science and Engineering 34: 541-551.
Ghanbari, E., et al., 2015. Impact of rock fabric on water imbibition and salt diffusion in gas shales. International Journal of Coal Geology 138: 55-67.
Gupta, R.; et al., Temperature Effects on Surfactant-Aided Imbibition into Fractured Carbonates. SPE J. 2010, 15 (03), 588-597.
Hawthorne, S. B., et al., 2013. Hydrocarbon Mobilization Mechanisms From Upper, Middle, and Lower Bakken Reservoir Rocks Exposed to C02. Presented at SPE Unconventional Resources Conference Canada, Calgary, Alberta, Canada, Nov. 5-7, 2013.
Hoffman, B. T. 2018. Huff-N-Puff Gas Injection Pilot Projects in the Eagle Ford. Presented at SPE Canada Unconventional Resources Conference, Calgary, Alberta, Canada, Mar. 13-14, 2018.
Huron, M. J., et al., 1979. New Mixing Rules in Simple Equations of State for Representing Vapour-Liquid Equilibria of Strongly Non-Ideal Mixtures. Fluid Phase Equilibria, 3(4): 255-271.
Kathel, P., et al., 2013. Wettability Alteration in a Tight Oil Reservoir. Energy & Fuels, 27(11 ): 6460-6468.
Lake, L. W.; et al., A Fundamentals of Enhanced Oil Recovery; Society of Petroleum Engineers, Chapter 7: Richardson, TX, 2014.

(56) References Cited

OTHER PUBLICATIONS

Lashgari, H. R., et al., 2018. Evaluation of Carbon Dioxide Storage and Miscible Gas EOR in Shale Oil Reservoirs. Fuel.
Leverett, M. C. Capillary Behavior in Porous Solids. Trans. Soc. Pet. Eng. 1941, 142 (01), 152-169.
Li, K., et al., 2014. Effect of initial water saturation on crude oil recovery and water cut in water-wet reservoirs. International Journal of Energy Research 38: 1599-1607.
Li, K., et al., 2006. Influence of Initial Water Saturation on Recovery by Spontaneous Imbibition in Gas/Water/Rock Systems and the Calculation of Relative Permeability. SPE Reservoir Evaluation & Engineering 9(04): 295-301.
Liang, T. 2016. Water Block from Hydraulic Fracturing in Low Permeability Rocks: Experimental Studies on Causes and Potential Mitigation Methods (Doctoral dissertation).
Liang, T., et al., 2017. Enhancing Hydrocarbon Permeability after Hydraulic Fracturing: Laboratory Evaluations of Shut-ins and Surfactant Additives. SPE Journal, 22(04): 1-011.
Liu, J.; et al., Experimental Study of Wettability Alteration and Spontaneous Imbibition in Chinese Shale Oil Reservoirs Using Anionic and Nonionic Surfactants. J. Pet. Sci. Eng. 2019, 175, 624-633.
Lu, et al., 2019, Effect of Low-Concentration of 1-Pentanol on the Wettability of Petroleum Fluid-Brine-Rock Systems; Langmuir; DOI: 10.1021/acs.langmuir.9b00099; Mar. 1, 2019.
Lu, J.; et al., Novel Large-Hydrophobe Alkoxy Carboxylate Surfactants for Enhanced Oil Recovery. SPE J. 2014, 19 (06), 1024-1034.
Lu, Y.; et al., Effect of Low-Concentration of 1-Pentanol on the Wettability of Petroleum Fluid-Brine-Rock Systems. Langmuir 2019, 35 (12), 4263-4269.
Ma, S., et al., 1995. Generalized Scaling of Spontaneous Imbibition Data for Strongly Water-Wet Systems. Paper presented at the 6th Petroleum Conference of the South Saskatchewan Section, the Petroleum Society of CIM, Regina, Saskatchewan, Canada, Oct. 16-18, 1995.
Mason, G.; et al., Developments in Spontaneous Imbibition and Possibilities for Future Work. J. Pet. Sci. Eng. 2013, 110, 268-293.
Mejia, M. Experimental Investigation of Surfactant Flooding in Fractured Limestones. M.S. Thesis, The University of Texas at Austin, Austin, TX, Dec. 2018.
Mirzaei, M., et al. 2016. Visualization and Analysis of Surfactant Imbibition Into Oil-Wet Fractured Cores. SPE Journal. 21 (01): 101-111.
Mobilia, M., et al., 2016. Initial Production Rates in Tight Oil Formations Continue to Rise. EIA.
Morsy, S., et al., 2013. Waterflooding in the Eagle Ford Shale Formation: Experimental and Simulation Study. Presented at SPE Unconventional Resources Conference and Exhibition—Asia Pacific, Brisbane, Australia, Nov. 11-13. SPE-167056-MS.
Mullen, J. 2010. Petrophysical Characterization of the Eagle Ford Shale in South Texas. Presented at Canadian Unconventional Resources and International Petroleum Conference, Calgary, Alberta, Canada, Oct. 19-21, 2010.
Nelson, P.H. 2009. Pore-Throat Sizes in Sandstones, Tight Sandstones, and Shales. AAPG bulletin, 93(3): 329-340.
Nguyen, D., et al., 2014. Evaluation of Surfactants for Oil Recovery Potential in Shale Reservoirs. Presented at SPE Improved Oil Recovery Symposium, Tulsa, Oklahoma, USA, Apr. 12-16, 2014.
Sanchez-Rivera, D., et al., 2015. Reservoir Simulation and Optimization of Huff-and-Puff Operations in the Bakken Shale. Fuel, 147: 82-94.
Schechter, D.S., et al., 1994. Low IFT Drainage and Imbibition. Petroleum Science & Engineering. 11: 283-300.
Sharma, G., et al., 2013. Wettability Alteration in High-Temperature and HighSalinity Carbonate Reservoirs. SPE Journal. vol. 18(4): 646-655. SPE-147306-PA.
Sharma, S., et al., 2017. A Comparative Study of Huff-n-Puff Gas and Solvent Injection in a Shale Gas Condensate Core. Journal of Natural Gas Science and Engineering, 38: 549-565.

Shen, Y., et al., 2018. Multi parameter Analysis of Gas Transport Phenomena in Shale Gas Reservoirs: Apparent Permeability Characterization. Scientific Reports 8, 2601.
Shuler, P. J.; et al., Chemical Process for Improved Oil Recovery from Bakken Shale. Proceedings of the Canadian Unconventional Resources Conference; Calgary, Alberta, Canada, Nov. 15-17, 2011; SPE-147531-MS, DOI: 10.21181147531-MS.
Siriwardane, H., et al., 2016. Extent of Hydraulic Fractures in Shales. NETL Technical Report Series; U.S. Department of Energy, National Energy Technology Laboratory: Morgantown, WV, 2016; p. 55.
Stephenson, R. M. 1992. Mutual Solubilities: Water-Ketones, Water-Ethers, and WaterGasoline-Alcohols. Journal of Chemical and Engineering Data, 37(1): 80-95.
Swanson, C. et al. 2018. Post-Frac-Hit Mitigation and Well Remediation of Woodford Horizontal Wells with Solvent/Surfactant Chemistry Blend. Presented at SPE/AAPG/SEG Unconventional Resources Technology Conference, Jul. 23-25, 2018, Houston, Texas, USA.
Todd, H.B., et al., 2016. Improved Oil Recovery IOR Pilot Projects in the Bakken Formation. Presented at SPE Low Perm Symposium, Denver, Colorado, USA, May 5-6, 2016.
Tong, Z., et al., 2001. Scaling of Viscosity Ratio for Oil Recovery by Imbibition from Mixed-Wet Rocks. Paper SCA 2001-21, proceedings of the International Symposium of the Society of Core Analysts, Edinburgh, UK, Sep. 17-19, 2001.
Tovar, F. D., et al., 2018. Gas Injection for EOR in Organic Rich Shale. Part 1: Operational Philosophy. Presented at the SPE Improved Oil Recovery Conference, Tulsa, Oklahoma, USA, Apr. 14-18, 2018.
Vikksund, B. G., et al., 1998. Initial water saturation and oil recovery from chalk and sandstone by spontaneous imbibition. Paper SCA-9814, proceedings of the International Symposium of the Society of Core Analysts, the Hague, Netherlands, Sep. 14-16, 1998.
Wan, T., et al., 2013. Evaluate EOR Potential in Fractured Shale Oil Reservoirs by Cyclic Gas Injection. Presented at Unconventional Resources Technology Conference, Denver, Colorado, USA, Aug. 12-14, 2013.
Wang, D., et al., 2012. Wettability Survey in Bakken Shale with Surfactant-Formulation Imbibition. SPE Reservoir Evaluation & Engineering, 15(06): 695-705.
Wang, D., et al., 2015. Scaling Laboratory Data Surfactant Imbibition Rates to the Field in Fractured Shale Formations. In Unconventional Resources Technology Conference, San Antonio, Texas, Jul. 20-22, 2015.
Wang, M.; et al., Ketone Solvent as a Wettability Modifier for Improved Oil Recovery from Oil-Wet Porous Media. Fuel 2019, 258, 116195.
Wang, L., et al., 2017. Advances in Improved/Enhanced Oil Recovery Technologies for Tight and Shale Reservoirs. Fuel 210: 425-445.
Wang, M., et al., 2019. Comparative Study of Ketone and Surfactant for Enhancement of Water Imbibition in Fractured Porous Media. Accepted Dec. 2019 for publication in Energy & Fuels.
Wang, M., et al., 2019. Oxygenated Solvent as a Novel Additive for Improved Oil Recovery in Tight Oil Reservoirs. Presented at SPE Annual Technical Conference and Exhibition, Calgary, Alberta, Canada, 30 Sep.-Oct. 2, 2019. SPE-195871-MS.
Yan, R., et al., 2014. New Eagle Ford Wells Continue to Show Higher Production. EIA.
Yousef A., et al., 2011. Laboratory investigation of the impact of Injection-Water Salinity and Ionic Content on Oil Recovery From Carbonate Reservoirs. SPE reservoir Evaluation & Engineering. vol. 14(5): 548-593. SPE-137634-PA.
Yu, W., et al., 2015. C02 Injection for Enhanced Oil Recovery in Bakken Tight Oil Reservoirs. Fuel, 159: 354-363.
Zeng, T., et al., Application of Surfactants in Shale Chemical EOR at High Temperatures. Proceedings of the SPE Improved Oil Recovery Conference; Tulsa, OK, Apr. 14-18, 2018; SPE-190318-MS, DOI: 10.2118/190318-MS.
Zhang, J., et al., 2015. Development of new testing procedures to measure propped fracture conductivity considering water damage in clay-rich shale reservoirs: An example of the Barnett Shale. Journal of Petroleum Science and Engineering 135:352-359.

(56) References Cited

OTHER PUBLICATIONS

Zhou, X., et al., 2000. Interrelationship of wettability, initial water saturation, aging time, and oil recovery by spontaneous imbibition and waterflooding. SPE Journal 5(2): 199-207. SPE-62507-PA.

* cited by examiner

1. Pressurization pump  2. Accumulator  3. Vacuum pump  4. Pressure gauge
5. In-line density meter  6. Viscometer  7. Oven 1. Pressurization pump  2. Accumulators  3. Hassler type core-holder  4. Oven
5. Hydraulic manual pump  6. Differential pressure gauge  7. Graduating cylinder 1. Pressurization pump  2. Accumulators  3. Core holder  4. Oven
5. Hydraulic manual pump  6. Pressure gauge  7. Differential pressure transducer
8. Graduated tubes 1. Pressurization pump  2. Accumulators  3. Core holder  4. Oven
5. Hydraulic manual pump  6. Pressure gauge  7. Differential pressure transducer
8. Graduated tubes 1. Pressurization pump  2. Accumulators  3. Hassler type core-holder  4. Oven
5. Hydraulic manual pump  6. Pressure gauge  7. Graduating cylinder 1. Pressurization pump  2. Accumulator  3. Hassler type core-holder
4. Hydraulic manual pump  5. Graduating cylinder

OXYGENATED SOLVENTS FOR IMPROVED PRODUCTION OF OIL AND GAS

CROSS REFERENCE TO RELATED APPLICATION

This application is a U.S. National Stage of PCT International Application No. PCT/US2020/023920, filed on Mar. 20, 2020, which claims the benefit of and priority to U.S. Provisional Application No. 62/822,043, filed on Mar. 21, 2019, which are hereby incorporated by reference.

FIELD

This invention is in the fields of enhanced and improved oil recovery. This invention relates generally to methods and systems for producing hydrocarbons and enhancing hydrocarbon production by injecting an oxygenated solvent, such as one or more ketones, into a subterranean formation, such as a tight formation.

BACKGROUND

Horizontal drilling and multi-stage hydraulic fracturing have made it possible to recover oil from tight formations at economically feasible production rates. However, primary oil production from a tight reservoir often shows a rapid decline in production rate. For example, 60-70% production decline within a first year has been reported for the Eagle Ford formations. Primary recovery factors in tight oil reservoirs are typically lower than 10%.

Challenges for tight oil production originate from petrophysical properties of tight formations. Tight oil reservoirs typically contain highly diverse minerals with a variety of clay minerals and high total organic content (TOC). This diverse mineral content exposed to polar oil components and TOC collectively cause the rock wettability to be mixed, which in turn affects the multicomponent transport phenomena in tight formations in a complicated manner. Understanding of the interplay between petrophysical properties and fluid phase behavior is likely more important for improved oil recovery in tight formations than that in conventional reservoirs.

SUMMARY

Various methods of improved oil recovery (IOR) in subterranean oil reservoirs (formations) are described herein, such as cyclic injection (also known as huff-n-puff), waterflooding type injection, which may employ injection of a gas/liquid mixture, or hydraulic fracturing. Conventional techniques employ surfactant solutions, which may have a number of downsides, as described below. Cyclic gas injection may use $CO_2$ and natural gas, as has been performed in recent field pilots. During one cycle of huff-n-puff, gas may be injected into the reservoir through a wellbore and fractures (propped and unpropped). Then, the well may be shut-in during the soaking period, and reopened for oil production.

Pilot tests of natural gas huff-n-puff in the Eagle Ford formation have shown 30%-70% more oil production than the baseline primary production. The main mechanisms of improved oil recovery in gas huff-n-puff may include viscosity reduction and oil swelling. These mechanisms can rely on the mixing of the injected gas with the reservoir oil in subterranean rocks of ultra-low permeability. That is, the oil recovery rate may be likely dominated by diffusion, unlike in oil displacement by gas in conventional gas floods. Also, the presence of water (connate water and fracturing water) may limit the contact between the injection gas and the reservoir oil. The optimization of oil recovery by gas huff-n-puff may depend on the timing and duration of gas injection, soaking, and oil production for an available injection-gas composition. It is desirable to make the soaking time shorter and the oil production response greater and more rapid.

Surfactant-solution injection has also been evaluated, both experimentally and by numerical simulation. Surfactants can alter rock wettability from intermediate- and oil-wet to water-wet, and reduce interfacial tension (IFT) between oil and brine. As a result, oil recovery can be improved through imbibition. Low IFT, however, may limit the surfactant imbibition process. Besides, the injection of surfactant solutions may only have a limited effect on the bulk properties of oil, unlike gas huff-n-puff mechanisms. Surfactants may also limit the hydraulic paths for oil to be produced because of increased water saturations. The cost of surfactants, their stability, and their limited recoverability are also factors that affect the applicability to use in the field.

The present techniques overcome challenges in recovering oil or hydrocarbons from a subterranean formation by using an injection fluid that may naturally reduce oleic phase viscosity and density, which may be associated with swelling. The disclosed injection fluids may also alter the rock wettability to favorably allow oil release from the subterranean formation, and in many cases without using or in the absence of surfactants present in the injection mixture. In some cases, however, the disclosed injection fluids may be used in an injection mixture including surfactants. Eliminating surfactants may have a further beneficial effect, as stabilizers normally used to maintain the stability of surfactants also do not have to be used, reducing the complexity and cost of the injection fluid. The injected fluids may comprise gas or liquid-phase oxygenated solvents, such as ketones, which can favorably interact with both aqueous phases and oleic phases, and partition between both phases. In the case of gas flooding or gas huff-n-puff techniques, the gas-phase oxygenated solvents may be present at concentrations of up to 100% of the injection fluid, and may be mixed with a carrier gas, such as steam, $CO_2$, $N_2$, or a hydrocarbon gas, such as methane, ethane, or natural gas, for example. In the case of liquid flooding or liquid cyclic injection techniques, the liquid-phase oxygenated solvents may be present at concentrations of up to 100% of the injection fluid, and may be mixed with a carrier liquid, such as water, brine, connate water, produced water, or seawater, for example. In some cases, the gas-phase oxygenated solvents may be used in hydraulic fracturing processes, such as where the gas-phase oxygenated solvents are included in a hydraulic fracturing fluid, which may optionally include surfactants.

In one aspect, methods of producing hydrocarbons from a subterranean formation (e.g., a tight formation) are disclosed. An example method of this aspect comprises injecting a fluid comprising one or more ketones into the subterranean formation; and producing hydrocarbons from the subterranean formation. A variety of ketones may be used for the methods of this aspect. For example, at least one of the one or more ketones has a carbon chain length of from 4-8. Useful ketones may optionally have one or more hydrophobic carbon side chains with a length of from 2-4. In some cases, branched or cyclic ketones may be employed. Specific ketones useful with the methods of this aspect include, but are not limited to, butanone, 2-pentanone, 3-pentanone, 2-hexanone, 3-hexanone, 2-heptanone, 3-heptanone, 4-heptanone, 2-octanone, 3-octanone, 4-octanone, and any combination of these.

The ketones in the fluid injected into the subterranean formation may advantageously modify conditions in the subterranean formation to favorably enhance or improve recovery of oil from the subterranean formation. In one example, the one or more ketones in the fluid injected into the subterranean formation may reduce a viscosity of the hydrocarbons in the subterranean formation. In another example, the one or more ketones in the fluid injected into the subterranean formation may reduce a density of the hydrocarbons in the subterranean formation. In another example, the one or more ketones in the fluid injected into the subterranean formation may result in swelling of the hydrocarbons in the subterranean formation. Optionally, the one or more ketones in the fluid injected into the subterranean formation may modify a wettability of rock in the subterranean formation to a more water-wet condition. Optionally, the one or more ketones in the fluid injected into the subterranean formation reduce an interfacial tension between an aqueous phase liquid in the subterranean formation and an oil phase liquid in the subterranean formation. As another example, the one or more ketones in the fluid injected into the subterranean formation may partition into an aqueous phase liquid in the subterranean formation and an oil phase liquid in the subterranean formation.

In embodiments, a variety of different fluids and fluid characteristics may be employed, which may be useful for employing the methods of this aspect in different subterranean formations. In one specific example, the fluid comprises, consists of, or consists essentially of the one or more ketones. In another specific example, the fluid comprises, consists of, or consists essentially of the one or more ketones for a first duration and a method of this aspect may further comprise injecting a different fluid before and/or after the first duration. In this way, a slug of the one or more ketones may be injected to introduce a volume of the one or more ketones before or after injection of other fluids. Optionally, the fluid comprises the one or more ketones and a carrier fluid. For example, a concentration of the one or more ketones in the fluid may be from 0.01 wt. % to 99.9 wt. %, and a concentration of the carrier fluid in the fluid may be from 0.01 wt. % to 99.9 wt. %. In embodiments, the carrier fluid is a gas-phase carrier fluid or a liquid-phase carrier fluid.

In some methods of this aspect, the fluid is a gas-phase fluid. The gas-phase fluid may optionally comprise, consist of, or consist essentially of the one or more ketones. Optionally, the fluid comprises a gas-phase hydrocarbon, methane, ethane, natural gas, carbon dioxide, nitrogen, steam, or any combination of these from any sources. Optionally, the one or more ketones are present in the fluid in the gas-phase.

In some methods of this aspect, the fluid is a liquid-phase fluid. The liquid-phase fluid may optionally comprise, consist of, or consist essentially of the one or more ketones. Optionally, the fluid comprises a liquid-phase fluid lacking a surfactant or including a surfactant in trace or negligible amounts. As noted above, reducing or eliminating use of a surfactant in an injected fluid is desirable. Optionally, a fluid lacking a surfactant, without a surfactant, not comprising a surfactant or other equivalent terms indicating that a surfactant is not present in a fluid may be absolutely free of surfactants or may contain negligible or trace amounts of one or more surfactants. In some cases, a small amount of a surfactant may be present in the fluid, which may not alter or otherwise change the properties of the fluid as compared to conditions where the fluid absolutely lacks a surfactant. Beneficially, the one or more ketones in the fluid may provide some of the same properties as surfactants, but instead be also able to solvate hydrocarbons in the subterranean formation or be completely soluble in the subterranean formation, rather than only partially soluble, as may be the case with some surfactants. Optionally, the fluid further comprises water, produced water, fresh water, seawater, connate water, brine, or any combination of these from any sources. Optionally, the one or more ketones are present in the fluid in the liquid-phase.

In some cases, surfactants are intentionally included in the fluid. Combination of one or more surfactants and one or more ketones may provide further advantages that will be appreciated in view of the present disclosure and the below examples. In some cases, any surfactants known to those of skill in the art may be used. Example surfactants may include, but are not limited to anionic surfactants, non-ionic surfactants, cationic surfactant, zwitterionic/amphoteric surfactants. Example surfactants may include, but are not limited to, 2-ethylhexanol (EH)-4 propylene oxide (PO)-15 ethylene oxide (EO), 2-EH 4PO 20EO, 2 EH 4PO 25EO, 2-EH 7PO 20EO, 2-ethylhexanol-x propylene oxide (PO)-y ethylene oxide (EO), where x and y are integers greater than zero. Example surfactants may include, but are not limited to, detergents, fatty acids, soaps, emulsifiers, foaming agents, dispersants, or the like.

The methods of this aspect may be suitable for use in any subterranean formation. In some embodiments, the subterranean formation comprises one or more of minerals, such as silicates, carbonates, or clays, tarmat, kerogen, bitumen, liquid hydrocarbons, liquid petroleum, light crude oil, gaseous hydrocarbons, natural gas, water, or brine. The methods of this aspect may comprise or be part of a flooding process or a huff-n-puff process. For example, injecting the fluid and producing the hydrocarbons may comprise or be part of a flooding process or a huff-n-puff process. Optionally, the hydrocarbons comprise liquid petroleum, light crude oil, tarmat, gaseous hydrocarbons, heavy oil, bitumen, or any combination of these.

Methods of this aspect may optionally further comprise placing one or more wells in the subterranean formation. For example, injecting the fluid into the subterranean formation may include injecting the fluid into one or more of the wells. As another example, producing the hydrocarbons from the subterranean formation may include producing the hydrocarbons from one or more of the wells. Optionally, at least a portion of the fluid injected into the subterranean formation may be recovered. For example, in some methods of this aspect, producing the hydrocarbons from the subterranean formation includes recovering at least a portion of the fluid injected into the subterranean formation. Any suitable well characteristics or injection characteristics may be employed when injecting the fluid into the subterranean formation. Optionally, a bottom hole pressure for injecting the fluid may be greater than a fracture pressure of the subterranean formation. In this way, application of the ketones may be employed as part of the fracturing process. Optionally, a bottom hole pressure for injecting the fluid may be smaller than a fracture pressure of the subterranean formation. In this way, the ketones may be employed as an enhanced oil recovery process after fracturing or depletion of the subterranean formation. Optionally, a bottom hole pressure for producing the hydrocarbons may be less than a fracture pressure of the subterranean formation.

In some embodiments, modeling of the subterranean formation may be employed and used to drive or dictate injection characteristics or production characteristics. For example, some methods of this aspect may optionally include further developing a model for the subterranean formation, such as a model that uses ketone aqueous- and oil-phase partitioning characteristics, ketone physical properties, subterranean formation characteristics, such as rock type, hydrocarbon type, or the like, and/or hydrocarbon physical properties. Optionally the model may be useful for simulating oil production from the subterranean formation. Optionally, the model may be used to determine injection characteristics for injecting the fluid into the subterranean formation, such as a flow rate, an injection volume, an injection pressure, a fluid composition, or the like or combinations thereof, any of which may be time-varying. Optionally, the model may be used to determine production characteristics for producing the hydrocarbons from the subterranean formation, such as a production flow or draw rate, production pressure, or the like or combinations thereof, any of which may be time-varying. Optionally, methods of this aspect may comprise injecting the fluid according to the determined injection characteristics. Optionally, methods of this aspect may comprise producing the hydrocarbons according to the determined production characteristics. Optionally, the subterranean formation characteristics include a fracture network volume in fluid communication with one or more wells that are used for the injecting and/or the producing. Optionally, the injection characteristics may include, identify, or dictate injecting an injection volume that is equal to or greater than the fracture network volume.

In another aspect, systems for producing hydrocarbons from a subterranean formation are provided. An example system of this aspect may comprise a source of a fluid, such as a fluid that comprises one or more ketones; an injection system in fluid communication with the source, the injection system further in fluid communication with the subterranean formation; and a hydrocarbon production system in fluid communication with the subterranean formation. Example injection systems and production systems may include one or more pumps, wells, fluid conduits, pressure or storage vessels, or the like.

Systems of this aspect may optionally include a computing system that may control or transmit control signals to an injection system or production system. As an example, a computing system may include one or more processors and a non-transitory processor readable storage medium containing instructions for execution by the one or more processors. Example processor executable instructions may include or comprise instructions to perform portions of one or more methods described herein. For example, a model of a subterranean formation or modeling of a subterranean formation may comprise a computer program or processor executable instructions that receive information about a subterranean formation and/or one or more ketones and determine injection or production characteristics. Optionally, the computer system may transmit control signals to an injection system or production system to control the injection system or production system according to the injection or production characteristics.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

Described herein are techniques for producing hydrocarbons from a subterranean reservoir and, particularly, from tight formations. As used herein, a "tight formation" refers to a hydrocarbon- or petroleum-bearing reservoir in a low permeability material, rock, or mineral formation, such as sandstone, shale, siltstone, carbonate, or limestone. A tight formation may include one or more of liquid hydrocarbons, liquid petroleum, light crude oil, gaseous hydrocarbons, natural gas, water, or brine. Example tight formations include the Eagle Ford formation, the Permian Wolfcamp formation, the Bakken formation, etc. The disclosed techniques employ oxygenated solvents, such as ketones, to advantageously improve or enhance oil or hydrocarbon production from tight formations and also subterranean formations in general.

Use of ketones may be beneficial for a number of reasons. For example, oil diluted with ketones may swell, reduce in viscosity, and/or reduce in density, any of which may increase the mobility of the oil in the subterranean formation. Ketones may also be soluble in both aqueous phases as well as oil phases, and may reduce interfacial tension between aqueous and oleic phases, which may further improve or enhance production. Ketones may further modify a wettability of the rock formation, changing the formation to have a more water-wet character, which may increase mobility of the oil in the subterranean formation, such as by allowing a more free release of oil from within pores of the rock formation.

As used herein, the term ketone refers to an organic compound including a carbonyl group and two carbon side chains each bonded to opposite sides of the carbonyl.

Ketones may be symmetric (having carbon side chains of equal sizes) or asymmetric (having carbon side chains of different sizes).

The inventors have found that certain ketones, however, provide more benefits than others. The total carbon chain length of the ketones and/or the carbon side chain lengths may impact the suitability of the ketones to enhance or improve hydrocarbon production from subterranean formation. In some embodiments, a suitable ketone carbon chain length is from 4-8 carbon atoms. In some embodiment, a suitable ketone side chain has a length of 2-4 carbon atoms. Suitable ketones may advantageously reduce the viscosity of oil in the subterranean formation, rather than increase the viscosity of the oil in the presence of water in the subterranean formation, which may occur with some ketones, such as acetone.

Figure 1:
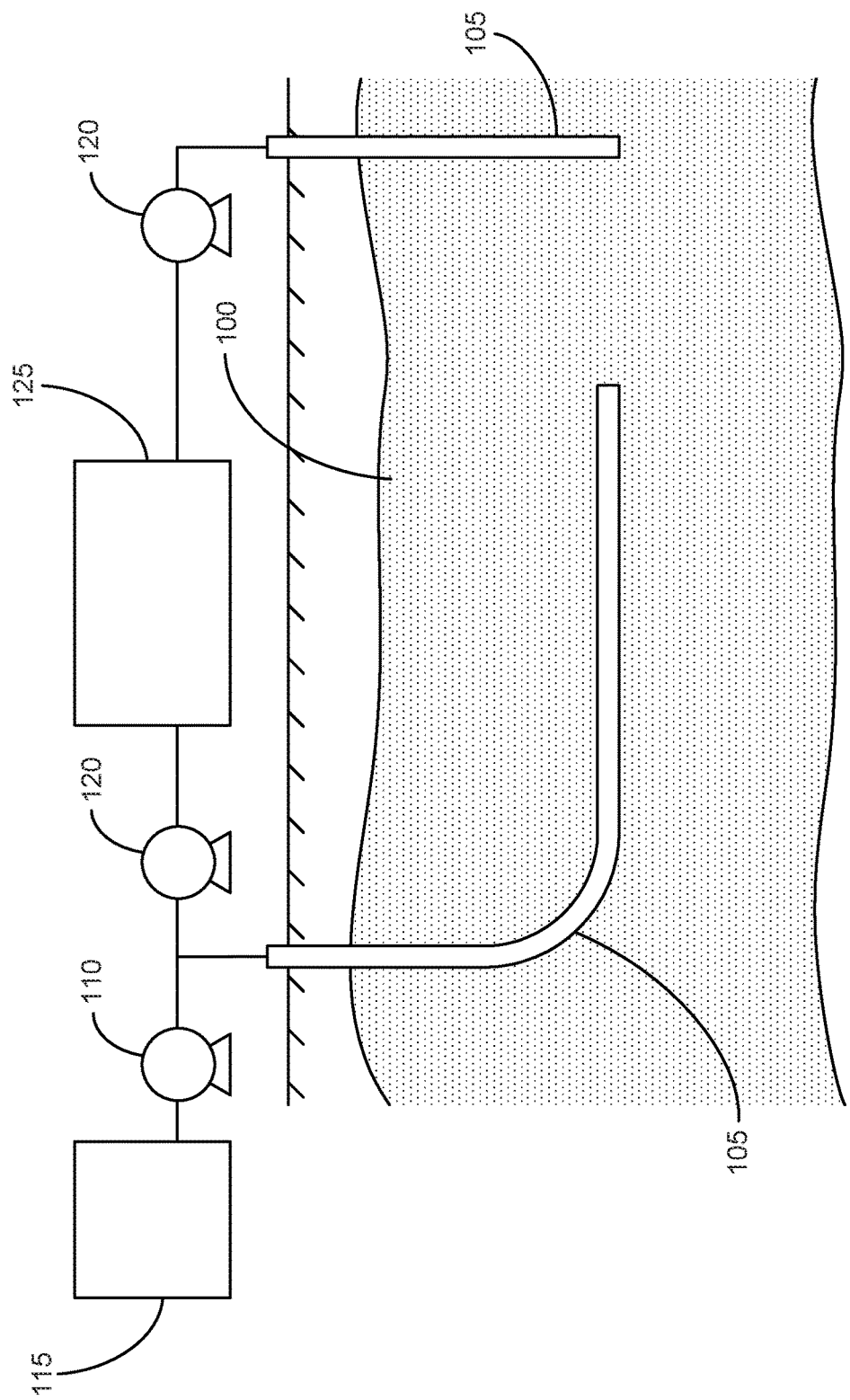
FIG. 1 provides a schematic illustration of a subterranean formation and a system for producing hydrocarbons from the subterranean formation.

FIG. 1 provides a schematic overview of an example reservoir 100 in which a number of wells 105 have been placed. In some cases, the wells 105 may be vertical wells. In some cases, the wells 105 may be horizontal wells. Combinations of vertical and horizontal wells are also contemplated herein. In some cases, wells 105 may be used for a cyclic injection or huff-n-puff process, where a fluid, such as a recovery enhancement fluid, is injected and, after an optional soak period, a production process takes place. In some cases, wells 105 may be used for flooding processes, in which a fluid, such as a displacement fluid, is injected into a first well to displace the hydrocarbons in the reservoir 100 and a second well is used to produce the hydrocarbons. Depending on the specific configuration, the same or different wells 105 may be used for both the injection and the production.

An injection system may be in fluid communication with the wells 105. As illustrated in FIG. 1, the injection system may include conduits and pumping equipment 110, for example. A fluid source 115 may be in fluid communication with the injection system or the injection system may include the fluid source 115. Fluid source 115 may comprise or include a storage tank, mixing tank, fluid conduits, or the like, for example, and may be used to provide a fluid for injection into reservoir 100 via wells 105.

A production system may be in fluid communication with the wells 105. As illustrated in FIG. 1, the production system may include conduits and pumping equipment 120, for example. A storage tank 125 may be in fluid communication with and/or a component of the production system.

Figure 2:
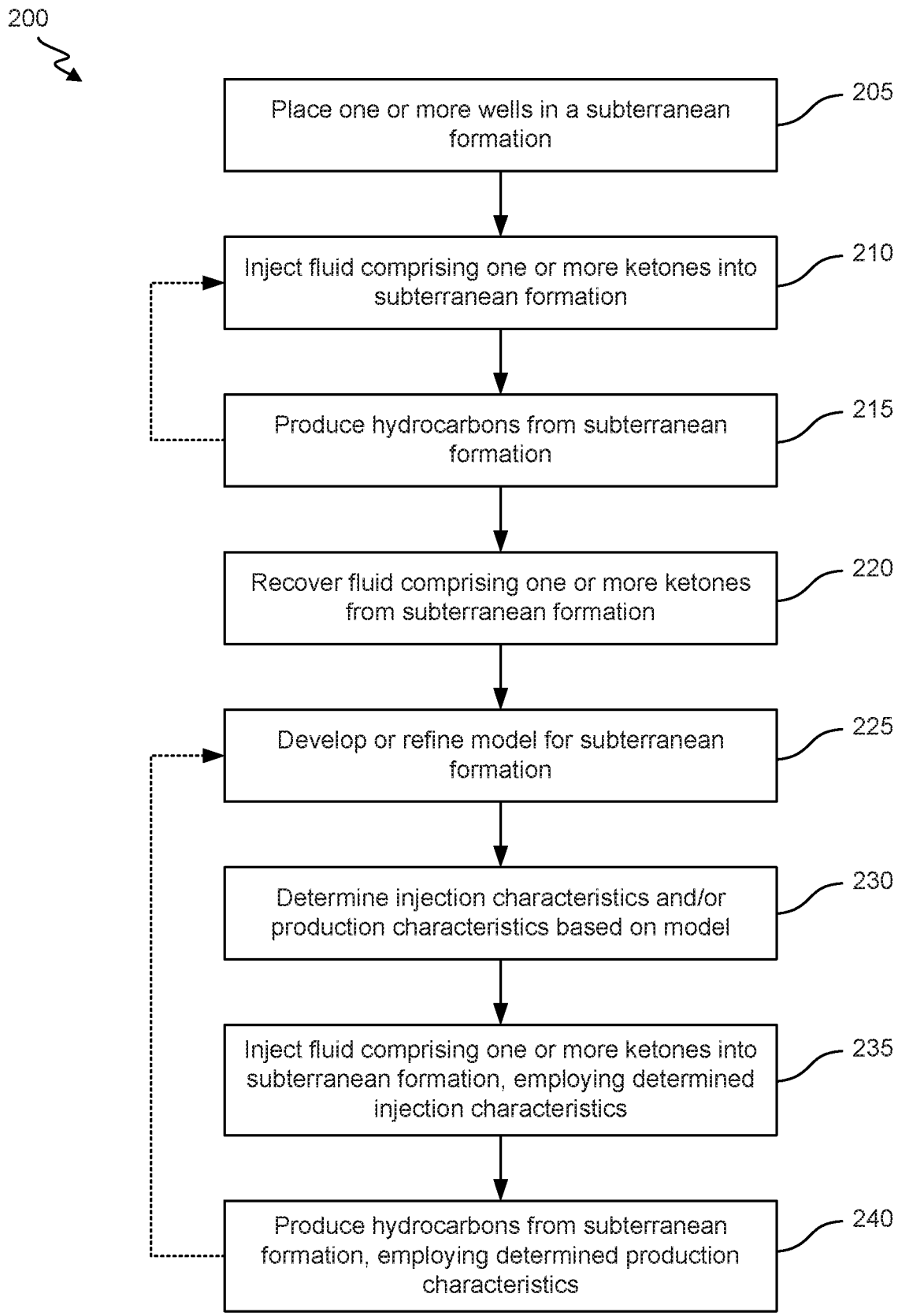
FIG. 2 provides an overview of an example hydrocarbon production method.

FIG. 2 provides an overview of an example method 200 for producing hydrocarbons from a subterranean formation. At block 205, one or more wells are placed in the subterranean formation. As noted above, the one or more wells may be independently used for injection of fluid into the subterranean formation and/or production of hydrocarbons from the subterranean formation. The wells may have any suitable dimensions, orientations, directions, etc. The one or more wells may comprise vertical wells, horizontal wells, or combinations thereof, for example.

At block 210, a fluid comprising one or more ketones is injected into the subterranean formation, such as via the one or more wells. The fluid may be a liquid- or gas-phase fluid, and may optionally include a carrier fluid. The fluid may be continuously injected or may be injected semi-continuously or in one or more discrete injection processes. The fluid may comprise, consist of, or consist essentially of the one or more ketones. Example ketones include, but are not limited to, butanone, 2-pentanone, 3-pentanone, 2-hexanone, 3-hexanone, 2-heptanone, 3-heptanone, 4-heptanone, 2-octanone, 3-octanone, and 4-octanone. The injection of the one or more ketones may be proceeded or followed by injection of other fluids, which may or may not include the one or more ketones.

At block 215, hydrocarbons are produced from the subterranean formation. Depending on the formation and/or configuration, the pressure within the subterranean formation may be sufficient to directly produce the hydrocarbons from the subterranean formation without requiring an artificial lift to draw the hydrocarbons up to the surface, but in some cases an artificial lifting system may be used. Depending on the production process employed, the injection of fluid and production of hydrocarbon steps at blocks 210 and 215 may be repeated one or more times, such as in a cyclic injection process.

At block 220, fluid comprising the one or more ketones may optionally be recovered from the subterranean formation. In some cases, it may be desirable to recover at least a portion of the fluid in order to recover some of the one or more ketones injected into the subterranean formation. Depending on the formation, however, fluid recovery may be feasible or infeasible. It will be appreciated that fluid recovery may occur during or after production of hydrocarbons, for example.

At block 225, a model for the subterranean formation and hydrocarbon production may be developed and/or refined. The model may simulate future production of hydrocarbons from the subterranean formation and may take into consideration several factors or characteristics, such as the subterranean formation composition, including rock composition, hydrocarbon composition, presence and composition of an aqueous phase, etc., the historical production from the subterranean formation (if any), the injected fluid composition and physical properties, predicted or estimated properties of hydrocarbons in the subterranean formation when mixed with the one or more ketones, such as viscosity, density, etc. As the subterranean formation characteristics can change during injection and production periods, the model may be refined to take these changes into consideration. Furthermore, as new production takes place, the production amount, rate, etc. may further be used to refine the model.

At block 230, the model may be used to generate or determine injection characteristics, which may include or identify, for example, identity of one or more ketones to use in the injected fluid, a composition of the injected fluid, including relative amounts of carrier fluid and the one or more ketones, a flow rate of the injected fluid, a volume amount of the fluid to inject, an injection pressure to use for injecting the fluid, a soak period duration, or the like. At block 230, the model may also be used to generate or determine production characteristics, which may include or identify, for example, a production rate, a production volume, and a production pressure, or the like.

At block 235, the fluid may be injected into the subterranean formation according, such as via the one or more wells in the subterranean formation. The fluid injected into the subterranean formation may comprise the one or more ketones and may have injection characteristics as determined according to the model. At block 240, hydrocarbons may be produced from the subterranean formation employing the determined production characteristics. Optionally, the steps occurring at block 225, 230, 235, and 240 may be repeated one or more times over the course of time as new information becomes available or as production changes.

The invention may be further understood by the following non-limiting examples.

Example 1: Ketone Solvent as a Wettability Modifier for Improved Oil Recovery from Oil-Wet Porous Media This example investigates a novel class of oxygenated solvents that can enhance the oil recovery from oil-wet rocks by multiple mechanisms, such as wettability alteration, oil-viscosity reduction, and oil swelling, in the presence of brine (connate water and/or fracturing water). The compound studied for the first time in this research is 3-pentanone (3p), a symmetric short ketone that can partition into both oil and brine at reservoir conditions. It can act as a solvent by itself, but this example describes the potential mechanisms of oil recovery when an aqueous solution of 1.1 wt % 3p in reservoir brine (3 pRB) is in contact with oil and oil-wet rock.

Results show that the average contact angle of oil droplets on oil-aged calcite surfaces was rapidly reduced to 26° with 3 pRB, in contrast to 123° with RB, without affecting the oil/brine interfacial tension. Spontaneous imbibition results show that the oil recovery factor reached 50.0% with 3 pRB and 10.0% with RB at Day 3. The final recovery factor was 51.0% with 3 pRB and 12.0% with RB. The subsequent forced imbibition determined the Amott index to water of 0.76 with 3 pRB and 0.23 with RB, indicating a clear, positive impact of 3 pRB on oil recovery by water imbibition in the cores tested. A mechanism of oil recovery by 3 pRB in this example is the wettability change as demonstrated by the contact-angle experiment.

Horizontal drilling and multi-stage hydraulic fracturing have made it possible to recover oil from tight formations at economically feasible production rates. However, tight oil reservoirs often show a rapid decline in production rate. For example, a decline of 60%-70% in oil production rate within a first year has been reported for tight formations in the Eagle Ford. Primary recovery factors in tight oil reservoirs are typically lower than 10%.

In addition to their low permeabilities, the oil recovery from tight oil reservoirs is likely affected by heterogeneous petrophysical properties at different scales and phase distribution. The diversity of minerals and high total organic content (TOC) have been studied for various shale plays. For example, a rock sample from Wolfcamp contained 13 wt % quartz, 15 wt % clays, 46 wt % calcite, 19 wt % dolomite, 4 wt % feldspar, and 3 wt % pyrite with 5-6 wt % TOC in one study.

Different minerals show different wettability states. Quartz tends to show a water-wet state because the surface is negatively charged. In contrast, calcite tends to show an oil-wet state, because the positively charged surfaces can adsorb negatively charged oil components (naphthenic acids). In addition, the presence of organic matter also causes the rock to be in an oil-wet state. It has been reported that most tight oil reservoirs are originally intermediate-wet to oil-wet, which affects the multicomponent transport phenomena in tight formations in a complicated manner.

Various methods have been studied for recovering oil from mixed- to oil-wet rocks and altering their wettability state to more water-wet, such as surfactant-solution injection, alcohol-solution injection, and low-salinity water (LSW) injection. These wettability alteration agents are injected to facilitate water imbibition into tight rock matrices.

Surfactant-solution injection for improved oil recovery in tight oil reservoirs has been studied. The mechanisms of improved tight-oil recovery by the surfactant-solution injection include wettability alteration and interfacial tension (IFT) reduction between the oleic and aqueous phase. The IFT reduction has been found to be important, but the IFT should not reach an ultralow value (e.g., 10-3 mN/m) for improved oil recovery in tight reservoirs. An ultra-low IFT may limit the surfactant imbibition rate and, therefore, oil recovery. It has been demonstrated that oil recovery rate decreases with decreasing IFT when the wettability is altered by a surfactant solution. Similar results through novel imbibition experiments at high pressure have also been observed. Oil recovery from a tight reservoir can be improved by inducing wettability alteration with a moderate IFT reduction. This seems to be a marked difference from the conventional surfactant-enhanced oil recovery, which depends on achieving ultralow IFT during the convective oil displacement. More exploratory studies may be performed for surfactant-based methods for tight oil reservoirs. Several studies indicated that the diffusion of surfactants is a useful controlling parameter in oil recovery from tight rocks because surfactants are typically large molecules. However, some ultra-short hydrophobe surfactants are relatively short, and can be viewed as surface-active cosolvents.

Different types of surfactants (e.g., anionic, non-ionic, and cationic surfactants) have been compared in terms of wettability alteration and improvement in oil recovery. For example, both anionic and non-ionic surfactants may change the wettability of carbonate and siliceous shale samples, but the former may perform better than the latter. Non-ionic surfactants may not affect the wettability of siliceous shale, but anionic surfactants may alter its wettability.

A solution of 1-pentanol has been evaluated for wettability alteration. Contact angle measurements showed that 1 wt % 1-pentanol solution can significantly decrease the contact angle of a petroleum fluid on calcite. The effect was pronounced with 0.5 wt % 1-pentanol at high NaCl or $MgCl_2$ concentrations. This wettability alteration may arise from the accumulation of 1-pentanol in the thin brine film between oil and the rock surface.

LSW injection has been studied for conventional reservoirs, but also recently for tight oil reservoirs. A proposed mechanism of wettability alteration involves via synergistic interactions of $Ca^{2+}$, $Mg^{2+}$, and $SO_4^{2-}$ ions in seawater to remove the carboxylic acid groups of oil adsorbed in chalk cores. The mechanism may exploit the polar-polar interaction between negatively charged sulfate ions with positively charged rock surfaces that brings the wettability towards a more water-wet state.

Inspired by this mechanism through the action of sulfate ions, this example explores practical solvents that can weaken the interaction of polar oil components with positively charged rock surfaces. Since the carbonyl oxygen of ketones is electron-rich with a partially negative charge, it was hypothesized that ketone solvents might be able to alter the rock wettability towards a water-wet state. This hypothesis was successfully tested with acetone in initial screening of ketone solvents. However, the oleic phase was found to become highly viscous in the presence of water and acetone, as is the case with alcohol/water/oil mixtures. Then, the subsequent optimization reached a more favorable balance of the affinities for crude oil and brine with a larger alkyl side chain groups than acetone. On the basis of the exploratory study, this example presents an investigation focused on 3-pentanone that was found to act as a wettability alteration agent and also as a miscible solvent with crude oil at reservoir conditions.

3-Pentanone (3p) is a symmetric ketone with the chemical formula of $C_5H_{10}O$ and the following structure:

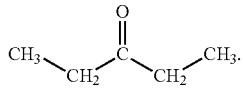

It is a colorless liquid at standard conditions, nontoxic, and widely used in the food industry. 3-Pentanone acts as a usual solvent in the oleic phase when the concentration is beyond the solubility limit in the aqueous phase. A significant portion of the 3p will partition from the aqueous phase to the oleic phase when a 3p aqueous solution is brought in contact with an oleic phase, regardless of the 3p concentration in the aqueous phase. Furthermore, it can interact with oil-wet surfaces, causing the wettability to a more water-wet state as will be described below.

This example describes the application of 3p as a sole additive to reservoir brine (RB) with no modification to RB's ionic composition and salinity. Use of a 3p solution in RB (3 pRB) is compared with use of RB alone to see the effect of the presence of 3p in RB on oil recovery.

Materials and methods. The materials and methods used for the investigation of the potential oil recovery mechanisms by 3 pRB, such as wettability alteration and oil viscosity reduction are described below and fundamental data, such as properties of the oil, RB, 3p, and 3 pRB, and the aqueous stability of 3 pRB are also provided.

Reservoir fluid properties. A crude oil sample was taken from a tight oil reservoir in Texas. The reservoir temperature is 347 K. The reservoir brine (RB) with a salinity of 68722 ppm was prepared in the lab by using available field data. Table 1 summarizes properties of the oil sample. Table 2 shows the ionic composition of RB. The density and viscosity of RB were measured to be 1030 kg/m³ and 0.56 cp at the experimental conditions in this research (347 K and atmospheric pressure).

TABLE 1

Properties of the crude oil sample used in this research

| | | |
|---|---|---|
| Molecular weight, g/mol | | 186 |
| Density, kg/m³ | | 822.5 (at 288.71 K) |
| SARA, wt % | Saturates | 76.7 |
| | Aromatics | 20.1 |
| | Resins | 3.2 |
| | Asphaltenes (pentane insoluble) | less than 0.1 |

Figure 3:
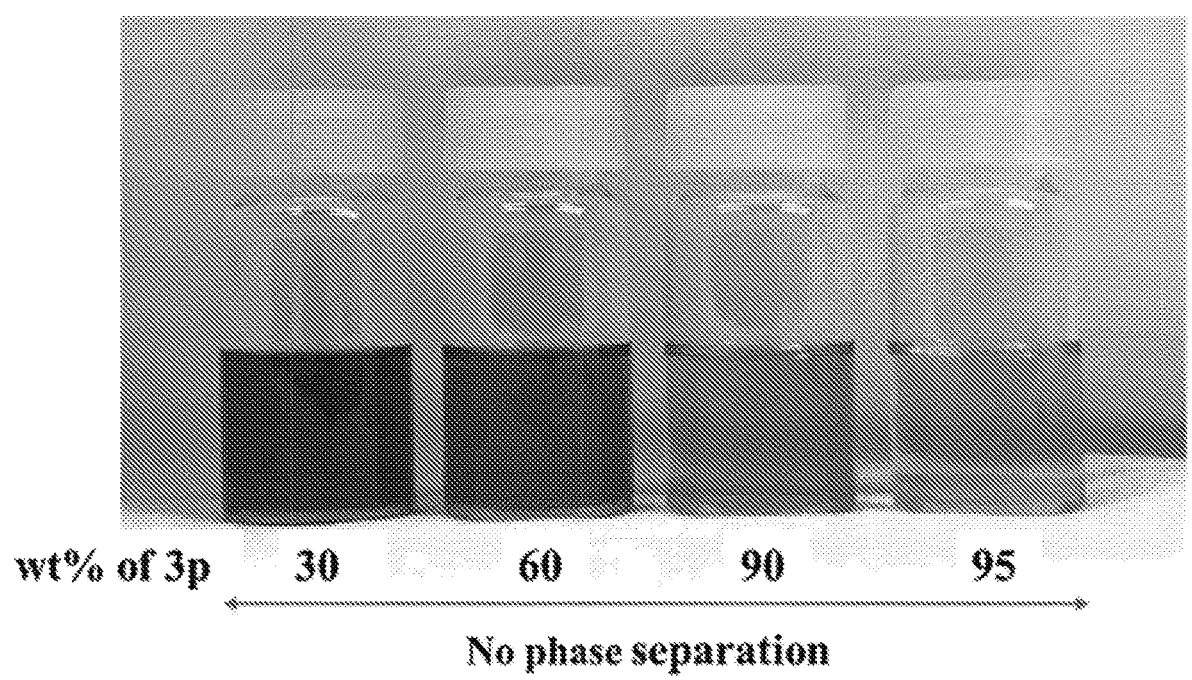
FIG. 3 provides a photograph of single-phase mixtures of 3p with the crude oil at room temperature.

3-Pentanone properties. A sample of 3p had a purity greater than 99% (Sigma-Aldrich). Vapor pressure measurements of 3p show that 3p is close to n-heptane in terms of volatility; that is, it is possible to inject 3p as part of the gaseous injection fluid. The density of 3p is 760 kg/m³ at the experimental conditions in this research (347 K and atmospheric pressure). FIG. 3 shows single-phase mixtures of 3p with the crude oil at room temperature. No phase separation was observed for the overall concentrations of 3p tested (between 30 wt % and 95 wt %).

TABLE 2

Composition of the reservoir brine (RB) used in this Example (68722 ppm). The density of RB was measured to be 1030 kg/m³ at 347 K and atmospheric pressure.

| Cations | ppm | Anions | ppm |
|---|---|---|---|
| $Na^+$ | 25,170 | $Cl^-$ | 41,756 |
| $K^+$ | 210 | $SO_4^{2-}$ | 108 |
| $Ca^{2+}$ | 1,292 | | |
| $Mg^{2+}$ | 187 | | |

Figure 4:
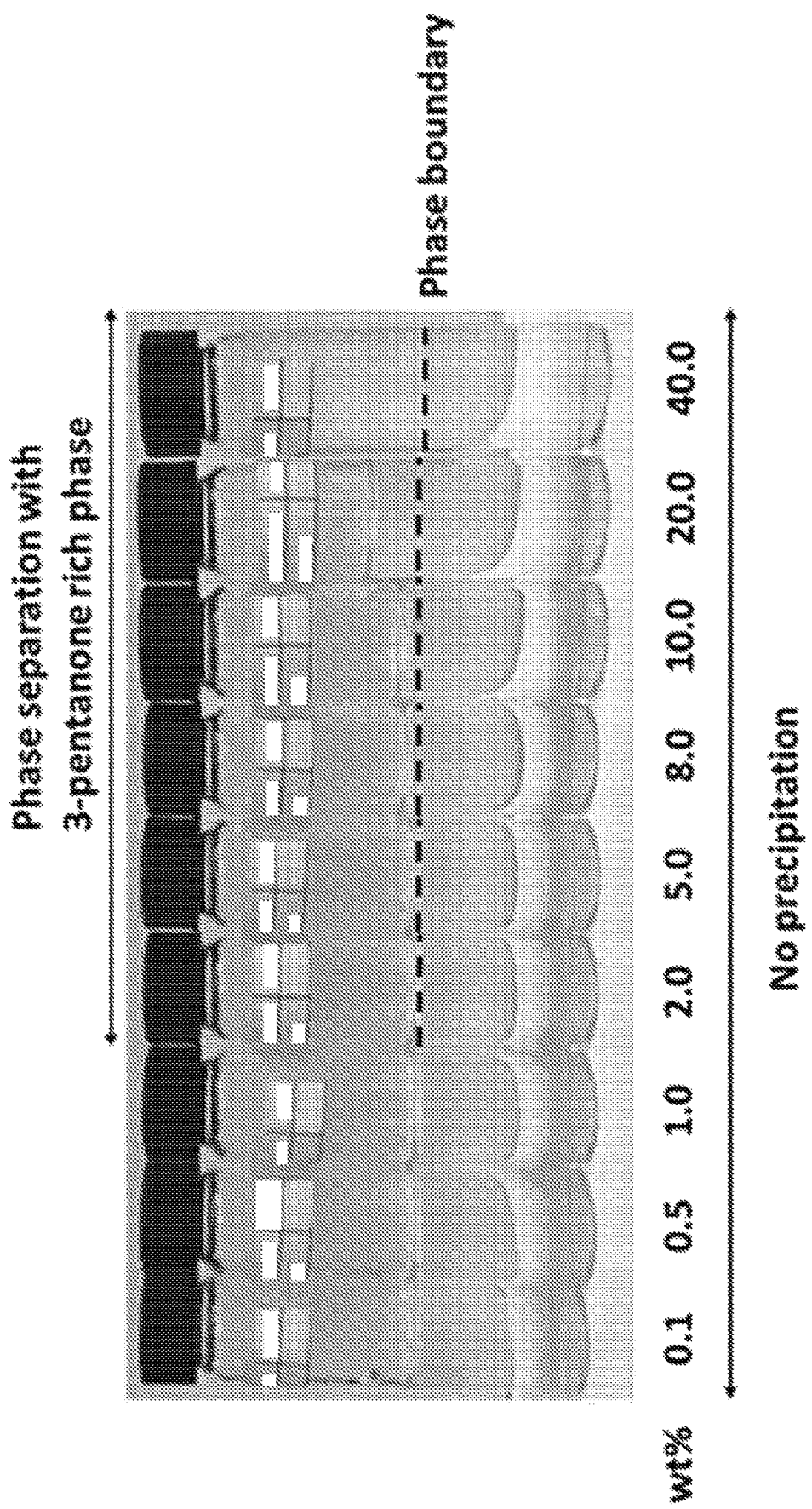
FIG. 4 provides a photograph of the aqueous stability was confirmed for 3-pentanone in reservoir brine at 347 K.

The aqueous stability was confirmed for 3p in RB (Table 2) at 347 K (FIG. 4). No salt precipitation was observed for the overall concentrations of 3p tested (0.1 wt %-40 wt %). A phase separation occurred with increasing concentration of 3p. There was a very small amount of excess 3p-rich phase at 2-wt % 3p. These results indicate that the 3p solubility limit in RB is lower than the aqueous stability limit at 347 K, which makes 3p suitable as an additive to a RB-based injection fluid. Quantitative $^1H$ NMR analysis indicated that the solubility limit of 3-pentanone in RB at 347 K is 1.1 wt %. This defined the maximum concentration of 3p in 3 pRB tested in this research. In comparison, the 3p solubility in deionized water at 347 K was measured to be 2.59 wt % in this research.

The densities of 1.1-wt % 3 pRB and 0.8-wt % 3 pRB were measured to be 1030 kg/m³ at the experimental conditions in this research (347 K and atmospheric pressure). The viscosity of 1.1-wt % 3 pRB was measured to be 0.52 cp by a rheometer at 347 K and atmospheric pressure.

Contact-angle experiments. Contact-angle experiments were performed by using polished flat calcite surfaces. Calcite was used because it is one of the major minerals often observed in tight formation rocks. Its positively charged surfaces can be made oil wet by adsorption of negatively charged oil components. The polished calcite pieces of approximate dimensions 5×2×0.5 cm³ were washed with deionized water. Then, the air-dried calcite pieces were aged in RB (Table 2) for 1 day at 347 K and air dried. Next, the brine-aged calcite pieces were aged in crude oil (Table 1) for at least 5 weeks, and then in a heavy oil for at least 1 week at 347 K. The heavy oil was used to ensure that the calcite surfaces are oil-wet. After the aging, the calcite pieces were retrieved and any excess oil was carefully removed from the surfaces.

The contact-angle experiments were performed with two aqueous solutions, RB and 1.1-wt % 3 pRB (the solubility limit) at 347 K. The solutions were degasified inside an oven at 368 K for at least 2 days. Then, two glass chambers were prepared, each of which contained one aqueous solution and one calcite piece. The glass chambers were placed in an oven at 368 K for 1 h to confirm that no gas bubble appeared. Then, two droplets of oil (Table 1) were placed on the bottom surface of each calcite piece in each glass chamber. After the placement of oil droplets, 3p was added to a glass chamber to make the 3p overall concentration of 8 wt %. The glass chambers were then tightly closed and placed in the oven at 347 K. Since 8 wt % was beyond the 3p solubility in RB at 347 K (1.1 wt %), an excess 3p phase was present above the 1.1-wt % 3p aqueous solution (FIG. 4). This excess 3p phase served as a reservoir that maintained the concentration of 3p in the aqueous phase at the 3p solubility limit as it dissolved into the oil during the experiment. This procedure avoided several issues that would occur if RB and the added 3p were mechanically mixed before the chamber was placed in the oven. For example, the air dissolution would occur if the mixture was mechanically stirred. Also, nucleation of the 3p phase might affect oil droplets on calcite surfaces upon a phase separation with increasing temperature.

Photos of oil droplets were taken at the initialization of the experiment and every several hours for up to three days. The contact angles of both sides of each oil droplet were measured using onscreen protractor software. An average contact angle and standard deviation were then calculated and plotted with respect to time for each aqueous solution tested.

IFT experiments. The IFT experiments were performed by use of a spinning drop tensiometer (SDT, Krüss, Germany) at 347 K. This device can measure IFTs between $10^{-6}$ and 2000 mN/m with a resolution of $10^{-6}$ mN/m. During the measurement, the denser phase was placed into a horizontal tube first, and then a droplet of the less dense phase was placed into the horizontal tube while the tube was rotating. The droplet was deformed owing to the rotation, which was visualized by using a high-power monochromatic light-emitting diode and stroboscope. The shape of a droplet spinning in the capillary tube was recorded by a high-resolution camera. The ADVANCE™ software was then used to analyze the shape of a droplet and calculate an IFT value, using the densities of the two phases at 347 K.

IFT values were measured for four systems: (1) crude oil and RB, (2) 3p and 1.1-wt % 3 pRB, (3) crude oil and 1.1-wt % 3 pRB, and (4) crude oil diluted by 18.6 wt % 3p and 0.8-wt % 3 pRB. System 1 was at phase equilibrium. A certain level of mass transfer was expected during the IFT measurement for the other three pseudo-binary systems. In system 2, water could transfer from 1.1-wt % 3 pRB to the 3p-rich phase. An IFT was estimated by using the densities of 3p and 1.1-wt % 3 pRB. In system 3, 3p could be transferred from RB to crude oil, which reduced the density of the oleic phase. Therefore, the upper-limit and lower-limit density values were assigned for the oleic phase to calculate a possible range of IFTs for this system. System 4 was tested to validate the range of IFT values estimated for system 3. To this end, an IFT was determined by using the density of the crude oil that was diluted by 18.6 wt % 3p and the density of 0.8-wt % 3 pRB at 347 K. These concentrations correspond to the values from the samples taken from the oleic and aqueous phases that were present in the Amott cell after the imbibition experiment as will be explained later.

Figure 5:
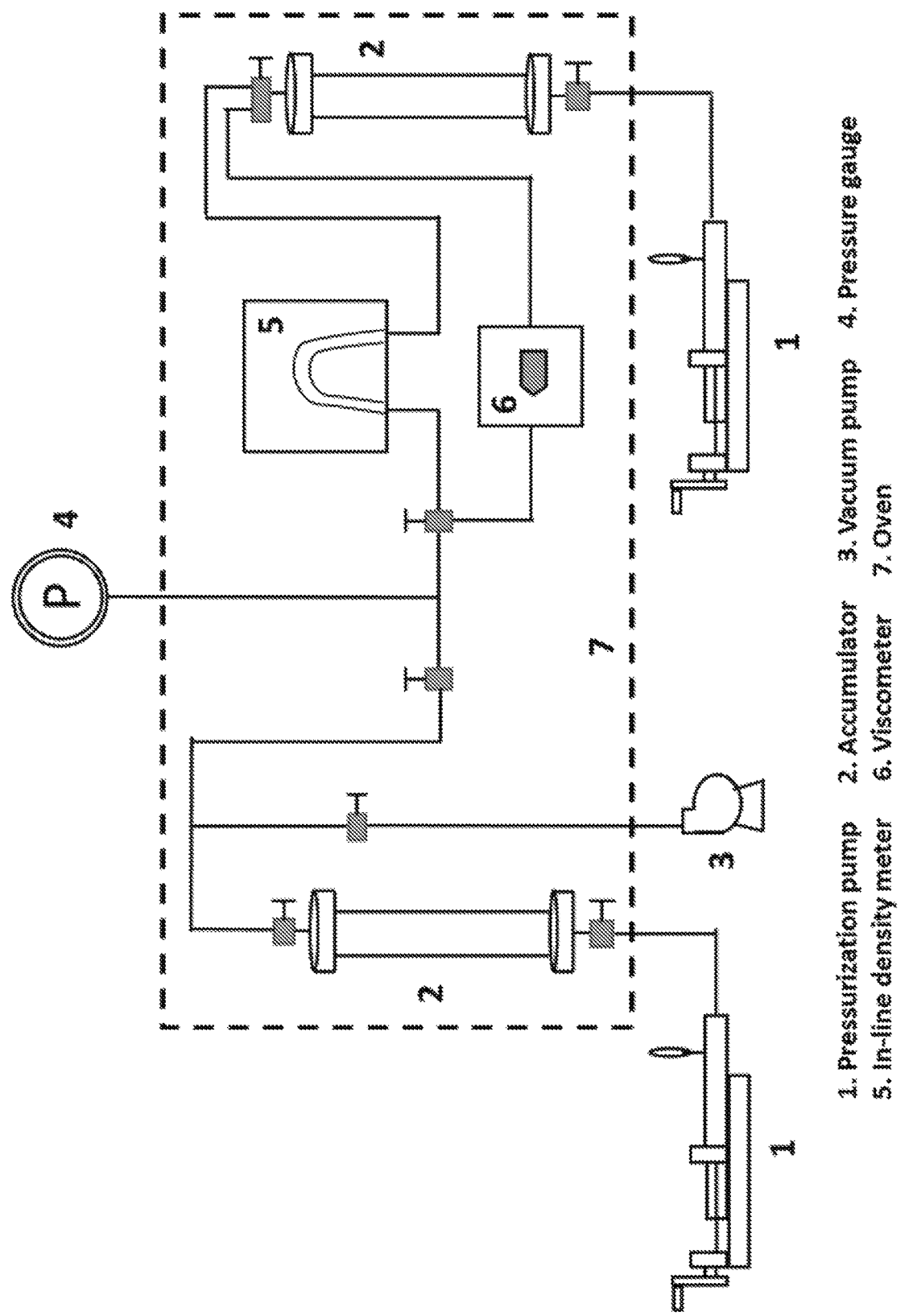
FIG. 5 provides a schematic of the experimental set up for density and viscosity experiments.

Density and viscosity experiments. FIG. 5 shows a schematic of the experimental set up for density and viscosity experiments. The system consists mainly of automated pumps, a sample accumulator, an in-line fluid densitometer, an in-line viscometer, an oven, and an effluent accumulator. The pump (Teledyne ISCO 100DX) maintained the system pressure automatically by water.

In the density measuring cell (Anton Paar DMA-HPM), fluid's density is measured in a U-shaped tube, in the range from 0 to 3000 kg/m³. The instrument precision of the density meter is ±1 kg/m³. Anton Paar DMA-HPM uses the method of oscillating U-tube for its density measurement, in which the sample's density is calculated from the sample's period of oscillation. The in-line viscometer (ViscoPro 2100) measures the viscosity of a fluid in the range from 0.2 to 2 cp. The instrument precision of the viscometer is ±0.02 cp and repeatability is ±0.5% of the reading. During the viscosity measurement, the magnetic piston is surrounded by the fluid sample and oscillates under magnetic force. The sample's viscosity is calculated from the time required for the piston to complete a two-way cycle. The viscometer and density meter were placed in a Despatch oven (model LAC2-18-8). Light-emitting diode screens that display measured data from the fluid densitometer and viscometer were connected outside the oven. The absolute pressure of the system was measured with a pressure gauge (Omega PX459-2.5KGI-EH).

Densities and viscosities were measured for the following mixtures of crude oil and 3p: 81.4 wt % crude oil and 18.6 wt % 3p (33 mol % 3p), 59.0 wt % crude oil and 41.0 wt % 3p (60 mol % 3p), and 35.1 wt % crude oil and 64.9 wt % 3p (80 mol % 3p). Each mixture was mixed in a glass bottle with a magnetic mixer before placing it in the accumulator.

Before each measurement, the system was cleaned thoroughly with toluene. Then, the system was dried by air and evacuated. Next, the fluid mixture was pumped into the system from the accumulator. Then, the temperature in the oven was increased to 347 K. When the temperature in the oven was stable, the mixture was measured for viscosities and densities at different pressures, ranging from 101 kPa to 10342 kPa.

Spontaneous imbibition. Spontaneous imbibition experiments were performed using Amott cells at 347 K to quantify the effect of 3p on oil recovery through water imbibition. Indiana limestone cores with a length of 0.127 m and a diameter of 0.0254 m were used for this research. Limestone cores can represent an oil-wet condition by aging them in oil. The inverse Bond number ($N_B^{-1}$) with these cores ranged from 33 to 38:

$$N_B^{-1} = C \frac{\sigma \sqrt{\phi/k}}{\Delta \rho g H}. \quad (1)$$

An imbibition process is said to be capillary-force dominated when $1/N_B$ is larger than 5. That is, the imbibition in this research was capillary-force dominated so that the experiment could capture the effect of wettability on oil recovery. In Eq. (1), $N_B$ is Bond number, C is 0.4 for the capillary tube model, σ is interfacial tension, ϕ is porosity, k is permeability, Δρ is the density difference between the aqueous and oleic phases, and H is the height of the core.

Figure 6:
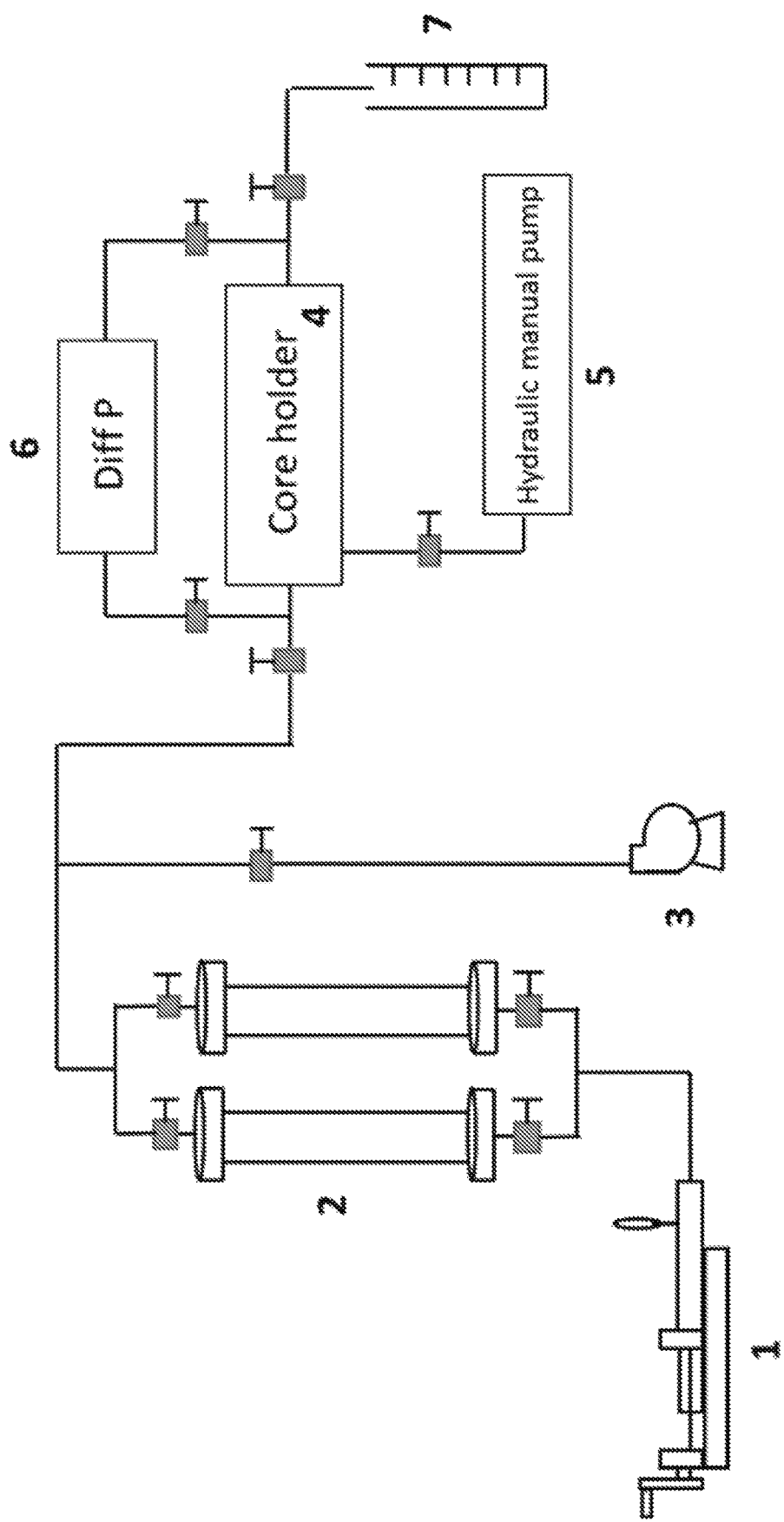
FIG. 6 provides a schematic of the saturating cores.

The cores were saturated with RB and oil. FIG. 6 shows a schematic of the core-flooding system used. It includes two accumulators for RB and crude oil, a pump, a Hassler type core-holder, a vacuum pump, a hydraulic manual pump to maintain the overburden pressure, a differential pressure gauge, and cylinders.

After a core was placed in the core holder, the system was evacuated. Then, the core was saturated with RB. The effective porosity of the core was determined by subtracting the system's dead volume (3.65 cm³) from the volume injected. Then, the permeability of the core was determined by RB injection rates and differential pressures. Next, the crude oil (Table 1) was injected into the core at 50 cm³/h. After the oil breakthrough, the injection rate was increased to 100 cm³/h to minimize the capillary end effect. The injection of crude oil at 100 cm³/h was continued until the water production became unmeasurable. A residual water saturation was estimated from the produced brine volume. Table 3 summarizes the measured porosity, permeability, water saturation and oil saturation for the core samples used in the imbibition experiment. Finally, the oil-saturated cores were placed in a container filled with the crude oil for at least three weeks at 347 K. Similar initial water/oil saturations were previously achieved with Indiana limestone cores.

TABLE 3

Properties of the two cores used for the imbibition experiments. RB and 3pRB stand for reservoir brine and 1.1- wt % 3-pentanone in RB, respectively.

|  | Core for the RB case | Core for the 3pRB case |
|---|---|---|
| Porosity | 0.196 | 0.200 |
| Permeability, mD | 28.0 | 35.1 |
| Water saturation | 0.57 | 0.54 |
| Oil saturation | 0.43 | 0.46 |

The two cores prepared (Table 3) were used for imbibition experiments with the following aqueous solutions: RB and 1.1-wt % 3 pRB. To this end, RB and a mixture of 8 wt % 3p and 92 wt % RB were prepared one day prior to the imbibition experiment and placed in an oven at 347 K to minimize the amount of dissolved gas. The mixture of 8 wt % 3p and 92 wt % RB showed an excess 3-p phase as the overall 3p concentration was beyond the solubility of 3p in RB at 347 K. In the preparation of the imbibition experiment, core samples were placed inside the imbibition cells first. Then, RB and the 3p/RB mixture were carefully poured into the respective Amott cells. This was done without cooling the solutions and inside a heated oven to minimize any oil recovery due to thermal expansion of fluids. Then, the excess 3p phase that was present above 1.1 wt % 3 pRB (the 3p solubility in RB at 347 K) was carefully removed from the Amott cell prior to the imbibition experiment. Note that the removal of the excess 3p phase was not done for the contact angle measurement for 1.1-wt % 3 pRB, but was done here to avoid the mixing of the recovered oil with the excess 3p phase present in the glass-tube part of the Amott cell. That is, the 3p concentration in the aqueous phase was not kept at the solubility limit (1.1 wt %) in this imbibition experiment as 3p was gradually dissolved in the oleic phase. During the experiment, no attempt was made to detach oil drops from the core surfaces.

The recovered oleic-phase volume was periodically measured during the imbibition experiment at 347 K. For the 3 pRB case, 3p could be transferred from the aqueous to the oleic phase; therefore, the amount of 3p in the recovered oil was measured by quantitative $^1$H NMR analysis and subtracted from the amount of the oleic phase recovered in the Amott cell. The same NMR analysis was performed for the 3p aqueous solution inside the Amott cell after the experiment.

Figure 7:
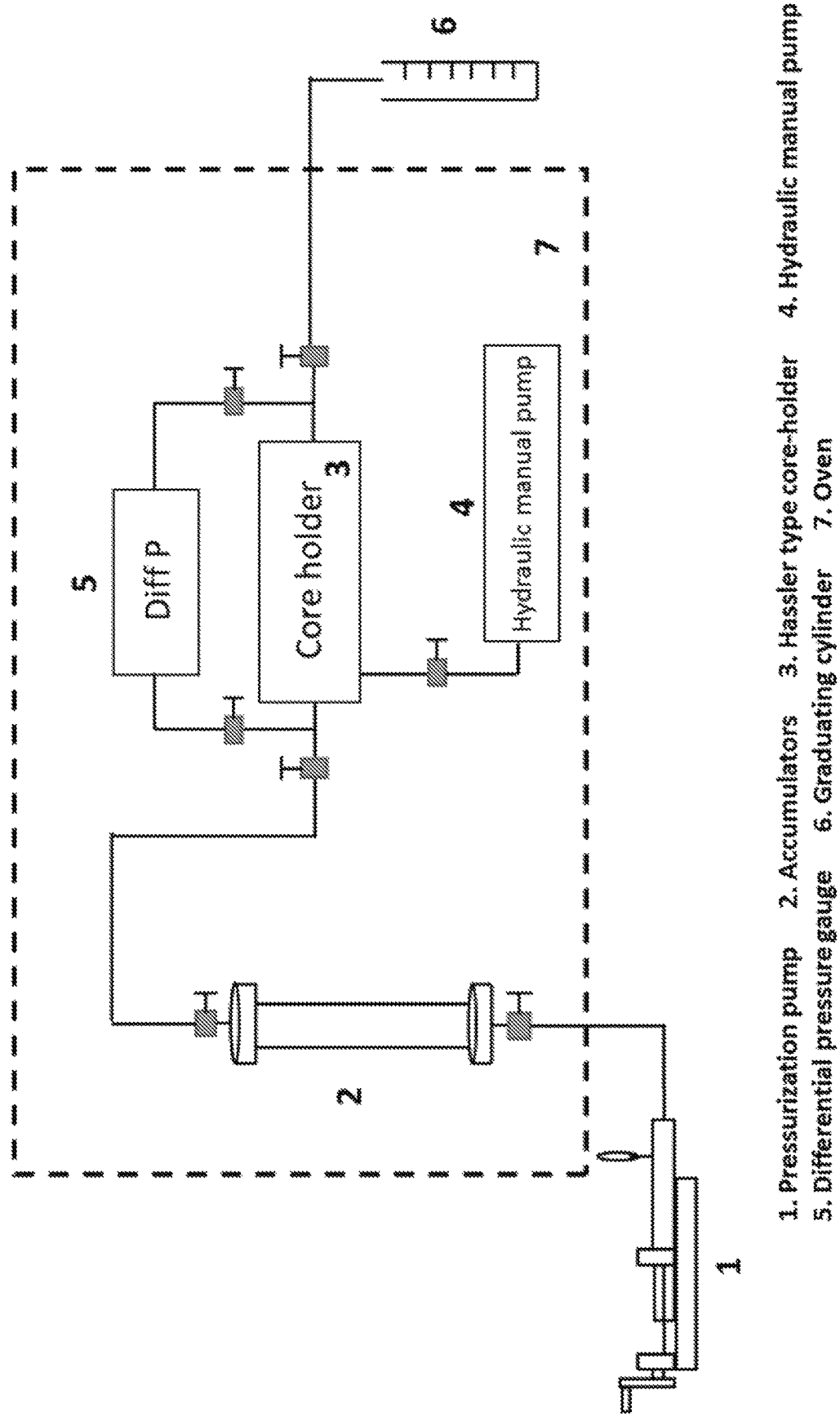
FIG. 7 provides a schematic of the experimental set up for the forced imbibition.

Forced imbibition. The spontaneous imbibition was followed by forced imbibition for the same cores with their corresponding displacing fluids, RB and 1.1-wt % 3 pRB, at 347 K. FIG. 7 shows a schematic of the experimental set up for this forced imbibition. It includes an accumulator for the aqueous phase to be injected, a pump, a Hassler type core-holder, a hydraulic manual pump to maintain the overburden pressure, a differential pressure gauge, and an oven. The connecting lines were filled with the displacing fluid prior to the placement of a core inside the core holder.

Before the forced imbibition, the recovered oleic phase and the remaining aqueous solution in the Amott cell were transferred to clean containers. Then, the core was taken from the Amott cell and placed inside the core holder. The aqueous solution was injected into the core holder at a constant flow rate at 347 K. The outlet pressure was constant at the atmospheric pressure. The produced oil and water were collected outside the oven. The produced oleic-phase volume and pressure drop along the core were recorded periodically. Once the water cut reached 100%, the injection rate was increased to reduce the capillary end effect. The recovered oil amount by the forced imbibition by 1.1-wt % 3 pRB was determined by quantitative $^1$H NMR that gave the 3p concentration in the recovered oil.

According to Rapoport and Leas, the capillary effect can be neglected when the scaling coefficient $Lu\mu_w$ is greater than 0.5-3.5 cm$^2$ cp/min, in which L is the length of the core sample, u is the injection rate, and $\mu_w$ is the viscosity of the aqueous solution. For the forced imbibition with RB, the injection rate was 32 cm$^3$/h, which gave the Rapoport-Leas scaling coefficient of 0.8 cm$^2$ cp/min and the capillary number of 9.0×10$^{-7}$. The oil production became undetectable after 5 pore volumes of injection (PVI). Then, the injection rate was increased to 257 cm$^3$/h, which gives the Rapoport-Leas scaling coefficient of 6.0 cm$^2$ cp/min and the capillary number of 7.2×10$^{-6}$.

For the forced imbibition with 3 pRB, the injection rate was 32 cm$^3$/h, which gave the Rapoport-Leas scaling coefficient of 0.7 cm$^2$ cp/min and the capillary number of 8.3×10$^{-7}$. The water-cut became 100% after 10 PVI. Then, the increased injection rate of 129 cm$^3$/h gave the Rapoport-Leas scaling coefficient of 2.8 cm$^2$ cp/min and the capillary number of 3.3×10$^{-6}$. No additional oil was recovered by the increased injection rate.

Results and discussion. The main results of the contact angle, IFT, density, viscosity, and imbibition experiments are presented. The oil recovery results from the imbibition experiment are explained by several important mechanisms of 3 pRB.

Figure 8A:
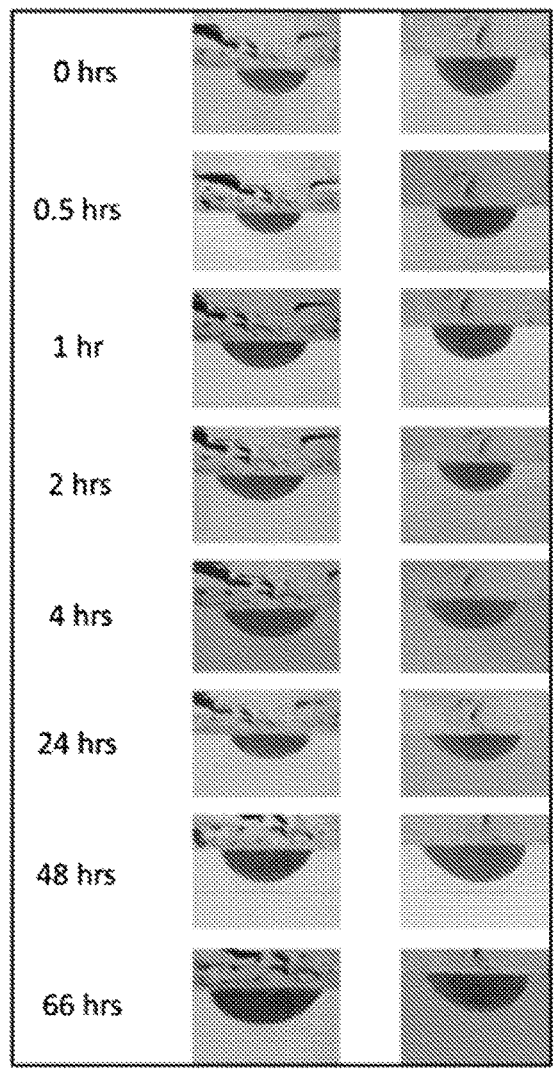
FIG. 8A provides photographs of oil droplets on an oil-aged calcite chip in reservoir brine without use of an oxygenated solvent.

Contact-angle experiments. As described above, two aqueous solutions were tested, RB and 1.1-wt % 3 pRB (the 3p solubility limit), at 347 K. FIG. 8 shows the change in contact angle with the two solutions. For the RB case (FIG. 8a), the initial average contact angle was 105°, but an equilibrium state after 24 h gave a contact angle of 123°. That is, RB did not reduce the contact angle.

Figure 8B:
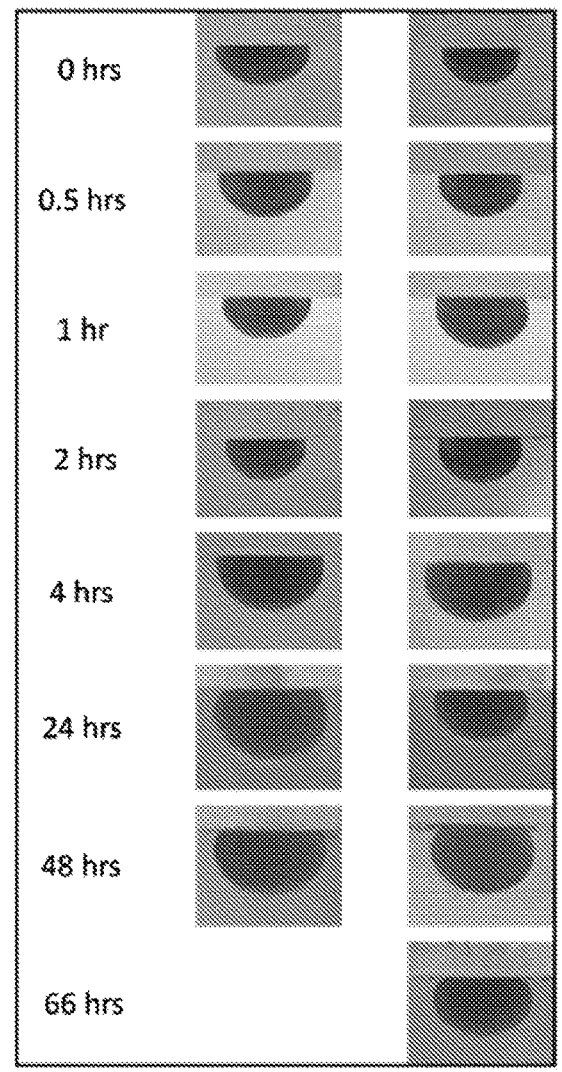
FIG. 8B provides photographs of oil droplets on an oil-aged calcite chip with an oxygenated solvent (3-pentanone) solution at its solubility limit in reservoir brine, showing that within one day of the experiment commencement, all oil droplets were detached from the top surface FIG. 9 provides the average contact angles for reservoir brine and 1.1-wt % 3 pRB at 347 K.
Figure 9:
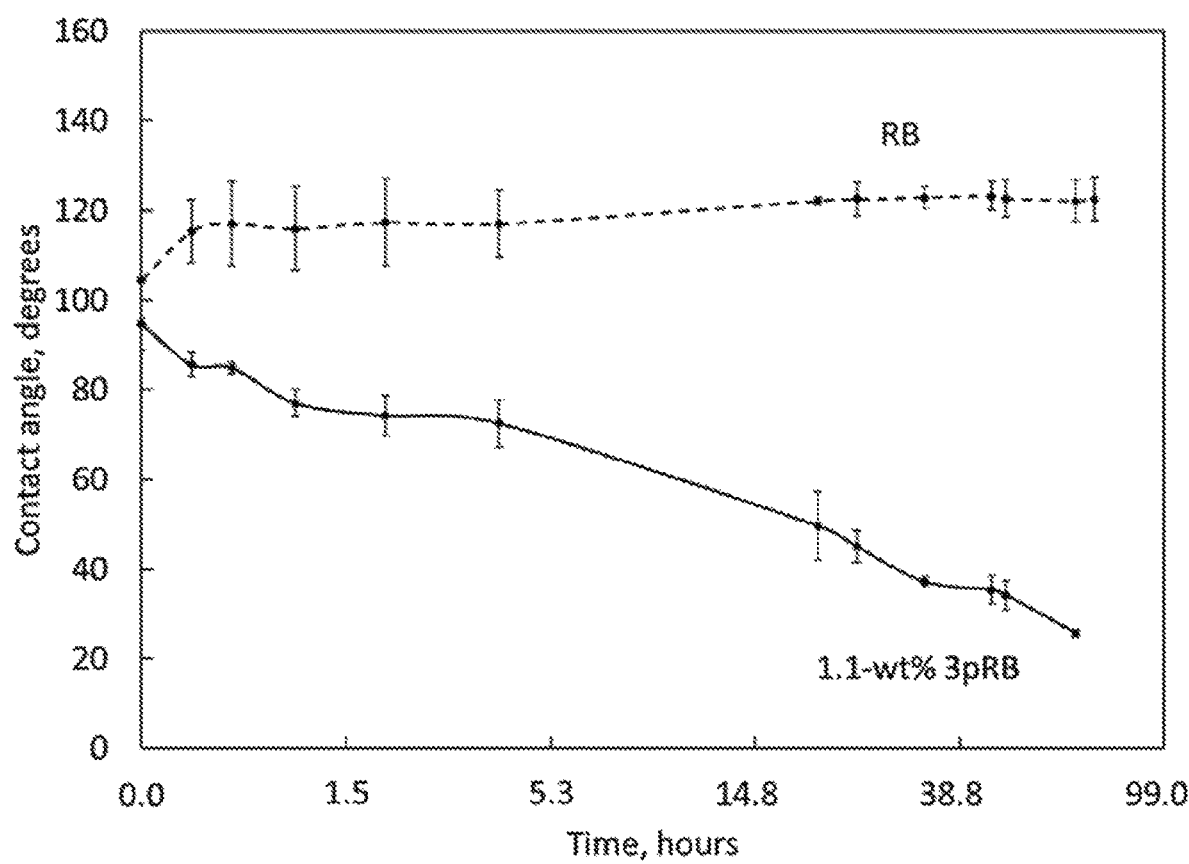

FIG. 8b shows the results for 1.1-wt % 3 pRB. The initial average contact angle was 95°. It rapidly decreased to 74° within 2 h, and then gradually decreased to 26° at 66 h, rendering the calcite surface strongly water-wet. After 3 days, no oil droplets were observed on the calcite surface. FIG. 9 compares the average contact angles for the tested solutions, and shows the rapid reduction in contact angle by 1.1-wt % 3 pRB, especially for the initial few hours.

The mechanism of wettability alteration by 3 pRB is related to the carbonyl oxygen of 3p that is electron-rich because of the inductive electron donation from two alkyl groups. The electron-rich oxygen atom of 3p can reduce the interaction of positively charged rock surfaces and the carboxylate groups that anchor the oil to the surface. This dipole-ion interaction between the 3p molecules and the calcite surface likely caused the wettability to change from oil-wet to strongly water-wet, and the partial or complete detachment of oil molecules from the surface. Note that this interaction between 3p molecules and the calcite surface are expected through the aqueous and oleic phases because 3p partitions into both phases.

IFT experiments. The four fluid systems tested are described above. Table 4 shows the IFT values for the four fluid systems. For system 1, no net mass transfer was expected between the phases during the experiment. For system 2, water could be transferred from 1.1-wt % 3 pRB to the 3p-rich phase. The IFT value for system 2 was estimated by using the densities of 3p and 1.1-wt % 3 pRB.

For system 3, it is likely that the mass transfer of 3p occurred from the aqueous to the oleic phase during the experiment. Therefore, a range of IFTs was estimated by using the upper and lower limit density values for the oleic phase. The upper and lower limits in density for the oleic phase are the crude oil density and 3p density, respectively. For the aqueous phase density, both 1.1-wt % 3 pRB and RB were measured to be 1030 kg/m³. Among the fluid systems given in Table 4, system 3 is most relevant to the proposed method of oil recovery by injection of 1.1-wt % 3 pRB.

TABLE 4

IFT for four systems at 347 K and atmospheric pressure: (1) crude oil and RB, (2) 3p and 1.1- wt % 3pRB, (3) crude oil and 1.1- wt % 3pRB, and (4) crude oil diluted by 18.6 wt % 3p and 0.8- wt % 3pRB.

|  | Sample name and its density at 347 K, kg/m³ |  | IFT, mN/m |
|---|---|---|---|
| System 1 | Crude oil | 780 | 11.44 |
|  | Reservoir brine | 1030 |  |
| System 2 | 3-Pentanone | 760 | 10.02 |
|  | 1.1- wt % 3pRB | 1030 |  |
| System 3 | Crude oil with no 3p | 780 | 11.05 |
|  | 1.1- wt % 3pRB | 1030 |  |
|  | 3-Pentanone with no crude oil | 760 | 11.94 |
|  | 1.1- wt % 3pRB | 1030 |  |
| System 4 | Crude oil diluted with 18.6 wt % 3-pentanone | 772 | 10.68 |
|  | 0.8- wt % 3pRB | 1030 |  |

These results show that the presence of 3p had essentially no effect on the IFT between the oleic and the aqueous phases. The impact of 3p on the IFT was limited because of the small amount of 3p in the aqueous phase at the experimental condition (i.e., 1.1 wt % in this experiment). This result indicates that the reduction in contact angle measured for 3 pRB was a consequence of wettability alteration for the nearly constant IFT around 11 mN/m.

Figure 10:
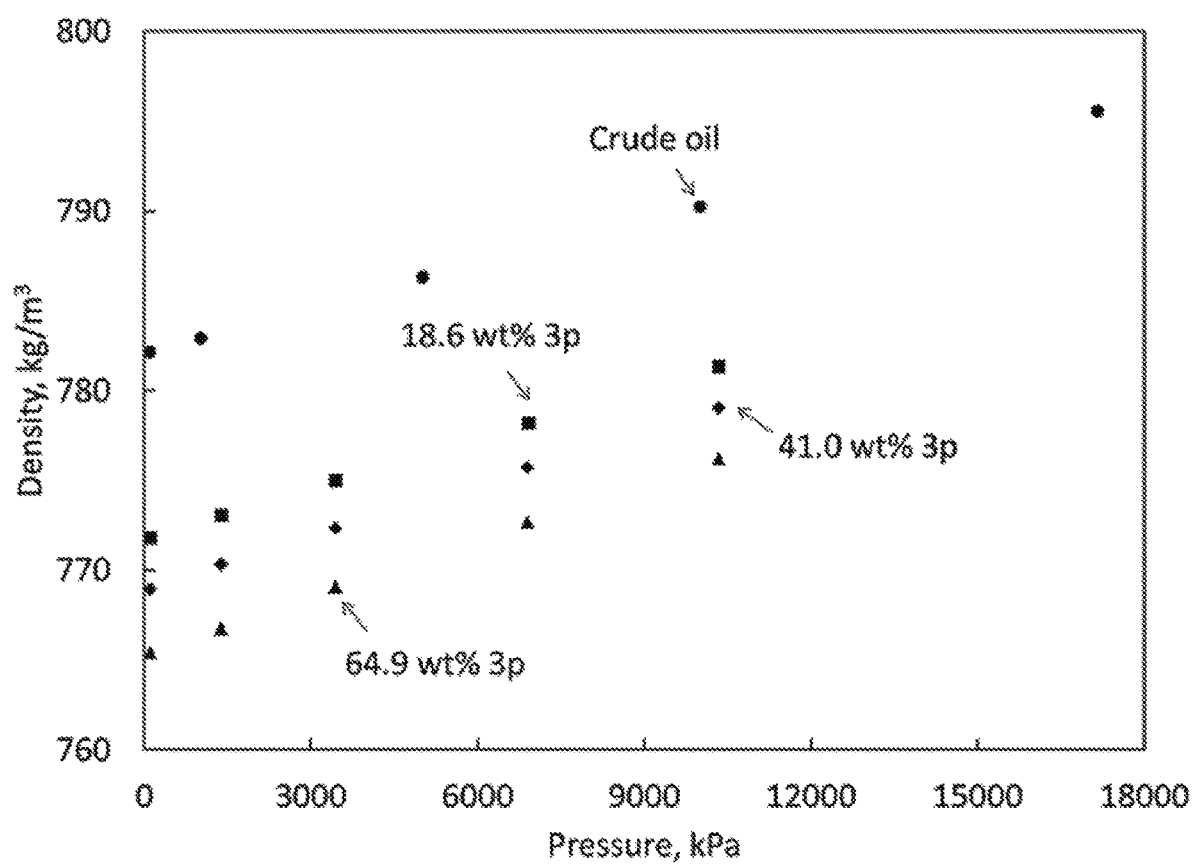
FIG. 10 provides the densities measured for the mixtures of crude oil and 3p.
Figure 11A:
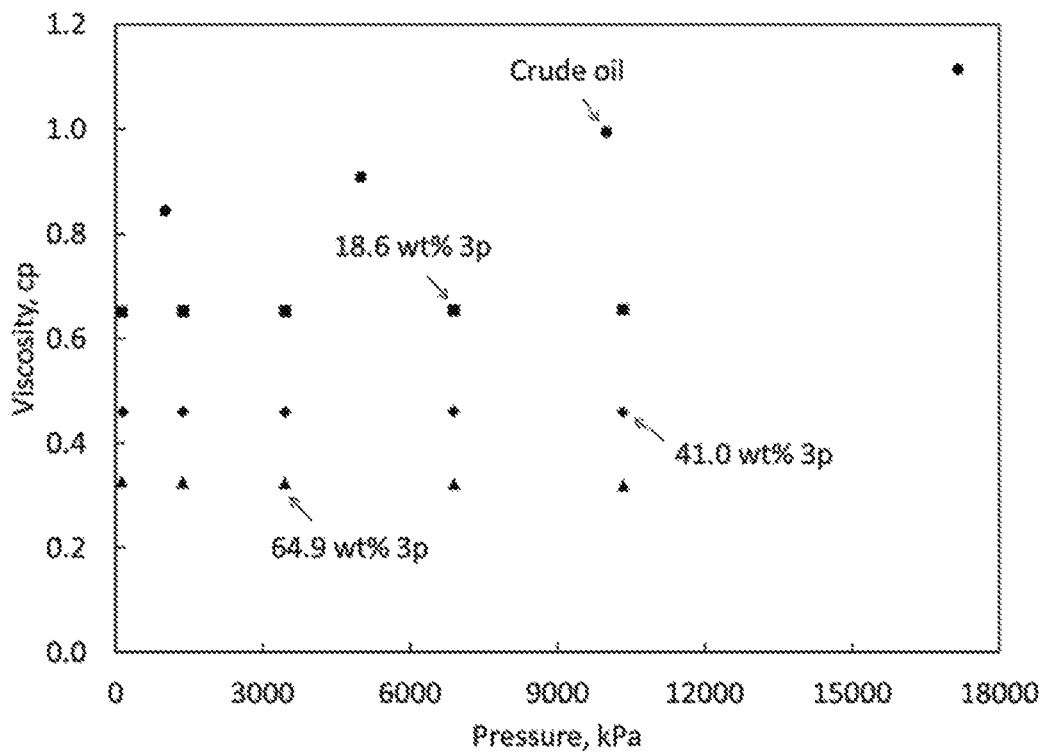
FIG. 11A and FIG. 11B provides the viscosities measured for mixtures of crude oil and 3p.

Density and viscosity experiments. Tables 5 and 6 provide the densities and viscosities measured for the three mixtures of crude oil and 3p as described above. They are also shown in FIG. 10 and FIG. 11A. Table 5 and FIG. 10 show that the mixture density slightly decreases with increasing 3p concentration and decreasing pressure.

Table 6 and FIG. 11A show that the oleic-phase viscosity decreased with increasing 3p concentration. Comparison of the original oil viscosity with the viscosity of 64.9 wt % (80 mol %) 3p and 35.1 wt % oil indicates a viscosity reduction by a factor between two and three. The oil viscosity reduction can improve the oil recovery rate during the imbibition of 3 pRB, as will be further analyzed with scaling theory below.

TABLE 5

The densities of crude oil and its mixtures with 3-pentanone.

| 0 wt % 3-Pentanone (344 K) | | 18.6 wt % (33 mol %) 3-Pentanone (347 K) | | 41.0 wt % (60 mol %) 3-Pentanone (347 K) | | 64.9 wt % (80 mol %) 3-Pentanone (347 K) | |
|---|---|---|---|---|---|---|---|
| Pressure kPa | Density kg/m³ | Pressure kPa | Density kg/m³ | Pressure kPa | Density kg/m³ | Pressure kPa | Density kg/m³ |
| 96.53 | 782.1819 | 103.97 | 771.8049 | 107.01 | 768.9360 | 101.01 | 765.4374 |
| 999.74 | 782.9128 | 1385.02 | 773.0452 | 1379.02 | 770.3187 | 1383.02 | 766.7794 |
| 4998.70 | 786.3198 | 3452.00 | 775.0159 | 3447.03 | 772.3456 | 3445.03 | 769.0788 |
| 9997.40 | 790.2524 | 6899.03 | 778.2247 | 3891.03 | 775.7424 | 6896.00 | 772.6733 |
| 17140.37 | 795.5964 | 10345.03 | 781.3632 | 10343.03 | 779.0497 | 10342.00 | 776.2332 |

TABLE 6

The viscosity of crude oil and its mixtures with 3-pentanone.

| 0 wt % 3-Pentanone (344 K) | | 18.6 wt % (33 mol %) 3-Pentanone (347 K) | | 41.0 wt % (60 mol %) 3-Pentanone (347 K) | | 64.9 wt % (80 mol %) 3-Pentanone (347 K) | |
|---|---|---|---|---|---|---|---|
| Pressure kPa | Viscosity cp | Pressure kPa | Viscosity cp | Pressure kPa | Viscosity cp | Pressure kPa | Viscosity cp |
| 96.53 | 0.8284* | 134.38 | 0.6522 | 157.89 | 0.4609 | 135.9 | 0.3267 |
| 999.74 | 0.8450 | 1381.57 | 0.6534 | 1375.71 | 0.4604 | 1381.57 | 0.3264 |
| 4998.70 | 0.9090 | 3448.00 | 0.6533 | 3448.00 | 0.4596 | 3446.55 | 0.3242 |
| 9997.40 | 0.9950 | 6887.59 | 0.6545 | 6889.10 | 0.4613 | 6893.45 | 0.3221 |
| 17140.37 | 1.1150 | 10336.00 | 0.6561 | 10337.52 | 0.4592 | 10340.41 | 0.3205 |

*This value was extrapolated from the crude oil viscosities at 344 K and 999.74 kPa-17140.37 kPa.

Spontaneous imbibition. The imbibition experiment with 1.1-wt % 3 pRB was compared with that with RB as the base case at 347 K. No oil recovery was observed when the core samples were immersed in the solutions. This indicated that the cores were oil-wet after the aging at 347 K for 3 weeks. The experiment was concluded within two weeks after confirmation of no more oil recovery.

Figure 12A:
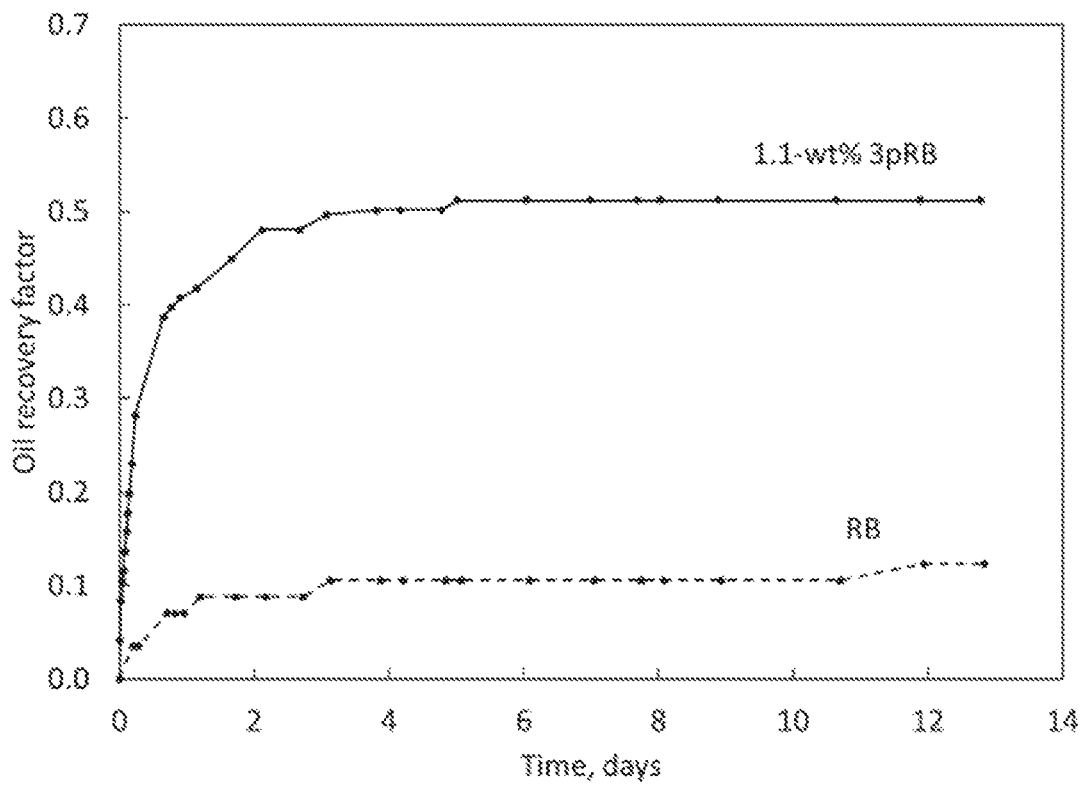
FIG. 12 provides data showing the oil recovery factors obtained by the spontaneous imbibition with RB and 1.1-wt % 3 pRB at 347 K.
Figure 12B:
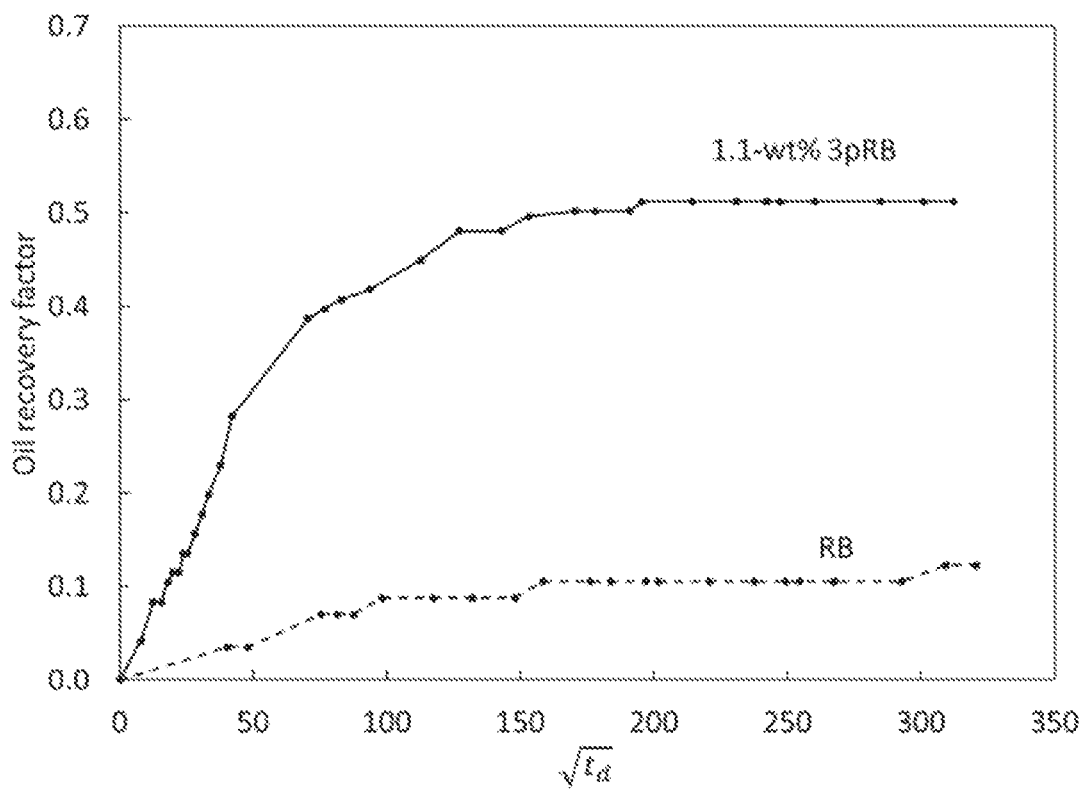

FIG. 12 compares the oil recovery factors obtained by the spontaneous imbibition with RB and 1.1-wt % 3 pRB at 347 K. The oil recovery factor from the oil-aged limestone core reached 45% at 2 days and the final oil recovery of 51.0% in the 3 pRB case. In contrast, the final oil recovery was 12.0% in the RB case.

As given above, the initial concentration of 3p in RB was 1.1 wt % (the solubility of 3p in RB at the experimental pressure and temperature). After the experiment, the 3p concentration was 18.6 wt % in the recovered oleic phase and 0.8 wt % in the aqueous phase outside the core. This confirmed the mass transfer of 3p from the aqueous phase to the oleic phase, causing oil viscosity reduction and oil swelling by 3p. It is unknown how the 3p amount inside the core was distributed under a transient non-equilibrium state during the experiment.

Figure 13:
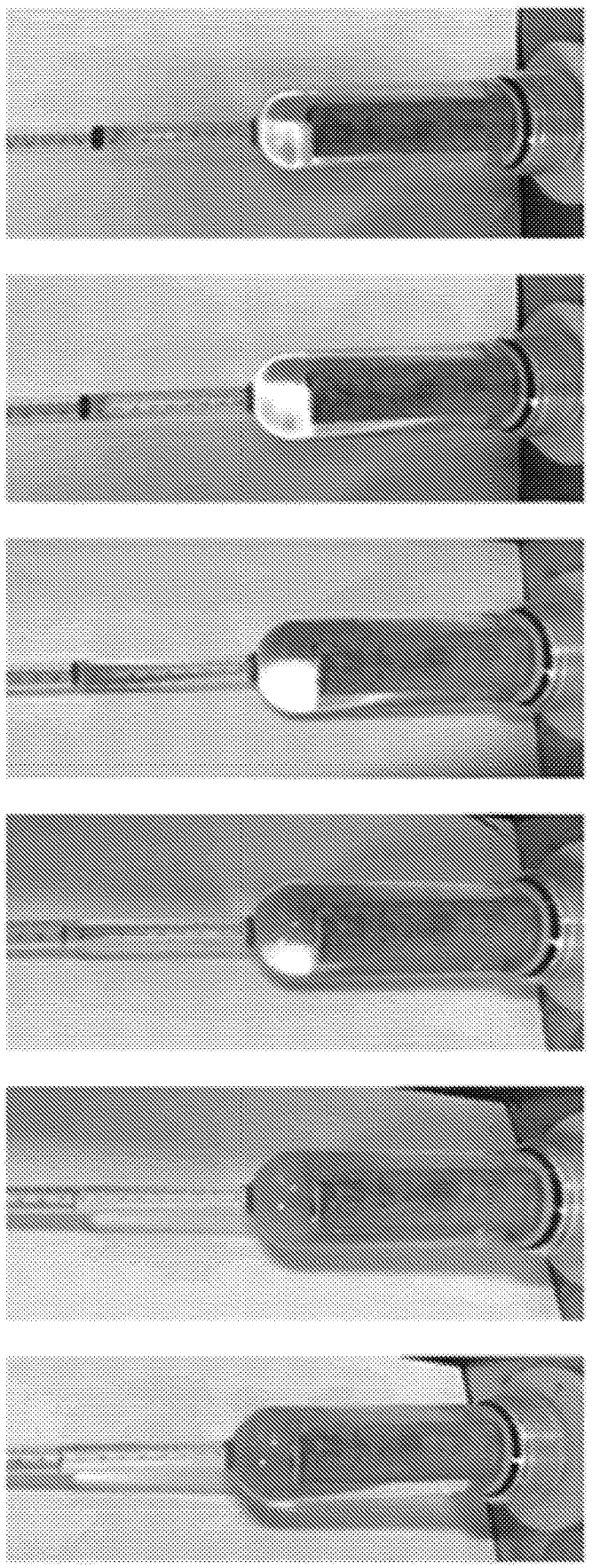
FIG. 13 provides photographs of oil recovery from a spontaneous imbibition test with RB at 347 K.
Figure 14:
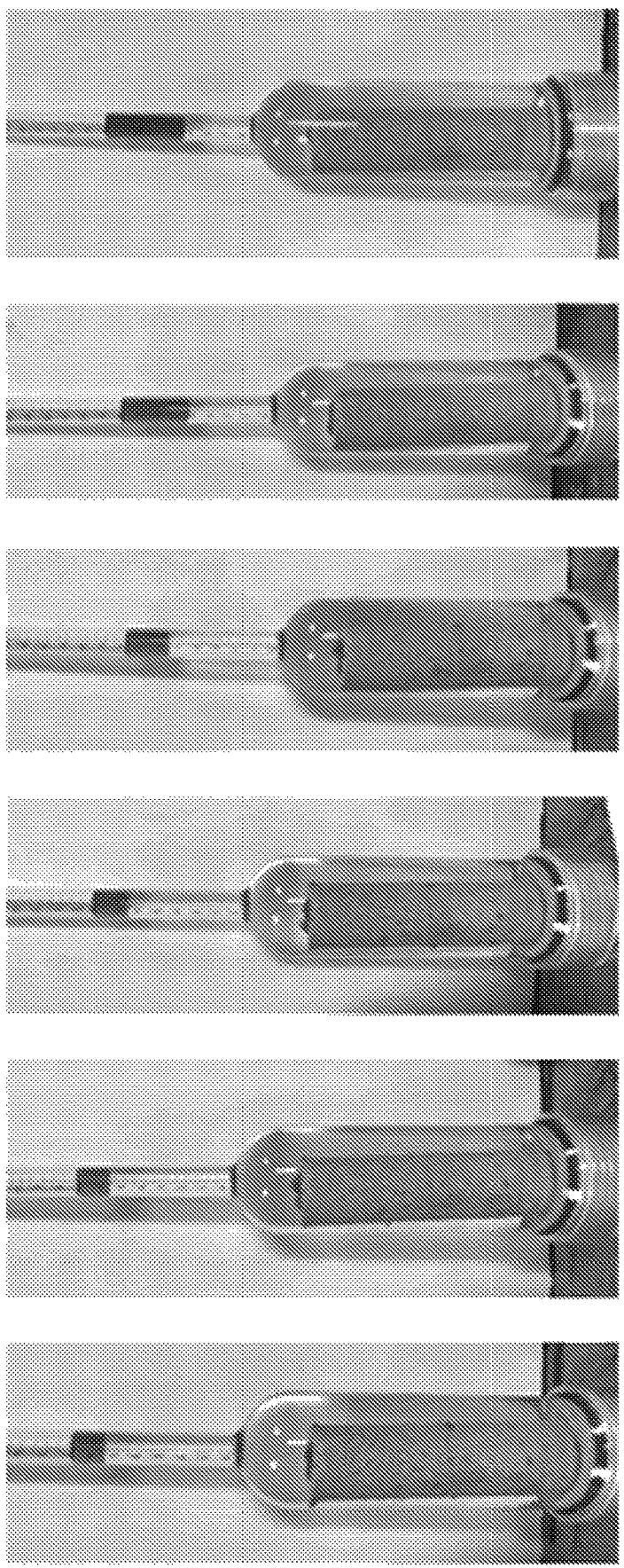
FIG. 14 provides photographs of oil recovery from a spontaneous imbibition test with 1.1-wt % 3 pRB at 347 K.

FIG. 13 shows that oil was produced from the top of the core in the RB case, indicating the contribution of buoyancy to oil recovery. FIG. 14 shows that oil was produced not only from the top, but also from the side surface of the core in the 3 pRB case. This indicates that the counter- and co-current flow contributed to the oil recovery with 3 pRB likely because of the wettability alteration without affecting the water/oil IFT, oil swelling, and oil viscosity reduction in addition to the buoyant force. FIG. 14 also shows that 3 pRB created no emulsion.

Figure 11B:
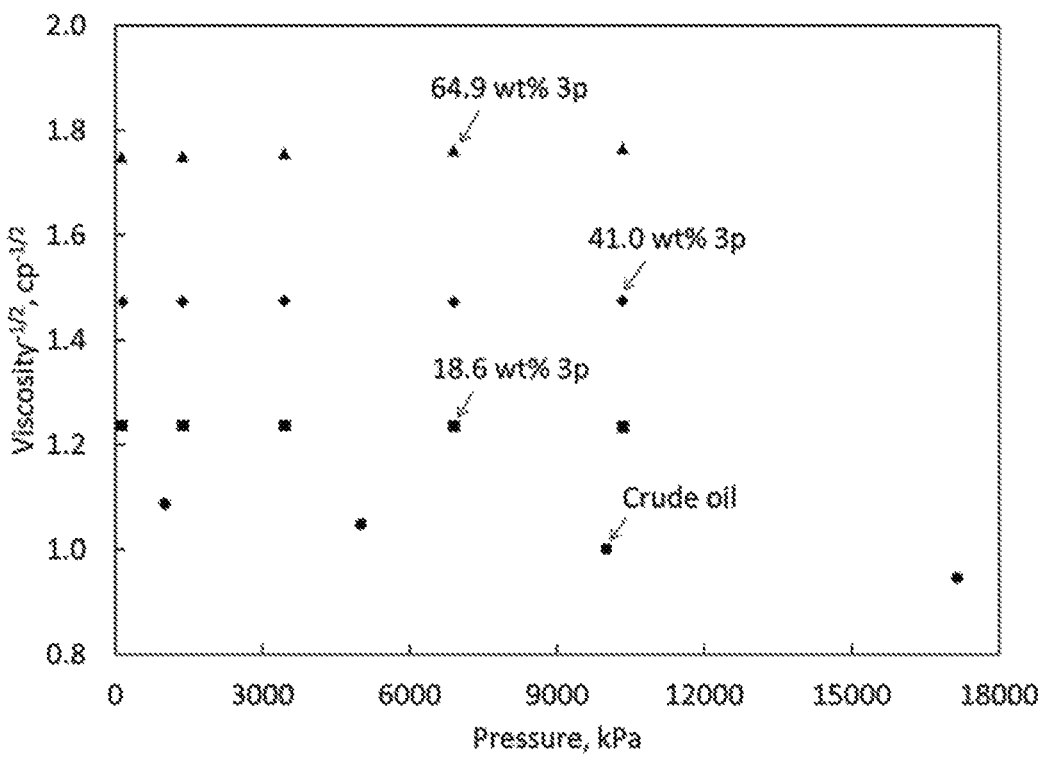

Since this imbibition experiment was a capillary dominated process, Ma et al.'s scaling theory $$t_d = t \sqrt{\frac{k}{\phi}} \frac{\sigma}{\sqrt{\mu_o \mu_w}} \frac{4(d^2 + 2L^2)}{L^2 d^2} \quad (2)$$

was used to estimate the contribution from the viscosity reduction by 3p. In Eq. (2), $t_d$ is dimensionless time, t is time, $\phi$ is porosity, k is permeability, $\sigma$ is interfacial tension, $\mu_w$ and $\mu_o$ are aqueous phase viscosity and oleic phase viscosity, d is core diameter, and L is core length. This equation indicates that the oil recovery rate is proportional to $\mu_o^{-1/2}$. As shown in FIG. 11(b), $\mu_o^{-1/2}$ increases with increasing 3p concentration. $\mu_o^{-1/2}$ of the crude oil is 1.0987 $cp^{-1/2}$ at 344 K and atmospheric pressure, and $\mu_o^{-1/2}$ of 3p-diluted oil (33 mol % or 18.6 wt %) is 1.2383 $cp^{-1/2}$ at 347 K and atmospheric pressure. These results indicate that the oil recovery rate during this particular imbibition experiment could have been enhanced by 13% because of the oil dilution by 3p. In addition to viscosity reduction, 3p can also cause oil swelling. Oleic phase saturation could have been increased by 24% when the oil was diluted by 18.6 wt % 3p at 347 K and atmospheric pressure.

Figure 15:
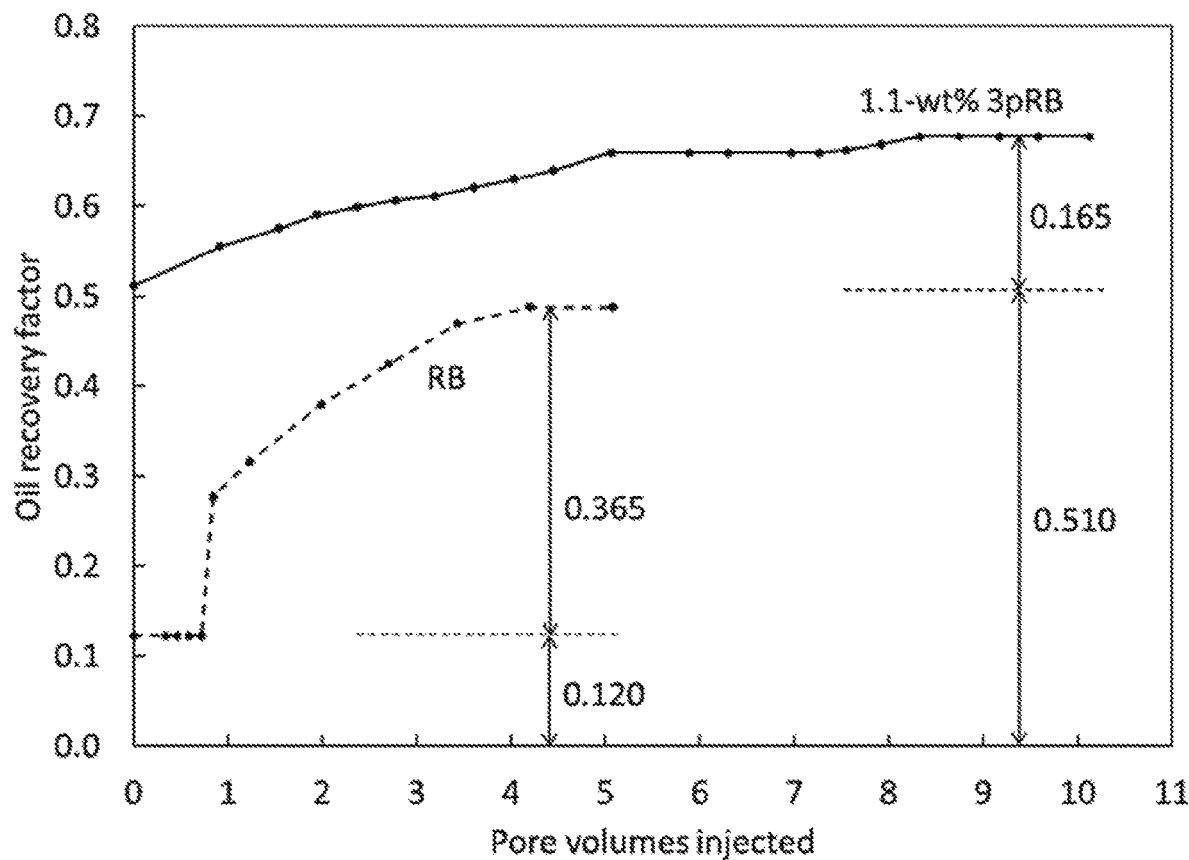
FIG. 15 provides plots showing oil recovery factors during forced imbibition tests with RB and 1.1-wt % 3 pRB at 347 K.

Forced imbibition. As described above, the forced imbibition was performed for the cores after the spontaneous imbibition at 347 K. FIG. 15 shows the oil recovery by the forced imbibition of RB and 1.1-wt % 3 pRB. In this FIG. 15, the oil recovery factors at "0 PVI" are the final oil factors from the spontaneous imbibition. For the RB case, the oil recovery factor from the forced imbibition leveled off at 36.5% after 4.2 PVI at the flow rate of 32 cm³/h. An additional oil recovery of 3.3% was obtained by the increased injection rate, which made the total oil recovery factor of 51.8% (12.0% with the spontaneous imbibition and 36.5%+3.3% with the forced imbibition). The Amott index to water for this core was calculated to be 0.23 based on the oil recovery factor of 39.8% by the forced imbibition.

For the 3 pRB case, the produced oil during each time step was less than 0.5 ml after 2 PVI, and tended to stick on the wall of the receiver vial. The forced imbibition was paused after 5 PVI to quantify oil recovery at each time step. Then, the forced imbibition was resumed for the 2nd batch of injection. It was possible that the phase distribution changed between the 1st and 2nd batch of injection. This is likely the reason for the change in the trend in the oil recovery factor around 5 PVI for the 3 pRB case in FIG. 15. The oil recovery factor of this forced imbibition was 16.5% at 10 PVI.

The Amott index to water was calculated to be 0.76, which is much greater than the Amott index to water for the RB case, 0.23. This result indicates a clear, positive impact of 3 pRB on oil recovery by water imbibition in the cores tested. However, it will be appreciated that this is a consequence of multiple mechanisms caused by the presence of 3p; that is, it is not only because the wettability was changed from oil-wet to strongly water-wet without lowering the oil/RB IFT, but also because the miscibility between 3p and crude oil caused oil swelling and oil viscosity reduction. Furthermore, these two factors might have some synergistic effect because the miscibility of 3p with oil could allow the access of 3p molecules to oil-wet surfaces through the two immiscible liquid phases.

The results in this example collectively showed a potential of improved oil recovery by the 3p additive to RB in mixed-wet or oil-wet rock formations. Although this example was focused on 3p, the molecular structure of ketone can be optimized for a given set of reservoir and operating conditions. This multifunctional solvent is environmentally friendly and commercially available. It can be injected as an additive to aqueous or gaseous injection fluids. It can partition into all fluid phases (oleic, gaseous, and aqueous) and also interact with positively charged oil-wet surfaces once it is injected into the formation. More data can be obtained for fundamental properties of mixtures of 3p with various oil and/or brine samples at a wide range of pressure and temperature conditions. Oil recovery experiments with various cores of different mineralogy types can also be performed, such as huff-n-puff experiments using aqueous or gaseous injection fluids with ketone as an additive.

This example describes an investigation of 3-pentanone (3p) as an additive to reservoir brine (RB) for improved oil recovery from mixed- or oil-wet cores. Two sets of imbibition experiments using oil-aged limestone cores were performed with RB and 1.1-wt % 3p in RB (3 pRB) at 347 K. This 3 pRB was at the solubility limit of 3p in RB at 347 K, which defined the maximum concentration of 3p in this research. Oil recovery results were explained on the basis of more fundamental experiments, such as contact-angle, IFT, viscosity, and density experiments. Conclusions are as follows:

1. The contact angle experiment showed that 3 pRB can rapidly alter the wettability of oil-aged calcite surfaces from an oil-wet to a strongly-water-wet state at 347 K. The final contact angle observed was 26° with 3 pRB, in contrast to 123° with RB. The IFT experiment indicated that the presence of 3p did not affect the IFT between crude oil and RB during the contact angle experiment. That is, the wettability change by 3 pRB occurred without affecting the IFT between the aqueous and oleic phases.

2. Results from the spontaneous imbibition experiment showed that the oil recovery factor reached 50.0% with 3 pRB and 10.0% with RB at Day 3. The final oil recovery factor in the spontaneous imbibition was 51.0% with 3 pRB and 12.0% with RB. The spontaneous imbibition rapidly exhibited the clear advantage of 3 pRB over RB within the first few days.

3. The subsequent forced imbibition yielded the final oil recovery factor of 67.5% (51.0% with the spontaneous imbibition+16.5% with the forced imbibition) with 3 pRB, and 51.8% (12.0% with the spontaneous imbibition and 36.5%+3.3% with the forced imbibition) with RB. These results gave the Amott index to water of 0.76 with 3 pRB, in contrast to 0.23 with RB. This indicates a clear, positive impact of 3 pRB on oil recovery by water imbibition in the cores tested. The main mechanism at play is the wettability change as demonstrated by the contact-angle experiment. Additional mechanisms include the miscibility of 3p with oil that yielded oil swelling and oil viscosity reduction.

4. It is conceivable that the wettability change caused by 3 pRB is related to the dipole-ion interaction between the 3p molecules and the calcite surface. This interaction may reduce the polar-polar interaction of the carboxylate group of naphthenic acids in oil with the calcite surface. The partitioning of 3p into the oleic and aqueous phases may increase the accessibility of 3p to rock surfaces through the two liquid phases and, therefore, increase the possibility for 3p's electron-rich oxygen atom to interact with positively-charged rock surfaces.

5. When 3p is dissolved in the oil, it enhances the oil mobility through the oil swelling and viscosity reduction as is the case with conventional miscible solvents. The oil viscosity was reduced by 21% when the oil was diluted by 18.6 wt % (33 mol %) 3-pentanone at 347 K. Calculation results showed that this oil viscosity reduction could improve the oil recovery rate by 13% during the spontaneous imbibition experiment.

6. In the RB tested in this research, the dissolution of 3p did not cause any salt precipitation within the 3p solubility limit (1.1 wt %) at 347 K. This makes 3p desirable as an additive to a RB-based aqueous injection fluid. It is possible to select an optimal ketone solvent for a given set of reservoir and operating conditions in terms of the oil recovery mechanisms discussed in this example.

Nomenclature for Example 1.
3p 3-pentanone
3 pRB 3-pentanone solution in reservoir brine
d core diameter
H height of the core
k permeability
L length of the core
$N_B$ Bond number
t time
u injection rate
φ porosity
σ interfacial tension
ρ density
IFT interfacial tension
$^1$H NMR proton nuclear magnetic resonance
LSW low-salinity water
PVI pore volume(s) injected
RB reservoir brine
TOC total organic content
$t_d$ dimensionless time
$\mu_o$ oleic phase viscosity
$\mu_w$ aqueous phase viscosity Figure Captions for Example 1. FIG. 3. Mixtures of 3p with the crude oil at room temperature. The overall concentrations of 3p tested are from 30 wt % to 95 wt %. No phase separation was observed.

FIG. 4. Aqueous stability test of the reservoir brine (Table 2) with 3-pentanone at 347 K. The overall concentrations of 3-pentanone tested are from 0.1 wt % to 40%. No salt precipitation was observed because the solubility of 3-pentanone in RB is only 1.1 wt % at 347 K as measured by quantitative $^1$H NMR analysis.

FIG. 5. Schematic of the experimental set up for the density and viscosity experiment.

FIG. 6. Schematic of the experimental set up for saturating cores.

FIG. 7. Schematic of the experimental set up for the forced imbibition.

FIG. 8A and FIG. 8B. Change in contact angle for oil droplets in RB (FIG. 8A) and 1.1-wt % 3 pRB, the solubility limit at 347 K (FIG. 8B). They were all at 347 K and atmospheric pressure. One of the oil droplets for 3 pRB was detached from the surface after 48 h.

FIG. 9. Contact angles measured for the reservoir brine (RB) (Table 2) and 1.1-wt % 3 pRB at 347 K and atmospheric pressure. Standard deviations of contact angles are shown as the error bars in the figure. The contact angle rapidly decreased with 1.1-wt % 3 pRB within a few hours of the experiment commencement.

FIG. 10. Densities of crude oil and its mixtures with 3-pentanone. The crude oil densities were measured at 344 K. All other densities were measured at 347 K.

FIG. 11A. Viscosities of crude oil and its mixtures with 3-pentanone (3p). The crude oil viscosities were measured at 344 K and the other viscosities were measured at 347 K. FIG. 11B. Viscosity$^{-1/2}$ of crude oil and its mixtures with 3p. Oil recovery rate by capillary-driven water imbibition is estimated to be proportional to $\mu_o^{-1/2}$, which increases with increasing 3p concentration.

FIG. 12. Oil recovery factors from the spontaneous imbibition experiments with RB and 1.1-wt % 3 pRB at 347 K. The oil recovery factor reached 50.0% with 3 pRB and 10.0% with RB at Day 3, and 51.0% with 3 pRB and 11.0% in RB at Day 5. These cores were subject to the forced imbibition experiment, as shown in FIG. 15. Dimensionless time ($t_d$) for 1.1-wt % 3 pRB was calculated with crude oil viscosity at 347 K and atmospheric pressure; however, the oleic phase viscosity actually decreases during imbibition as the transfer of 3p takes place from the aqueous to the oleic phase.

FIG. 13. Spontaneous imbibition experiment with RB at 347 K. It was observed that oil was produced from the top face of the core, indicating the contribution of buoyancy force.

FIG. 14. Spontaneous imbibition experiment with 1.1-wt % 3 pRB at 347 K. It was observed that oil was produced not only from the top, but also from the side surface of the core. This indicates that the counter- and co-current flow contributed to the oil recovery with 3 pRB, because of the wettability alteration without affecting the water/oil IFT, oil swelling, and oil viscosity reduction in addition to the buoyancy force.

FIG. 15. Oil recovery factor during the forced imbibition with RB and 1.1-wt % 3 pRB at 347 K. The oil recovery factors indicated for "0 PVI" are the final oil recovery factors from spontaneous imbibition. For the RB case, oil recovery factor from forced imbibition leveled off at 36.5% after 4.2 PVI. An additional oil recovery of 3.3% was obtained by the increased injection rate after 5 PVI. The Amott index to water for the RB case was calculated to be 0.23 based on the spontaneous and forced imbibition experiments. For 3 pRB case, the produced oil during each time segment was less than 0.5 ml after 2 PVI, and tended to stick on the wall of the receiver vial. Therefore, the experiment was paused after 5 PVI to quantify the oil recovery at each time step. After the measurement of the produced oil mass from 0 to 5 PVI, the experiment was resumed for the 2nd batch of injection. It is likely that the phase distribution in the core was altered while preparing the 2nd batch injection of 3 pRB. The Amott index to water for the 3 pRB case was calculated to be 0.76 based on the spontaneous and forced imbibition experiments.

Example 2: Comparative Study of Ketone and Surfactant for Enhancement of Water Imbibition in Fractured Porous Media This Example presents a comparative study of two wettability modifiers with different characteristics for enhancing water imbibition from a fracture into the surrounding matrix. One is 3-pentanone, a symmetric short ketone, and the other is 2-ethylhexanol-4 propylene oxide-15 ethylene oxide, a non-ionic surfactant with an ultrashort hydrophobe. They were used as low-concentration additives (approximately 1 wt %) to reservoir brine in this research. The coreflooding experiments using fractured limestone cores showed that the 3-pentanone solution resulted in more rapid oil recovery by water imbibition than the surfactant solution. The difference in oil recovery response between the two chemical solutions was attributed to the main difference between them as wettability modifiers; that is, the 3-pentanone solution keeps the original water/oil interfacial tension, but the surfactant solution lowers it by 2 orders of magnitude.

Tight oil reservoirs often show a rapid decline in the production rate, indicating a critical need for improved oil recovery methods. For example, a decline of 60-70% in the oil production rate within the first year has been reported for tight formations in the Eagle Ford. Therefore, primary recovery factors in tight oil reservoirs are typically smaller than 10%.

Several methods of improved oil recovery in shales (or shale IOR) have been proposed and studied in the literature. They are likely affected by the significant heterogeneity typically observed for shales. For example, their petrophysical properties are complex because of a variety of minerals and total organic content. As a result, shale IOR methods using aqueous injection fluids will be affected by the heterogeneous wettability in addition to ultralow permeabilities. Most tight oil reservoirs are expected to be originally intermediate-wet to oil-wet.

Surfactant solutions have been studied for shale IOR and/or fracturing fluids. Expected mechanisms include wettability alteration and interfacial tension (IFT) reduction between the aqueous and oleic phases. Different types of surfactants (e.g., anionic, non-ionic, and cationic surfactants) have been tested for their ability to alter rock wettability, reduce the water/oil IFT, and improve oil recovery. Both anionic and non-ionic surfactants can alter the wettability of carbonate shale and siliceous shale from oil-wet to water-wet. Anionic and non-ionic surfactants have been tested with siliceous shale indicating that non-ionic surfactants did not affect the contact angle, while anionic surfactants altered rock wettability.

IFT reduction may be important, but it may be useful that IFT does not reach an ultralow value ($10^{-3}$ mN/m) for shale IOR. An ultralow IFT may limit the surfactant imbibition rate and, therefore, oil recovery. The oil recovery rate may decrease with decreasing IFT when the wettability is altered by a surfactant solution. This seems to be a marked difference from the conventional surfactant-enhanced oil recovery, which depends upon achieving ultralow IFT during the oil displacement.

In addition to surfactant, alcohol solution has been studied for wettability alteration. A 1-pentanol solution has been evaluated for wettability alteration. Experimental results showed that the contact angle of a petroleum fluid on calcite was significantly decreased in 1 wt % 1-pentanol solution. The effect was more evident with 0.5 wt % 1-pentanol at a high NaCl or $MgCl_2$ concentrations. This wettability alteration may be because of the accumulation of 1-pentanol in the thin brine film between oil and the rock surface.

Chahardowli et al. investigated Solvent-enhanced spontaneous imbibition with dimethyl ether (DME) and diethyl ether has been investigated. Performance of spontaneous imbibition experiments with sandstone and carbonate cores using DME/DEE solution in brine demonstrated that DME/DEE could improve oil recovery. The anticipated mechanisms of improved oil recovery relate to oil swelling and oil viscosity reduction.

3-pentanone has been investigated as an additive to reservoir brine (RB) for improved oil recovery from mixed-wet or oil-wet cores. This symmetric ketone is a colorless liquid at standard conditions, non-toxic, widely used in the food industry, and commercially available at a relatively low cost. It may function as a multifunctional solvent that acts as a wettability modifier without lowering the water/oil IFT and also as a miscible solvent with crude oil at reservoir conditions. Two sets of imbibition experiments using oil-aged limestone cores were performed with RB and 1.1 wt % 3-pentanone solution in RB at 347 K. Results from the spontaneous imbibition experiments showed that the oil recovery factor reached 50.0% with the 3-pentanone solution in RB and 10.0% with RB at day 3. The final oil recovery factor was 51.0% with the 3-pentanone solution in RB and 12.0% with RB. The subsequent forced imbibition determined the Amott index to water to be 0.76 with the 3-pentanone solution and 0.23 with RB. These results indicated a clear, positive impact of a low-concentration 3-pentanone in RB on oil recovery by water imbibition in the cores tested. The improved oil recovery mechanisms include not only wettability alteration but also the miscibility of 3-pentanone with oil that yielded oil swelling and oil viscosity reduction.

In this Example, 3-pentanone and surfactant are compared for the first time as a low-concentration additive to RB, in terms of enhancement of water imbibition from a fracture into the surrounding matrix. They are expected to have different mechanisms as imbibition enhancers because a low concentration of 3-pentanone does not affect the water/oil IFT, unlike surfactant solutions. The surfactant used in this research is a non-ionic surfactant with an ultrashort hydrophobe, 2-ethylhexanol-x propylene oxide (PO)-y ethylene oxide (EO). Two sets of coreflooding experiments using oil-aged fractured limestone cores were performed with 1.1 wt % 3-pentanone solution in RB and 1.0 wt % surfactant solution in RB at 347 K.

Materials And Methods. Part of the information regarding 3-pentanone and its mixtures with oil and reservoir brine is described above in Example 1. Although the important data are duplicated in this Example, more details can be found above.

Figure 16:
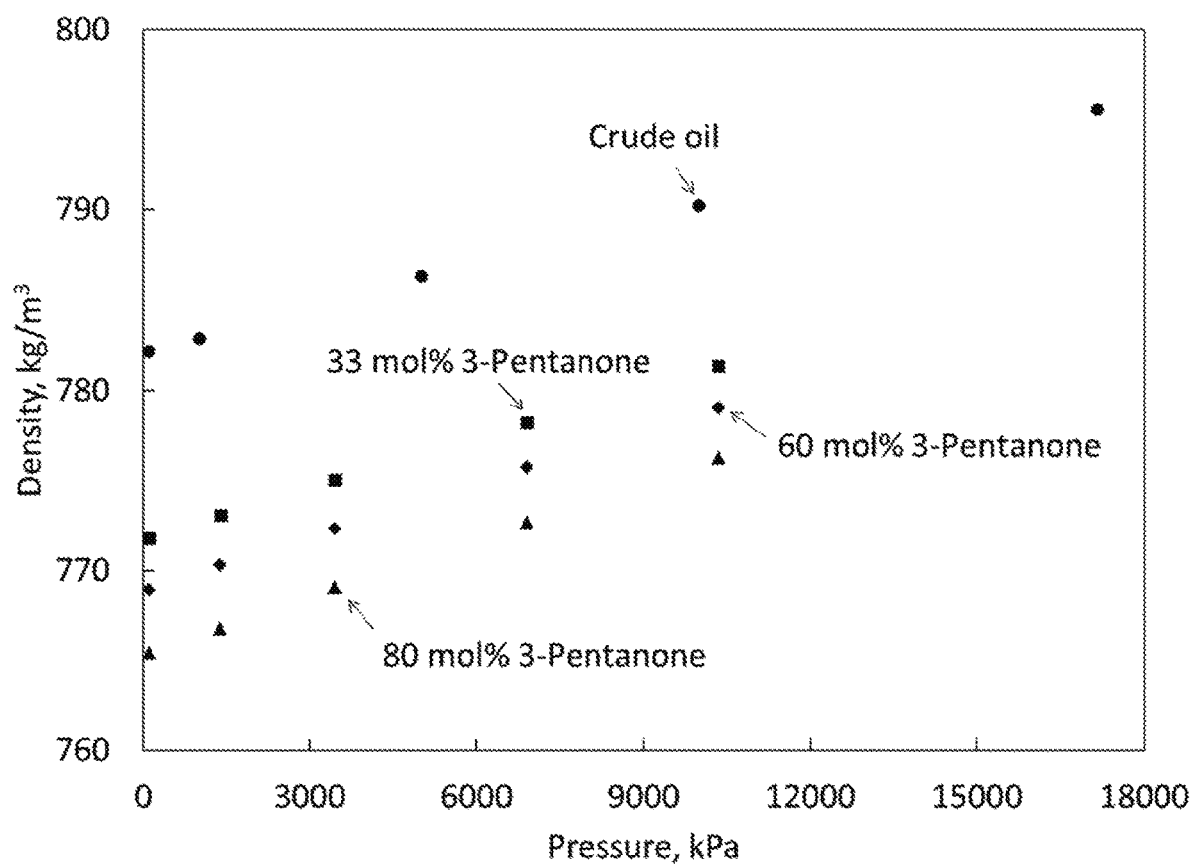
FIG. 16 provides data showing densities of crude oil and its mixtures with 3-pentanone.
Figure 17:
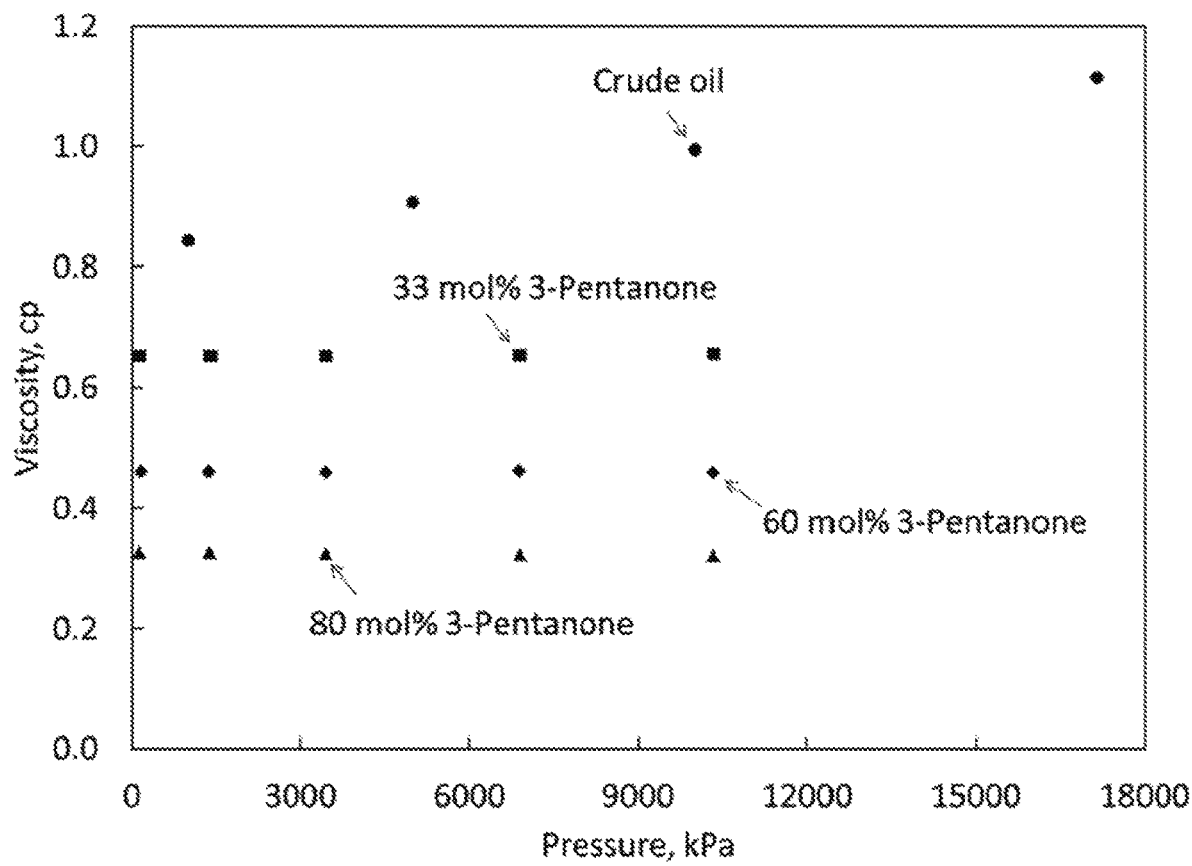
FIG. 17 provides data showing viscosities of crude oil and its mixtures with 3-pentanone.

Reservoir Fluid Properties. A crude oil sample taken from a tight oil reservoir in Texas was used in this research. Table 7 summarizes properties of this oil sample. The reservoir temperature is 347 K. The reservoir brine (RB) with a salinity of 68,722 ppm was prepared in the lab on the basis of available field data. Table 8 shows the ionic composition of RB. The density of RB was measured to be 1030 kg/m$^3$ at 347 K and atmospheric pressure. IFT between the crude oil and RB was measured to be 11.44 mN/m at 347 K and atmospheric pressure. FIGS. 16-17 show oil viscosities and densities measured at different pressures at 344 K (slightly lower than the reservoir temperature of 347 K).

TABLE 7

Properties of the Crude Oil Sample Used in This Research. Oil densities and viscosities at high pressures are presented in FIGS. 16-17.

| Molecular weight, g/mol | | 186 |
|---|---|---|
| Density, kg/m$^3$ | | 823 (at 289 K) |
| | | 780 (at 347 K) |
| SARA, wt % | Saturates | 76.7 |
| | Aromatics | 20.1 |
| | Resins | 3.2 |
| | Asphaltenes (pentane insoluble) | less than 0.1 |

TABLE 8

Composition of the reservoir brine (RB) used in this example (68722 ppm). The density of RB was measured to be 1030 kg/m$^3$ at 347 K and atmospheric pressure.

| Cations | ppm | Anions | ppm |
|---|---|---|---|
| Na$^+$ | 25,170 | Cl$^-$ | 41,756 |
| K$^+$ | 210 | SO$_4^{2-}$ | 108 |
| Ca$^{2+}$ | 1,292 | | |
| Mg$^{2+}$ | 187 | | |

3-Pentanone Properties. A sample of 3-pentanone (Sigma-Aldrich) had a purity greater than 99%. The density of 3-pentanone is 760 kg/m$^3$ at 347 K and atmospheric pressure. The above example presented the aqueous stability of 3-pentanone in RB at the experimental conditions and investigated wettability alteration and oil dilution (density and viscosity reduction) by 3-pentanone.

Key findings from the above example are briefly summarized here. It was shown that the average contact angle of oil droplets on oil-aged calcite surfaces in 1.1 wt % 3-pentanone solution in RB rapidly decreased from 95° to 74° within 2 h and then gradually decreased to 26° after 66 h. After 3 days, no oil droplets were observed on the calcite surfaces.

The IFT experiment indicated that the presence of 3-pentanone did not affect the IFT between crude oil and RB (11 mN/m). Density and viscosity experiments for mixtures of crude oil with 3-pentanone showed the capability of oil dilution of 3-pentanone as a solvent (FIGS. 16-17). It is important to reduce oil viscosity even for this light oil in shale IOR.

As in the above Example 1, the concentration of 3-pentanone in RB used in this research is 1.1 wt %, the solubility limit of 3-pentanone in RB at 347 K. The density and viscosity of 1.1 wt % 3-pentanone solution in RB were measured to be 1030 kg/m$^3$ and 0.52 cP, respectively, at 347 K and atmospheric pressure.

Surfactant Formulation. A non-ionic surfactant was used to make a surfactant solution that lowers the water/oil IFT and changes the wettability to water-wet. The surfactant, 2-ethylhexanol (2-EH)-4PO-15EO, has an ultrashort hydrophobe and was made by alkoxylation of 2-EH with 4 PO and 15 EO groups (Harcros Chemicals). The PO and EO groups affect the hydrophobicity and aqueous stability of the surfactant, respectively. Although other ultrashort hydrophobe surfactants have been studied for improving polymer flooding, 2-EH-xPO-yEO surfactants are studied for the first time as a simple surfactant solution for enhancing water imbibition in fractured media in this research.

2-EH-xPO-yEO was chosen in this research primarily because this cosolvent-based surfactant is simple and abundantly available at a relatively low cost. Several 2-EH-xPO-yEO surfactants were screened by testing the stability in RB (Table 9). 2-EH-4PO-15EO, 2-EH-4PO-20EO, 2-EH-4PO-25EO, and 2-EH-7PO-20EO in RB showed no salt precipitation, cloudy phase, or phase separation at 347 K. Then, IFTs were measured between the oil (Table 7) and the stable surfactant solutions in RB at 347 K and atmospheric pressure (Table 9). 2-EH-4PO-15EO was selected for this research because it decreases the water/oil IFT and is the shortest among the stable surfactants. The IFT between the oil and the 2-EH-4PO-15EO solution was measured to be 0.21 mN/m at 347 K and atmospheric pressure. The density of the surfactant solution was measured to be 1039 kg/m$^3$ at 347 K and atmospheric pressure.

TABLE 9

Aqueous Stability of 2-EH-xPO-yEO Surfactants in RB at 347 K and the IFT Values between the Oil (Table 7) and the Stable Surfactant Solutions at 347 K. The surfactant concentration is 1 wt %.

| surfactant | stability | IFT (mN/m) |
|---|---|---|
| 2-EH_4PO-15EO | stable | 0.21 |
| 2-EH-4PO-20EO | stable | 0.86 |
| 2-EH-4PO-25EO | stable | 0.96 |
| 2-EH-7PO-10EO | cloudy | |
| 2-EH-7PO-15EO | cloudy | |
| 2-EH-7PO-20EO | stable | 0.11 |

Figure 18:
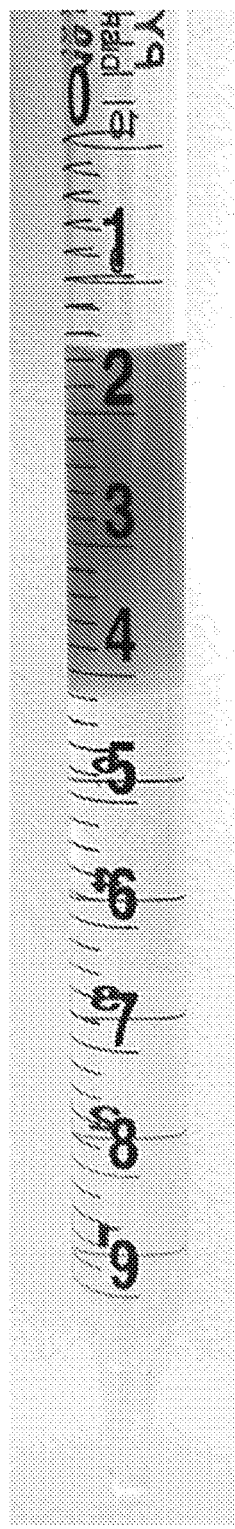
FIG. 18 provides a photograph of a phase behavior test of the mixture of oil/2-EH-4PO-15EO/RB test in reservoir brine.

Phase behavior was studied with the mixture of oil/2-EH-4PO-15EO/RB at 347 K. FIG. 18 shows the sample with a water/oil ratio of 7:3 (i.e., 70 vol % aqueous phase and 30 vol % oil) aged at 347 K for at least 7 days. A small amount of macroemulsion was observed near the interface between the oil and water phases.

Contact Angle Experiments. Contact angle experiments were performed with oil-aged calcite pieces at 347 K. Example 1 describes results with 1.1 wt % 3-pentanone solution using the same oil and RB as in this Example. This Example presents new results with 1.0 wt % 2-EH-4PO-15EO solution. The procedure largely follows that of Example 1, but as explained below, a change to the previous procedure was necessary because it was not possible to continuously monitor oil droplets on the calcite surface with the surfactant solution.

Before the contact angle measurement, the chemical solution and RB were separately degasified at elevated temperatures. Then, oil-aged calcite pieces were placed in RB. Oil droplets were placed on the bottom surface of a calcite piece in the RB glass chamber. The glass chamber was then tightly closed and placed in an oven at 347 K, and a photo of the oil droplets was taken after 30 min. Then, the surfactant solution at 347 K was added to the glass chamber to set the overall surfactant concentration to 1.0 wt %. The glass chamber was then tightly closed and placed in an oven at 347 K. It was observed that the oil droplet was slipping away from the calcite surface after 1 h.

The calcite piece was continued to be placed in the surfactant solution and taken out after 1 day. Then, the calcite piece was rinsed with RB and placed in RB with no surfactant. After the RB chamber was heated in the oven at 347 K, a new oil droplet was placed on the bottom surface of the calcite piece. A photo of the oil droplet was taken then. The contact angles of both sides of each oil droplet were measured using onscreen protractor software. An average contact angle and standard deviation were then calculated.

Experimental Procedure for Coreflooding. Coreflooding experiments were performed at 347 K for two limestone cores. The Indiana limestone cores have the common dimensions with a diameter of 0.0254 m and a length of 0.127 m. The cores were saturated with RB first and then oil, during which the core properties were measured, such as porosity, permeability, and water and oil saturations. The cores were then placed in a container filled with oil for at least 4 months at 347 K. The irreducible water saturation can decrease after aging because of wettability alteration; therefore, both cores were flooded by oil one more time after the long aging period.

Figure 19:
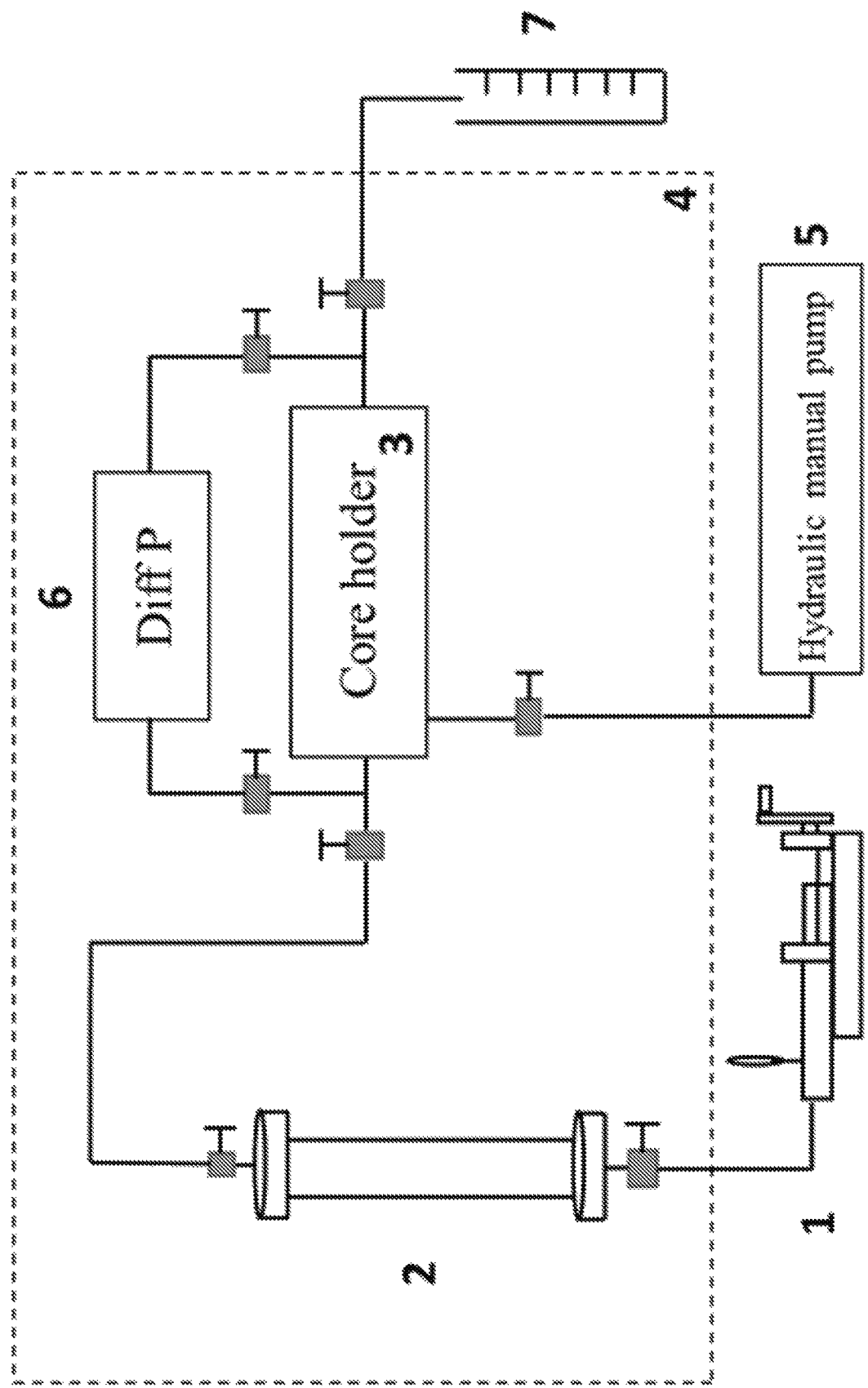
FIG. 19 provides a schematic illustration of an experimental device for oil flooding testing.

FIG. 19 shows a schematic of the oil-flooding system used. It includes an accumulator for crude oil, a pump, a Hassler-type core holder, a hydraulic manual pump to maintain the overburden pressure, a differential pressure gauge, cylinders, and an oven. After a core was placed in the core holder, oil was injected into the cores at 100 cm$^3$/h and 347 K until no water production was observed.

Figure 20:
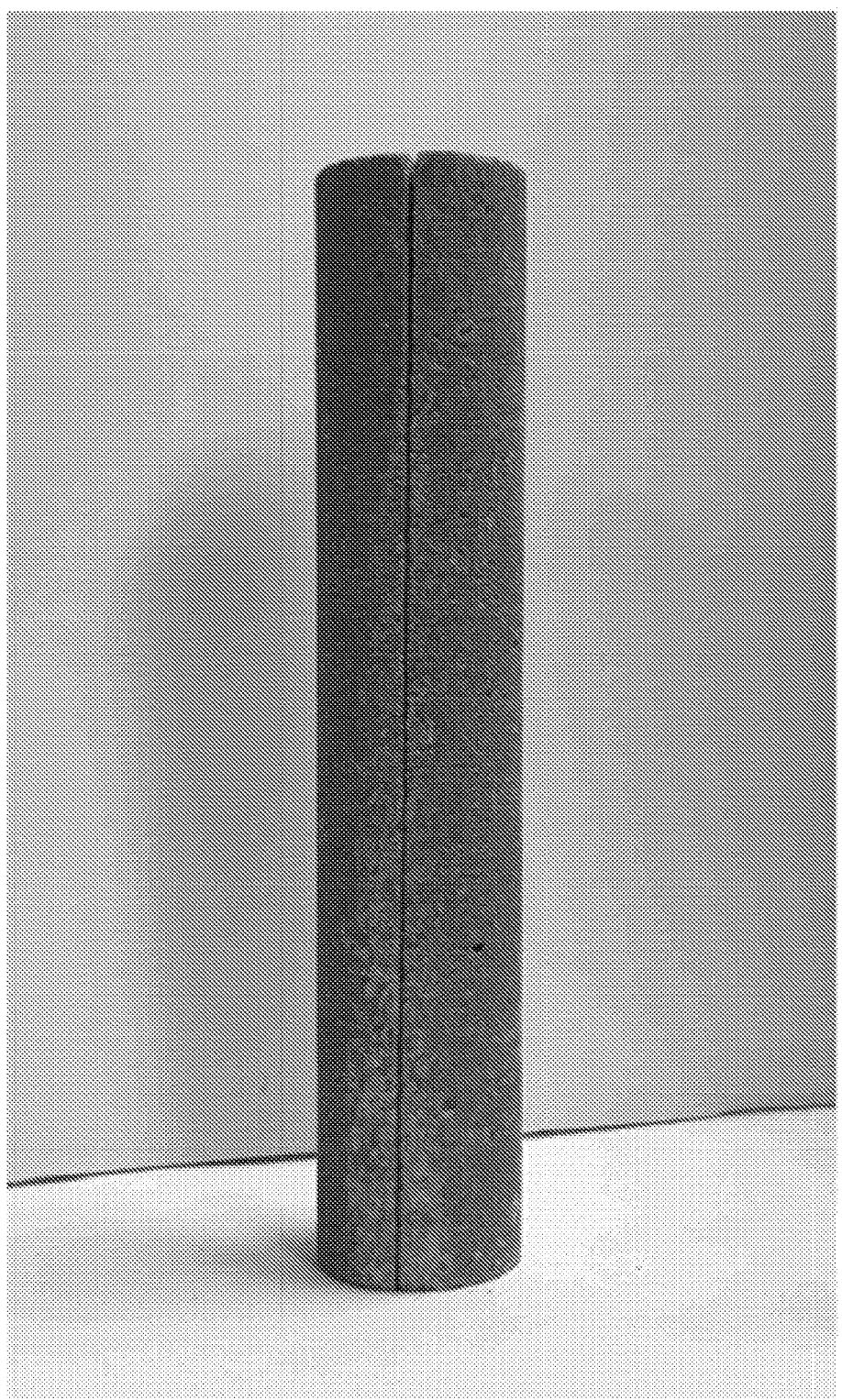
FIG. 20 provides a photograph of an artificially fractured Indiana limestone core.

An artificial fracture was created along the longitudinal axis using an electric saw for each core (FIG. 20). By following the procedure of Mejia, Teflon spacers with 0.001 m in width and 0.127 m in length were placed along two edges of the fracture to maintain a fracture aperture. Then, the core halves were carefully put together with the Teflon spacers in the fracture, wrapped with a Teflon tube, and placed inside a vertically oriented coreholder.

oil displacements were gravitationally stable in the vertical direction. After a fractured core was placed in the coreholder, the oven temperature was increased to reservoir temperature (347 K). Then, the core was flooded with crude oil to remove any gas inside the fracture and measure the fracture permeability using the flow rate of 900 cm$^3$/h. The overburden pressure was adjusted so that all cores used in this research had similar fracture apertures and fracture permeabilities. Table 10 provides the pressure drops along the cores at 900 cm$^3$/h and the overburden pressures used.

Fracture permeabilities were calculated. The equation for flow between parallel plates $$b=(3\pi dk_e)^{1/3}$$

was used to estimate a fracture aperture, where b is the fracture aperture, d is the core diameter, and $k_e$ is the effective oil permeability of the fractured core. The fracture apertures are provided in Table 10. A fracture permeability can be calculated from the fracture aperture by the following equation:

$$k_f=b^2/12$$

Table 4 shows the fracture permeabilities and the permeability contrasts between the fracture and the matrix. The flow capacities of the fracture ($k_fA_f$) and the matrix ($k_mA_m$) are also provided in Table 4. $A_f$ and $A_m$ are cross-sectional areas of the fracture and matrix, respectively. $k_f$ and $k_m$ are permeabilities of the fracture and matrix, respectively. The flow capacities of the fractures were approximately 200 times greater than those of the matrix.

The corefloods with fractured cores were performed at 347 K in three stages: the first stage with RB, the second stage with a chemical slug (either 3-pentanone or surfac-

TABLE 10

Properties of the Cores Used for Coreflooding Experiments.
Core 1 was used for 1.1 wt % 3-pentanone solution in RB.
Core 2 was used for 1.0 wt % 2-EH-4PO-15EO solution in RB.

|  | core 1 | core 2 |
| --- | --- | --- |
| Matrix porosity | 0.197 | 0.203 |
| Matrix permeability (mD) | 30.8 | 41.4 |
| Matrix water saturation | 0.506 | 0.596 |
| Matrix oil saturation | 0.494 | 0.404 |
| Flow capacity of the matrix (m$^4$) | 1.540 × 10$^{-17}$ | 2.069 × 10$^{-17}$ |
| Mass of the core before cutting (kg) | 0.14847 | 0.14777 |
| Mass of the core after cutting (kg) | 0.13691 | 0.13622 |
| Matrix pore volume after cutting (m$^3$) | 1.166 × 10$^{-5}$ | 1.202 × 10$^{-5}$ |
| Pressure drop along with the core at 900 cm$^3$/h (kPa) | 6.688 | 6.964 |
| Overburden pressure (kPa) | 4137 | 6274 |
| Fracture aperture (m) | 1.215 × 10$^{-4}$ | 1.199 × 10$^{-4}$ |
| Fracture permeability (D) | 1246 | 1214 |
| Permeability contrast between fracture and matrix | 40455 | 29324 |
| Flow capacity of fracture (m$^4$) | 3.795 × 10$^{-15}$ | 3.649 × 10$^{-15}$ |
| Fracture volume (m$^3$) | 3.920 × 10$^{-7}$ | 3.870 × 10$^{-7}$ |
| Sum of matrix pore volume and fracture volume (m$^3$) | 1.205 × 10$^{-5}$ | 1.241 × 10$^{-5}$ |

Table 10 summarizes the properties of the cores after the preparation described above. Core 1 was used for the 3-pentanone solution, and core 2 was used for the 2-EH-4PO-15EO solution.

Figure 21:
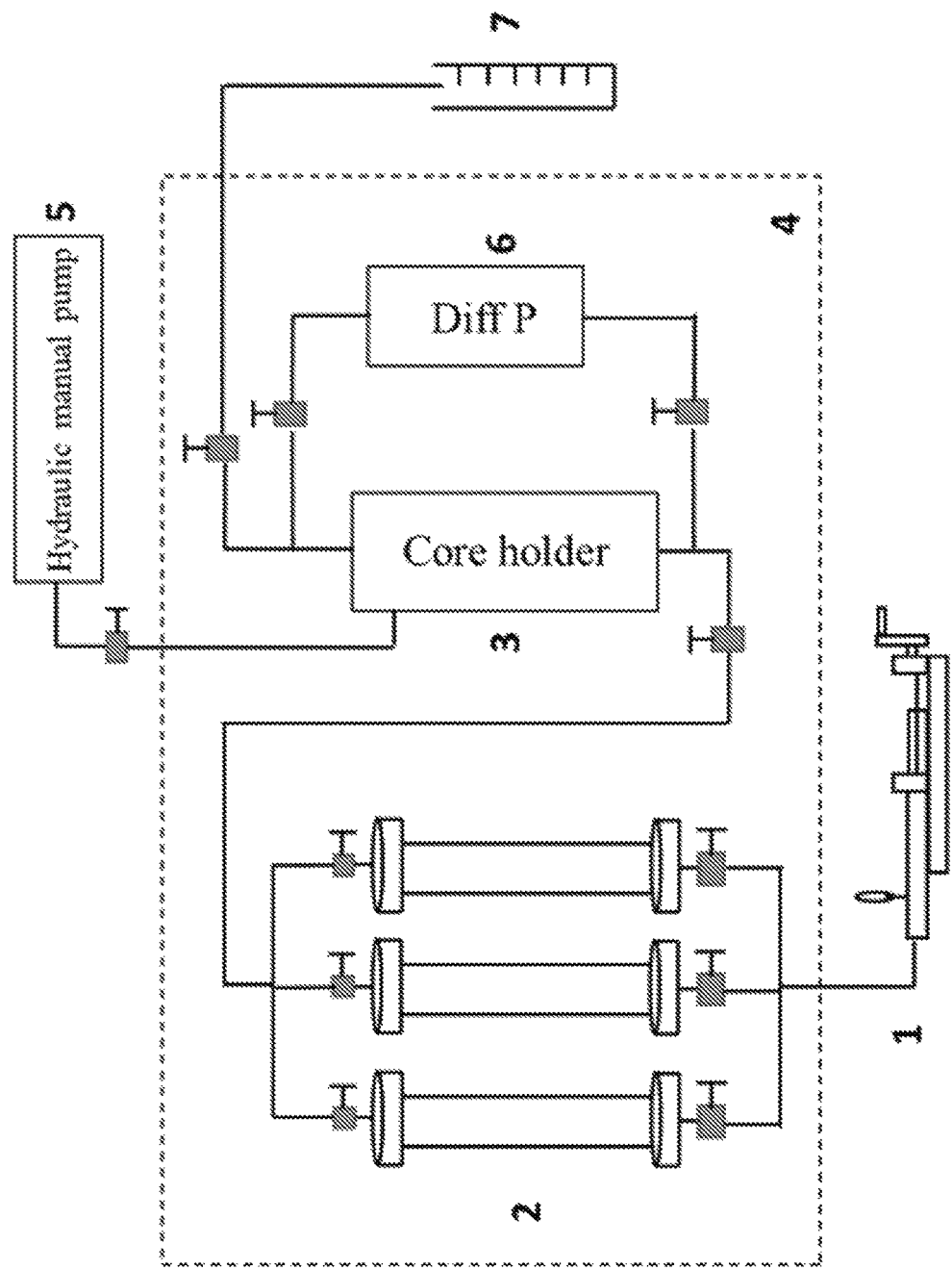
FIG. 21 provides a schematic illustration of an experimental device for coreflooding testing.

FIG. 21 provides a schematic of the experimental setup for coreflooding. It consists of accumulators for crude oil, RB, and chemical solution (3-pentanone or surfactant), a pump, a Hassler-type core holder, a hydraulic manual pump to maintain the overburden pressure, a differential pressure gauge, cylinders, and an oven. As mentioned previously, the tant), and the third stage with "chase" RB. The initial RB stage was at 6 cm$^3$/h for 1.5 pore volumes injected (PVI), then at 0.05 cm$^3$/h for 0.3-0.4 PVI, and at 6 cm$^3$/h until there was no oil production. After that, a chemical slug (3-pentanone or surfactant) was injected at 0.6 cm$^3$/h for 1.6 PVI. Finally, the chase RB was injected at 0.6 cm$^3$/h. This chase RB flooding was performed until no oil production was observed for core 2 (the surfactant case). However, it was terminated after 1.2 PVI of the chase RB for core 1 because of operational constraints.

The coreflood effluent was collected in plastic graduating cylinders at room temperature. To correct the oil recovery factor for 3-pentanone solubility in oil, the 3-pentanone concentration in recovered oil was measured by the proton nuclear magnetic resonance (H NMR) method for the chemical slug and chase RB flooding periods for core 1.

Results and Discussion. Below the main results of the contact angle and coreflooding experiments with the 3-pentanone and 2-EH-4PO-15EO solutions are described. Then, the improved oil recovery mechanisms by 3-pentanone and the surfactant are discussed using the experimental results.

Figure 22A:
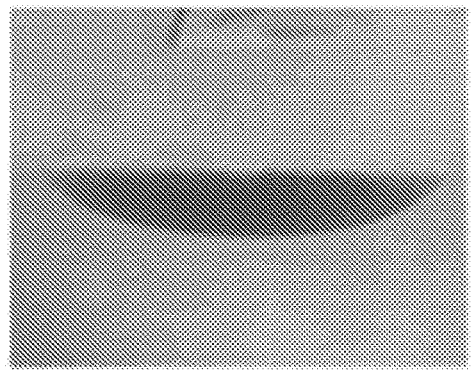
FIG. 22A provides a photograph of contact angle measurement test at the initiation of the experiment in RB at 347 K.
Figure 22B:
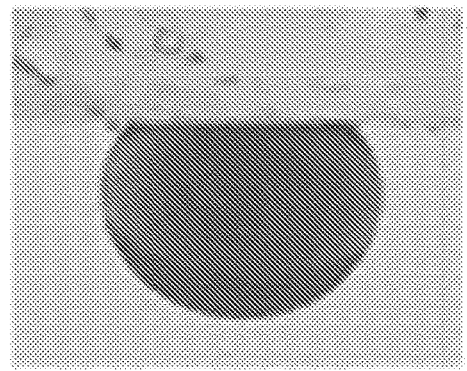
FIG. 22B provides a photograph of contact angle measurement test in 1.0 wt % 2-EH-4PO-15EO in RB at 347 K.
Figure 22C:
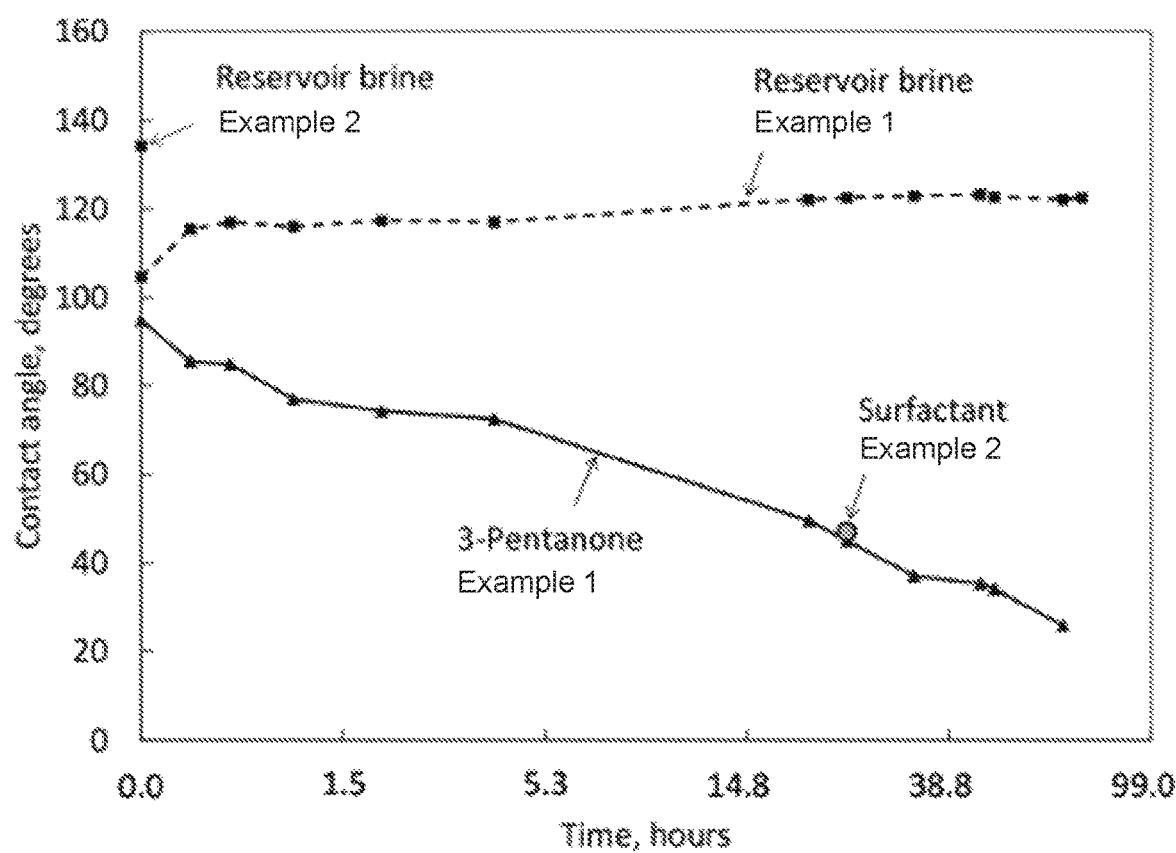
FIG. 22C provides data showing a comparison of the contact angle results for three cases: RB, 1.1 wt % 3-pentanone in RB, and 1.0 wt % 2-EH-4PO-15EO in RB.

Contact Angle Experiments. As described above, the contact angle experiment was performed with 1.0 wt % 2-EH-4PO-15EO solution at 347 K. FIG. 22C and Table 11 show the contact angles measured at the initialization of the experiment and at 24 h after the oil-aged calcite piece was immersed in the 2-EH-4PO-15EO solution at 347 K and atmospheric pressure. The average contact angle was initially 134.1° but substantially reduced to 47.1° after 24 h. This experiment demonstrated that this ultrashort hydrophobe surfactant can effectively alter the wettability of oil-aged calcite from oil-wet to water-wet within 1 day at 347 K.

TABLE 11

Contact Angles at the Initialization of the Experiment and at 24 h after the Calcite Piece Was Immersed in 2-EH-4PO-15EO Surfactant Solution at 347 K and Atmospheric Pressure.

| droplet | contact angle (deg) left side | right side | Average contact angle (deg) |
|---|---|---|---|
| At the initialization | 133.2 | 135.1 | 134.1 |
| At 24 h | 47.5 | 46.8 | 47.1 |

FIG. 22C also shows the results of the contact angle experiments for 1.1 wt % 3-pentanone solution in RB and RB alone at the same experimental conditions. It appears that 3-pentanone and 2-EH-4PO-15EO are comparable as wettability modifiers.

Coreflooding Experiments. Coreflooding experiments in this research are concentrated on the water imbibition from a fracture into the surrounding matrix through buoyant and capillary forces. These two forces are considered to be present in tight oil recovery by aqueous injection fluid, but their relative magnitude is uncertain. The buoyant force depends upon the distribution of fluids and fracture dimensions, among many other factors, and these two factors likely become more important when the buoyant force has to overcome a large capillary force at the matrix/fracture interfaces in oil-wet tight reservoirs.

We consider two scenarios for enhancing the water imbibition in shale IOR. One scenario is where a wettability modifier makes the rock surfaces more water-wet without lowering the IFT, which makes the capillary force dominate over the buoyant force. The other is where a surfactant solution makes the water/oil IFT lower and the rock surfaces more water-wet. Both scenarios commonly make the imbibition process less sensitive to the uncertain factors affecting the in situ buoyant force, such as fracture properties, petrophysical heterogeneities, and distribution of fluids. The results presented above in this Example and Example 1 indicate that two aqueous injectants can be conveniently used, 3-pentanone and 2-EH-4PO-15EO solutions in RB, for comparing the two scenarios.

Note that the current experimental study uses non-shale cores. That is, the experiment was designed to compare the two scenarios described above and not to quantify the oil recovery from tight shale cores. How deep the injection fluid will be imbibed into tight shale matrices with available/enhanced imbibition forces is a separate question to be addressed.

Figure 23:
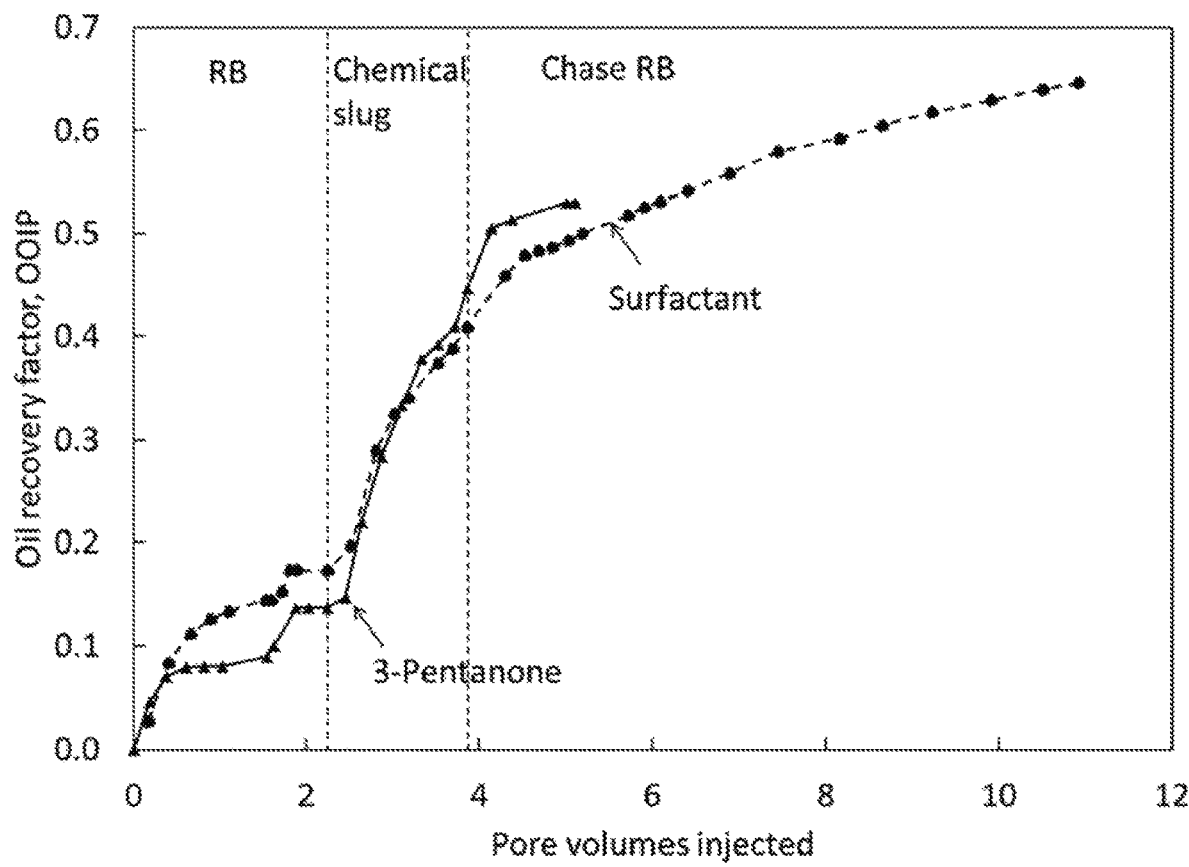
FIG. 23 provides plots showing oil recovery factors during the coreflooding tests at 347 K.

FIG. 23 presents the oil recovery factors for the two cases: 1.1 wt % 3-pentanone solution in RB with core 1 and 1.0 wt % 2-EH-4PO-15EO solution in RB with core 2. As indicated in FIG. 23 and above, each core was first flooded with RB until it reached a residual oil saturation to RB (100% water cut). Then, it was flooded by the respective chemical solution that improved oil recovery through different mechanisms. After 1.6 PVI of a chemical slug, the cores were flooded with the chase RB. The chase RB injection had to be terminated after 1.2 PVI only for core 1 because of operational constraints.

The first RB flooding stage showed that two cores were noticeably different from each other, as expected for Indiana limestone cores because of the heterogeneity. The oil recovery factor for core 1 reached a plateau at 13.7% after 1.89 PVI of RB, but that for core 2 reached 17.3% after 1.81 PVI. As shown in Table 10, core 2 had a higher permeability and lower residual oil saturation to RB than core 1.

The oil recovery factors after the first RB flooding (i.e., incremental oil recovery) are presented in FIG. 24. Because of the significant differences between the two cores, the incremental oil recovery factors were corrected using the Leverett factor, $(k/\phi)^{0.5}$, for a better comparison.

During the chemical flooding stage and the chase RB flooding stage, the oil recovery factor of the 3-pentanone case was systematically higher than that of the surfactant case. The oil recovery curves in FIG. 24 indicate that the 3-pentanone case resulted in more rapid oil recovery by imbibition than the surfactant case.

The incremental oil recovery factor for the 3-pentanone case was 30.9% for the chemical slug stage (1.6 PVI) and 8.4% for the chase RB flooding stage (1.2 PVI); that is, the total improved oil recovery was 39.3% for the 3-pentanone case. The incremental oil recovery factor for the surfactant case was 23.6% for the chemical slug stage (1.6 PVI) and 23.7% for the chase RB flooding stage (7.0 PVI); that is, the total improved oil recovery was 47.3% for the surfactant case. As mentioned previously, the ultimate improved oil recoveries were not compared because the chase RB was terminated for the 3-pentanone case; however, the ultimate oil recovery factor during the chase RB flooding stage might have been smaller for the 3-pentanone case than for the surfactant case because the water/oil IFT was not lowered by 1.1 wt % 3-pentanone. The slow but steady increase in oil recovery by the chase RB after the surfactant solution injection may also be related to the increase in water/oil IFT after switching to the chase RB injection, during which the surfactant concentration near the matrix/fracture interface was likely reduced.

Note that the oil recovery factor for the 3-pentanone case in FIG. 24 has been corrected for the solubility of 3-pentanone in oil (i.e., the mass transfer of 3-pentanone from the brine to the oil during the flooding). The concentration of 3-pentanone in the recovered oil was measured by the $^1$H NMR method, as presented in Table 12. It demonstrated the transient mass transfer of 3-pentanone from the aqueous phase to the oleic phase, causing the reduction of oil density and viscosity by 3-pentanone (FIGS. 16-17).

Qualitative analysis is presented using the coreflooding results, although local force balances may be transient and coupled with many factors, such as compositional details and heterogeneous petrophysical properties. The capillary force is estimated as $$P_c = 2\sigma \cos\theta / r$$

where $\sigma$ is the water/oil IFT, $\theta$ is the contact angle, and r is the pore radius. The average pore radius is calculated from $$r = (8k/\phi)^{0.5}$$

where k and $\phi$ are the permeability and porosity of the core, respectively. The buoyant force is calculated as $$\Phi_g = \Delta\rho g h$$

where $\Delta\rho$ is the density difference between the aqueous phase and the oleic phase, g is gravitational acceleration, and h is the height of the core.

TABLE 12

Concentration of 3-Pentanone in Recovered Oil during the Coreflooding Experiment. The $^1$H NMR method was used for the measurement.

| time interval (PVI) | 3-pentanone concentration in recovered oil (wt %) |
|---|---|
| 2.58-2.77 | 1.388 |
| 2.77-3.01 | 1.623 |
| 3.01-3.24 | 1.958 |
| 3.24-3.47 | 3.841 |
| 3.85-4.00 | 2.320 |
| 4.00-4.27 | 3.092 |

The 3-pentanone case results in the capillary pressure of 18.0 kPa and the buoyant force of 0.3 kPa using the following: $\sigma=11$ mN/m, $\theta=26°$, and $r=1.1\times10^{-6}$ m. The $\theta$ value was taken from the data after 66 h of observation of oil droplets on an oil-aged calcite surface (as reproduced in FIG. 22A and FIG. 22B). This indicates that the oil recovery process in the 3-pentanone case was dominated by the capillary force.

The surfactant case results in the capillary pressure of 0.2 kPa and the buoyant force of 0.3 kPa using the following: $\alpha=0.21$ mN/m, $\theta=47°$, and $r=1.3\times10^{-6}$ m. The $\theta$ value was taken from Table 11. This indicates that the two forces were comparable in magnitude in the surfactant case.

These conclusions can be drawn using the Bond number and its variants but in an even more qualitative manner. Also, use of typical parameter values for fractured tight formations gives the same qualitative result. The main difference is that the 3-pentanone case would be much more dominated by the capillary force because the water/oil IFT becomes more influential in a medium of ultralow permeability.

To recap on the main differences between the 3-pentanone and surfactant cases, the more rapid imbibition observed for the 3-pentanone case was caused by a greater capillary pressure, for which the 3-pentanone solution rapidly changed the rock wettability to strongly water-wet without lowering the water/oil IFT. Also, the miscibility of 3-pentanone with oil caused the reduction in oil viscosity and density once the mass transfer of 3-pentanone from the aqueous phase to the oleic phase took place. In contrast, the 2-EH-4PO-15EO solution reduced the water/oil IFT while also changing the rock wettability to water-wet. Although this resulted in a slower imbibition process, the surfactant case showed a very slow but steady increase in oil recovery during the subsequent chase RB injection. This may be because the water/oil IFT gradually increased with the chase RB lowering the surfactant concentration.

Conclusion. This Example compared two wettability modifiers with different characteristics for enhancing water imbibition from a fracture into the surrounding matrix. One is 3-pentanone, a symmetric short ketone, and the other is 2-EH-4PO-15EO, a non-ionic surfactant with an ultrashort hydrophobe. They were used as low-concentration additives (approximately 1 wt %) to RB in this Example. Results from the contact angle and coreflooding experiments give the following conclusions: (a) The contact angle experiments showed that the two chemicals were comparable as wettability modifiers (FIG. 22A and FIG. 22B). For example, the surfactant solution was able to change the contact angle of oil droplets on oil-wet calcite surfaces from 134° to 47° within a day. (b) The coreflooding experiments using fractured limestone cores showed that the 3-pentanone solution resulted in more rapid oil recovery by water imbibition than the surfactant solution (FIG. 24). The increase in the oil recovery factor (with the initial RB flood as the baseline) was 30.9% for 1.6 PVI of the 3-pentanone solution and 8.4% for 1.2 PVI of the chase RB. For the surfactant case, it was 23.6% for 1.6 PVI of the surfactant solution and 23.7% for 7.0 PVI of the chase RB. (c) The difference in oil recovery response between the two chemical solutions was attributed to the main difference between them as wettability modifiers; that is, the surfactant solution lowers the water/oil IFT, but the 3-pentanone solution does not. The water/oil IFT was measured to be lowered from 11 to 0.21 mN/m with the surfactant solution at 347 K. (d) The oil recovery was increasing even after 7.0 PVI of the chase brine after the surfactant slug (FIG. 24). This might be related to the water/oil IFT that had been lowered by the surfactant solution slug and then increased during the chase RB injection.

Nomenclature for Example 2. Roman Symbols
A=cross-sectional area
b=fracture aperture
d=core diameter
g=gravitational acceleration
h=height of the core
k=permeability
$N_B$=Bond number
$P_C$=capillary pressure
r=pore radius
Greek Symbols
$\phi$=porosity
$\Phi$=buoyant force
$\sigma$=interfacial tension
$\theta$=contact angle
$\rho$=density
Subscripts
e=effective
f=fracture
m=matrix
Abbreviations
2-EH=2-ethylhexanol
EO=ethylene oxide
IFT=interfacial tension
PO=propylene oxide
PVI=pore volume(s) injected
RB=reservoir brine
$^1$H NMR=proton nuclear magnetic resonance Figure Captions for Example 2. FIG. 16. Densities of crude oil and its mixtures with 3-pentanone. The crude oil densities were measured at 344 K. All other densities were measured at 347 K.

FIG. 17. Viscosities of crude oil and its mixtures with 3-pentanone. The crude oil viscosities were measured at 344 K, and the other viscosities were measured at 347 K.

FIG. 18. Phase behavior test of the mixture of oil/2-EH-4PO-15EO/RB at 347 K. The surfactant concentration in RB is 1.0 wt %. The water/oil ratio was 7:3 (i.e., 70 vol % aqueous phase and 30 vol % oil).

FIG. 19. Schematic of the experimental setup for oil flooding.

FIG. 20. Artificially fractured Indiana limestone core. The diameter is 0.0254 m, and the length is 0.127 m. Table 10 summarizes the properties of fractured cores.

FIG. 21. Schematic of the experimental setup for coreflooding.

FIG. 22A. Contact angle at the initialization of the experiment. FIG. 22B. Contact angle 24 h after the calcite piece was immersed in 2-EH-4PO-15EO solution at 347 K and atmospheric pressure. FIG. 22C. Comparison of the contact angle results for three cases. Average contact angles of oil droplets on oil-aged calcite surfaces for three solutions: RB, 1.1 wt % 3-pentanone in RB, and 1.0 wt % 2-EH-4PO-15EO in RB.

FIG. 23. Oil recovery factors during the coreflooding experiments at 347 K. Two cores were first flooded with RB until there was no oil production. Then, they were flooded with a surfactant slug (3-pentanone or 2-EH-4PO-15EO solution). After 1.6 PVI of the chemical slug, the cores were flooded with the chase RB. The chase RB injection had to be terminated after 1.2 PVI only for core 1 because of operational constraints.

Figure 24A:
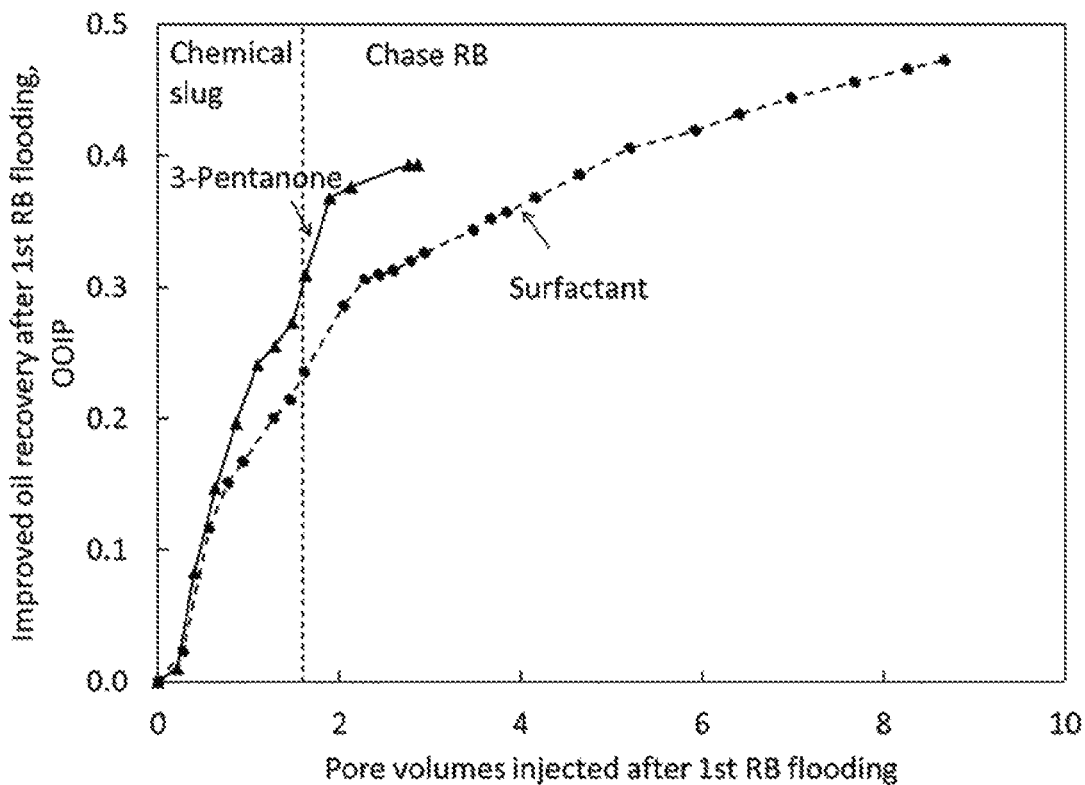
FIG. 24A provides plots showing improved oil recovery factors for a 3-pentanone and surfactant after the end of the first RB flooding.
Figure 24B:
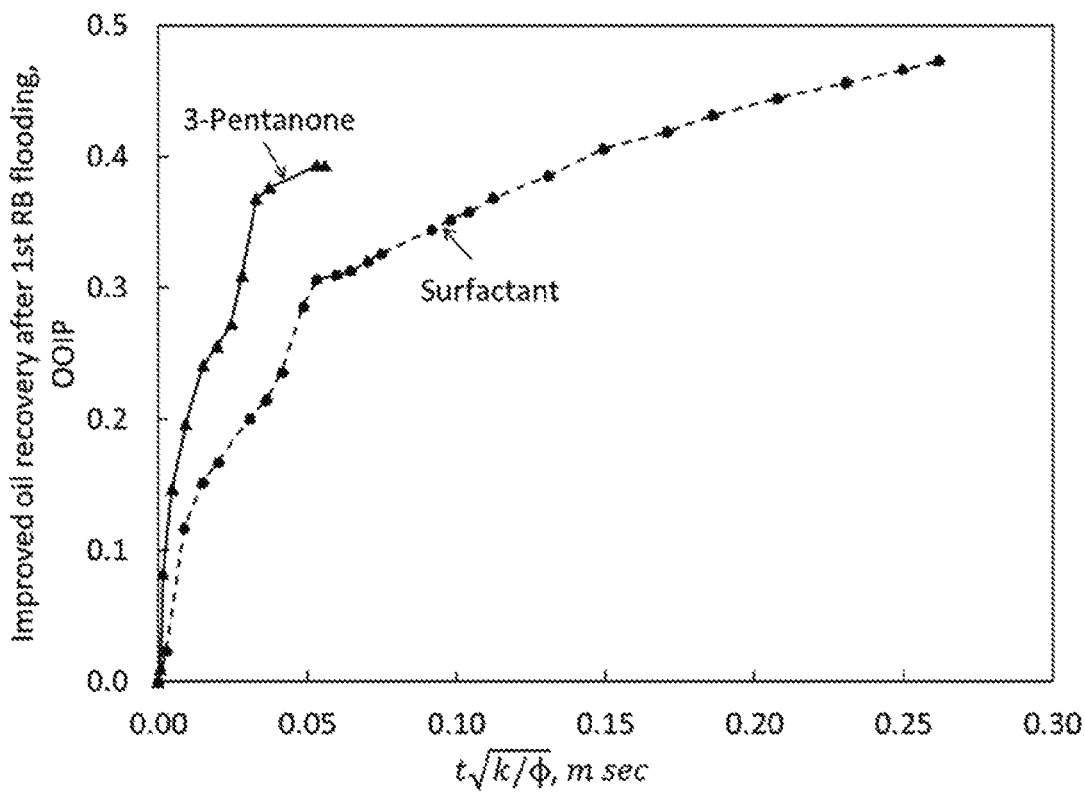
FIG. 24B provides plots showing improved oil recovery factors for a 3-pentanone and surfactant with respect to the Leverett factor.

FIG. 24A and FIG. 24B. Improved oil recovery factors for the 3-pentanone and surfactant cases after the first RB flooding (FIG. 24A). "Improved oil recovery" represents the amount of oil recovered after the end of the first RB flooding. Note that the oil recovery factor for the 3-pentanone case has been corrected for the 3-pentanone solubility in oil. Improved oil recovery factors with respect to the Leverett factor (FIG. 24B).

Example 3: Enhancement of Water Imbibition in Shales by Use of Ketone Solvent

This example investigates an application of 3-pentanone, a symmetric short ketone, to enhance the water imbibition in coreflooding of fractured carbonate cores. 3-Pentanone was tested in two ways: 1.1-wt % 3-pentanone solution in reservoir brine (3 pRB) and pure 3-pentanone (3p) as a miscible solvent. 3p is a mutual solvent for oil and water, and can rapidly change the rock wettability to strongly water-wet with its electron-rich oxygen atom through the oil and water phases. The main objective of this research is to investigate how the initial water saturation in the matrix affects the imbibition of 3 pRB or 3p from the fracture and the resulting recovery of oil from the matrix.

The experimental results were analyzed in terms of material balance (mass and volume) with simplifying assumptions. This analysis enabled to estimate how much of the injected components were imbibed into the surrounding matrices from the fracture and the relative contribution of the injected components to displacing oil in the matrix.

For the injection of 3 pRB, the oil recovery was consistently greater when there was an initial aqueous phase in the matrix. While the presence of an initial aqueous phase did not affect the imbibed fraction of the injected 3p, it made it more effective for 3p to enhance the oil displacement by water in the matrix. For example, 87% of the oil recovered from the matrix was displaced by water (the rest by 3p) for the coreflood with an initial water saturation of 31%.

The injection of pure 3p showed that a larger amount of oil was recovered from the matrix with the presence of an initial aqueous phase in the matrix. The oil recovery mainly came from the displacement of oil by 3p in the matrix with a minor contribution of water. Results for the 3 pRB and 3p injections indicate collectively that 3-pentanone was more effective in enhancing oil recovery when an aqueous phase was initially present in the matrix.

Hydraulic fracturing made possible the recovery of oil from shales at economically feasible production rates. However, the petrophysical properties of shales, such as ultra-low permeability, heterogeneous mineralogy, and high total organic content (TOC), result in recovery factors typically below 10%. The presence of organic matter and the high content of calcite and dolomite tend to cause the shales to be oil-wet or mixed-wet.

Surfactant solutions have been proposed to facilitate the imbibition of water into the shale matrix and thus enhance oil production. The recovery mechanisms of surfactants are the rock-wettability change toward a more water-wet state and the reduction of interfacial tension (IFT) between the aqueous and oleic phases.

Cationic, anionic, and non-ionic surfactants have been investigated to evaluate their performance in shales. For example, anionic and non-ionic surfactants have been tested on carbonate and siliceous shales to modify the wettability from oil-wet to water-wet. Anionic surfactant was a better wettability modifier than the non-ionic surfactant. Anionic surfactants altered the wettability of siliceous shales, while non-ionic surfactants did not affect the wettability. IFT should not be decreased to ultra-low values ($10^{-3}$ mN/m) during the application of surfactants in shales.

As described in reference to Example 1, above, the application of 3-pentanone as an additive to reservoir brine (RB) enhances oil recovery from oil-wet or mixed-wet cores. 3-Pentanone is a symmetric short ketone that partitions into oil and water at reservoir conditions. It is a colorless liquid at standard conditions, widely used in the food industry, non-toxic and available at low-cost. 3-Pentanone was tested as a novel chemical that works as a wettability modifier without changing the water/oil IFT and also as a miscible solvent to oil at reservoir conditions. Spontaneous and forced imbibition experiments were performed with oil-wet limestone cores and RB and 3 pRB. The results indicated that 3-pentanone improves oil recovery by wettability alteration, and also by oil swelling and viscosity reduction, as a consequence of the miscibility of 3-pentanone with oil.

As described in reference to Example 2, above, 3-pentanone and a non-ionic surfactant were studied as additives to RB to enhance the water imbibition from a fracture into the surrounding matrices. Coreflooding experiments in fractured cores showed that 3 pRB recovered oil more quickly than the surfactant solution by spontaneous imbibition. 3 pRB did not change the original water/oil IFT, which favorably increased the capillary force to accelerate the water imbibition by wettability alteration.

Overall, Example 1 and Example 2 showed that 3-pentanone is a promising chemical to recover oil from oil-wet fractured formations, such as shales and tight carbonates. However, it is unknown how $S_{wi}$ would affect the performance of 3-pentanone or 3 pRB. Water saturations in shale plays can be high after their primary depletion; e.g., the water-cut was reported to be 90% in part of the Permian basin.

Initial water saturation ($S_{wi}$) can influence the spontaneous imbibition rate and oil recovery. However, results are not consistent regarding how $S_{wi}$ affects the performance of water imbibition. The final oil recovery factor in Berea Sandstones by spontaneous water imbibition was little affected by the initial water saturation in the range from 0 to 30%. Imbibition rate decreased as $S_{wi}$ increased in the range of 0 to 6%, and then it increased as $S_{wi}$ increased from 15 to 34%. For Rørdal chalks, the oil recovery decreased from 67 to 30% as the $S_{wi}$ increased from 7.5% to 51%. The imbibition rate first increased with the augmentation of $S_{wi}$ up to 34%, and then it slightly decreased. By countercurrent spontaneous imbibition experiments in Berea sandstones, the initial water saturation in the range of 0 to 20% did not affect the oil recovery significantly. Above 20% of $S_{wi}$, the oil recovery increased.

Studies of the relationship among rock wettability, $S_{wi}$, aging time, and oil recovery during spontaneous imbibition and waterflooding on Berea sandstone revealed that the imbibition rate and final oil recovery decreased as the initial water saturation decreased (as a consequence of larger aging time and less water wetness). For diatomite cores, oil recovery decreased as $S_{wi}$ increased (up to 60%). Furthermore, residual oil saturation was not greatly affected by $S_{wi}$ (recovery was measured in the unit of pore volume).

$S_{wi}$ showed no systematic effect on oil recovery with Berea sandstones. After scaling to reservoir conditions, oil recovery was sensitive to $S_{wi}$. It increased as $S_{wi}$ increased within the range of 11-28%. Numerical simulations of the effects of $S_{wi}$ on oil recovery by imbibition indicate that $S_{wi}$ did not affect the recoverable oil at a reservoir scale and did not change oil production rate at the reservoir scale, unlike in core-scale experiments. A potential difference between reservoir scale and core-scale may include that the displacement was forced imbibition at the reservoir scale, whereas it was spontaneous imbibition at the core scale.

$S_{wi}$ has been reported to be 25% for organic Barnett shale, and 20% for Horn River shale. For Otter Park and Evie gas shales, $S_{wi}$ decreased the water imbibition rate, but $S_{wi}$ did not affect the oil imbibition rate. Hydrophobic organic material could diminish the water imbibition rate. Combined effects of $S_{wi}$ and imbibing fluid on the spontaneous imbibition into Barnett shale cores included that $S_{wi}$ affected spontaneous imbibition into shales, but the effects depended on mineral composition. The high heterogeneity of shales made the imbibition process complicated and, therefore, effects depend on shale type.

This Example describes the effects of $S_{wi}$ on the imbibition of water and 3-pentanone into fractured cores. Two injection schemes were considered for water imbibition enhancement by 3-pentanone in the presence of $S_{wi}$. For the first scheme, 3-pentanone was used as 3 pRB to enhance the water imbibition with cores #1 ($S_{wi}$=0) and #2 ($S_{wi}$=0.311). For the second scheme, 3-pentanone was injected as a pure solvent with cores #3 ($S_{wi}$=0) and #4 ($S_{wi}$=0.28).

Materials and Methods. Relevant information regarding 3-pentanone is described in more detail in reference to Example 1. A complete set of experimental data for 3-pentanone and its mixtures with oil and reservoir brine (RB) can be found therein.

Fluid Properties. A sample of crude oil from an oil reservoir in Texas was used for the experiments. The experimental temperature was 347 K. Table 13 shows the relevant properties of the oil sample for this study. This oil is more viscous than the oil described in Examples 1-2. RB with a salinity of 68722 ppm was prepared based on accessible field data (Table 14). The density of RB was 1030 kg/m³ and at 347 K and atmospheric pressure.

TABLE 13

Properties of the crude oil sample used in this research.

| Molecular weight, g/mol | | 210 |
|---|---|---|
| Density, kg/m³ | | 878 (at 293 K) |
| | | 849.6 (at 347 K) |
| Viscosity, cP | | 2.6 (at 347 K) |
| SARA, wt % | Saturates | 71.6 |
| | Aromatics | 24.8 |
| | Resins | 3.0 |
| | Asphaltenes (pentane insoluble) | <0.1 |

TABLE 14

Composition of the reservoir brine (RB) used in this research (68722 ppm). The density of RB was 1030 kg/m³ at 347 K and atmospheric pressure.

| Cations | ppm | Anions | ppm |
|---|---|---|---|
| Na⁺ | 25170 | Cl⁻ | 41756 |
| K⁺ | 210 | SO₄²⁻ | 108 |
| Ca²⁺ | 1292 | | |
| Mg²⁺ | 187 | | |
| sum | 26858.24 | sum | 41863.73 |

Pentanone Properties. A sample of 3-pentanone with a purity greater than 99% was obtained from Sigma-Aldrich. The density of 3-pentanone is 760 kg/m3 at 347 K and atmospheric pressure. Aqueous stability of 3-pentanone in RB, wettability measurements with calcite surfaces, and oil dilution by 3-pentanone are described in more detail in reference to Example 1.

The concentration of 3-pentanone in RB described in this Example was 1.1 wt %, which is the solubility limit of 3-pentanone in RB at 347 K. This aqueous solution is referred to as "3 pRB." The density of 3 pRB was 1030 kg/m3 at 347 K and atmospheric pressure.

Example 1 describes that 3-pentanone modifies the wettability of calcite from oil-wet to water-wet. The average contact angle of oil droplets on oil-aged calcite surfaces in 3 pRB decreased from 95° to 74° within two hours, and further decreased to 26° after 66 hours. None of the oil droplets was attached on the calcite surface after 3 days. An IFT experiment showed that 3 pRB did not affect the IFT between the crude oil and RB (approximately 11 mN/m).

Experimental Procedure for Coreflooding. Four Texas cream limestone cores were prepared for coreflooding experiments, having a diameter of 0.0254 m and a length of 0.229 m. Cores #1 and #3 were fully saturated with oil, and cores #2 and #4 with RB first and then with oil at 347 K and atmospheric pressure. The porosities, permeabilities and water and oil saturations were measured for all cores. Then, the cores were placed in a container filled with oil for at least one month at 347 K. Since initial water saturation can decrease due to wettability alteration, the cores containing water (#2 and #4) were flooded again with oil after the aging period.

Figure 25:
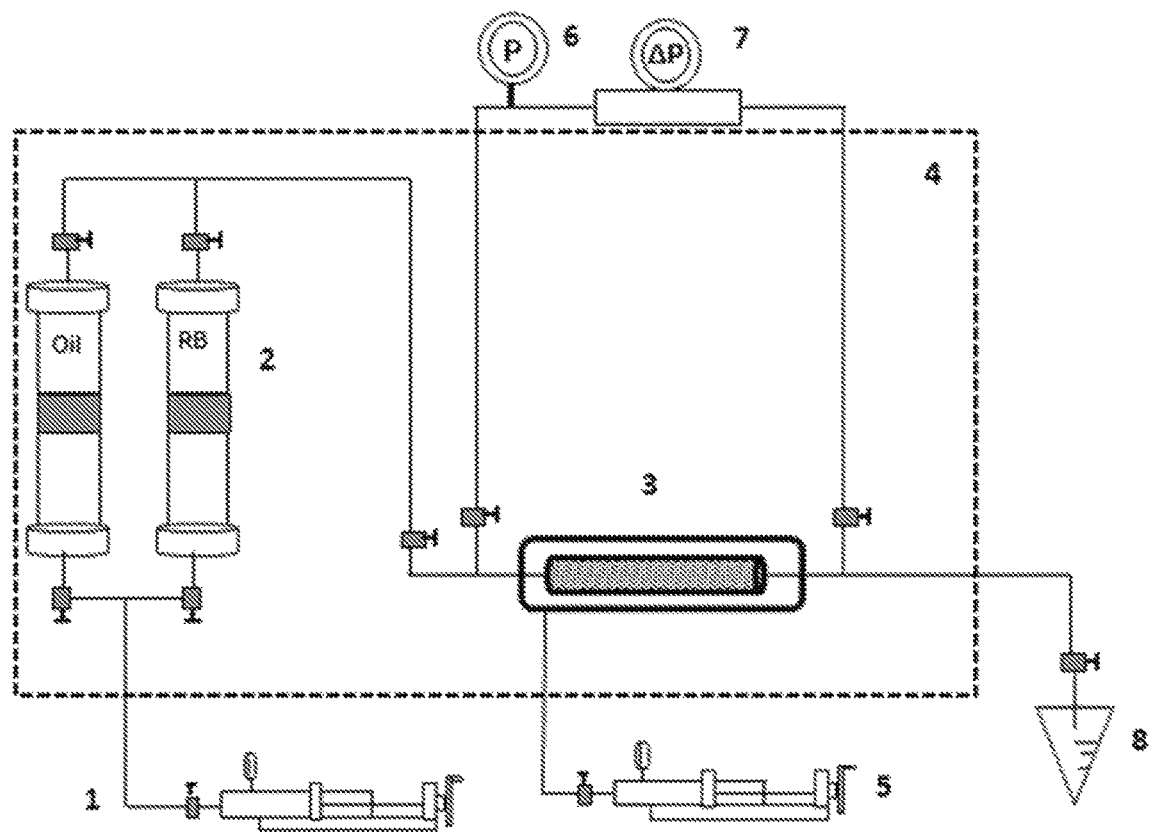
FIG. 25 provides a schematic illustration of an experimental device for saturation of cores with oil and RB.

FIG. 25 shows the system for the fluid saturation of cores at reservoir temperature. The system includes two accumulators for oil and RB, a core holder, a manual pump to maintain the overburden pressure, a pressure gauge, a differential pressure gauge, fluid collectors, and an oven. For cores #2 and #4, oil was injected into the cores at 100 cm3/hr until no water was produced.

Figure 26:
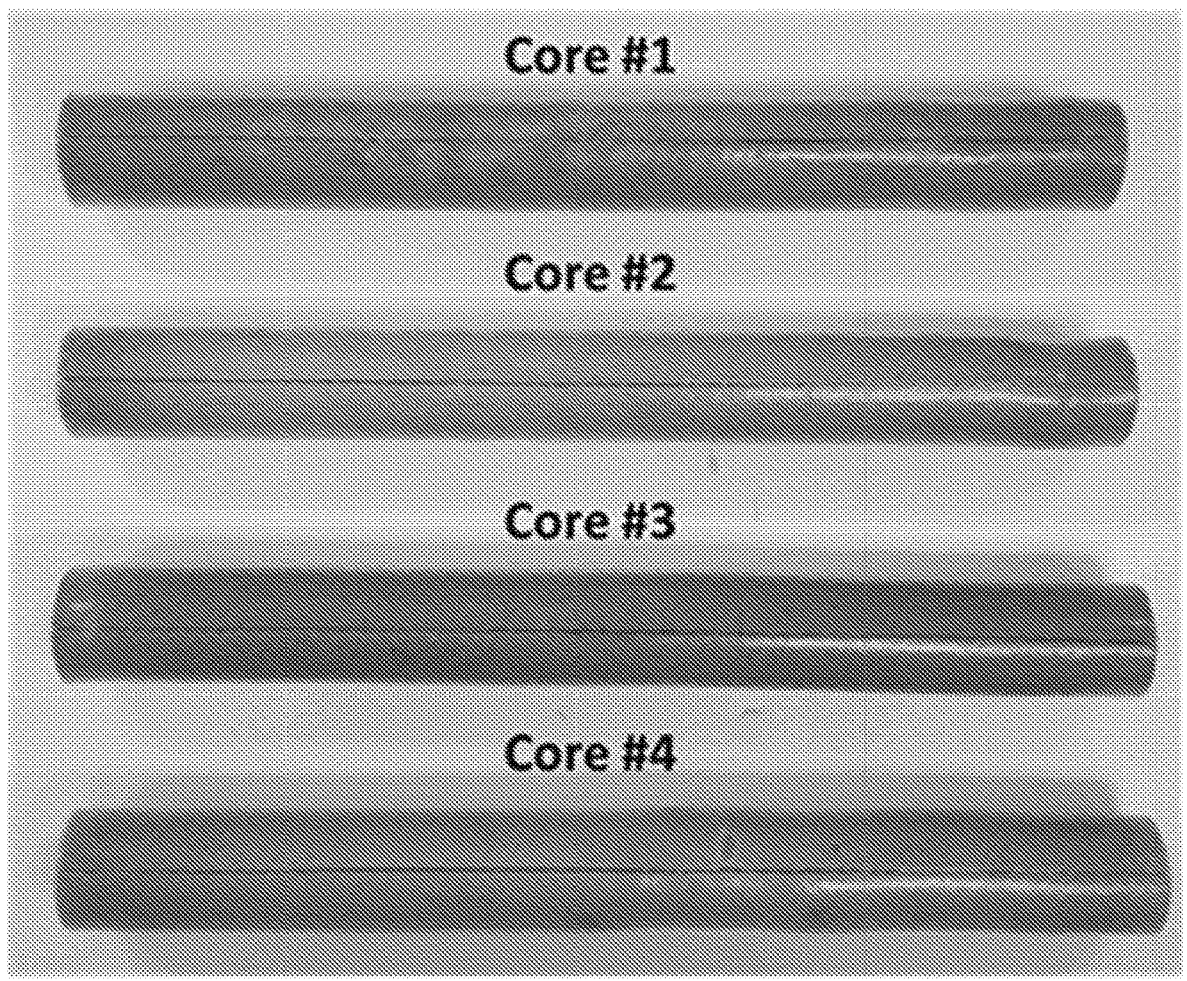
FIG. 26 provides photographs of artificially fractured Texas cream limestones cores.

Before a coreflooding experiment, a fracture was created for each core with an electrical saw as shown in FIG. 26. Two Teflon strips of 0.001 m in width and 0.229 m in length were placed inside the fracture to keep an aperture of the fracture. The core halves were put together with the Teflon strips in place, and wrapped with a heat-shrinkable Teflon tube. Finally, the core was placed horizontally inside the core holder with the fracture vertically-oriented.

Table 15 provides the properties of the cores and other important parameters for the design of coreflooding experiments. Cores #1 and #2 were used for 3 pRB injection, and cores #3 and #4 for pure 3p injection. Note again that cores #1 and #3 were fully saturated with oil and cores #2 and #4 contained initial water saturations, 31.1% and 28.0%, respectively.

The fracture permeability, $k_f$, was calculated. The fracture aperture was obtained from the equation for flow between parallel plates:

$$b = (3\pi d k_e)^{\frac{1}{3}} \qquad (1)$$

where b is the fracture aperture, d is the core diameter, and $k_e$ is the effective oil permeability of the fractured core from Darcy's law. The fracture permeability was then calculated from the fracture aperture by the following equation:

$$k_f = b^2/12. \qquad (2)$$

Table 15 provides the pressure drops along the cores at 100 cm3/hr, the overburden pressures, the fracture apertures, the fracture permeabilities and the fracture/matrix permeability ratios (permeability contrasts). The flow capacities of the

TABLE 15

Properties of the cores used for coreflooding experiments. Cores #1 and #2 were used for a slug injection of 1.1 wt % 3-pentanone solution in RB (3pRB). Cores #3 and #4 were used for the injection of pure 3-pentanone as a slug.

|  | Core #1 | Core #2 | Core #3 | Core #4 |
|---|---|---|---|---|
| Matrix porosity | 0.274 | 0.280 | 0.286 | 0.280 |
| Matrix permeability, mD | 19.9 | 17.8 | 31.6 | 17.8 |
| Matrix water saturation | 0.0 | 0.311 | 0.0 | 0.280 |
| Matrix oil saturation | 1.0 | 0.689 | 1.0 | 0.720 |
| Flow capacity of the matrix, m$^4$ | $9.947 \times 10^{-18}$ | $8.901 \times 10^{-18}$ | $1.580 \times 10^{-17}$ | $8.901 \times 10^{-18}$ |
| Mass of the core before cutting, kg | 0.25056 | 0.25191 | 0.2465 | 0.25018 |
| Mass of the core after cutting, kg | 0.23000 | 0.23227 | 0.2263 | 0.2293 |
| Matrix pore volume after cutting, m$^3$ | $2.909 \times 10^{-5}$ | $3.005 \times 10^{-5}$ | $3.034 \times 10^{-5}$ | $2.969 \times 10^{-5}$ |
| Pressure drop along the core at 100 cm$^3$/hr, kPa | 6.895 | 10.689 | 3.654 | 8.274 |
| Overburden pressure, kPa | 2068 | 2068 | 7584 | 6550 |
| Fracture aperture, m | $1.03 \times 10^{-4}$ | $9.72 \times 10^{-5}$ | $1.28 \times 10^{-4}$ | $9.74 \times 10^{-5}$ |
| Fracture permeability, D | 900 | 798 | 1398 | 801.7 |
| Permeability contrast between fracture and matrix | 45249 | 44831 | 44241 | 45039 |
| Flow capacity of fracture, m$^4$ | $2.330 \times 10^{-15}$ | $1.944 \times 10^{-15}$ | $4.509 \times 10^{-15}$ | $1.958 \times 10^{-15}$ |
| Fracture pore volume, m$^3$ | $6 \times 10^{-7}$ | $5.6 \times 10^{-7}$ | $7.5 \times 10^{-7}$ | $5.6 \times 10^{-7}$ |
| Total pore volume, m$^3$ | $2.97 \times 10^{-5}$ | $3.06 \times 10^{-5}$ | $3.11 \times 10^{-5}$ | $3.03 \times 10^{-5}$ |

Figure 27:
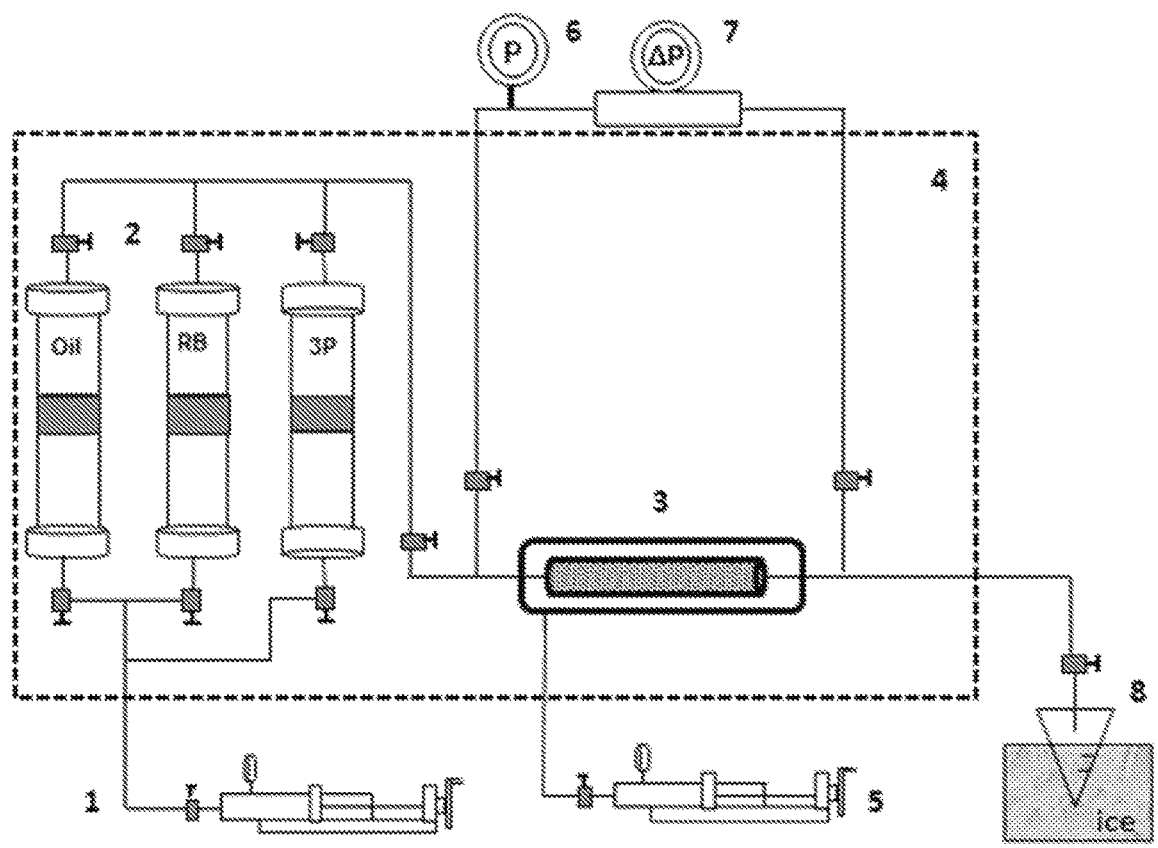
FIG. 27 provides a schematic illustration of an experimental device for coreflooding experiment testing.

FIG. 27 presents a schematic of the setup for the coreflooding experiments. The setup includes accumulators for crude oil, RB, and 3-pentanone (3 pRB or pure 3p), a pump, a core holder, a hydraulic manual pump to maintain overburden pressure, a pressure gauge, a differential pressure gauge, fluid collectors, and an oven.

After placing a fractured core in the core holder, the oven temperature was set to reservoir temperature (347 K). Then, oil was injected to remove any air inside the fracture and tubing. Oil flow rate was gradually increased from 20 to 1000 cm$^3$/hr. A partially-closed valve was placed at the outlet of the system to maintain the fracture space filled out with liquid. This also kept the outlet pressure slightly higher than the atmospheric pressure. Fracture permeability was measured using a flow rate of 100 cm$^3$/hr. The overburden pressure was regulated to make the fracture/matrix permeability ratio within the range between 63634 and 33126. This range was calculated from available data of fracture conductivity, fracture width, and matrix permeability for shale plays. The permeability ratio was set to be similar to that in shales.

fracture ($k_f A_f$) and the matrix ($k_m A_m$) are also shown in Table 15. $A_f$ and $A_m$ are cross-sectional areas of the fracture and matrix. $K_f$ and $k_m$ are permeabilities of the fracture and matrix. The flow capacities of the fractures were approximately 240 times greater than those of the matrix.

The coreflooding experiments were performed at 347 K with an injection scheme consisting of three stages: the first stage with RB with no chemical, the second stage with a chemical slug (either 3 pRB or pure 3p), and the third stage with "chase" RB. The RB for the initial stage was injected at 6 cm$^3$/hr until no oil production was observed. For the second stage, the chemical slug, either 3 pRB or pure 3p, was injected at a flow rate based on 1 hour of residence time in the fracture. Finally, the chase RB was injected at the same flow rate calculated for the chemical slug until there was no more oil production for cores #1 and #3. For cores #2 and #4, however, the RB injection was stopped after 4.3 PVI.

The effluent was collected in plastic graduated tubes. The 3-pentanone concentrations in the oleic and aqueous phases were measured by the 1H NMR method for the chemical slug and chase RB periods for all cores. The concentration data were used to correct oil-recovery results for 3-pentanone solubility, and to analyze the material balance for each coreflooding. The tubes were placed in an ice bath to avoid evaporation of 3p for cores #3 and #4 after the excessive vaporization of 3p was noticed for corefloods with cores #1 and #2.

The flow rate of the chemical slug (3 pRB or pure 3p) was designed to set the chemical residence time to approximately 1 hour. The residence time in the fracture r is $$\tau = V_f/q, \quad (3)$$

where $V_f$ is the volume of fracture, and q is the flow rate of the chemical slug in the fracture. Table 4 summarizes the coreflooding experiments in this research and shows the flow rates during the injection of the chemical slug. As noted previously, the chemical slug was 3 pRB for cores #1 ($S_{wi}=0$) and #2 ($S_{wi}=0.311$), and pure 3p for cores #3 ($S_{wi}=0$) and #4 ($S_{wi}=0.280$). To analyze the effects of $S_{wi}$ on oil recovery and imbibition, core #1 was compared to core #2 for 3 pRB, and core #3 to core #4 for pure 3p.

Material Balance for a Fractured Core. Analysis of the coreflooding results requires the material balance analysis for (pseudo)components, brine, oil, and 3p. Since the oil recovery occurs by replacing oil with brine and/or 3p in the matrix pore volume, it is important to estimate how much of injected components was imbibed into the matrix from the fracture. The material balance is also useful in estimating the relative contribution of brine and 3p to displacing oil from the matrix pore volume.

The material balance for (pseudo)component i (i=1 for brine, 2 for oil, and 3 for 3p) for the horizontal flooding with a vertically-oriented fracture (FIG. 28) is based on the following assumptions:

The system volume consists of two subvolumes, the fracture volume ($V_f$) and the matrix volume ($V_m$).

The fracture volume is connected to the injector (source) and the producer (sink).

The system is closed except for the injector and producer. No chemical reaction.

For a given time interval $\Delta t$, $$\Delta M_{fi} = M_{ti} + M_{Ii} + M_{Pi} \quad (4)$$

$$\Delta M_{mi} = -M_{ti}, \quad (5)$$

where $\Delta M_{fi}$ and $\Delta M_{mi}$ are the accumulation of component i in $V_f$ and $V_m$, respectively. $M_{Ii}$ is the amount of component i going into $V_f$ through the injector for $\Delta t$, $M_{Pi}$ is the amount of component i going into $V_f$ through the producer for $\Delta t$, and $M_{ti}$ is the amount of component i transferred from $V_m$ to $V_f$ through the matrix/fracture interface for $\Delta t$. Note again that i=1 for brine, 2 for oil, and 3 for 3p.

When this material balance is applied to the time interval $\Delta t$, during which flow in $V_f$ is a steady state, $\Delta M_{fi}$ are zero for all i. Since $M_{Ii}$ and $M_{Pi}$ are known for all i for the corefloods ($M_{I2}=0$, in particular), $M_{ti}$ and, therefore, $\Delta M_{mi}$ are given for all i. The $M_{ti}$ values so calculated are net amounts because the gross amounts of mass transfer between $V_m$ and $V_f$ for $\Delta t$ are unknown in general.

How much of the injected amount is actually imbibed into $V_m$ is quantified by the imbibed fraction for component i ($F_i$). This imbibed fraction is an "apparent" value because $M_{ti}$ is the net amount of mass transfer from $V_m$ to $V_f$ as mentioned previously. The apparent imbibed fraction for component i, $F_i$, is defined for $\Delta t$ as $$F_i = -M_{ti}/M_{Ii} \quad (6)$$

$F_1$ and $F_3$ are calculated from the experimental data and used to interpret the imbibition experiments.

The contributions of brine (i=1) and 3p (i=3) to displacing oil (i=2) in the matrix are estimated by assuming no volume change on mixing of 3p and brine, and 3p and oil for the volume balance for $V_m$. That is, $\Sigma_{i=1}^{3} V_{ti}=0$, and therefore $\Sigma_{i=1}^{3} (V_{Ii}+V_{Pi})=0$, where $V_{ti}$ is the volume of component i transferred from $V_m$ to $V_f$ through the matrix/fracture interface for $\Delta t$, $V_{Ii}$ is the volume of component i going into $V_f$ through the injector for $\Delta t$, and $V_{Pi}$ is the volume of component i going into $V_f$ through the producer for $\Delta t$. Then, the produced oil for $\Delta t$ is expressed as $$-V_{P2} = (V_{I1}+V_{P1}) + (V_{I3}+V_{P3}). \quad (7)$$

The contribution of component i to displacing oil from the matrix, $D_i$, is defined as $$D_i = -(V_{Ii}+V_{Pi})/V_{P2} \quad (8)$$

for i=1 and 3.

Results and Discussion. The main results of the coreflooding experiments with 3 pRB (cores #1 and #2) and pure 3p (cores #3 and #4) are summarized, below. The mass/volume balance equations give $F_i$ and $D_i$ for i=1 and 3, and the resulting oil recovery results are discussed. Since brine (i=1) was not injected into cores #3 and #4, the discussion is centered on the effects of $S_{wi}$ on $F_3$.

The main focus of the coreflooding is on the effect of $S_{wi}$ on the displacement of oil (i=2) by brine (i=1) and/or 3p (i=3) through the fracture/matrix interface. The effects of $S_{wi}$ on water imbibition have been studied for conventional reservoirs, but no detailed analysis of material balance has been presented in the literature. Although the permeability ratios were designed to be generally similar to fractured shales (Table 16), the permeabilities of the cores (matrices) in this research are not as small as those for shales.

TABLE 16

Summary of the coreflooding experiments. Cores #1 and #2 were used for the slug injection of 1.1-wt % 3-pentanone solution in RB (3pRB). Cores #3 and #4 were used for the slug injection of pure 3-pentanone. τ is the residence time of the chemical product (3pRB or 3p) in the fracture, and q is the flow rate at which the chemical product is injected.

| core #1 | core #2 | core #3 | core #4 |
|---|---|---|---|
| $S_{wi} = 0$ | $S_{wi} = 0.311$ | $S_{wi} = 0$ | $S_{wi} = 0.28$ |
| Scheme: | Scheme: | Scheme: | Scheme: |
| RB/3pRB/Chase RB | RB/3pRB/Chase RB | RB/3p/Chase RB | RB/3p/Chase RB |
| τ = 1 hour | τ = 1 hour | τ = 1 hour | τ = 1 hour |
| q = 5.97 × 10$^{-7}$ m$^3$/hr | q = 5.62 × 10$^{-7}$ m$^3$/hr | q = 7.45 × 10$^{-7}$ m$^3$/hr | q = 5.64 × 10$^{-7}$ m$^3$/hr |

Figure 29A:
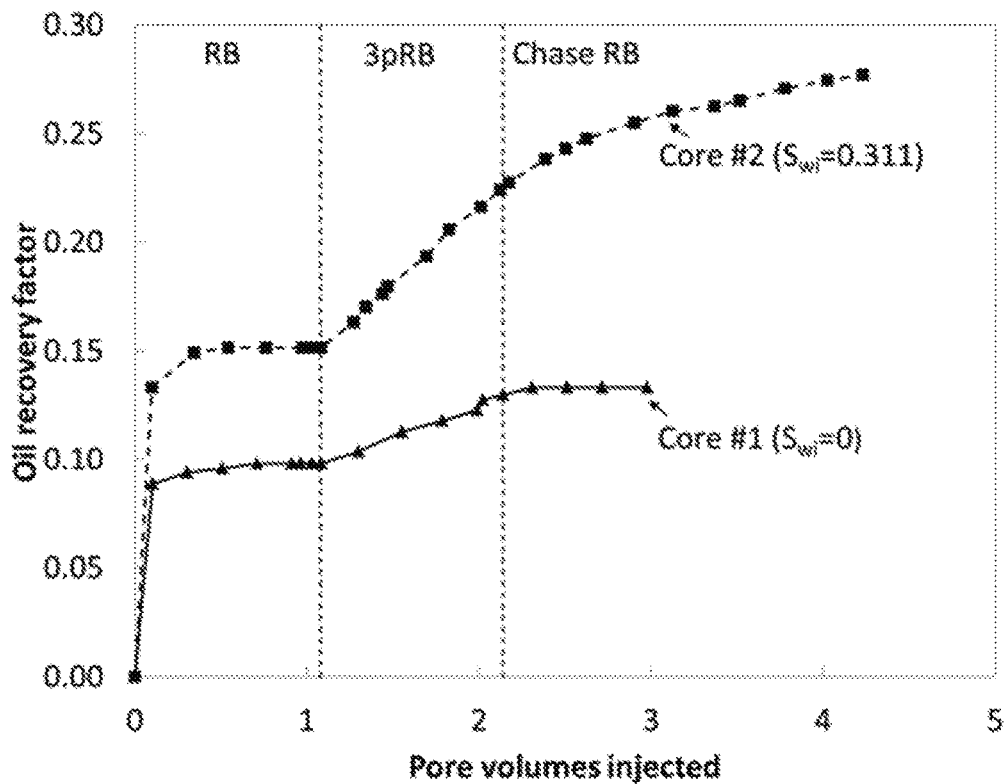
FIG. 29A provides plots showing oil recovery factors during coreflooding tests.

Coreflooding Experiments with 3 pRB for Cores #1 and #2. FIG. 29A shows the oil recovery factors for cores #1 ($S_{wi}$=0) and #2 ($S_{wi}$=0.311). As mentioned above, RB was first injected into the cores until no more oil production was observed. Then, 3 pRB was injected to improve the oil recovery for approximately 1.0 pore-volume injected (PVI). After that, the chase RB was injected until the watercut became essentially 100%. The chase RB injection was terminated at 0.84 PVI for core #1 and 2.11 PVI for core #2.

The initial RB injection showed that the oil recovery factor was clearly higher for core #2 than for core #1. The final recovery factor for this initial RB injection was 9.8% after 0.7 PVI for core #1, and 15.1% after 0.5 PVI for core #2. This indicates that the RB imbibition rate was more rapid for core #2 despite the fact that core #1 had a slightly higher permeability than core #2 (Table 15). The initial phase distribution likely affected the RB imbibition into these cores.

The incremental oil recovery factor during the 3 pRB slug injection was 3.2% for core #1, and 7.3% for core #2. The imbibition was more rapid for core #2 as was the case with the initial RB injection.

The chase RB injection reached the ultimate oil recovery factor for core #1, with an incremental oil recovery factor of 0.3% after only 0.17 PVI. The chase RB injection was continued until 0.84 PVI for core #1. For core #2, however, the chase RB injection did not reach a plateau until it was terminated at 2.11 PVI. This chase RB injection yielded an incremental oil recovery factor of 5.3% for core #2, which is much greater than 0.3% for core #1.

The total oil recovery factor after the three stages was 13.3% for core #1, and 27.7% for core #2. It is clearly shown that 3 pRB increased oil recovery beyond what the RB injection could recover; that is, the rock wettability should have changed to more water-wet, especially for core #2. The results indicate that the injected 3p was more efficiently used for enhancing the imbibition of brine (i=1) for core #2 than for core #1 as explained below.

Figure 29B:
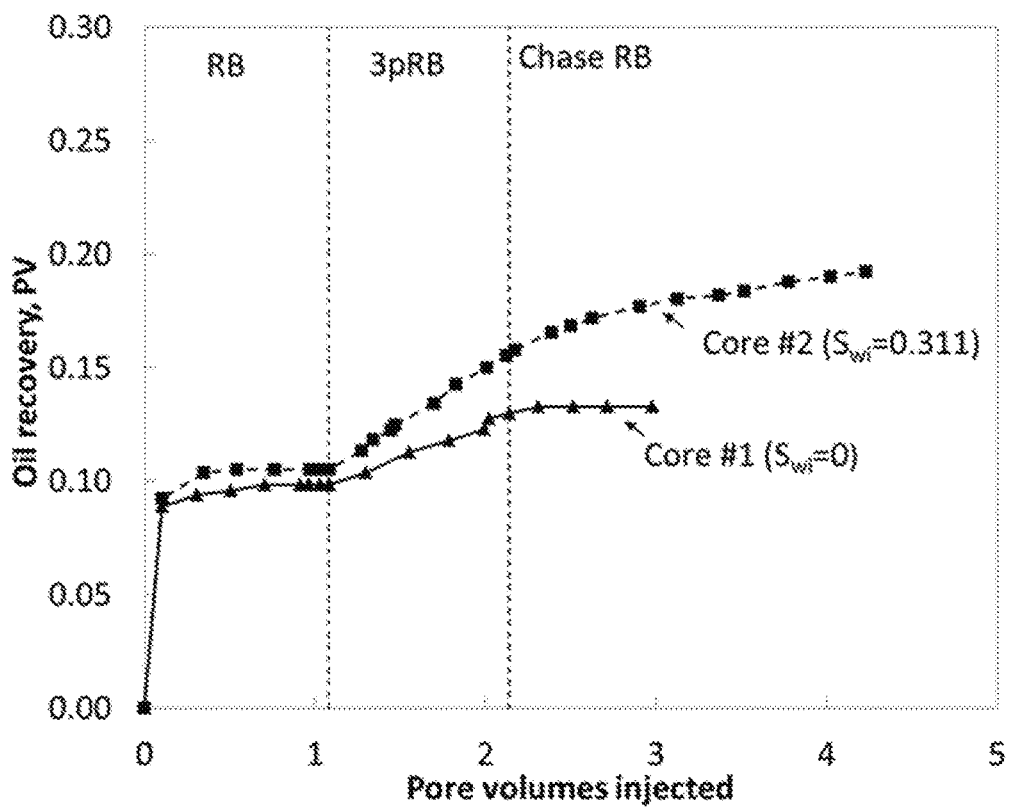
FIG. 29B provides plots showing oil recovery in pore volume units during coreflooding tests.

In addition to rock properties, the unit used for oil recovery affected the interpretation of imbibition experiments. FIG. 29B presents the oil recovery in the unit of pore volume (PV) for cores #1 and #2. The trends of oil recovery, imbibition rate, and the effectiveness of 3 pRB for these cores are consistent with the observations made for FIG. 29A.

Figure 30:
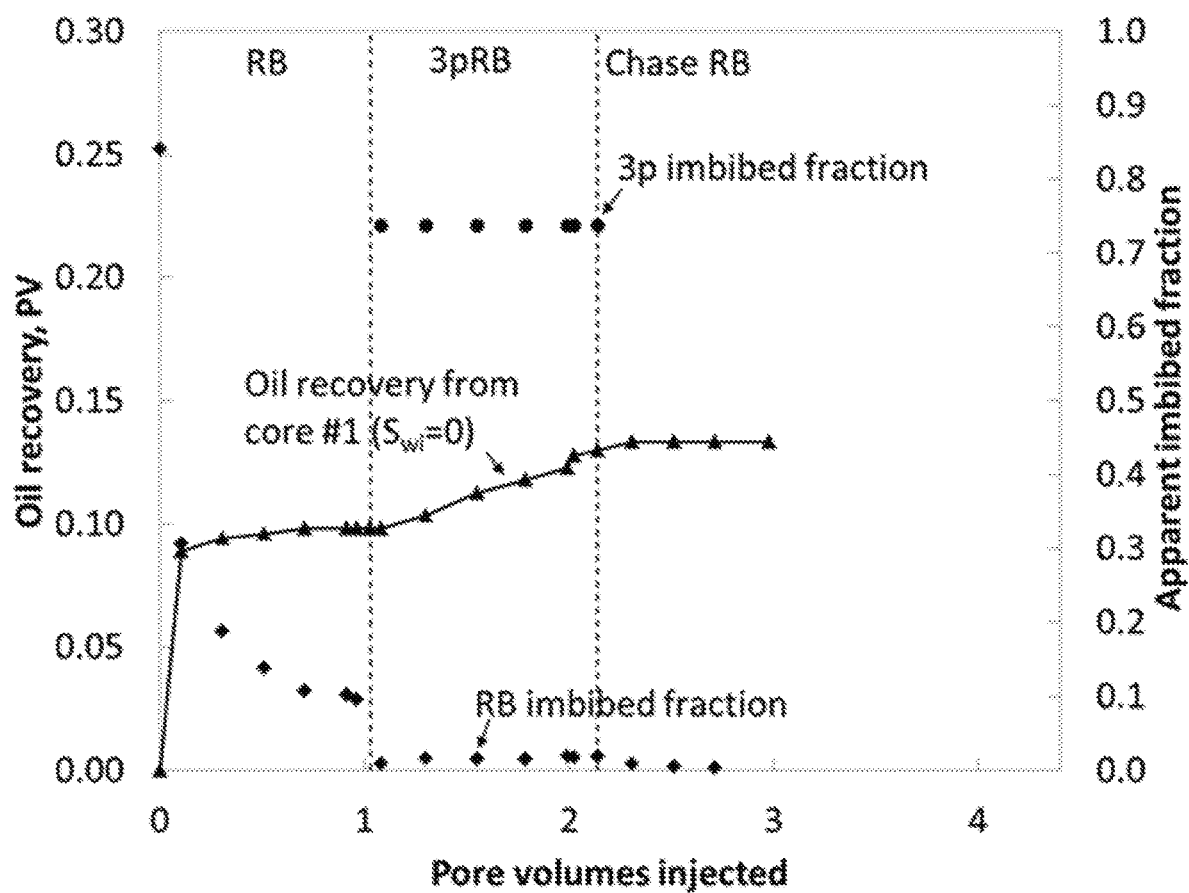
FIG. 30 provides data showing oil recovery in pore volume units and apparent imbibed fraction during coreflooding tests.
Figure 31:
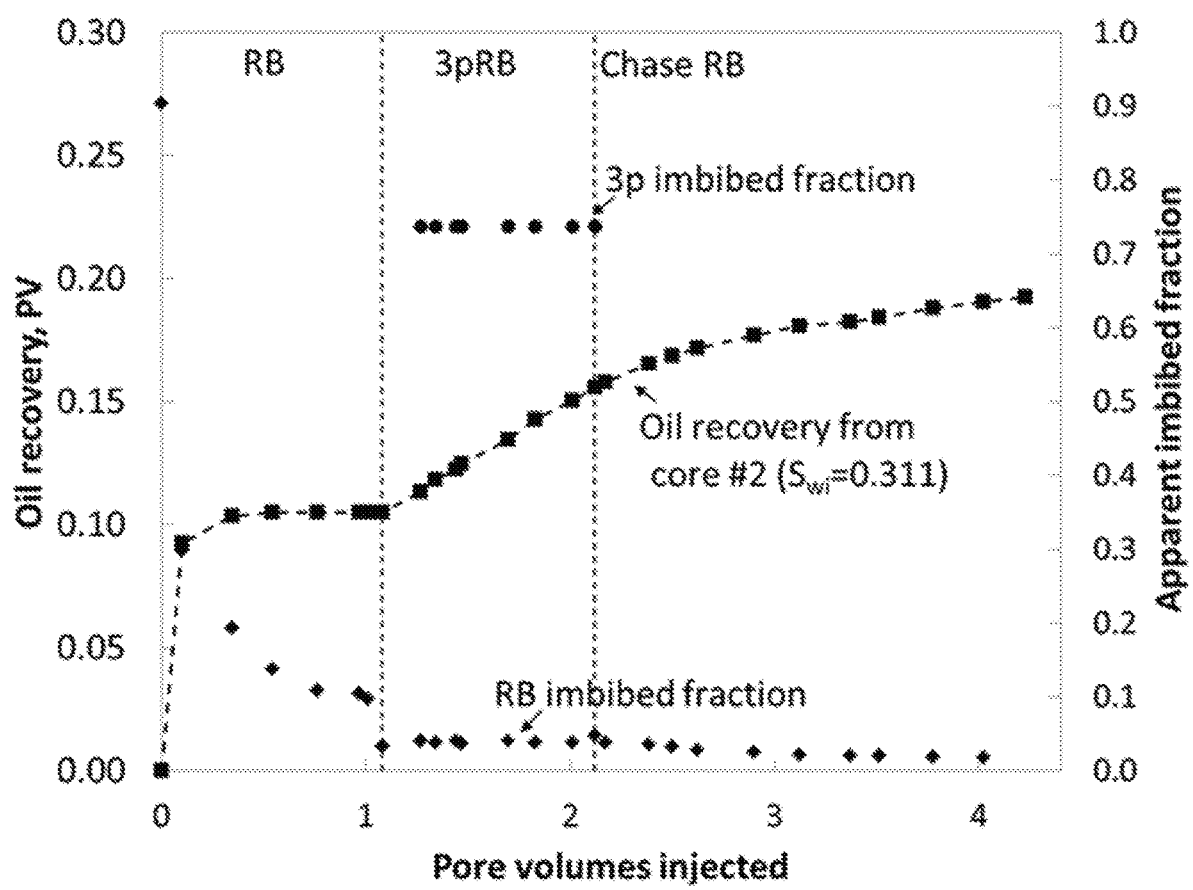
FIG. 31 provides data showing oil recovery in pore volume units and apparent imbibed fraction during coreflooding tests.

FIGS. 30-31 show the oil recovery (in PV), $F_1$, and $F_3$ for cores #1 and #2, respectively. The calculation of $F_i$ was done separately for the three stages; e.g., the time interval for $F_i$ for the 3 pRB stage starts upon the commencement of the 3 pRB injection. After the 3 pRB injection, $F_3$ was 0.738 for both cores #1 and #2. It remained high during the 3 pRB injection for both cores; that is, the effect of $S_{wi}$ on $F_3$ was not observed. However, $F_1$ was 0.018 for core #1, and 0.038 for core #2; that is, $F_1$ was larger with the larger $S_{wi}$.

For the chase RB stage, $F_1$ was 0.004 for core #1, and 0.018 for core #2. Note that the RB imbibition continued to occur when the chase RB injection was terminated for core #2. The presence of $S_{wi}$ was conducive to enhancement of $F_1$ by the imbibed 3p both for the 3 pRB and RB injection stages.

Figure 32:
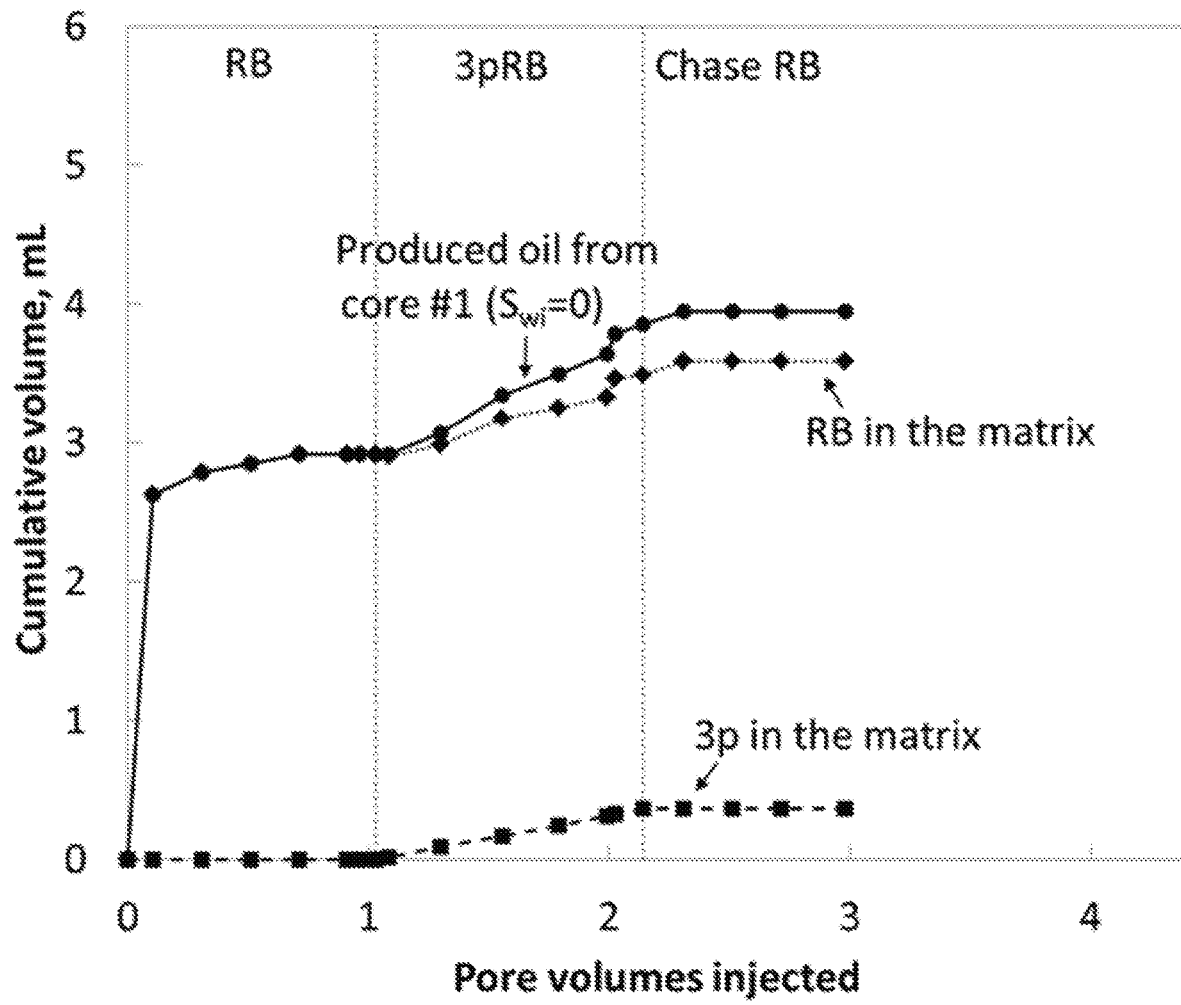
FIG. 32 provides data showing cumulative volume of produced oil for coreflooding tests.
Figure 33:
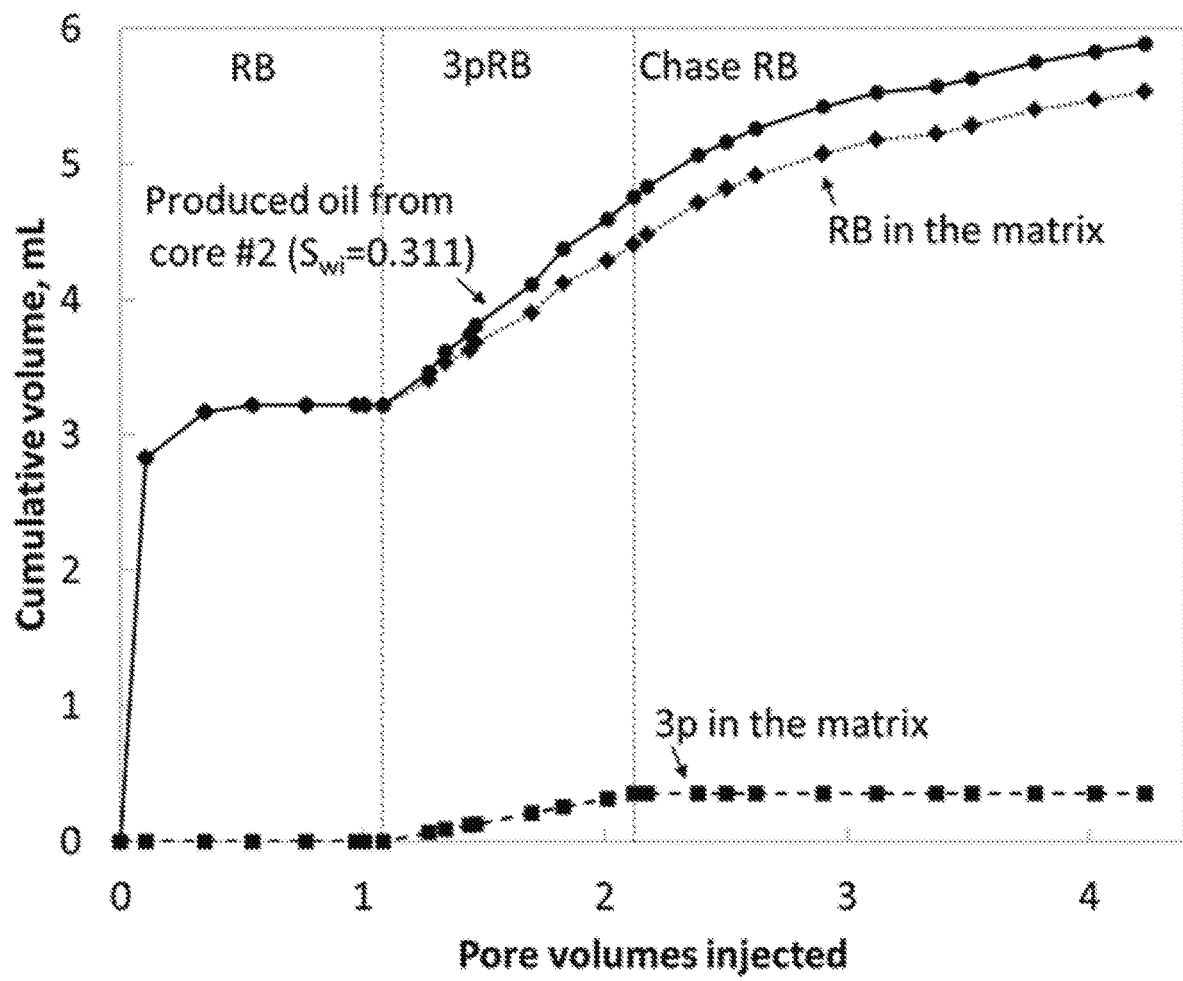
FIG. 33 provides data showing cumulative volume of produced oil for coreflooding tests.

FIGS. 32-33 show $-V_{P2}$ and $V_{fi}+V_{Pi}$ for i=1 and 3. These parameters were calculated on the cumulative basis, for which the time interval started at 0 PVI across all three stages. During the 3 pRB injection, $D_1$ was 61% for core #1, but it was as large as 77% for core #2. This reconfirms that 3-pentanone is more effective for enhancing the imbibition of brine by wettability alteration when an aqueous phase is initially present in the matrix. When the 3 pRB and chase RB injection are both considered, $D_1$ was 65% for core #1 and 87% for core #2, and it was increasing further when the experiment was terminated for core #2.

Figure 34A:
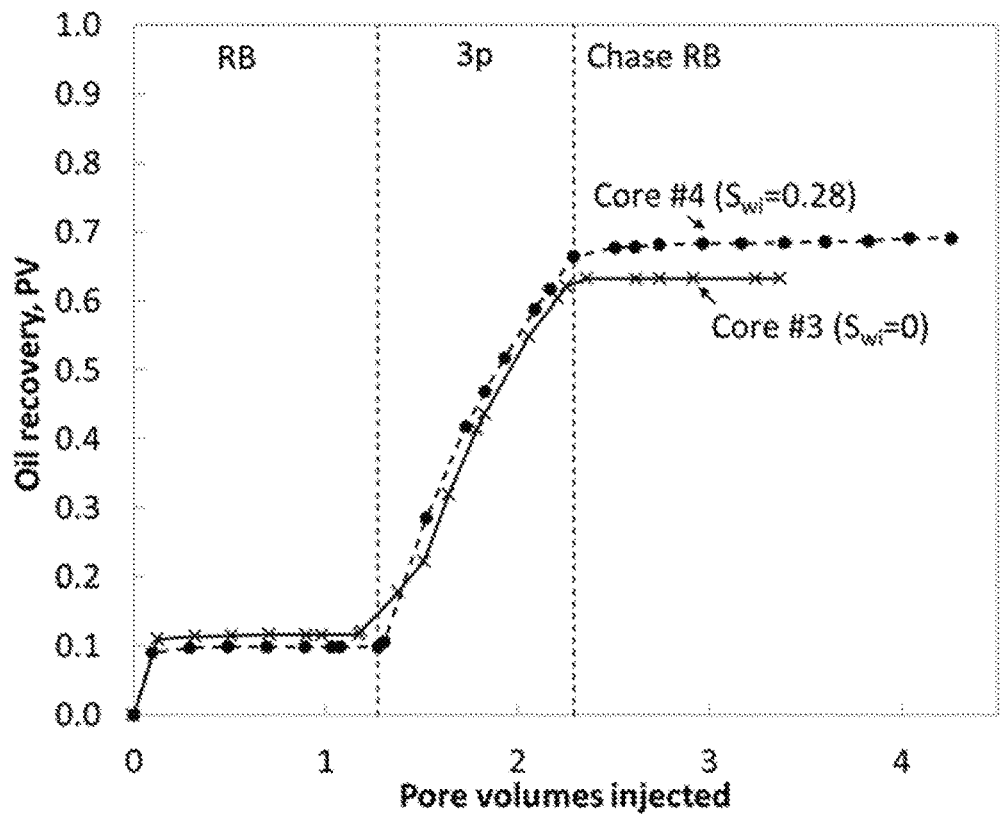
FIG. 34A provides plots showing oil recovery in pore volume units during coreflooding tests.
Figure 34B:
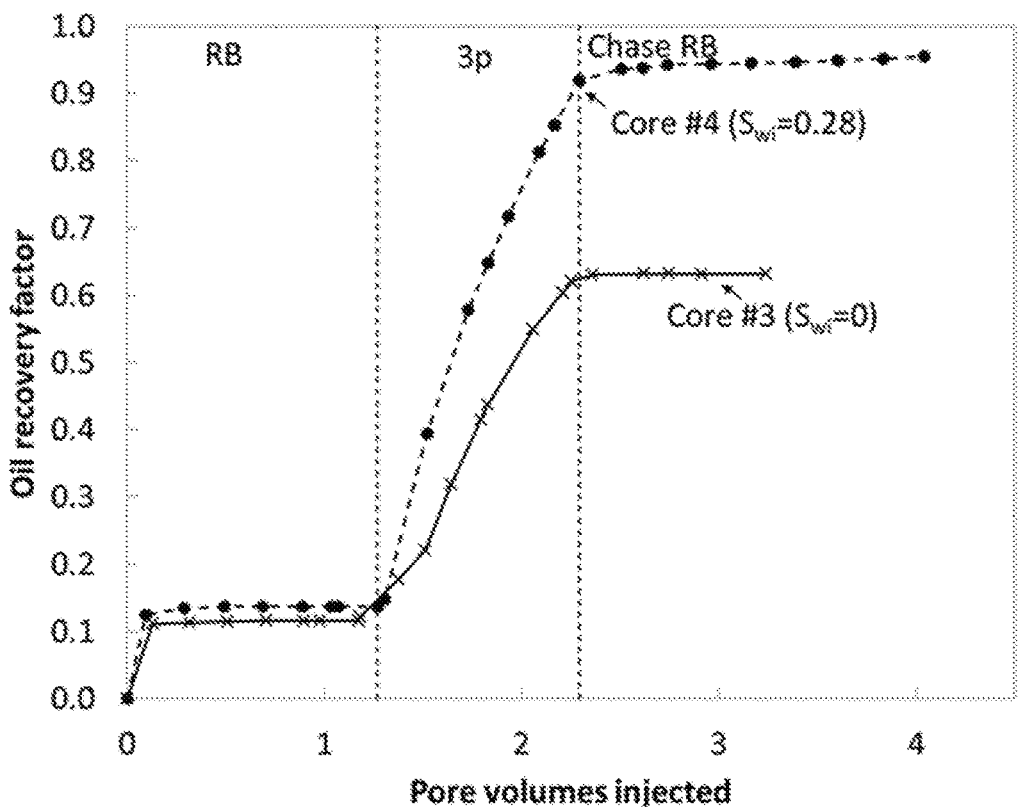
FIG. 34B provides plots showing oil recovery factors during coreflooding tests.

Coreflooding Experiments with Pure 3p for Cores #3 and #4. FIG. 34A and FIG. 34B presents the oil recovery results for cores #3 ($S_{wi}$=0) and #4 ($S_{wi}$=0.28), for which pure 3p was tested as a chemical slug. The oil recovery in FIG. 34A is given in the unit of original oil in place (OOIP), and that in FIG. 34B is in PV. As was done for the other cores, the initial RB injection was continued until no more oil production was observed. Then, a slug of pure 3p was injected to improve the oil recovery. Note that pure 3p is miscible with oil, and the solubility of water in 3p is approximately 3 wt % at 343 K, as described in more detail in reference to Example 2. After that, the chase RB injection was continued until no more oil production was observed. The chase RB injection was concluded after 1.11 and 1.97 PVI for cores #3 and #4, respectively.

The initial RB injection recovered 12% OOIP after 0.71 PVI for core #3, and 14% OOIP after 0.49 PVI for core #4. Note that core #3 was clearly more permeable than core #4 as given in Table 15 (31.6 mD in comparison to 17.8 mD), but their porosities were quite similar to each other. The oil recovery in PV (FIG. 34B) shows that the initial RB injection recovered a larger amount of oil from core #3.

FIG. 34 shows that the incremental oil recovery by the 3p slug was 50.5% OOIP (50.5% PV) for core #3 and 78.1% OOIP (56.5% PV) for core #4. The chase RB injection reached a plateau with an incremental oil recovery of 1.1% OOIP after 0.36 PVI for core #3. It recovered an incremental oil of 3.7% OOIP after 1.97 PVI for core #4. No plateau was observed before the experimental was terminated for core #4 as shown in FIG. 34. The total oil recovery were 63.2% OOIP (63.2% PV) for core #3 and 95.6% OOIP (69.1% PV) for cores #4.

Figure 35:
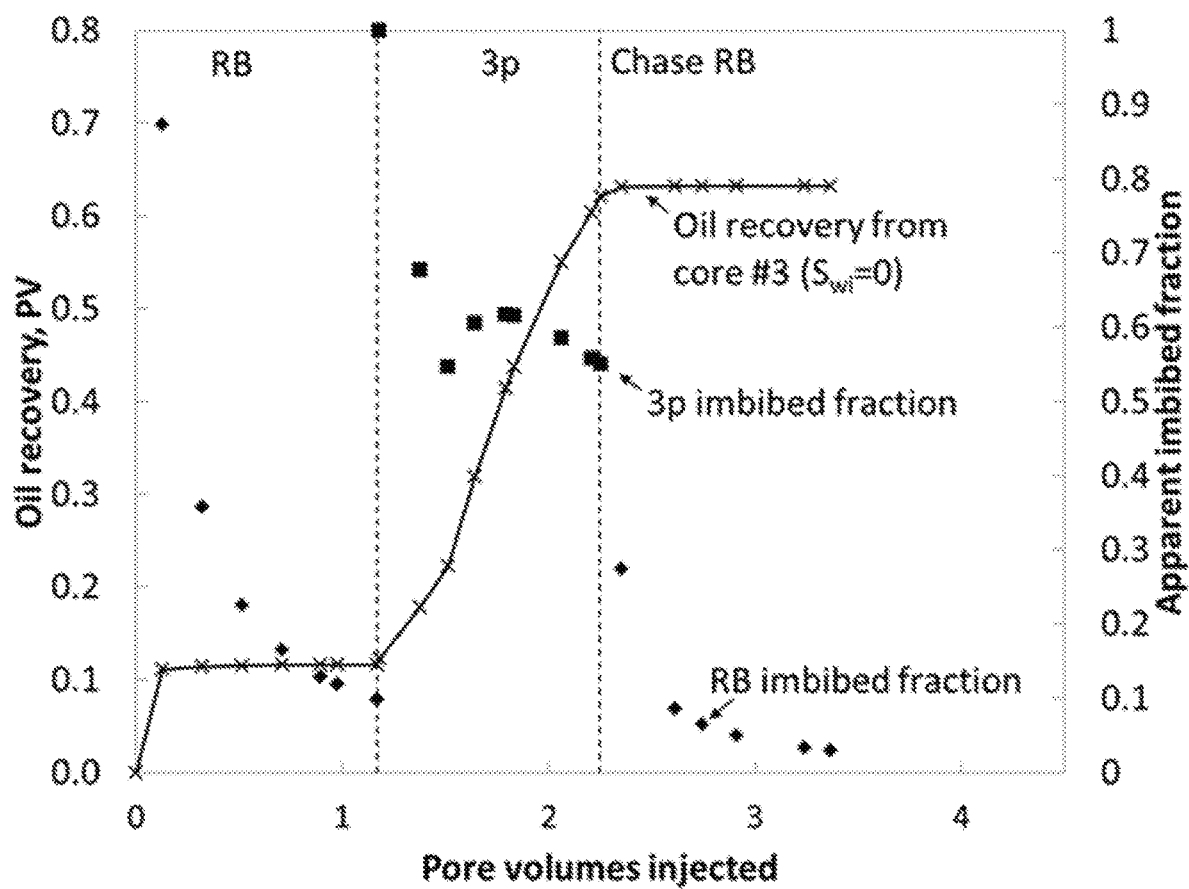
FIG. 35 provides data showing oil recovery in pore volume units and apparent imbibed fraction during coreflooding tests.
Figure 36:
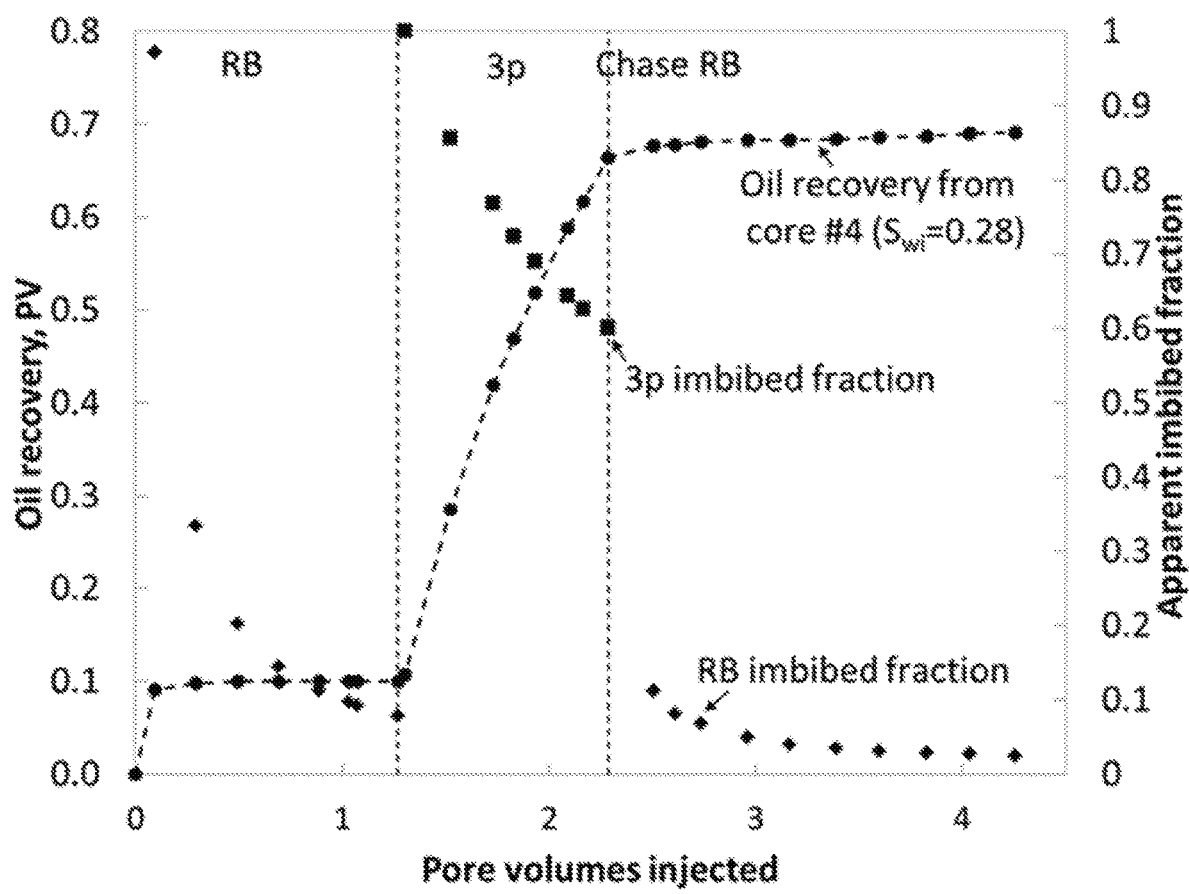
FIG. 36 provides data showing oil recovery in pore volume units and apparent imbibed fraction during coreflooding tests.

FIGS. 35-36 present the oil recovery (PV), $F_1$, and $F_3$ for cores #3 ($S_{wi}$=0) and #4 ($S_{wi}$=0.28), respectively. For core #3, $F_3$ was 0.550 after 1.0 PVI. As in the previous subsection, the calculation of Fi was done separately for the three stages: the initial RB, the 3p slug, and the chase RB injection. That is, the time interval, Δt, for the calculation was defined for each stage independently.

For core #4, $F_3$ was 0.601 after 1.0 PVI. That is, $F_3$ was measured to be larger with the presence of initial water in the matrix. 3-pentanone in the aqueous phase changed the wettability of the rock surface during the 3p displacement. $F_1$ during the chase RB injection reached a maximum value of 0.274 after 0.10 PVI, and then rapidly decreased to 0.030 after 1.11 PVI for core #3. For core #4, $F_1$ showed a maximum value of 0.112 after 0.22 PVI, and then decreased to 0.025 after 1.97 PVI.

Figure 37:
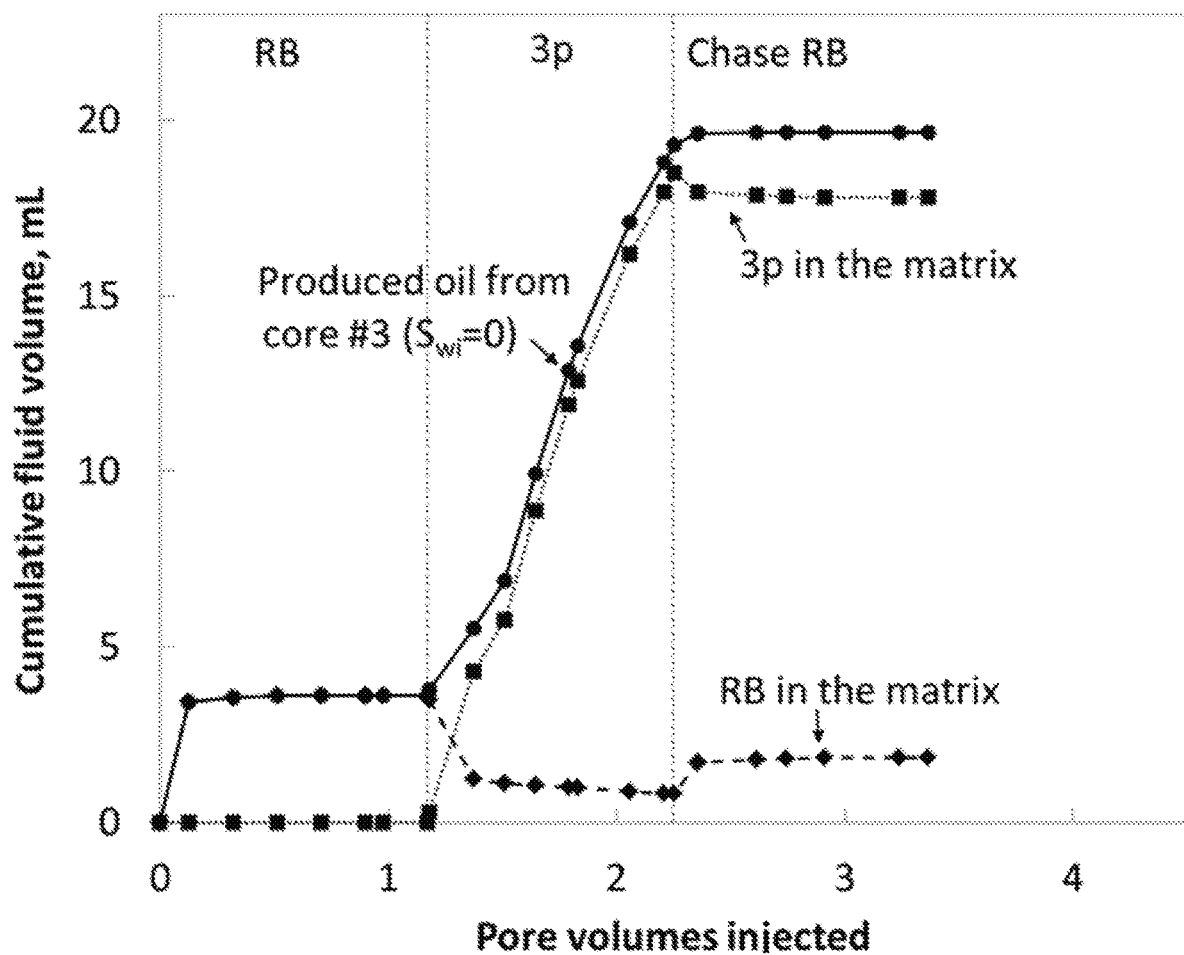
FIG. 37 provides plots showing cumulative volume of produced oil during coreflooding tests.
Figure 38:
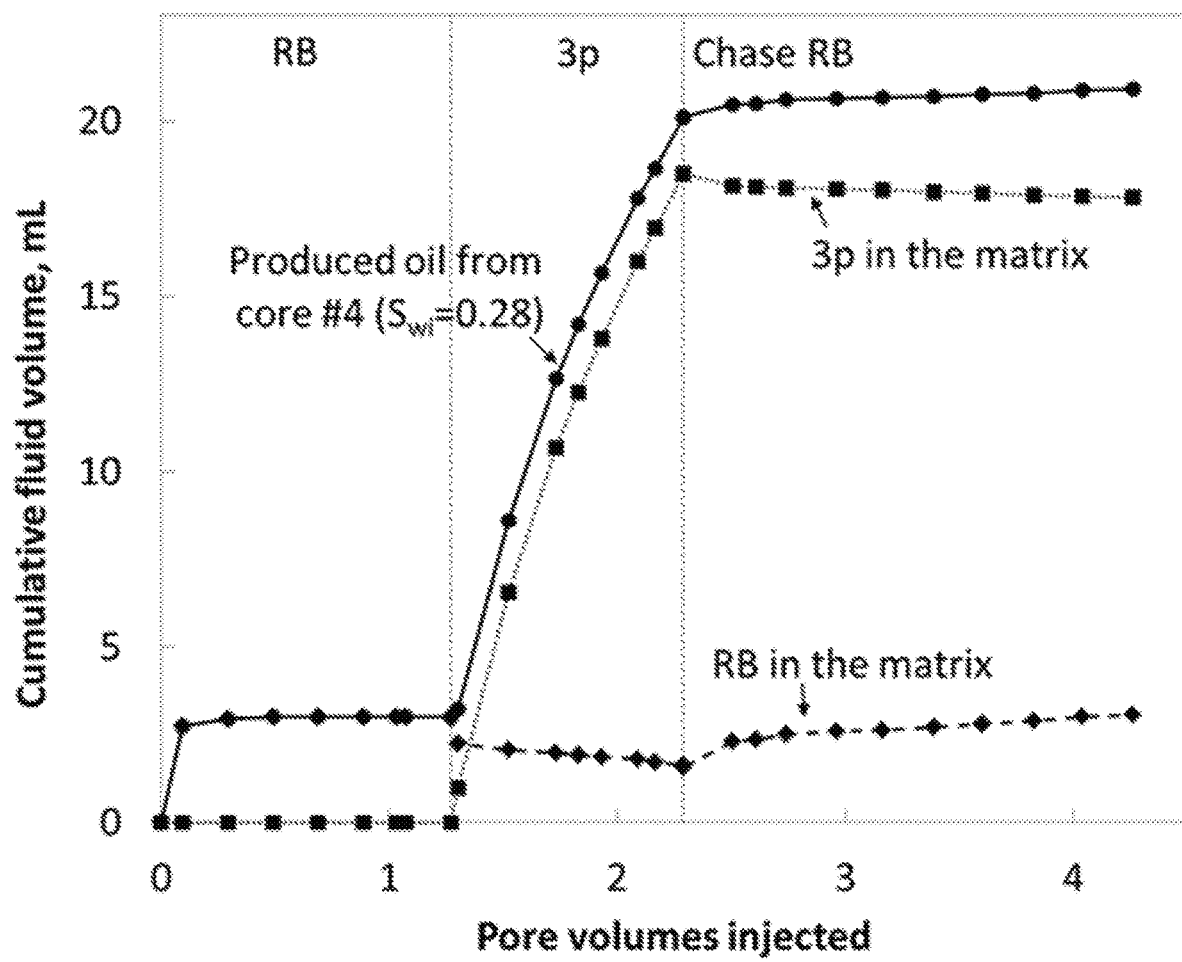
FIG. 38 provides plots showing cumulative volume of produced oil during coreflooding tests.

FIGS. 37-38 show the volume of produced oil, and the volumes of RB and 3p that imbibed into the matrix for cores #3 and #4, respectively. As in the previous subsection, the time interval for this calculation starts at the beginning of the initial RB injection. They clearly show that the oil recovery from the matrix relied more on oil displacement by 3-pentanone (i=3) than by brine (i=1) during the 3p slug injection.

Conclusions. This Example presents a new set of coreflooding data with fractured carbonate cores for investigation of the improved oil recovery by injection of 3 pRB and pure 3p as a slug. The experimental results were analyzed in detail in terms of material balance (mass and volume) with simplifying assumptions. This analysis enabled the estimation of how much of the injected components were imbibed into the matrix from the fracture ($F_1$ and $F_3$) and the relative contribution of the injected components to displacing oil in the matrix ($D_1$ and $D_3$). The main focus of the corefloods was on the effect of the presence of an initial aqueous phase on oil recovery by using 3 pRB or pure 3p. Conclusions are as follows:

Coreflooding experiments with 3 pRB. The injection of 3 pRB led to an incremental oil recovery after the RB injection reached a plateau in oil recovery for both cores (cores #1 and #2). The improved oil recovery was caused by the efficient imbibition of 3-pentanone into the matrix, resulting in enhanced water imbibition by the wettability alteration.

The oil recovery for core #2 ($S_{wi}$=0.311) was consistently greater than that of core #1 ($S_{wi}$=0) in both units of OOIP and PV. The total oil recovery factor was 27.7% OOIP (19.2% PV) for core #2, and 13.3% OOIP (13.3% PV) for core #1.

$F_3$ was estimated to be 0.74 for both cores #1 and #2 during the 3 pRB injection. $F_3$ was not significantly affected by the presence of the initial aqueous phase in the matrix for the 3 pRB cases (cores #1 and #2).

$F_1$ was estimated to be 0.018 for core #1 and 0.038 for core #2 during the 3 pRB injection. It was clearly greater when an aqueous phase is initially present in the matrix. $F_1$ in the chase RB injection stage was also greater for core #2 (0.018) than for core #1 (0.004).

$D_1$ was estimated to be 61% for core #1 and 77% for core #2 during the 3 pRB injection stage. It was 65% for core #1 and 87% for core #2 when the 3 pRB and chase RB injection stages are considered. This clearly shows that 3-pentanone was more effective in enhancing the water imbibition when an aqueous phase was initially present in the matrix.

Coreflooding experiments with pure 3-pentanone. The total oil recovery was 63.2% OOIP (63.2% PV) for core #3 ($S_{wi}$=0) and 95.6% OOIP (69.1% PV) for core #4 ($S_{wi}$=0.28). Although core #4 contained a smaller amount of oil in the matrix, it produced more oil from core #4 than from core #3 with the pure 3p injection followed by the chase RB injection.

$F_3$ was estimated to be 0.55 for core #3 and 0.60 for core #4 during the 3p injection. The transfer of 3-pentanone from the fracture to the matrix was more efficient with the presence of an initial aqueous phase in the matrix.

The incremental oil recovery during the 3p injection was 50.5% OOIP (50.5% PV) for core #3, and 78.1% OOIP (56.5% PV) for core #4. As in the 3 pRB cases, results from cores #3 and #4 showed that the injection of 3-pentanone was more effective for oil recovery from the matrix when an aqueous phase was initially present in the matrix.

Nomenclature
Roman Symbols
A cross-sectional area
b fracture aperture
d core diameter
$F_{Ii}$ apparent imbibed fraction of component i
i fluid component
k permeability
q flow rate of the chemical slug in the fracture
$M_{ti}$ the amount of component i from $V_m$ to $V_f$ through the matrix/fracture interface for $\Delta t$
$M_{Ii}$ the amount of component i going into $V_f$ through the injector for $\Delta t$
$M_{Pi}$ the amount of component i going into $V_f$ through the producer for $\Delta t$
S saturation
t time
V volume
Greek Symbols
$\tau$ residence time of the chemical slug in the fracture Subscripts
  e effective
  f fracture
  wi initial water
  m matrix
Abbreviations
  IFT interfacial tension
  OOIP original oil in place
  PV pore volume
  PVI pore volume(s) injected
  RB reservoir brine
  $^1$H NMR proton nuclear magnetic resonance
  3p 3-pentanone
  3 pRB solution of 3-pentanone in reservoir brine Figure Captions for Example 3. FIG. 25. Schematic of the experimental set up for saturation of cores with oil and RB (section 2.3).

FIG. 26. Artificially fractured Texas cream limestones cores. The diameter is 0.0254 m and the length is 0.229 m. Cores #1 ($S_{wi}$=0) and #2 ($S_{wi}$=0.311) were used for coreflooding experiments with 3 pRB, and cores #3 ($S_{wi}$=0) and #4 ($S_{wi}$=0.28) with 3p. Table 3 shows the properties of the fractured cores.

FIG. 27. Schematic of the experimental set up for coreflooding experiments (Section 2.3).

Figure 28:
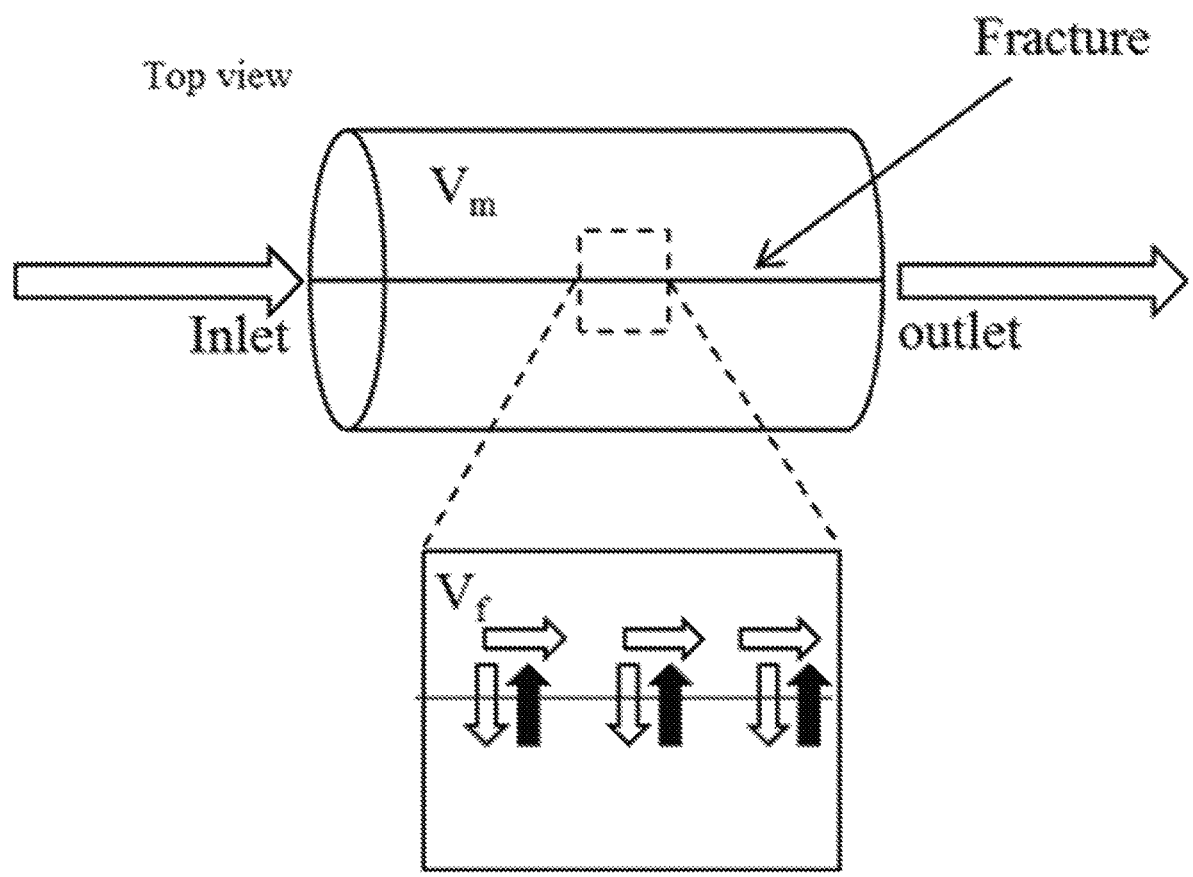
FIG. 28 provides a schematic of the dynamic imbibition from a fracture into a matrix for the material balance in the coreflooding experiments.

FIG. 28. Schematic of the dynamic imbibition from a fracture into a matrix for the material balance in the coreflooding experiments (Section 2.3). The figure shows the top view to appreciate the vertically-oriented fracture along the core, which is in horizontal position. $V_m$ is the matrix volume; $V_f$ is the fracture volume.

FIG. 29A and FIG. 29B. (a) Oil recovery factors (in the unit of OOIP) during coreflooding experiments at 347 K using 3 pRB as the chemical slug. (b) Oil recovery in PV during coreflooding experiments at 347 K using 3 pRB as the chemical slug. First, RB was injected into Cores #1 ($S_{wi}$=0) and #2 ($S_{wi}$=0.311) until no more oil production was observed. Then, 3 pRB was injected for 1 PVI. Finally, chase RB was injected. The injection of chase RB was terminated for core #1 after 0.84 PVI, for core #2 after 2.11 PVI. RB, 3 pRB, and $S_{wi}$ stand for reservoir brine, solution of 1.1-wt % 3p in reservoir brine, and initial water saturation, respectively.

FIG. 30. Oil recovery in pore volume units (left vertical axis) and apparent imbibed fractions of RB and 3-pentanone (right vertical axis) during the coreflooding experiment at 347 K using 3 pRB as the chemical slug, for core #1 ($S_{wi}$=0). RB, 3 pRB, 3p, and $S_{wi}$ stand for reservoir brine, solution of 3p in reservoir brine, 3-pentanone, and initial water saturation, respectively.

FIG. 31. Oil recovery in PV (left vertical axis) and the apparent imbibed fractions of RB and 3-pentanone (right vertical axis) during the coreflooding experiment at 347 K using 3 pRB as the chemical slug for core #1 ($S_{wi}$=0.311). RB, 3 pRB, 3p, and $S_{wi}$ stand for reservoir brine, solution of 1.1-wt % 3p in reservoir brine, 3-pentanone, and initial water saturation, respectively.

FIG. 32. Cumulative volume of produced oil, and the volumes of RB and 3p that imbibed into the matrix for core #1 ($S_{wi}$=0) for the coreflooding experiment at 347 K using 3 pRB as the chemical slug. RB, 3 pRB, 3p, and $S_{wi}$ stand for reservoir brine, solution of 1.1-wt % 3p in reservoir brine, 3-pentanone, and initial water saturation, respectively.

FIG. 33. Cumulative volume of produced oil, and the volumes of RB and 3p that imbibe into the matrix in core #2 ($S_{wi}$=0.311) for the coreflooding experiment at 347 K using 3 pRB as the chemical slug. RB, 3 pRB, 3p, and $S_{wi}$ stand for reservoir brine, solution of 1.1-wt % 3p in reservoir brine, 3-pentanone, and initial water saturation, respectively.

FIG. 34A. Oil recovery in PV during coreflooding experiments at 347 K using 3p as the chemical slug. FIG. 34B. Oil recovery factors (in the unit of OOIP) during coreflooding experiments at 347 K using 3p as the chemical slug. First, RB was injected into cores #3 ($S_{wi}$=0) and #4 ($S_{wi}$=0.28) until no more oil production was observed. Then, 3p was injected for 1 PVI.

Finally, chase RB was injected. The injection of chase RB was terminated for core #3 after 1.11 PVI, for core #4 after 1.97 PVI. RB, 3p, and $S_{wi}$ stand for reservoir brine, 3-pentanone, and initial water saturation, respectively.

FIG. 35. Oil recovery in pore volume units (left vertical axis) and apparent imbibed fractions of RB and 3p (right vertical axis) during the coreflooding experiment at 347 K using 3p as the chemical slug, for core #3 ($S_{wi}$=0). RB, 3p, and $S_{wi}$ stand for reservoir brine, 3-pentanone, and initial water saturation, respectively.

FIG. 36. Oil recovery in pore volume units (left vertical axis) and apparent imbibed fractions of RB and 3p (right vertical axis) during the coreflooding experiment at 347 K using 3p as the chemical slug, for core #4 ($S_{wi}$=0.28). RB, 3p, and $S_{wi}$ stand for reservoir brine, 3-pentanone, and initial water saturation, respectively.

FIG. 37. Cumulative volume of produced oil, and the volumes of RB and 3p that imbibed into the matrix in core #3 ($S_{wi}$=0) for the coreflooding experiment at 347 K using 3p as the chemical slug. RB, 3p, and $S_{wi}$ stand for reservoir brine, 3-pentanone, and initial water saturation, respectively.

FIG. 38. Cumulative volume of produced oil, and the volumes of RB and 3p that imbibe into the matrix in the core #4 ($S_{wi}$=0.28) for the coreflooding experiment at 347 K using 3p as the chemical slug. RB, 3p, and $S_{wi}$ stand for reservoir brine, 3-pentanone, and initial water saturation, respectively.

Example 4: Aqueous Solution of Ketone Solvent for Enhanced Oil Recovery in Tight Reservoirs This example investigates four dynamic imbibition experiments using fractured limestone cores with aqueous solutions of 3-pentanone and a non-ionic surfactant. Results of the dynamic imbibition experiments were analyzed by the material balance for components: oil, brine, and chemical (3-pentanone or surfactant). The analysis resulted in a quantitative evaluation of the imbibed fraction of the injected components (brine and chemical additives) and the relative contribution of these components to the oil displacement in the matrix.

Results show that 3-pentanone and surfactant both can enhance the imbibition of brine through wettability alteration; however, 3-pentanone is more efficient in transferring from a fracture to the surrounding matrix. The imbibed fraction was more than 57.0% for 3-pentanone, and only 6.0% for surfactant at the end of the chemical slug stage. During the 3-pentanone solution injection, brine and 3-pentanone both displaced oil from the matrix pore volume.

Results of the material balance analysis suggest that an optimal process with an aqueous wettability modifier will have a large imbibed fraction to rapidly enhance the oil displacement by brine in the matrix. Such a process will benefit from chase brine and soaking (or shut-in) so that the oil recovery can be maximized for a small amount of chemical injection.

There is a critical need for improved oil recovery methods in tight oil reservoirs. Tight oil reservoirs often show a rapid decline in production rate. In the Eagle Ford tight formations, a decline of 60%-70% in oil production rate within a first year has been reported. Therefore, primary recovery factors in tight oil reservoirs are typically lower than 10%.

The oil recovery from tight oil reservoirs is likely affected by their heterogeneous petrophysical properties. Shale formations contain diverse minerals and high total organic content (TOC). Contact angle values measured on the surface of shale cores indicated that tight oil reservoirs are typically intermediate- to oil-wet. Therefore, various aqueous injectants were studied to improve oil recovery through wettability alteration, such as surfactant-solution injection and ketone-solution injection as described in more detail in reference to Examples 1-2, above.

Surfactants were studied as aqueous injectants for improved oil recovery in shales or additives to fracturing fluids. The main mechanisms include wettability alteration and interfacial tension (IFT) reduction between the aqueous and oleic phases. For example, anionic and non-ionic surfactants changed the wettability of carbonate shale and siliceous shale from oil-wet to water-wet. Anionic surfactants altered the wettability of siliceous shale. IFT should not reach an ultra-low value (e.g., $10^3$ mN/m) for improved oil recovery in shales.

3-pentanone was investigated as an additive to reservoir brine (RB) for improved oil recovery from mixed- or oil-wet cores, as described in more detail in reference to Example 1. 3-Pentanone, a symmetric short ketone, is colorless liquid at standard conditions, non-toxic, widely used in the food industry, and commercially available at relatively low cost. Two sets of imbibition experiments were compared using oil-aged limestone cores with RB and 1.1-wt % 3-pentanone solution in RB at 347 K. During spontaneous imbibition experiments, the oil recovery factor reached 50.0% with the 3-pentanone solution in RB, and 10.0% with RB at Day 3. The final oil recovery factor was 51.0% with the 3-pentanone solution in RB, and 12.0% with RB. The subsequent forced imbibition showed that the Amott index to water was 0.76 with the 3-pentanone solution, and 0.23 with RB. These results indicated the positive impact of 3-pentanone on oil recovery by enhanced water imbibition in the cores tested. The improved oil recovery mechanisms include not only wettability alteration, but also the miscibility of 3-pentanone with oil that yielded the oil displacement by 3-pentanone and oil viscosity reduction.

As described in more detail in reference to Example 2, 3-pentanone was compared with a non-ionic surfactant for enhancing water imbibition from a fracture into the surrounding matrix. The surfactant used was 2-ethylhexanol-4 propylene oxide-15 ethylene oxide (2-EH-4PO-15EO). They were tested as additives (approximately 1 wt %) to reservoir brine. The dynamic imbibition experiments using fractured limestone cores showed that the 3-pentanone solution resulted in more rapid oil recovery than the surfactant solution. This was attributed to the main difference between them as wettability modifiers; that is, the 3-pentanone solution keeps the original water/oil interfacial tension, but the surfactant solution lowers it by two orders of magnitude.

3-pentanone was shown to be a promising aqueous injectant for improved oil recovery. There are still many questions to be addressed. For example, how much of the injected chemical (e.g. surfactant and 3-pentanone of Example 2) is imbibed from a fracture into the surrounding matrix? Also, the relative contribution of brine and 3-pentanone to displacing oil from the matrix pore volume is still not clear. Such fundamental information is necessary for finding operational strategies (e.g. chase brine injection, the shut-in period during huff-n-puff operation) for improved oil recovery.

Besides the conventional spontaneous imbibition using an Amott cell, computed-tomography (CT) was used to monitor spontaneous imbibition experiments. The CT scanner measures the density of the material placed inside the scanner. The color-coded relative density images of the core can be used to dynamically visualize the spontaneous imbibition. The density data from the CT scan was also reported as CT number. Porosity, water/oil saturation and, imbibition front position can be calculated from CT number. CT-scan provides valuable information about underlying physics during spontaneous imbibition. In this Example, material balance is used to show a detailed analysis of components' flow during dynamic imbibition using a fractured core.

saturated with RB first and then oil, during which the core properties were measured, such as porosity, permeability, and water and oil saturations. The cores were then placed in a container filled with oil for at least four months at 347 K. For the two cores for vertical dynamic imbibition, we performed oil-flooding after this long aging period and observed undetectable water production. Therefore, the two cores for horizontal dynamic imbibition were not flooded by oil after the oil aging.

An artificial fracture was created along the longitudinal axis using an electric saw for each core. Teflon spacers with 0.001 m in width and 0.127 m in length were placed to maintain a fracture aperture. Then, the core halves were carefully put together with the Teflon spacers placed in the fracture, wrapped with a Teflon tube and placed inside a horizontally-oriented core holder, with the fracture vertically-oriented. Table 17 summarizes the properties of the fractured cores.

TABLE 17

Properties of the cores used for coreflooding experiments. Core #1 was used for vertical dynamic imbibition with 1.1 wt % 3-pentanone solution in RB (3pRB). Core #2 was used for vertical dynamic imbibition with 1.0 wt % 2-EH-4PO-15EO solution in RB. Core #3 was used for horizontal dynamic imbibition with 3pRB. Core #4 was used for horizontal dynamic imbibition with 3pRB.

|  | Core #1 | Core #2 | Core #3 | Core #4 |
|---|---|---|---|---|
| Matrix porosity | 0.197 | 0.203 | 0.175 | 0.215 |
| Matrix permeability, mD | 30.8 | 41.4 | 13.0 | 34.9 |
| Matrix water saturation | 0.506 | 0.596 | 0.540 | 0.620 |
| Matrix oil saturation | 0.494 | 0.404 | 0.460 | 0.380 |
| Flow capacity of the matrix, $m^4$ | $1.540 \times 10^{-17}$ | $2.069 \times 10^{-17}$ | $0.650 \times 10^{-17}$ | $1.745 \times 10^{-17}$ |
| Mass of the core before cutting, kg | 0.14847 | 0.14777 | 0.15063 | 0.14839 |
| Mass of the core after cutting, kg | 0.13691 | 0.13622 | 0.13952 | 0.13726 |
| Matrix pore volume after cutting, $m^3$ | $1.166 \times 10^{-5}$ | $1.202 \times 10^{-5}$ | $1.043 \times 10^{-5}$ | $1.279 \times 10^{-5}$ |
| Pressure drop along with the core, kPa | 6.688 (at 900 $cm^3$/hr) | 6.964 (at 900 $cm^3$/hr) | 7.308 (at 500 $cm^3$/hr) | 5.861 (at 500 $cm^3$/hr) |
| Overburden pressure, kPa | 4137 | 6274 | 689 | 1724 |
| Fracture aperture, m | $1.215 \times 10^{-4}$ | $1.199 \times 10^{-4}$ | $0.970 \times 10^{-4}$ | $1.044 \times 10^{-4}$ |
| Fracture permeability, D | 1246 | 1214 | 795 | 913 |
| Permeability contrast between fracture and matrix | 40455 | 29324 | 61154 | 26160 |
| Flow capacity of fracture, $m^4$ | $3.795 \times 10^{-15}$ | $3.649 \times 10^{-15}$ | $1.933 \times 10^{-15}$ | $2.390 \times 10^{-15}$ |
| Fracture pore volume, $m^3$ | $3.920 \times 10^{-7}$ | $3.870 \times 10^{-7}$ | $3.129 \times 10^{-7}$ | $3.368 \times 10^{-7}$ |
| Total pore volume, $m^3$ | $1.205 \times 10^{-5}$ | $1.241 \times 10^{-5}$ | $1.074 \times 10^{-5}$ | $1.313 \times 10^{-5}$ |

Methods of Experiments and Material Balance Analysis. The main experimental data were obtained through three sets of dynamic imbibition experiments with 1.1-wt % 3-pentanone solution in reservoir brine (3 pRB) and one set with 1.0-wt % surfactant solution in reservoir brine (RB) at 347 K. Properties of reservoir fluid, 3-pentanone, and surfactant (2-EH-4PO-15EO) are described in more detail in reference to Examples 1-2, above, and are not fully duplicated here.

Experimental Procedure for Dynamic Imbibition. A total of four dynamic imbibition experiments were performed at 347 K with fractured limestone cores. Two of them were performed in a vertically upward direction, and the others horizontally. This section describes the procedure for the horizontal dynamic imbibition, which largely follows the procedure presented in Example 2 for the vertical experiments. Properties of the Indiana limestone cores and injection scheme for four dynamic imbibitions are also summarized in this section.

Figure 39:
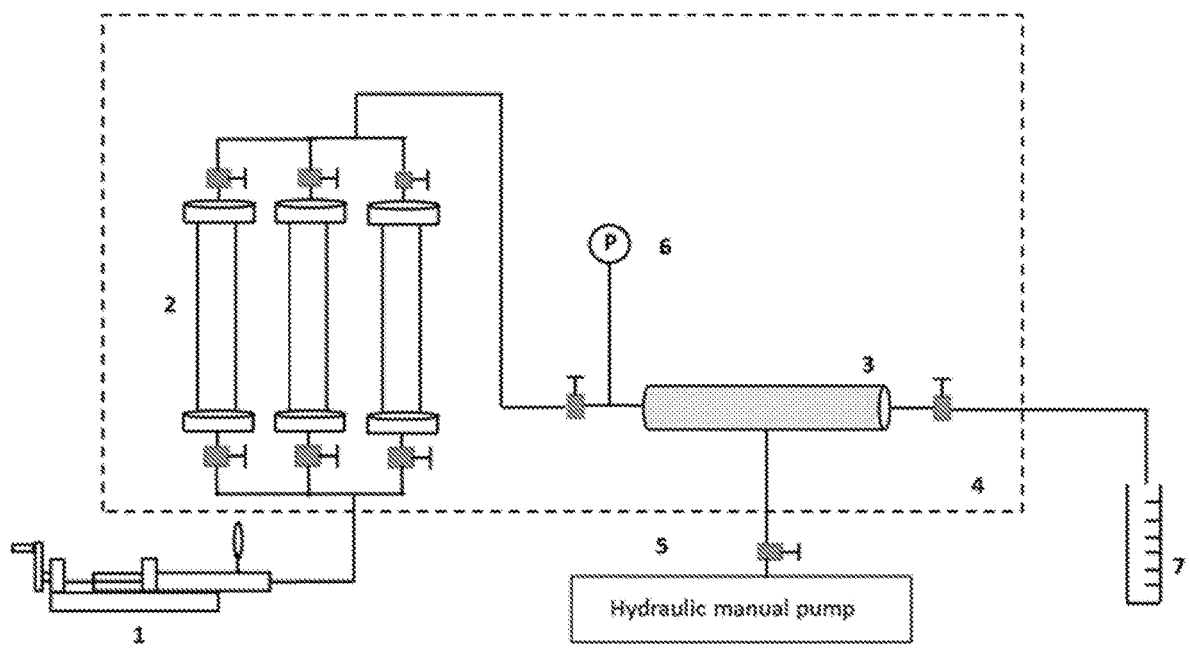
FIG. 39 provides a schematic illustration of an experimental device for horizontal dynamic imbibition.

The Indiana limestone cores had the common dimensions: a diameter of 0.0254 m and a length of 0.127 m. They were FIG. 39 provides a schematic of the experimental set-up for horizontal dynamic imbibition. It consisted of accumulators for crude oil, reservoir brine (RB), and chemical solution (3-pentanone), a pump, a Hassler-type core-holder, a hydraulic manual pump to maintain the overburden pressure, a differential pressure gauge, cylinders, and an oven. After a fractured core was placed in the core holder, the oven temperature was increased to reservoir temperature (347 K). Then, the core was flooded with crude oil to remove any gas inside the fracture and measure the fracture permeability at 500 $cm^3$/hr under an overburden pressure. Table 17 provides the pressure drops along with the corresponding flow rates and the overburden pressures used.

Fracture permeabilities were calculated. The equation for flow between parallel plates:

$$b = (3\pi dk_e)^{\frac{1}{3}} \tag{1}$$

was used to estimate a fracture aperture, where b is the fracture aperture, d is the core diameter, and $k_e$ is the effective oil permeability of the fractured core. The fracture apertures are provided in Table 17. A fracture permeability can be calculated from the fracture aperture by the following equation:

$$k_f = b^2/12. \quad (2)$$

Table 17 shows the fracture permeabilities and permeability contrasts between the fracture and the matrix. The flow capacities of the fracture ($k_f A_f$) and the matrix ($k_m A_m$) are also provided in Table 17. $A_f$ and $A_m$ are cross-sectional areas of the fracture and matrix. $k_f$ and $k_m$ are permeabilities of the fracture and matrix.

The injection schemes for the four dynamic imbibitions are summarized in Table 18. For all cores, the first stage was RB injection at 6 cm³/hr for 1.5 PVI, then at 0.05 cm³/hr for 0.3-0.4 PVI, and at 6 cm³/hr until there was no oil production. Then, the second stage was 3 pRB injection, for which all cores had a similar residence time of chemical in the fracture (39 mins). The duration of the second stage ($t_2$) was designed so that all cores with 3 pRB injection had a similar time (corrected by the Leverett factor), $\sqrt{k/\phi}t_2$, which is 0.028 m s. Finally, the chase RB was injected at a fixed flow rate until there was no more oil production. For only Core #4, the system was shut-in for 20 hours after the 3 pRB injection. After that, 3 pRB was injected again at 0.51 cm³/hr for 12 days.

The material balance for (pseudo)component i (i=1 for brine, 2 for oil, and 3 for chemical) for the dynamic imbibition (FIG. 40A) is based on the following assumptions:

The system volume consists of two subvolumes, the fracture volume ($V_f$) and the matrix volume ($V_m$).
The fracture volume is connected to the injector (source) and the producer (sink).
The system is closed except for the injector and producer.
No chemical reaction.
For a given time interval $\Delta t$, $$\Delta M_{fi} = M_{ti} + M_{Ii} + M_{Pi} \quad (3)$$

$$\Delta M_{mi} = -M_{ti} \quad (4)$$

where $\Delta M_{fi}$ and $\Delta M_{mi}$ are the accumulation of component i in $V_f$ and $V_m$, respectively. $M_{Ii}$ is the amount of component i going into $V_f$ through the injector for $\Delta t$, $M_{Pi}$ is the amount of component i going into $V_f$ through the producer for $\Delta t$, and $M_{ti}$ is the amount of component i transferred from $V_m$ to $V_f$ through the matrix/fracture interface for $\Delta t$. Note again that i=1 for brine, 2 for oil, and 3 for chemical.

When this material balance is applied to the time interval $\Delta t$, during which flow in $V_f$ is a (pseudo) steady state, $\Delta M_{fi}$ are zero for all i. Then, $M_{ti}$ can be calculated from $M_{Ii}$ and $M_{Pi}$, which are measurable. How much of the injected

TABLE 18

The injection schemes during dynamic imbibition with fractured cores

| | Core #1 (Vertical) | Core #2 (Vertical) | Core #3 (Horizontal) | Core #4 (Horizontal) |
|---|---|---|---|---|
| First stage | RB was injected at 6 cm³/hr for 1.5 PVI, then at 0.05 cm³/hr for 0.3-0.4 PVI, and at 6 cm³/hr until there was no oil production. | | | |
| Second stage | 3pRB was injected at 0.6 cm³/hr for 20 hours (1.6 PVI) | Surfactant solution was injected at 0.6 cm³/hr for 25 hours (1.6 PVI) | 3pRB was injected at 0.48 cm³/hr for 29 hours (1.3 PVI) | 3pRB was injected at 0.51 cm³/hr for 20 hours (0.8 PVI) |
| Third stage | Chase RB was injected at 0.6 cm³/hr for 19 hours (1.2 PVI) | Chase RB was injected at 0.6 cm³/hr until no oil production | Chase RB was injected at 0.48 cm³/hr until no oil production | Shut-in for 20 hours |
| Fourth stage | N/A | N/A | N/A | 3pRB was injected at 0.51 cm³/hr for 12 days (11.3 PVI) |

The effluent was collected in plastic graduating cylinders at room temperature. The 3-pentanone concentrations in the produced oleic and aqueous phases were measured by the ¹H NMR method for the chemical slug and chase RB periods for Cores #1, #3 and #4. The 2-EH-4PO-15EO concentration in the produced aqueous phase was measured by the HPLC method for the chemical slug and chase RB stages of Core #2. The concentration data were used to correct oil-recovery results for 3-pentanone solubility, and to analyze the material balance for each dynamic imbibition.

Material Balance for a Fractured Core. The dynamic imbibition results were analyzed by the material balance for (pseudo)components: brine, oil, and chemical, focused on the following questions:

What is the fractional amount of the injected component (brine or chemical) that is imbibed into the matrix from the fracture?
What is the relative contribution of brine and chemical to the oil displacement in the matrix pore volume?

amount is actually imbibed into $V_m$ is quantified by the imbibed fraction for component i ($F_i$). $F_i$ is defined for $\Delta t$ as:

$$F_i = -M_{ti}/M_{Ii} \quad (5)$$

for i=1 and 3. This imbibed fraction is an "apparent" value because $M_{ti}$ is the net amount of mass transfer from $V_m$ to $V_f$, as the gross amounts of mass transfer between $V_m$ and $V_f$ for $\Delta t$ are unknown in general.

$F_i$ for surfactant is obtained based on the surfactant amount in the produced aqueous phase measured by the HPLC method. However, $F_i$ for 3-pentanone can be erroneous because part of 3-pentanone might have been vaporized from the effluent sample before the 3-pentanone-concentration measurement. Therefore, we needed another method to obtain $F_3$ without using MP3. To this end, the volume balance was useful as described below (FIG. 40B).

Figure 41A:
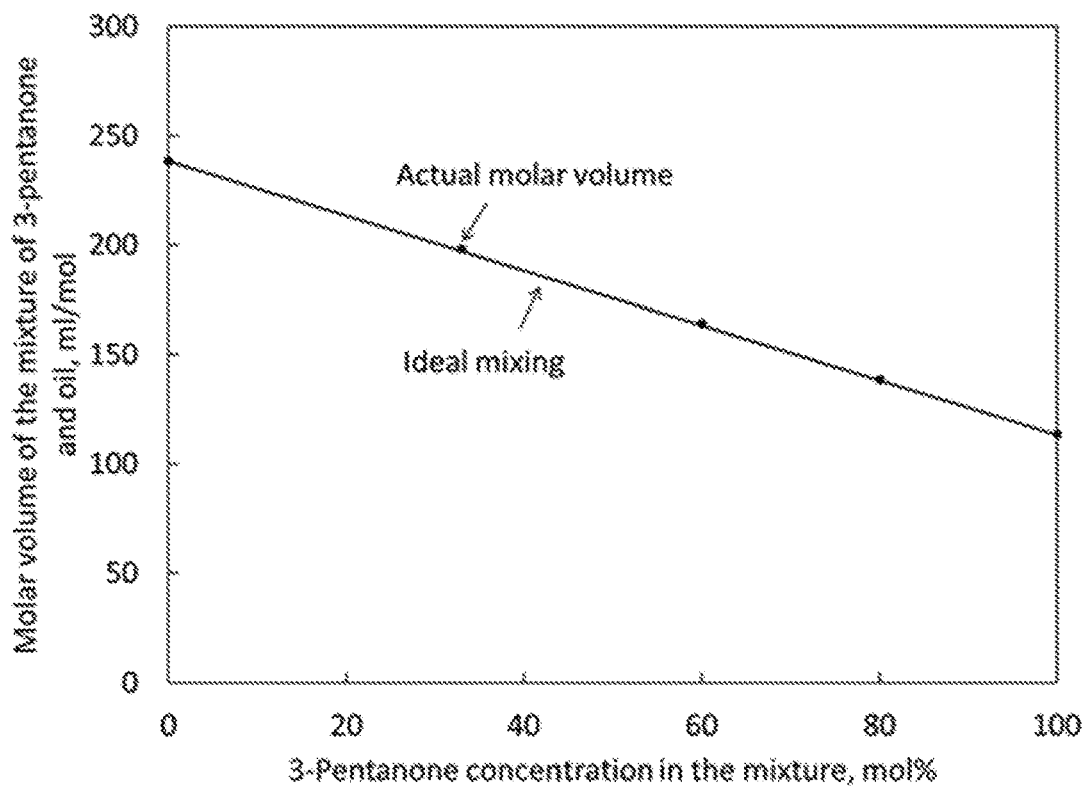
FIG. 41A provides data showing molar volume of the mixture of 3-pentanone/oil.
Figure 41B:
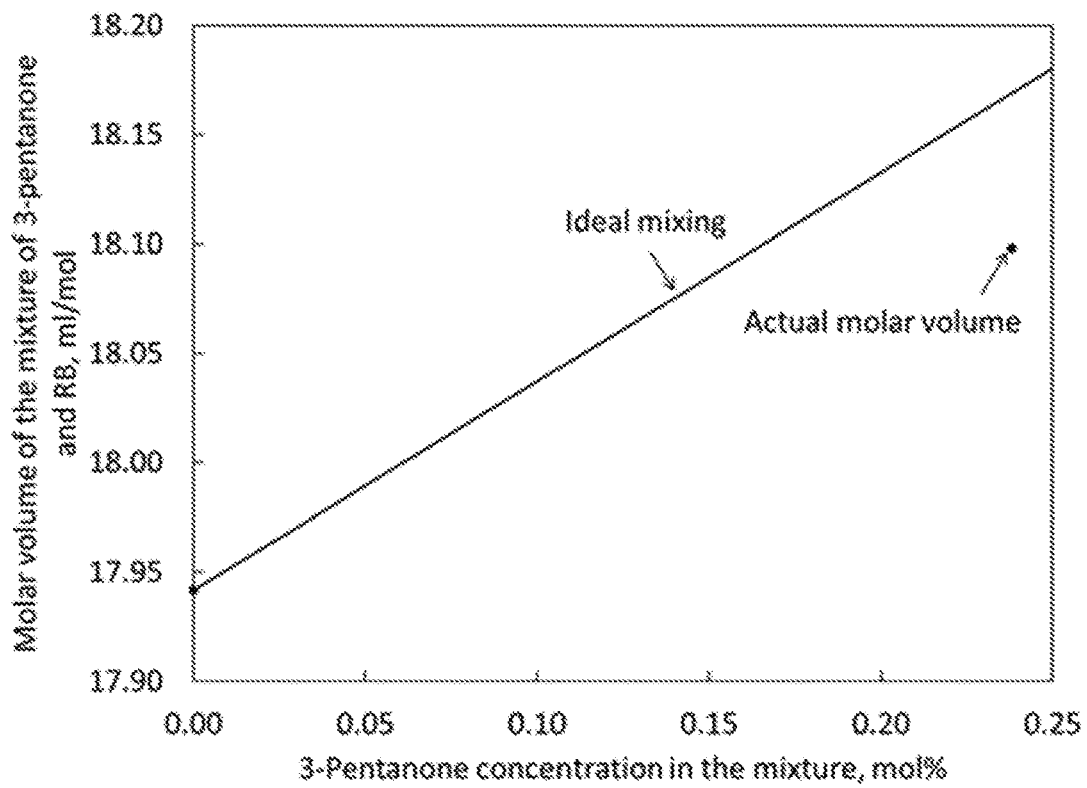
FIG. 41B provides data showing molar volume of the mixture of 3-pentanone/reservoir brine.

FIG. 41 shows the molar volume for 3-pentanone/oil and 3-pentanone/RB mixtures at 347 K and atmospheric pressure. The volume change on mixing of 3-pentanone and RB was found to be smaller than 0.39%; therefore, the ideal mixing is a reasonable assumption for the data analysis in this research. For a given time interval $\Delta t$, $$\Delta V_f = \Sigma_{i=1}^{3}(V_{ti} + V_{Ii} + V_{Pi}) \quad (6)$$

$$\Delta V_m = -\Sigma_{i=1}^{3} V_{ti} \quad (7)$$

where $\Delta V_f$ and $\Delta V_m$ are the volume changes in the fracture and matrix subsystems, respectively. $V_{Ii}$ is the volume of component i injected into the fracture for $\Delta t$, $V_{Pi}$ is the volume of component i going into the fracture through the producer for $\Delta t$, and $V_{ti}$ is the volume of component i transferred from $V_m$ to $V_f$ through the matrix/fracture interface for $\Delta t$.

Supposing that the fracture volume was at a steady state, $$\Delta V_{fi} = 0 = V_{ti} + V_{Ii} + V_{Pi} \quad (8)$$

$$\Delta V_m = 0 = -\Sigma_{i=1}^{3} V_{ti} \quad (9)$$

for i=1, 2, and 3. Note that Equation 8 is the strong condition for Equation 6 to be zero. Then, $V_{t3}$ and $F_3$ can be expressed in terms of Vi and VP for the other components as follows:

$$V_{t3} = V_{I1} + V_{P1} + V_{P2} \quad (10)$$

$$F_3 = -V_{t3}/V_{I3} = -(V_{I1} + V_{Pi} - V_{P2})/V_{I3} \quad (11)$$

The first question given previously in this subsection was addressed by obtaining $F_3$ by using Equation 5 for the surfactant case (Core #2) and using Equation 11 for the 3 pRB cases (Cores #1, 3, and 4).

The second question was about the contributions of brine (i=1) and 3-pentanone (i=3) to displacing oil (i=2) in the matrix. From Equations 8 and 10, the volume of recovered oil can be expressed as $$V_{P2} = V_{t1} + V_{t3} \quad (12)$$

Therefore, the contribution of component i to displacing oil in the matrix, $D_i$, is defined as $$D_i = V_{ti}/V_{P2} \quad (13)$$

for i=1 and 3. Note that $D_1 + D_3 = 1.0$. Equation 13 was used to address the second question given in this subsection.

The oleic phase saturation in the matrix contained components 1 and 2 for the 3 pRB cases (Cores #1, 3, and 4), and therefore was calculated in two ways:

$$S_{o1} = \frac{OOIM - V_{t2}}{V_m} \quad (14)$$

$$S_{o2} = \frac{OOIM - V_{t2} - V_{t3}}{V_m}, \quad (15)$$

where $S_{o1}$ and $S_{o2}$ are the oleic phase saturation, OOIM is original oil volume in the matrix, and $V_m$ is the pore volume of the matrix. The actual saturation of the oleic phase in the matrix should be between $S_{o1}$ and $S_{o2}$ for the 3 pRB cases. For dynamic imbibition with a surfactant solution, only $S_{o1}$ was calculated.

Experimental Results and Material Balance Analysis. This section presents the main results of the dynamic imbibition experiments with the 3 pRB (Cores #1, #3 and #4) and 2-EH-4PO-15EO solutions (Core #2). The material balance analysis is used to interpret the results. For Cores #1 and #2, a detailed description of oil recovery was presented in Example 2; therefore, description below primarily focuses on the material balance analysis of the results and give a new set of results and analysis for Cores #3 and #4.

Figure 42:
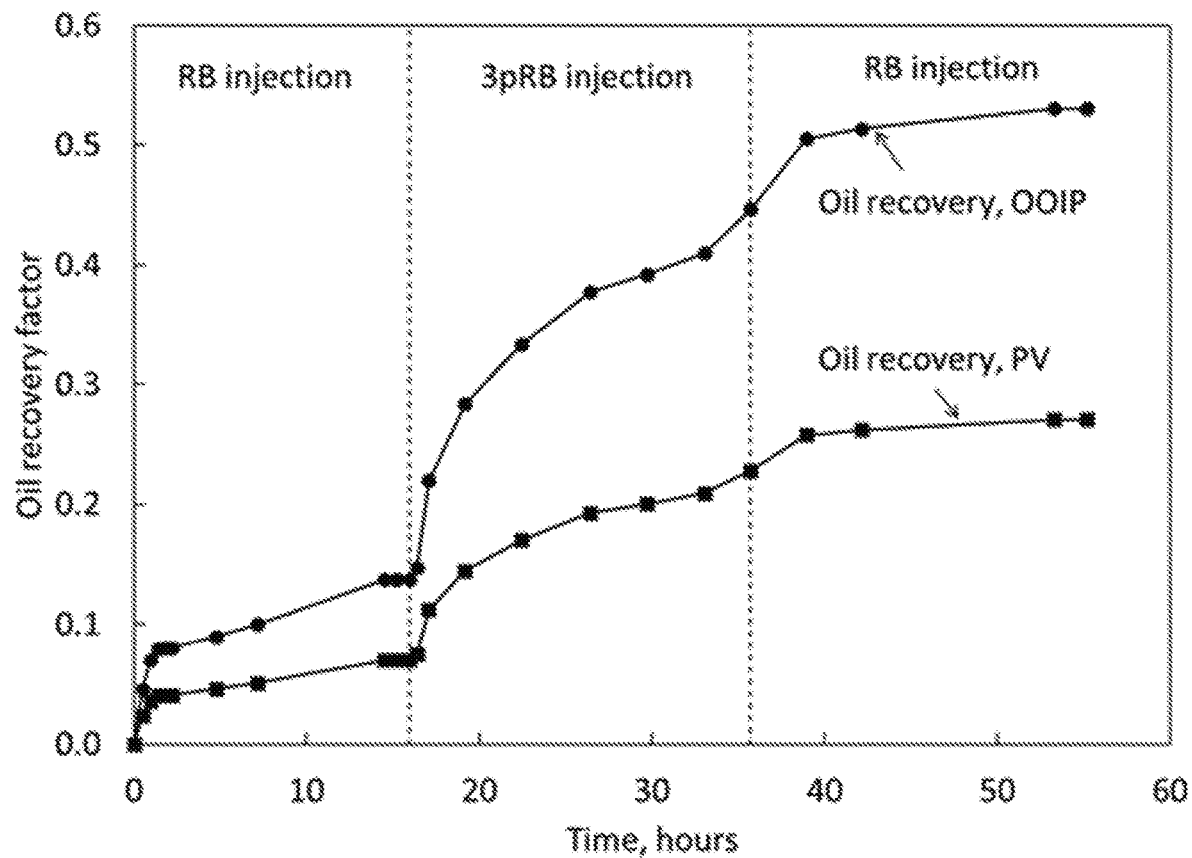
FIG. 42 provides plots showing oil recovery factors during coreflooding tests.

Vertical Dynamic Imbibition with 3 pRB (Core #1). FIG. 42 shows the oil recovery for Core #1. In addition to rock properties, the unit used for oil recovery may affect the interpretation of imbibition experiments. Oil recovery in the unit of pore volume (PV) and original oil in place (OOIP) both are presented in FIG. 42. As shown in Table 18, RB was injected into the core until no more oil production was observed. Then, 3 pRB was injected to improve the oil recovery for 20 hours. After that, the chase RB was injected for 19 hours.

Figure 43:
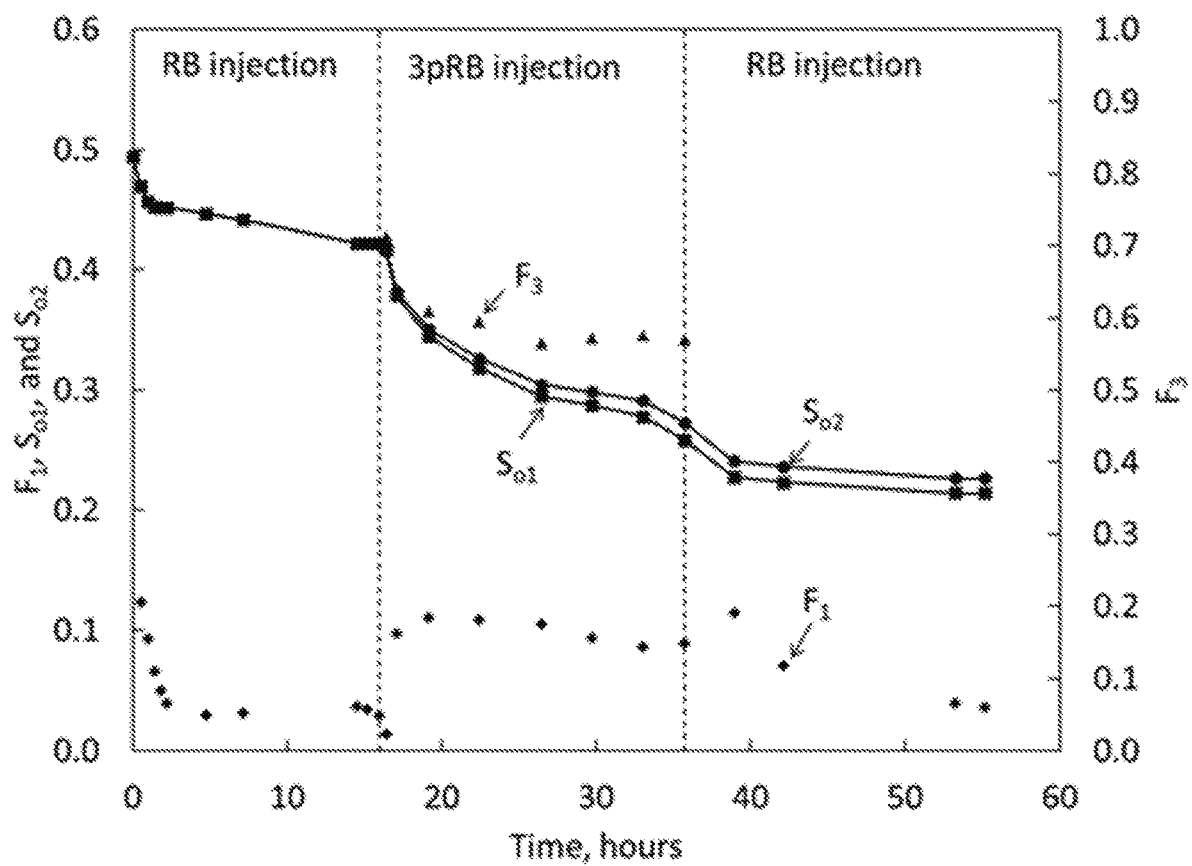
FIG. 43 provides plots showing $F_1$, $F_3$, $S_{o1}$ and $S_{o2}$ factors during coreflooding tests.

FIG. 43 presents $F_1$, $F_3$, $S_{o1}$, and $S_{o2}$. The calculation of $F_i$ was done separately for the three stages; e.g., the time interval for $F_i$ for the 3 pRB stage starts upon the commencement of the 3 pRB injection. $S_{o1}$ and $S_{o2}$ were calculated on a cumulative basis, for which the time interval started at 0 across all three stages. The calculations of $F_i$ and $S_o$ for the other cores also follow the same procedure.

$F_1$ and $F_3$ were 0.090 and 0.570, respectively, after the 3 pRB injection. $F_1$ was increased from 0.030 at the end of the first RB injection to 0.090 through the imbibition of 3-pentanone into the matrix during the 3 pRB injection. This is a clear indication that 3 pRB enabled improved oil recovery by enhanced brine imbibition. The main mechanism is most likely the wettability alteration as presented previously in Examples 1-2, above.

The imbibition of brine into the matrix continued during the chase RB injection. $F_1$ was 0.036 after the chase RB injection. FIG. 42 shows the oil recovery rate decreased rapidly during the chase RB stage. This is in part because the oleic phase saturation was already small by the end of 3 pRB injection (FIG. 43), yielding small capillary forces.

Figure 44:
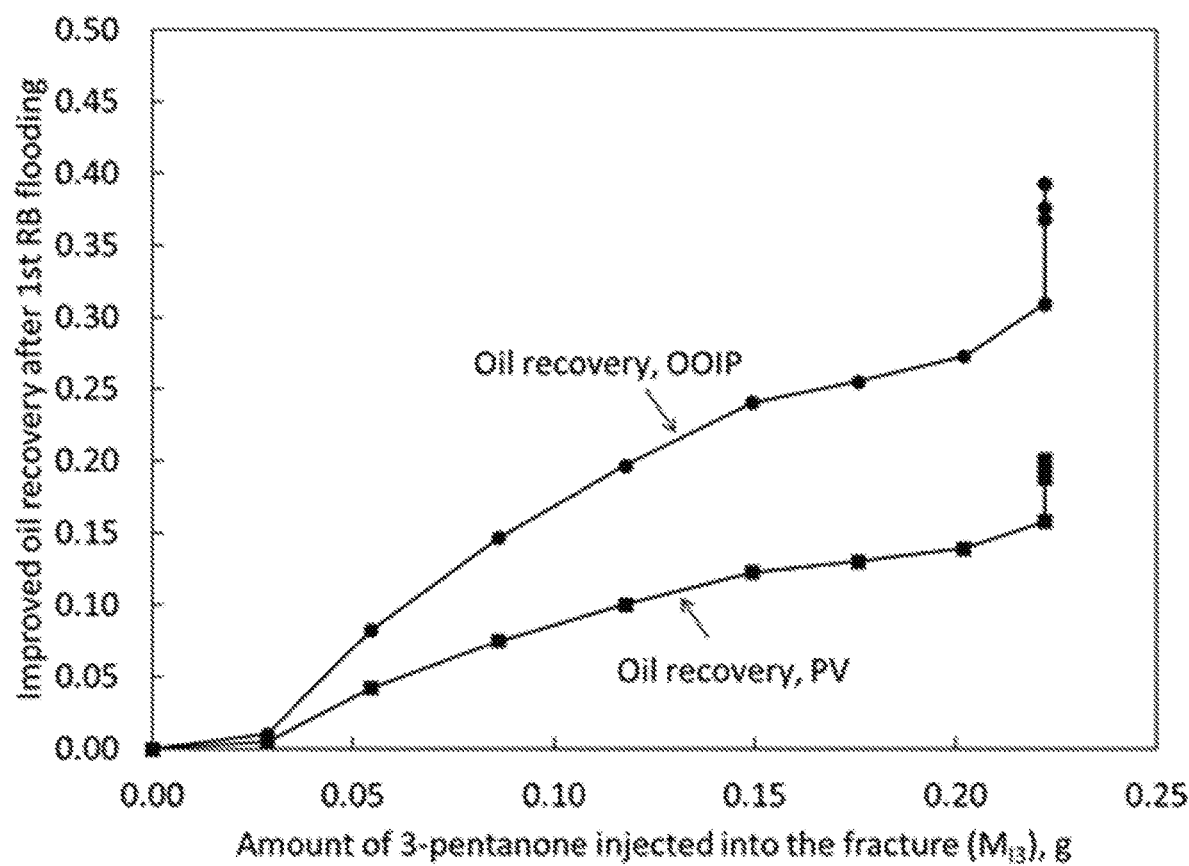
FIG. 44 provides plots showing oil recovery factors during coreflooding tests.

FIG. 44 presents the oil recovery with respect to $M_{I3}$. $M_{I3}$ was calculated on a cumulative basis, for which the time interval started at the beginning of 3 pRB injection. The same procedure was used for the other cores to be presented in next subsections. FIG. 44 clearly shows that the imbibition of brine during the chase RB injection was made possible by the 3 pRB injection, which was an efficient way to improve oil recovery. It is necessary to optimize the injection strategy to maximize the amount of oil produced for a given amount of the chemical injected. FIG. 30 clarifies that such an optimal injection strategy will increase the $D_1$ parameter.

Figure 45:
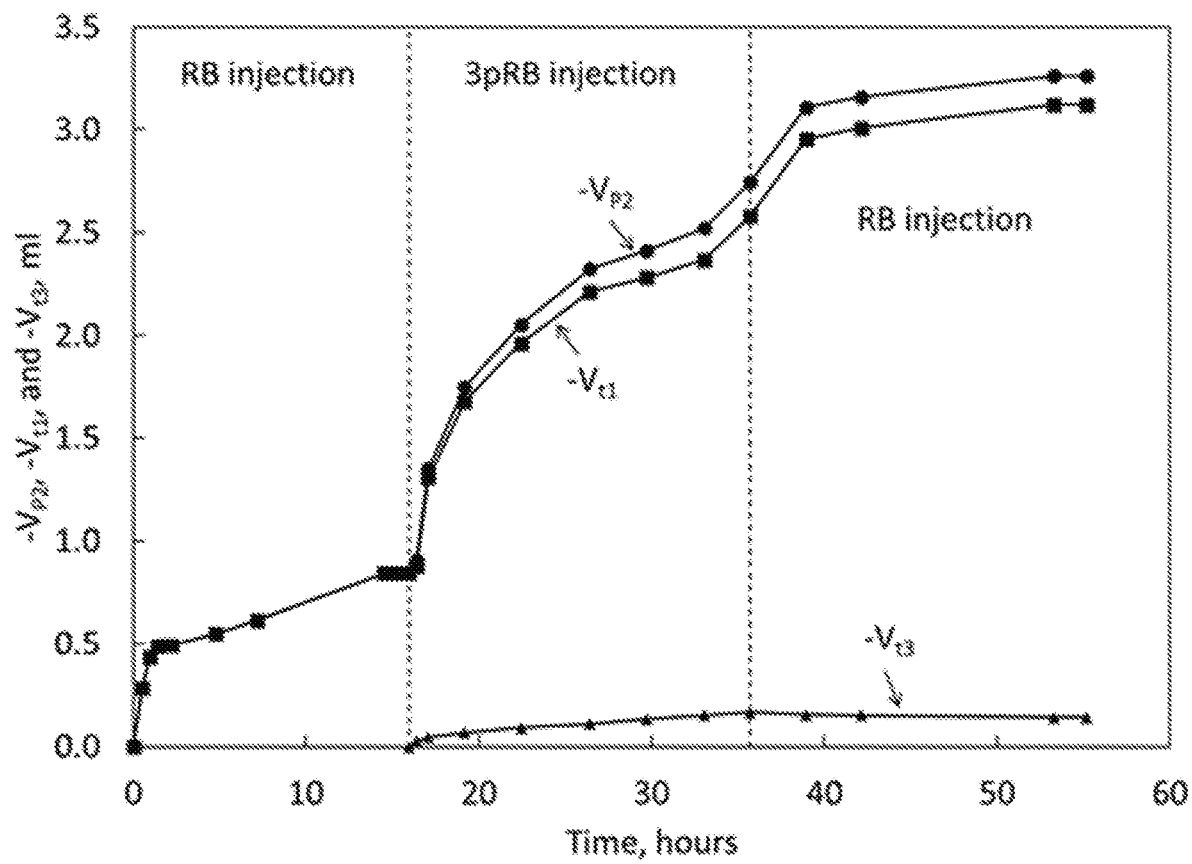
FIG. 45 provides plots showing $V_{P2}$, $V_{f1}$, and $V_{f3}$ factors during coreflooding tests.

FIG. 45 shows $-V_{P2}$ and $-V_{ti}$ for i=1 and 3. These parameters were calculated on a cumulative basis, for which the time interval started at 0 across all three stages. $D_1$ was also calculated on a cumulative basis, for which the time interval started upon the commencement of the 3 pRB injection. This calculation procedure is also applied to the other cores. Since 3-pentanone (i=3) is more expensive than brine (i=1), it is desirable to achieve a higher $D_1$ value (i.e., a lower $D_3$ value). During the 3 pRB injection, $D_1$ was 0.913; that is, the oil was mainly recovered by the displacement by brine. The rest was recovered by the displacement by 3-pentanone. When the 3 pRB and chase RB injection are both considered, $D_1$ was 0.942, indicating that $D_1$ can be increased by the chase brine injection.

Figure 46:
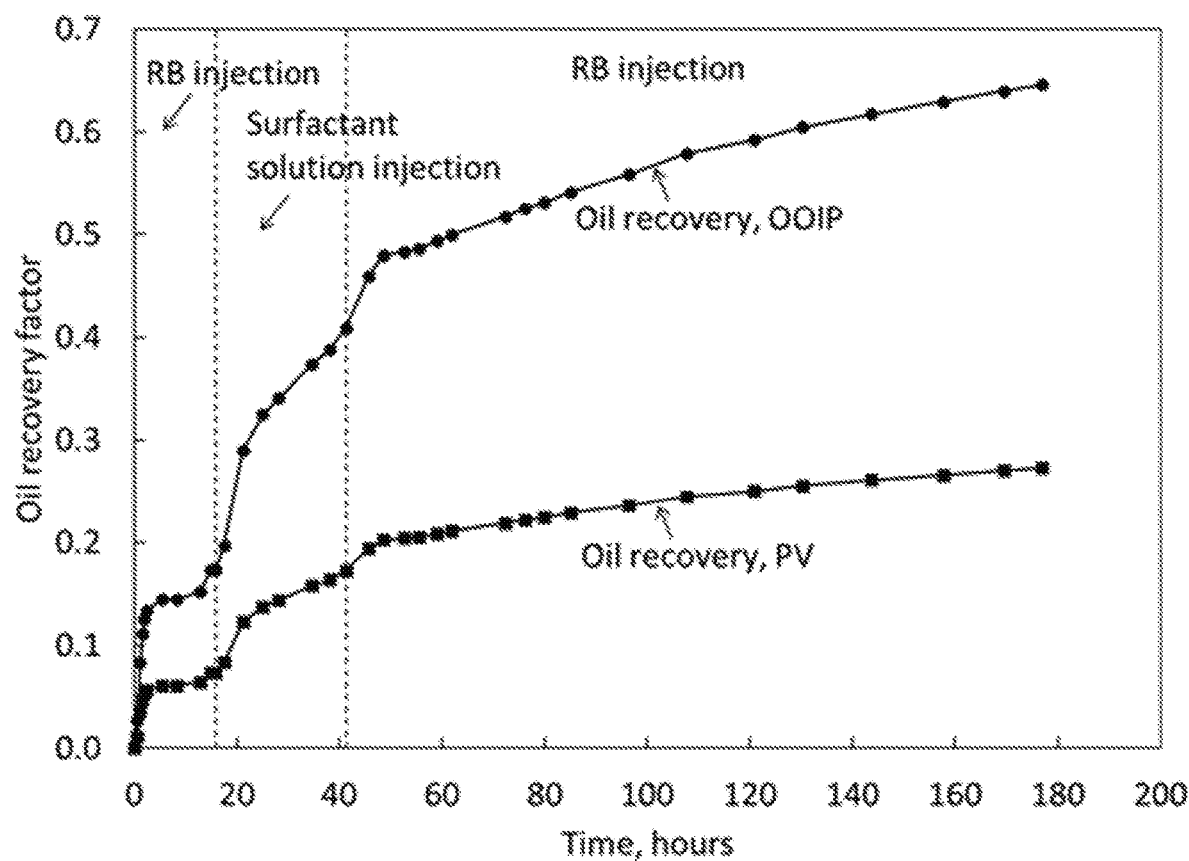
FIG. 46 provides plots showing oil recovery factors during coreflooding tests.
Figure 47:
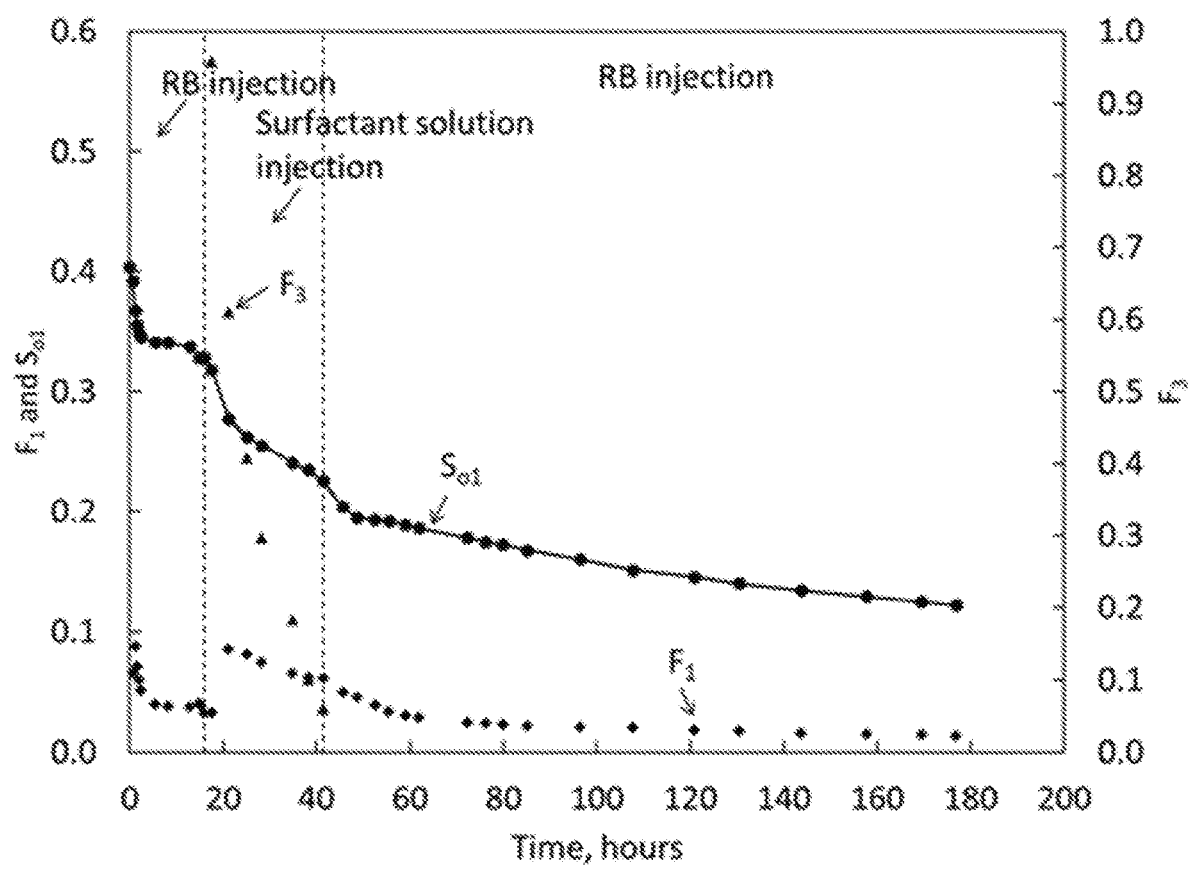
FIG. 47 provides plots showing $F_1$, $F_3$, $S_{o1}$ and $S_{o2}$ factors during coreflooding tests.

Vertical Dynamic Imbibition with Surfactant Solution (Core #2). FIG. 46 shows the oil recovery for Core #2. Comparison between FIG. 42 and FIG. 46 indicates that the final oil recovery factors given in PV were nearly the same for Cores #1 and 2. FIG. 47 shows the $F_1$, $F_3$, and $S_{o1}$ values from the material balance. $F_3$ was initially large, but rapidly decreased to result in 0.060 at the end of the surfactant solution injection. The efficiency of the surfactant imbibition into the matrix was clearly lower than that of the 3-pentanone imbibition in Section 3.1. This indicates that the surfactant imbibed into the matrix tended to flow back to the fracture more easily than 3-pentanone in the previous case.

FIG. 47 shows that the imbibed surfactant helped increase $F_1$ from 0.033 at the end of the initial RB injection to 0.062 at the end of the 3 pRB injection. However, this increase in $F_1$ is smaller than that with 3-pentanone for Core #1, described above.

Figure 48:
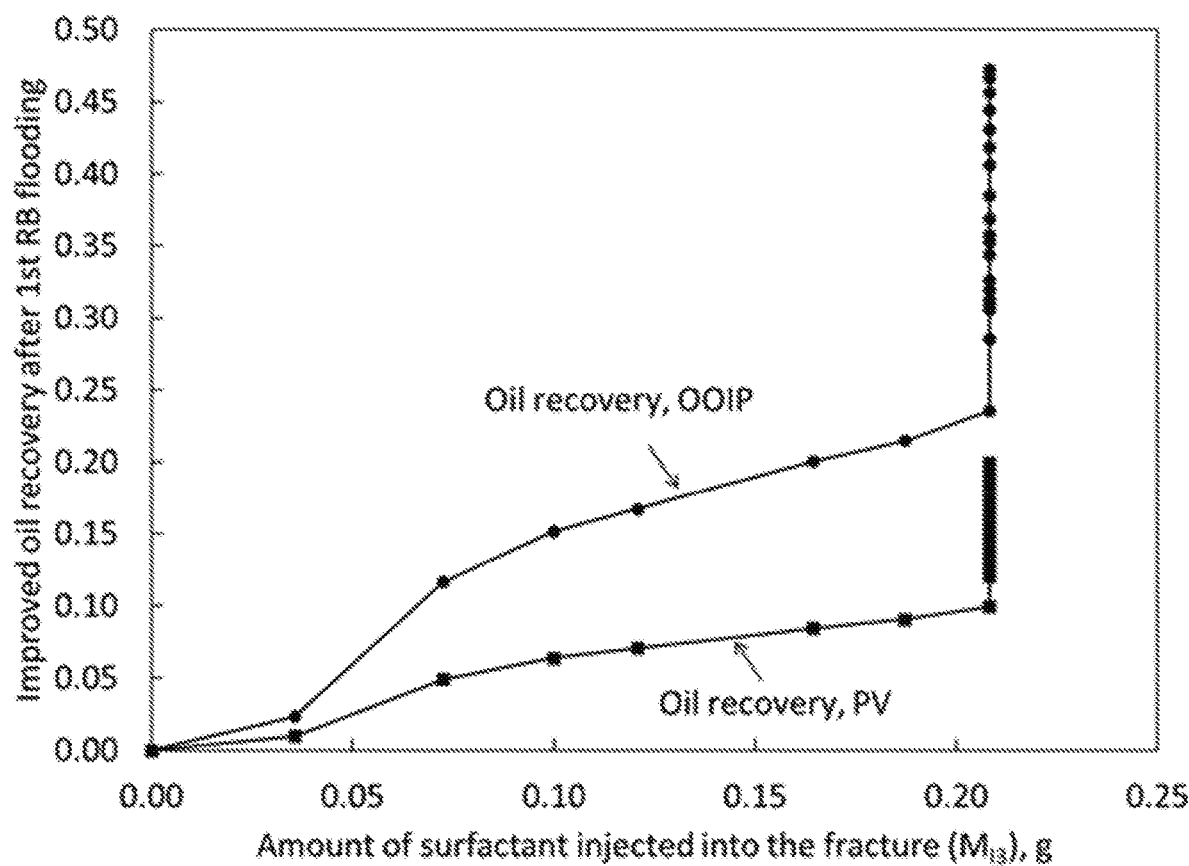
FIG. 48 provides plots showing oil recovery factors with respect to the amount of surfactant injected during coreflooding tests.

The imbibition of brine into the matrix continued after the surfactant injection was terminated. $F_1$ was 0.014 after the chase RB injection. This result confirms that the chase RB injection continued to recover oil at a slow rate (FIG. 46), and is shown in FIG. 48 with respect to $M_{f3}$. The slow, but steady increase in oil recovery by the chase RB injection may be related to the IFT change during the process: i) where the surfactant solution was imbibed, the IFT reduction might make a certain amount of oil mobile, although it also would lower the capillary-driven countercurrent flow of oil and brine; ii) the brine/oil IFT would increase after switching to the chase RB injection, making additional imbibition of brine.

Figure 49:
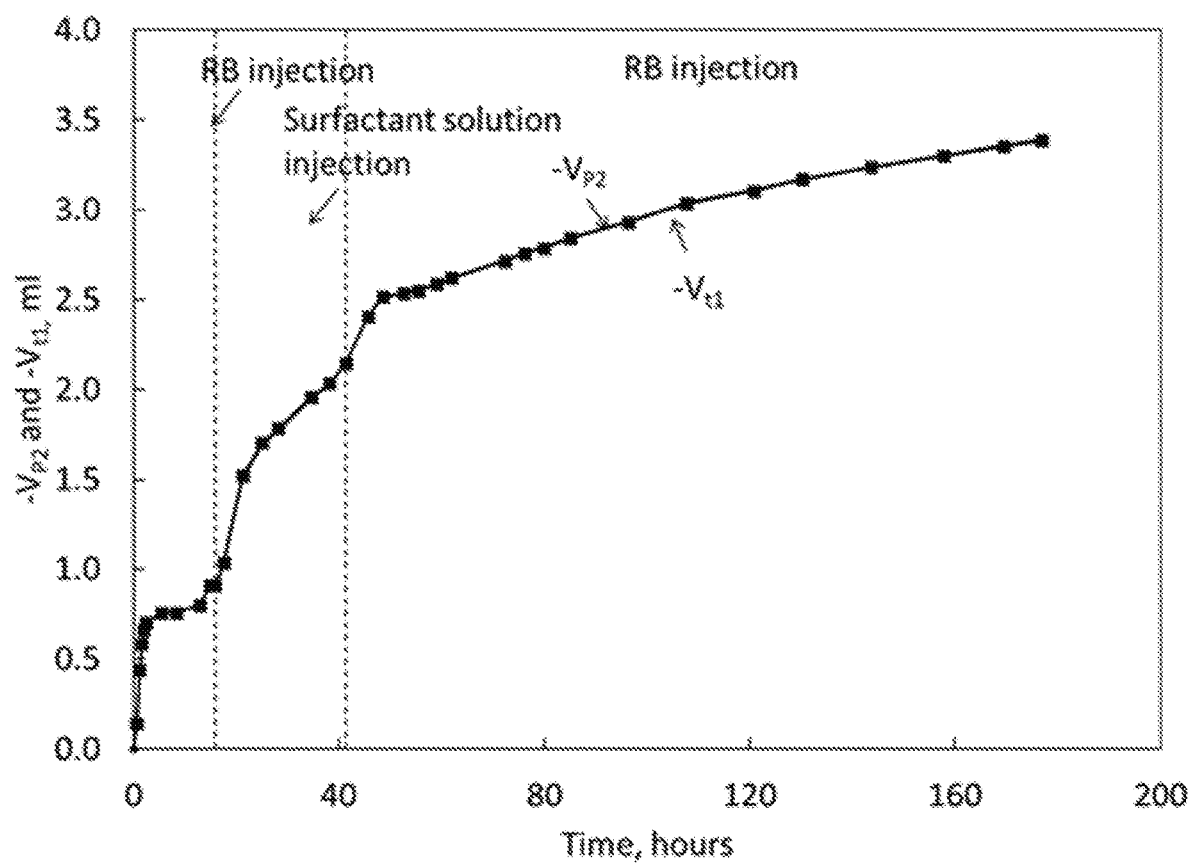
FIG. 49 provides plots showing $V_{P2}$, $V_{f1}$, and $V_{f3}$ factors during coreflooding tests.

FIG. 49 presents $-V_{P2}$ and $-V_{t1}$. The values of $-V_{P2}$ and $-V_{t1}$ are close to each other, indicating that the oil was recovered by the displacement by brine, not by the surfactant.

Figure 50:
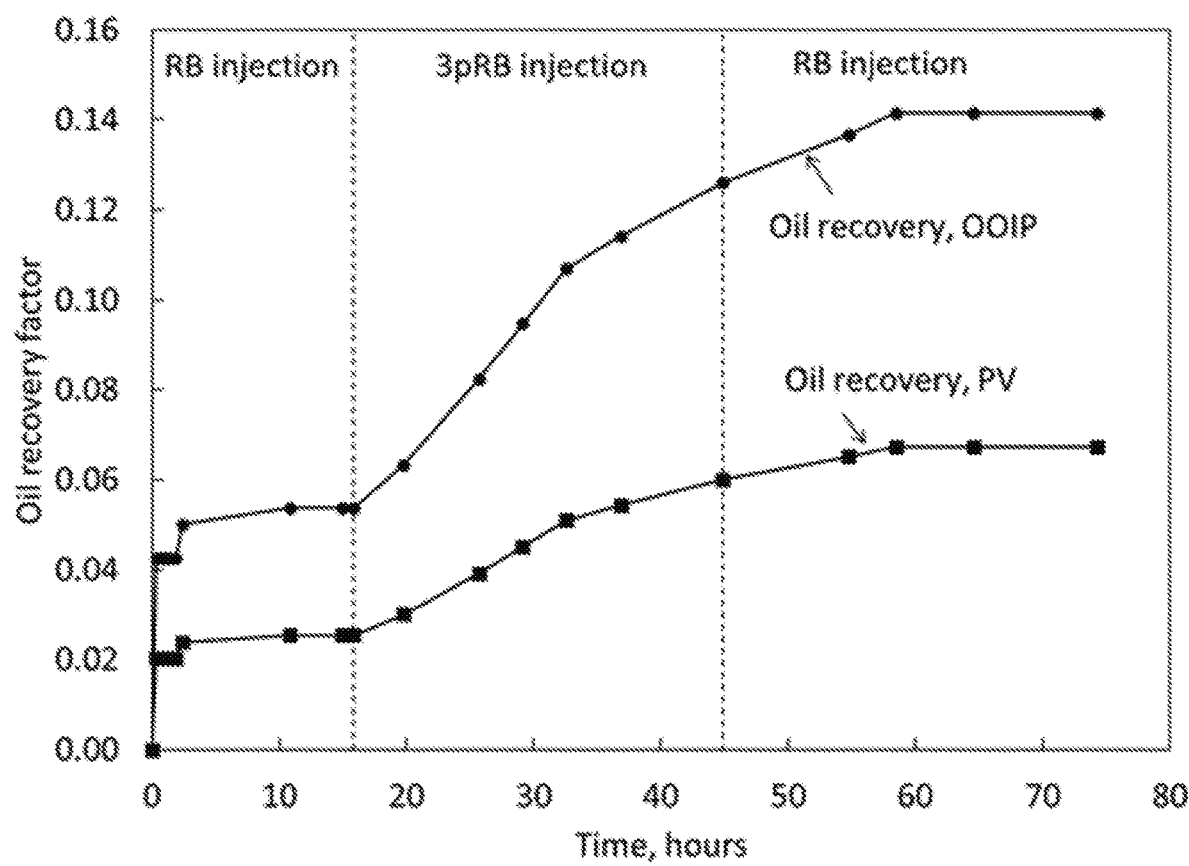
FIG. 50 provides plots showing oil recovery factors during coreflooding tests.

Horizontal Dynamic Imbibition with 3 pRB (Core #3). FIG. 50 presents the oil recovery for Core #3. As shown in Table 18, RB was injected into the core until no more oil production was observed. Then, 3 pRB was injected to improve the oil recovery for 29 hours. After that, the chase RB was injected until the oil cut became undetectable. The initial RB injection recovered 5.4% OOIP (2.6% PV). The incremental oil recovery during the 3 pRB injection was 7.2% OOIP (3.4% PV). The chase RB injection reached a plateau with an incremental oil recovery of 1.5% OOIP (0.7% PV). The total oil recovery was 14.2% OOIP (6.7% PV). It is clear that 3 pRB increased oil recovery beyond what the RB injection could recover.

Figure 51:
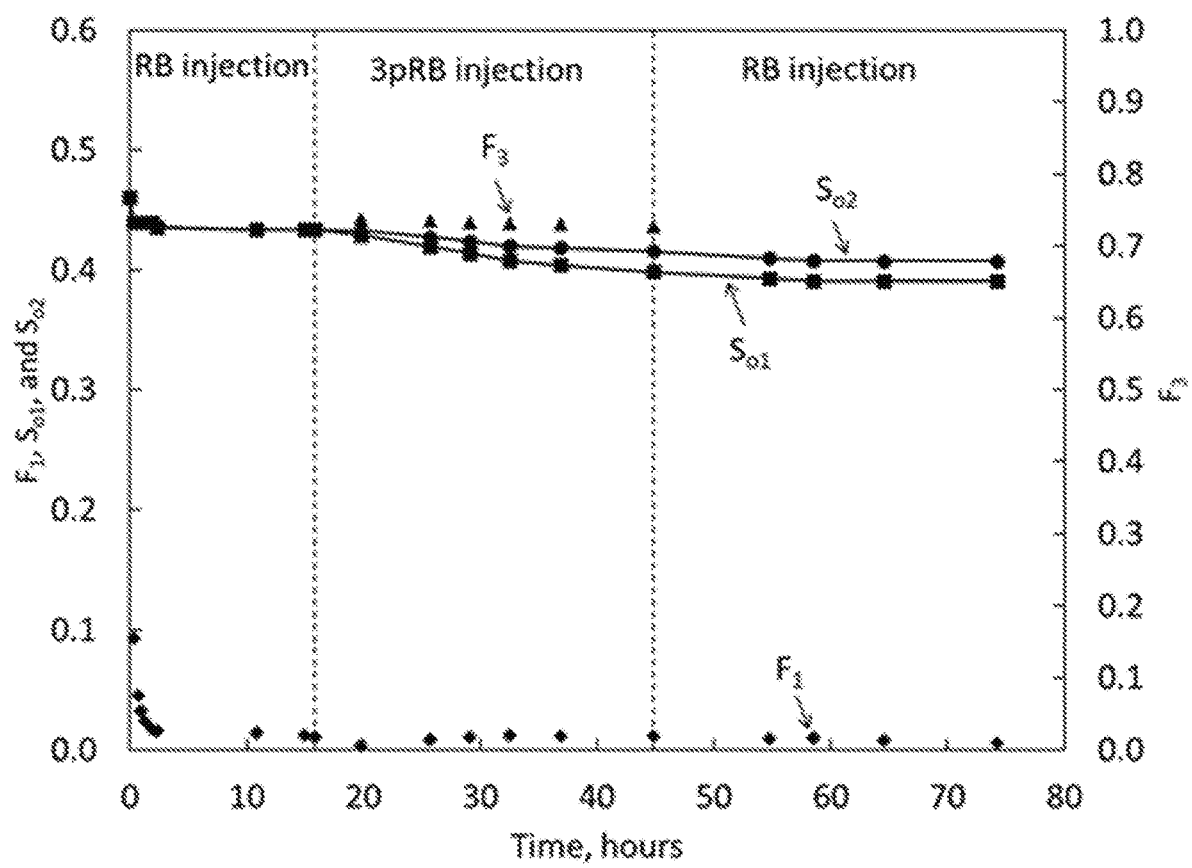
FIG. 51 provides plots showing $F_1$, $F_3$, $S_{o1}$ and $S_{o2}$ factors during coreflooding tests.

FIG. 51 presents $F_1$, $F_3$, $S_{o1}$, and $S_{o2}$. After the 3 pRB injection, $F_3$ was 0.727. This result confirmed that the imbibition of 3-pentanone into the matrix was efficient. $F_1$ was 0.012, indicating the brine imbibition occurred during the 3 pRB injection stage.

Figure 52:
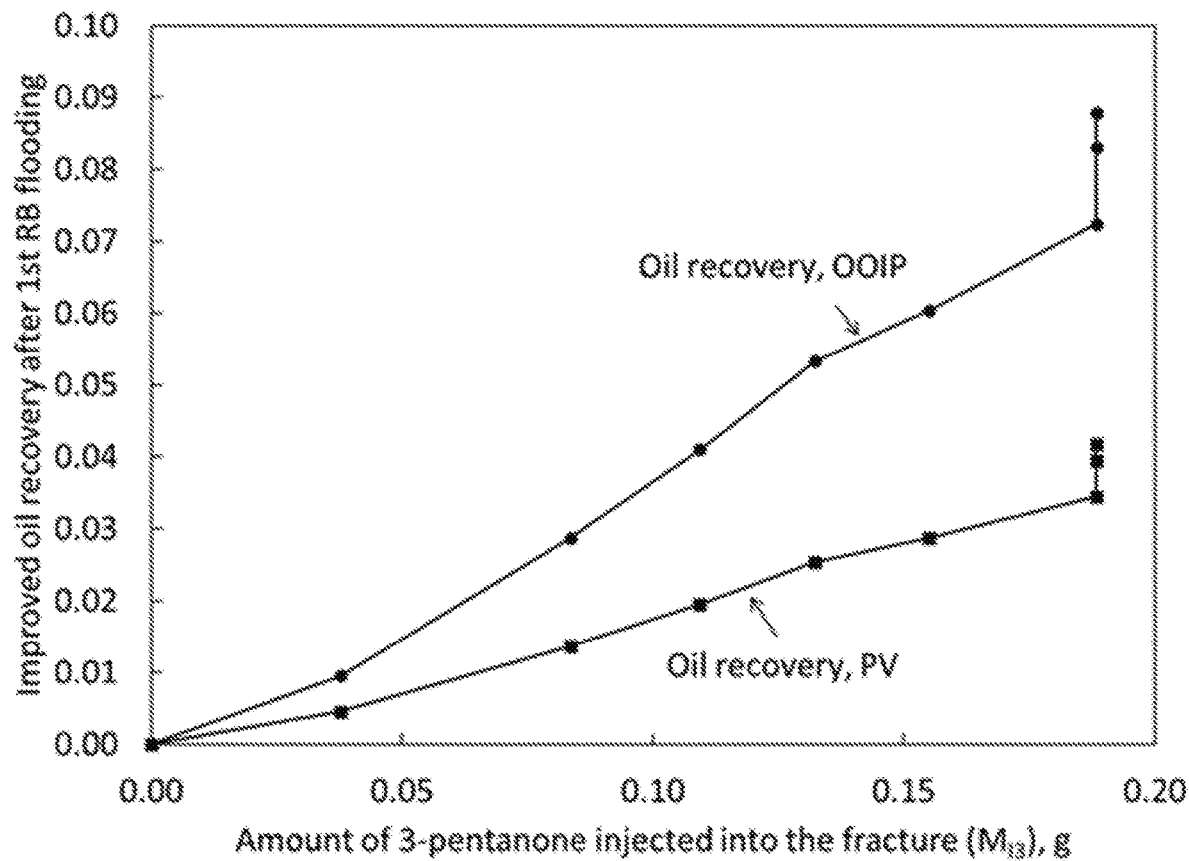
FIG. 52 provides plots showing oil recovery factors with respect to the amount of 3-pentanone injected during coreflooding tests.

Similarly to the previous cases, the brine imbibition continued to recover oil after the 3 pRB injection was terminated. FIG. 52 presents the oil recovery with respect to $M_{f3}$. $F_1$ during the chase RB injection was 0.006. FIG. 50 shows oil recovery quickly reached a plateau during the chase RB injection. The oleic phase saturation in the matrix at the end of the chase RB was about 0.40, which was greater than the final oleic-phase saturation for Core #1. The difference in petrophysical properties should have affected the difference observed, because Indiana limestone cores have been reported to be highly heterogeneous. It is not clear at the moment whether the difference in flow direction between Cores #1 and 3 could make such a marked difference in oil recovery.

Figure 53:
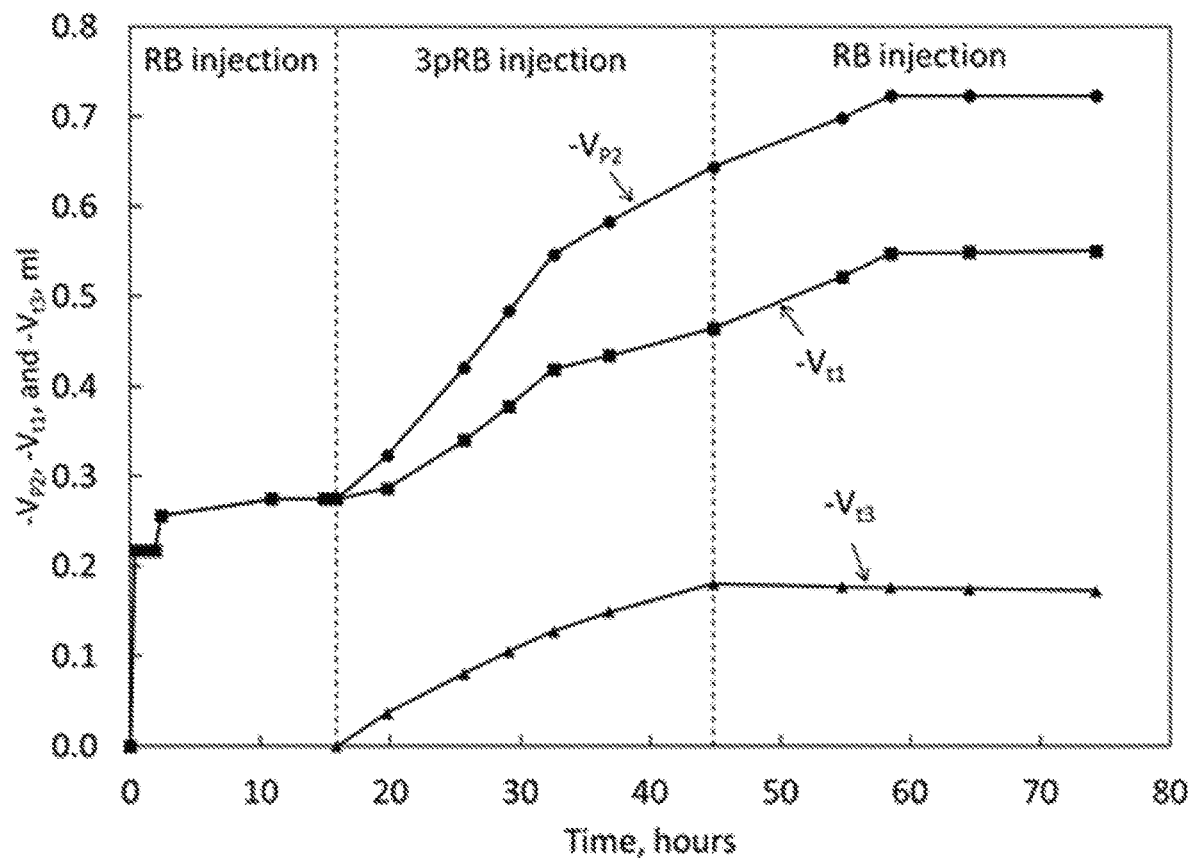
FIG. 53 provides plots showing $V_{P2}$, $V_{f1}$, and $V_{f3}$ factors with respect to the time during coreflooding tests.

FIG. 53 shows $-V_{P2}$ and $-V_{ti}$ for i=1 and 3. During the 3 pRB injection, $D_1$ was 0.513. This result shows brine and 3-pentanone (as components) contributed equally to displacing the oil in the matrix. This is less desirable than the $D_1$ value for Core #1, which was greater than 0.90. When the 3 pRB and chase RB stages are both considered, $D_1$ increases to 0.616. This confirms that the chase brine helps increase $D_1$.

Figure 54:
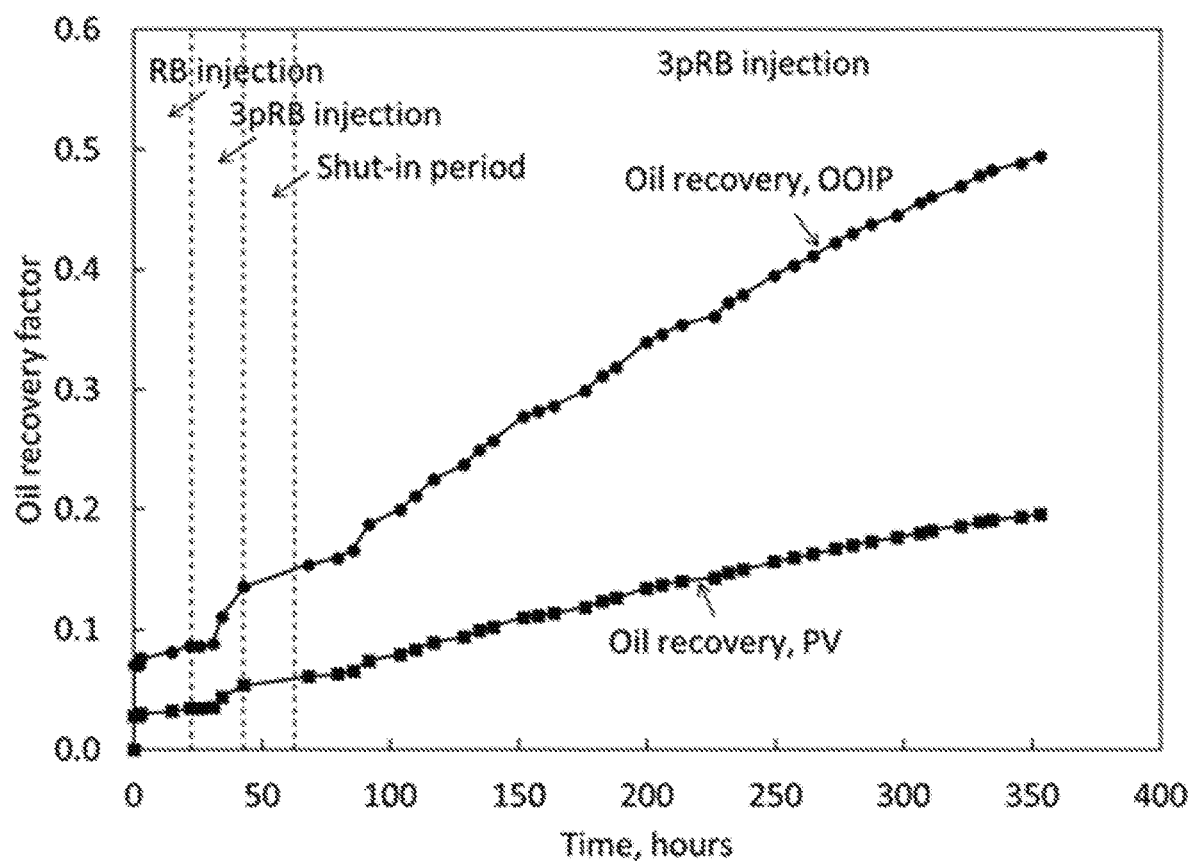
FIG. 54 provides plots showing oil recovery factors with respect to the time during coreflooding tests.

Horizontal Dynamic Imbibition with 3 pRB (Core #4). FIG. 54 presents the oil recovery for Core #4. RB was injected into the core until no more oil production was observed. Then, 3 pRB was injected to improve the oil recovery for 20 hours. After that, the system was shut-in for 20 hours. Finally, 3 pRB was injected for 12 days. The initial RB injection recovered 8.6% OOIP (3.4% PV). The incremental oil recovery during the second stage (3 pRB injection) was 4.9% OOIP (2.0% PV). During the shut-in period and subsequent 5-hour 3 pRB injection, the incremental oil recovery was 1.8% OOIP (0.7% PV). During the final 3 pRB injection stage, oil recovery steadily increased by 34.1% OOIP (13.5% PV). The total oil recovery was 49.5% OOIP (19.6% PV). It is clearly shown that oil recovery increased during the shut-in period, and continued to increase during 12 days of the 3 pRB injection.

Figure 55:
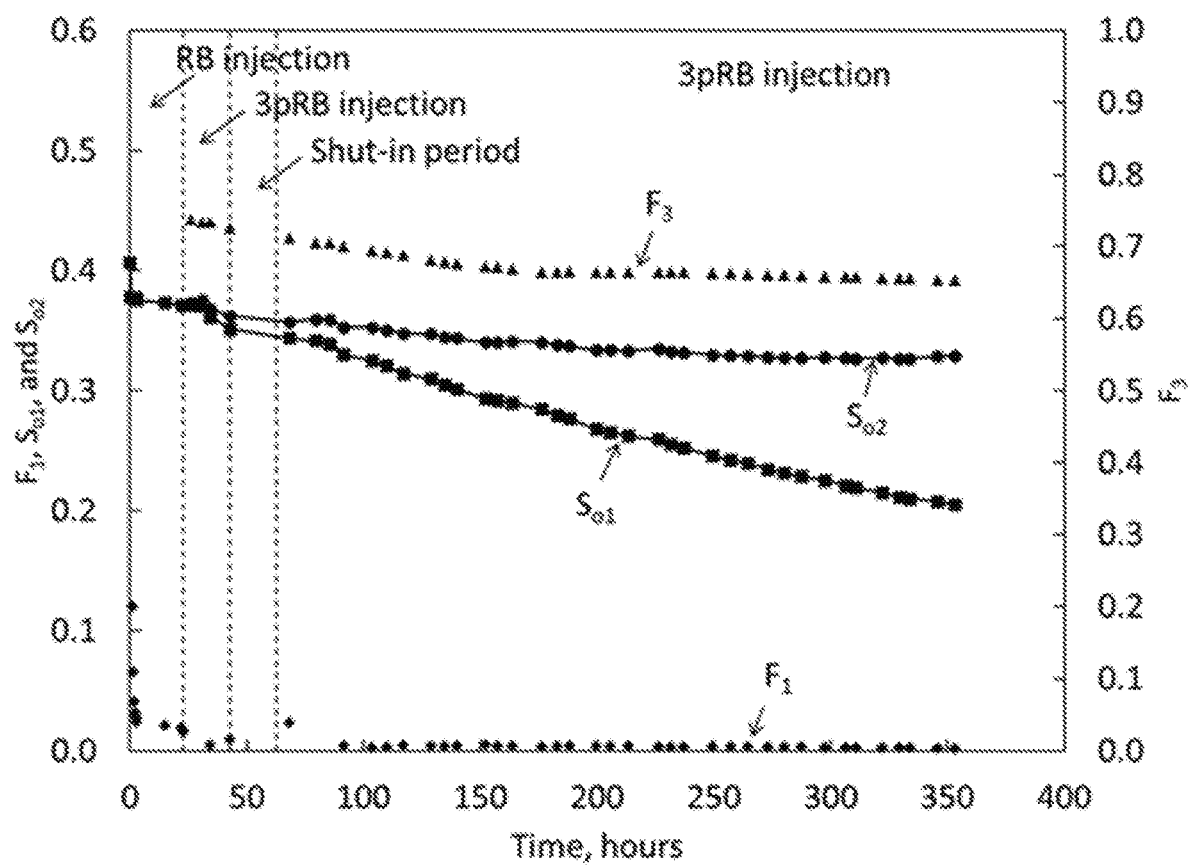
FIG. 55 provides plots showing $F_1$, $F_3$, $S_{o1}$ and $S_{o2}$ factors with respect to the time during coreflooding tests.

FIG. 55 shows $F_1$, $F_3$, $S_{o1}$, and $S_{o2}$. Similarly to the cases with Cores #1 and 3, $F_3$ during the 3 pRB injection shows that a large fraction of the injected 3-pentanone was imbibed into the matrix. $F_3$ after the second stage (3 pRB injection) was 0.725. $F_3$ after the last stage (3 pRB injection) was 0.653. $F_1$ after the second stage (3 pRB injection) was 0.009, indicating the brine imbibition occurred during the 3 pRB injection owing to wettability alteration. During the shut-in period and subsequent 5-hour 3 pRB injection, $F_1$ was 0.024, which is greater than that at the end of the second stage. This means the brine imbibition and oil recovery continued during the shut-in period, even without injecting 3 pRB. $F_1$ during the last stage continued to decrease, which reflects the reduced imbibition of brine. At the end of the last stage, $F_1$ was 0.002.

Figure 56:
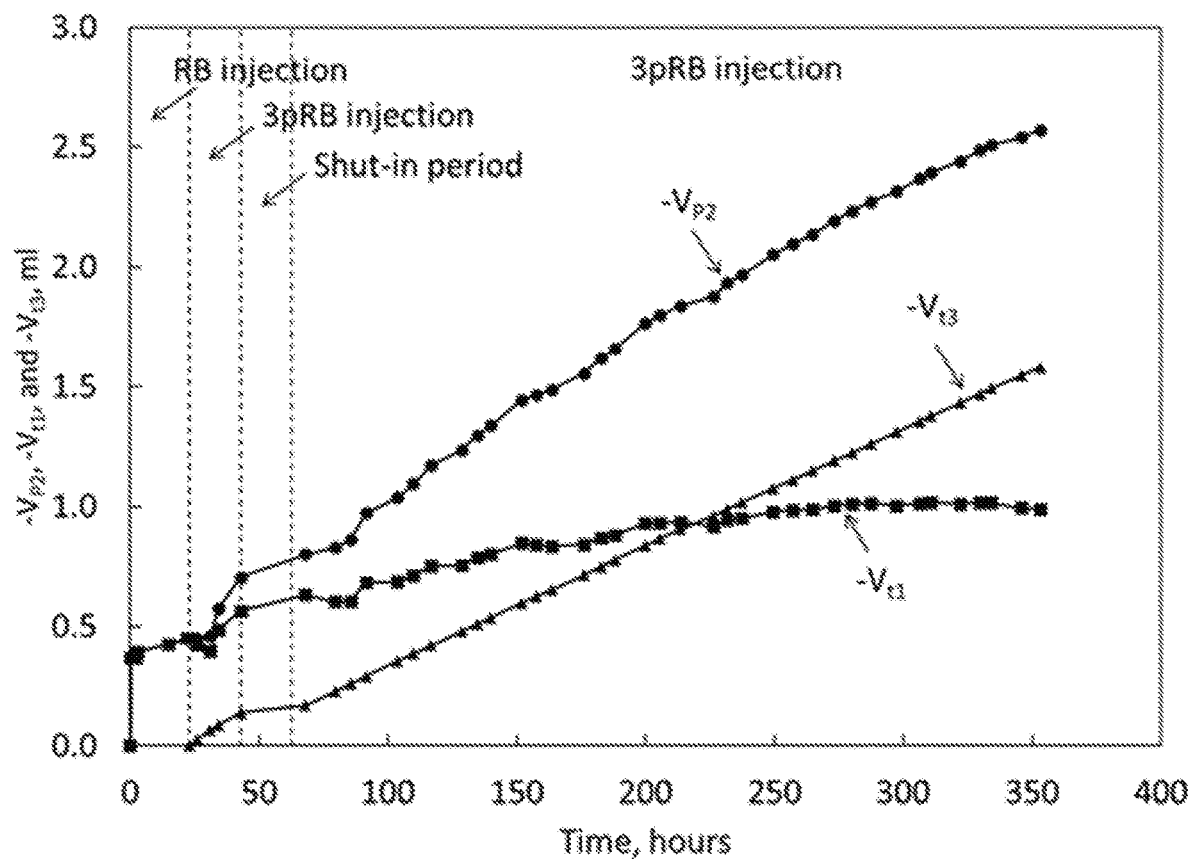
FIG. 56 provides plots showing $V_{P2}$, $V_{f1}$, and $V_{f3}$ factors with respect to the time during coreflooding tests.
Figure 59:
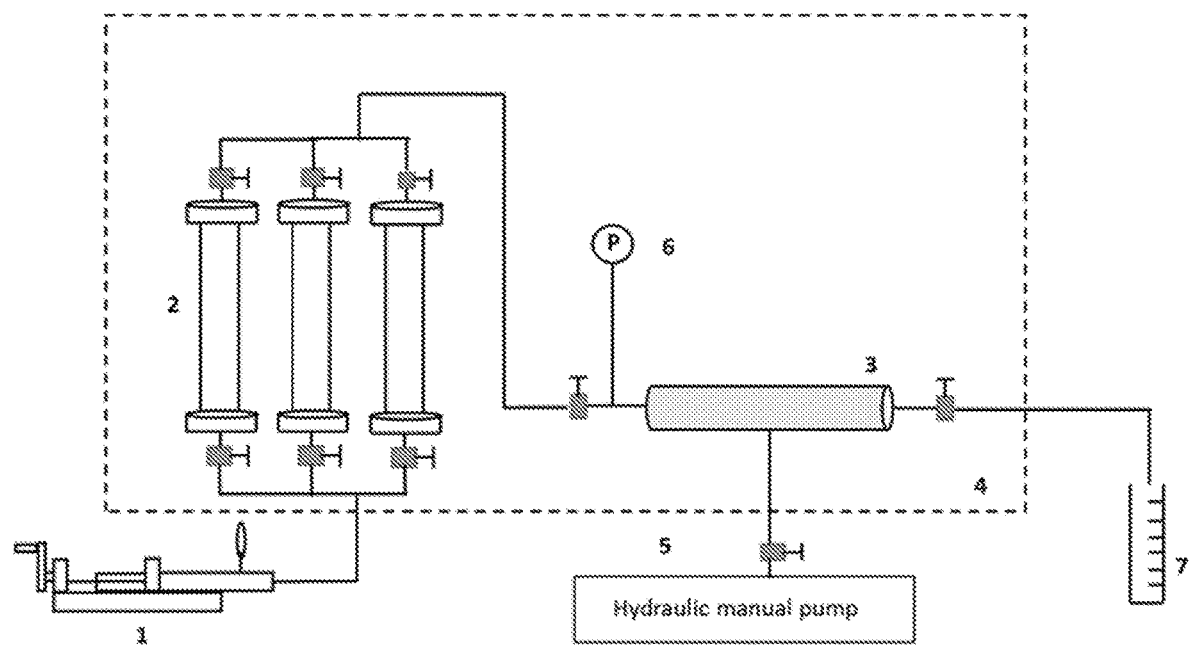
FIG. 59 provides a schematic illustration of an experimental device for flooding/soaking testing.

FIG. 56 presents $-V_{P2}$ and $-V_{ti}$ for i=1 and 3. As was the case with Core #3, the brine imbibition was not the dominant oil recovery mechanism. During the second stage, $D_1$ was 0.459. During the shut-in period and subsequent 5-hour 3 pRB injection, $D_1$ was 0.689, indicating that the shut-in period increased $D_1$. FIG. 59 also shows that the rate of brine imbibition was not affected during the shut-in period, but the rate of 3-pentanone imbibition was significantly reduced during the shut-in period. During the last stage, $D_1$ was 0.202, indicating that the oil recovery occurred mainly because the imbibed 3-pentanone displaced oil in the matrix. Note that the value of $-V_{t1}$ decreased for some time intervals during the last stage. This is likely because 3-pentanone displaced not only oil, but also brine in the matrix.

Conclusions. Details of four dynamic imbibition experiments (three with the 3-pentanone solution and one with the surfactant solution) were analyzed by the material balance for components: oil, brine, and chemical (either 3-pentanone or surfactant). The analysis resulted in a quantitative evaluation of the imbibed fraction of the components injected (brine and chemical) and the relative contribution of these components to the oil displacement in the matrix. The main conclusions are as follows:

3-Pentanone was more efficient in transferring from a fracture to the surrounding matrix than 2-EH-4PO-15EO. $F_3$ was more than 57.0% for 3-pentanone, and only 6.0% for 2-EH-4PO-15EO at the end of the chemical slug stage.

Both 3-pentanone and surfactant enhanced the brine imbibition into the matrix through wettability alteration. For example, $F_1$ at the end of the 3 pRB injection was 3 times greater than $F_1$ at the end of the RB injection for Core #1. $F_1$ at the end of the surfactant solution injection was 2 times greater than $F_1$ at the end of the RB injection for Core #2.

During the 3 pRB injection stage, brine and 3-pentanone both displaced oil from the matrix pore volume. Since 3-pentanone is more expensive than brine, it is more advantageous for the imbibed 3-pentanone to enhance the imbibition of brine than to displace oil by itself.

Results of the material balance analysis indicated that an optimal process with a wettability modifier will have a large imbibed fraction to rapidly enhance the oil displacement by brine in the matrix (for a greater $D_1$ value). Such a process will benefit from chase brine injection and soaking (or shut-in) so that the oil recovery could be maximized for a small amount of chemical injection.

The chase RB injection was able to recover oil after the 3 pRB injection or surfactant solution injection as long as a sufficient amount of 3-pentanone/surfactant was imbibed to change the rock wettability.

The oil recovery by the brine imbibition continued to occur during the shut-in period after 3 pRB injection. The brine imbibition rate was not affected during the shut-in period, but the rate of oil recovery by the 3-pentanone displacement was significantly reduced during the shut-in period.

Nomenclature for Example 4.
Roman Symbols
A cross-sectional area
b fracture aperture
d core diameter
D relative contribution of a component to displacing oil in the matrix
F apparent imbibed fraction
k permeability
M mass
q injection rate
S saturation
t duration
V volume
Greek Symbols
φ porosity
τ residence time
Subscripts
e effective
i index for pseudo component
I injected
f fracture
m matrix
oleic phase
P produced
t transfer
Abbreviations
3 pRB 1.1-wt % 3-pentanone solution in reservoir brine
CT computed-tomography
EH ethyhexanol
EO ethylene oxide
IOR improved oil recovery
IFT interfacial tension
OOIM original oil volume in matrix
OOIP original oil in place
PO propylene oxide
PV pore volume
PVI pore volumes injected
RB reservoir brine
TOC total organic content
$^1$H NMR proton nuclear magnetic resonance
HPLC high performance liquid chromatography Figure Captions for Example 4. FIG. 39. Schematic of the experimental set up for horizontal dynamic imbibition.

Figure 40A:
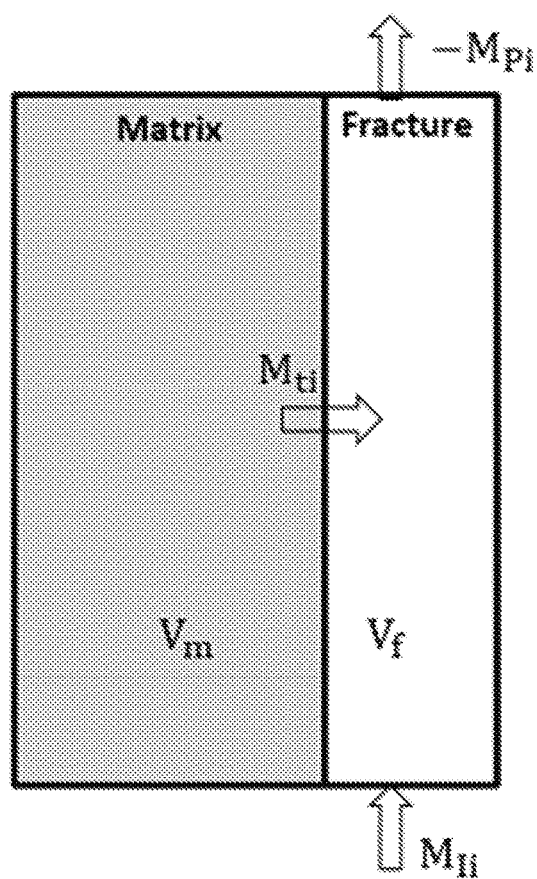
FIG. 40A provides a schematic illustration of dynamic imbibition in terms of mass.
Figure 40B:
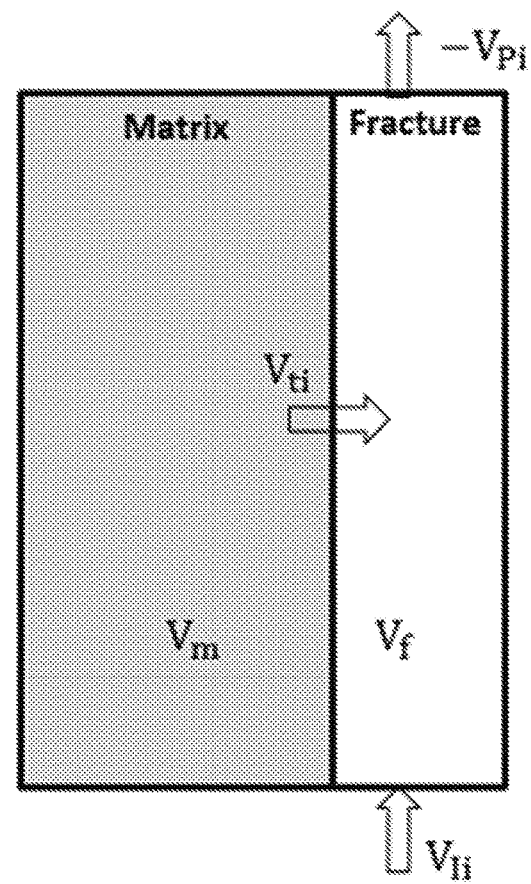
FIG. 40B provides a schematic illustration of dynamic imbibition in terms of volume.

FIG. 40A and FIG. 40B. Schematic of the dynamic imbibition. The system consists of two subvolumes, the fracture and matrix volumes. The fracture volume is connected to the injector (source) and the producer (sink). (a) Schematic of dynamic imbibition in terms of mass. (b) Schematic of dynamic imbibition in terms of volume.

FIG. 41. Molar volume of the mixture of 3-pentanone/oil and 3-pentanone/RB at 347 K and atmospheric pressure. (a) Mixture of 3-pentanone and oil. (b) Mixture of 3-pentanone and RB.

FIG. 42. Oil recovery for Core #1. Oil recovery curves are given in the units of OOIP and PV.

FIG. 43. $F_1$, $F_3$, $S_{o1}$ and $S_{o2}$ for Core #1.

FIG. 44. Oil recovery with respect to amount of 3-pentanone injected into the fracture for Core #1.

FIG. 45. $-V_{P2}$, $-V_{t1}$, and $-V_{t3}$ for Core #1.

FIG. 46. Oil recovery of Core #2. Oil recovery curves are given in the units of OOIP and PV.

FIG. 47. $F_1$, $F_3$ and $S_{o1}$ for Core #2.

FIG. 48. Oil recovery with respect to the amount of surfactant injected into the fracture for Core #2

FIG. 49. $-V_{P2}$ and $-V_{t1}$ for Core #2.

FIG. 50. Oil recovery of Core #3. Oil recovery curves are given in the units of OOIP and PV.

FIG. 51. $F_1$, $F_3$, $S_{o1}$ and $S_{o2}$ for Core #3.

FIG. 52. Oil recovery with respect to the amount of 3-pentanone injected into the fracture for Core #3.

FIG. 53. $-V_{P2}$, $-V_{t1}$, and $-V_{t3}$ for Core #3.

FIG. 54. Oil recovery of Core #4. Oil recovery curves are given in the units of OOIP and PV.

FIG. 55. $F_1$, $F_3$, $S_{o1}$ and $S_{o2}$ for Core #4.

FIG. 56. $-V_{P2}$, $-V_{t1}$, and $-V_{t3}$ for Core #4.

Example 5: The Effect of Phase Distribution on Imbibition Mechanisms for Enhanced Oil Recovery in Tight Reservoirs This example investigates the impact of initial water on the oil recovery from tight matrices through surfactant-enhanced water imbibition. Two flooding/soaking experiments using fractured tight cores with/without initial water were performed. The experimental results were analyzed by the material balance for components: oil, brine, and surfactant. The analysis resulted in a quantitative evaluation of the imbibed fraction of the injected components (brine and surfactant).

Results show that the surfactant enhanced the brine imbibition into the matrix through wettability alteration. The initial efficiency of the surfactant imbibition increased when brine was initially present in the matrix. The imbibition of brine was more efficient with no initial water in the matrix. A possible reason is that the presence of initial water in the matrix was able to increase the initial efficiency of the surfactant imbibition; however, the increased amount of surfactant in the matrix lowered the interfacial tension between the aqueous and oleic phases; therefore, the efficiency of brine imbibition was reduced. Another possible reason is that capillary force was lower in the presence of initial water in the matrix, resulting in weaker imbibition of brine.

Although the two cases showed different characteristics of the mass transfer through fracture/matrix interface, they resulted in similar values of final water saturation in the matrix. Hence, the surfactant injection was more efficient for a given amount of oil recovery when there was no initial water in the matrix.

Producing oil from tight formations at economical rates became possible because of hydraulic fracturing and horizontal drilling. However, tight reservoirs show a rapid production-rate declination and low recovery factors (below 10%) because of the adverse petrophysical properties, such as ultra-low permeability, high total organic content (TOC), and heterogeneous mineralogy. Wettability measurements through contact angles indicate that tight formations are either intermediate- to oil-wet.

To improve oil recovery in shales, surfactant solutions have been proposed to facilitate the spontaneous imbibition of water. The oil-recovery mechanisms by these additives include wettability alteration and interfacial tension (IFT) reduction between the aqueous and oleic phases. For instance, anionic and non-ionic surfactants were able to alter the wettability of carbonate and siliceous shales from oil- to water-wet state, but anionic surfactant showed better performance as a wettability modifier. Anionic surfactants modified the wettability of siliceous shales, but non-ionic surfactants did not work for that purpose. Although IFT reduction is important, it should not reach ultra-low values ($10^{-3}$ mN/m) during injection of surfactant solution into shales.

Besides petrophysical properties, the production of water also represents a problem for oil recovery and field operations in tight formations. The water cut is 90% in part of the Permian basin and around 30% for the Eagle Ford. Since surfactants are injected as aqueous solution, the impact of surfactant injection on oil recovery from a tight formation can be affected by the phase distribution in the tight matrix.

In the case of conventional reservoirs, it is well-documented that initial water saturation ($S_{wi}$) affects the oil recovery and the spontaneous water imbibition. With Berea sandstones, the imbibition rate decreased as $S_{wi}$ increased between 0 and 6%, and then it increased between 15 to 34% of $S_{wi}$; the oil recovery by water imbibition was slightly influenced by $S_{wi}$ in the range from 0 to 30%. For Rørdal chalks, the imbibition rate increased as $S_{wi}$ increased up to 34%, and then it decreased slightly for higher water saturations; the oil recovery reduced from 67 to 30% as the $S_{wi}$ augmented from 7.5% to 51%.

With Berea sandstones, the oil recovery by countercurrent spontaneous imbibition was not significantly affected by $S_{wi}$ in the range between 0 and 20%. However, the oil recovery increased for $S_{wi}$ above 20%. The interaction among rock wettability, $S_{wi}$, aging time, and oil recovery on Berea sandstones was analyzed during spontaneous water imbibition and waterflooding. Findings indicate that, as the $S_{wi}$ decreased (as a consequence of wettability change and aging time), the imbibition rate and final oil recovery also decreased. Imbibition experiments in diatomite cores showed that oil recovery diminished as $S_{wi}$ augmented (up to 60%). Residual oil saturation was not significantly affected by $S_{wi}$ (for recovery measured in pore volume unit).

$S_{wi}$ has no observable systematic effect on oil recovery in Berea sandstones. However, oil recovery became sensitive to $S_{wi}$ when the experiments were scaled up to reservoir conditions: it increased as $S_{wi}$ increased in the range of 11 to 28%. Investigation of the effects of $S_{wi}$ on oil production by water imbibition through reservoir simulations reveals that, unlike the results in core experiments, $S_{wi}$ does not influence oil production and oil recovery. This difference was attributed to the type of displacement: it was spontaneous imbibition at core scale, whereas it was forced imbibition at the reservoir scale. Overall, the results from these investigations show that the effects of $S_{wi}$ on water imbibition are not well-understood so far.

In the case of shales and tight formations, the studies to investigate the correlation between $S_{wi}$ and water imbibition are scarce. Also, a limited amount of data of $S_{wi}$ in shales has been reported. The $S_{wi}$ is 25% for organic Barnet shale, and 20% for Horn River shale. In Otter Park and Evie gas shales, water imbibition rate decreased by the $S_{wi}$, but oil imbibition rate was not affected. Hydrophobic organic material could decrease the imbibition rate of water. In Barnett shale cores, spontaneous imbibition into shales was affected by $S_{wi}$ and mineral composition. Each shale type needs a specific study because the high heterogeneities in shales make the imbibition a complicated process. No studies have been found about the effect of the $S_{wi}$ on enhanced water imbibition by surfactant solution.

This example presents findings describing how the presence of initial water affects the oil recovery from tight matrices by the imbibition of the surfactant solution. Two cases were compared, one without initial water in the matrix, and the other with initial water in the matrix.

Methods of Experiments and Material Balance Analysis. This section presents the methods of experiments and material balance analysis for this Example. The main experimental data were obtained through two sets of flooding/soaking experiments with 1.0-wt % surfactant solution in reservoir brine at 347 K. Properties of reservoir fluids, and surfactant (2-EH-4PO-15EO) used in this study are presented in Examples 1-2, above, and are not fully duplicated here.

Experimental Procedure for Flooding/Soaking Experiments. Two horizontal flooding/soaking experiments were performed at 347 K with fractured tight carbonate cores: Case 1 with initial water in the matrix, and Case 2 without initial water in the matrix. This section describes the preparation of the tight cores and the flooding/soaking experiments. Properties of the tight carbonate cores and the injection scheme for two flooding/soaking experiments are also summarized in this section.

Figure 57:
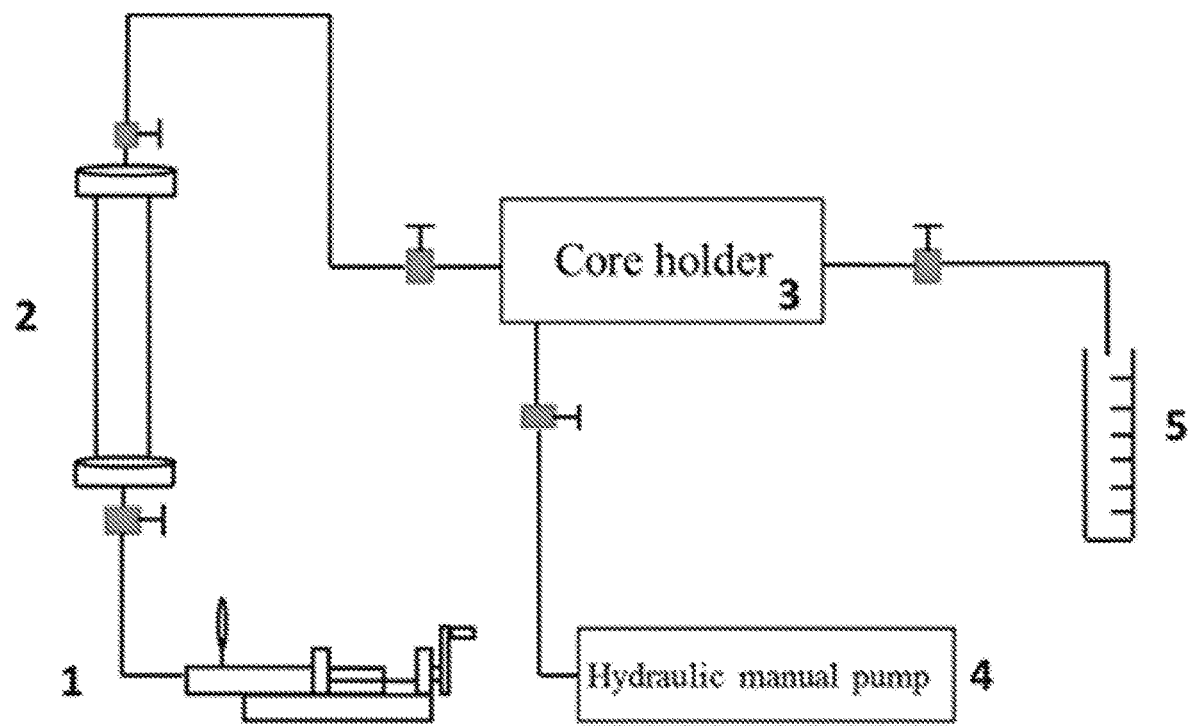
FIG. 57 provides a schematic illustration of an experimental device for brine-flooding testing.

Rocherons carbonate cores (Kocurek Industries Inc.) were used in this research. Because of their ultra-low permeability and heterogeneity, the Rocheron cores were cut into small pieces with 0.0254 m in diameter and approximately 0.0127 m in length before saturating with any fluids. In this research, 11 core pieces were saturated only by crude oil and 5 core pieces were saturated by both crude oil and reservoir brine at room temperature. To saturate core pieces by crude oil, they were placed in an accumulator, which was evacuated for at least 24 hours. Then, the crude oil was transferred into the accumulator, and the pressure inside the accumulator was set at 34474 kPa for more than 40 hours. The weights of the core pieces were measured before and after saturating by crude oil to quantify the oil volume in the cores. The volume so determined was assumed to be the accessible pore volume (PV) of the core. Oil-saturated core pieces were then placed inside a coreholder and flooded by reservoir brine under the pressure difference of 6895 kPa. FIG. 57 shows a schematic of the brine-flooding system used. It consists of an accumulator for reservoir brine, a pump, a Hassler-type core-holder, a hydraulic manual pump to maintain the overburden pressure and cylinders. Before brine injection, the inlet tubing of the coreholder was evacuated for 10 seconds to prevent injecting air into the core. The core was flooded by brine until the injected brine volume exceeded the accessible pore volume. After that, the core pieces were placed inside an accumulator, filled with crude oil at 34474 psi for 14 hours. The weights of the core pieces were measured after they were re-saturated by the crude oil. The brine and oil volumes in the core pieces were calculated by the following equations.

$$(PV - V_w)\rho_o + V_w \rho_w = M_f \quad (1)$$

$$V_o = PV - V_w \quad (2)$$

where PV is the accessible pore volume, $V_w$ is the brine volume in the core piece, $V_o$ is the oil volume in the core piece, $\rho_w$ is the reservoir brine density (1040 kg/m$^3$) at room temperature (296 K) and atmospheric pressure, $\rho_o$ is the crude oil density (817 kg/m$^3$) at room temperature (296 K) and atmospheric pressure, and $M_f$ is total fluid mass in the core piece. Then, oil and brine saturations in each core piece can be calculated. Table 19 presents the properties of the core pieces, including the length of each core piece, accessible pore volume, and oil and brine saturations. Core pieces #1-#5 in Table 19 were saturated by both brine and oil. Core pieces #6-#16 were saturated by only oil; hence, only the first step of oil saturation was done (without the brine-flooding and the oil resaturation).

TABLE 19

Properties of the core pieces. Core pieces #1-#5 were saturated by both brine and oil. Core pieces #6-#16 were saturated by only oil.

| Core piece # | Length, m | Accessible pore volume before cutting, m$^3$ | Accessible pore volume after cutting, m$^3$ | Brine saturation | Oil saturation |
|---|---|---|---|---|---|
| 1 | 0.0110 | 6.0702 × 10$^{-8}$ | 5.7527 × 10$^{-8}$ | 0.5765 | 0.4235 |
| 2 | 0.0110 | 7.0493 × 10$^{-8}$ | 6.7718 × 10$^{-8}$ | 0.0636 | 0.9364 |
| 3 | 0.0100 | 5.4339 × 10$^{-8}$ | 5.1813 × 10$^{-8}$ | 0.0660 | 0.9340 |
| 4 | 0.0100 | 5.9234 × 10$^{-8}$ | 5.5982 × 10$^{-8}$ | 0.1969 | 0.8031 |
| 5 | 0.0100 | 5.0422 × 10$^{-8}$ | 4.8560 × 10$^{-8}$ | 0.1068 | 0.8932 |
| 6 | 0.0105 | 5.4094 × 10$^{-8}$ | 5.1438 × 10$^{-8}$ | 0.0000 | 1.0000 |
| 7 | 0.0115 | 6.1926 × 10$^{-8}$ | 5.8697 × 10$^{-8}$ | 0.0000 | 1.0000 |
| 8 | 0.0105 | 5.3604 × 10$^{-8}$ | 5.1109 × 10$^{-8}$ | 0.0000 | 1.0000 |
| 9 | 0.0105 | 5.8010 × 10$^{-8}$ | 5.5751 × 10$^{-8}$ | 0.0000 | 1.0000 |
| 10 | 0.0120 | 6.9759 × 10$^{-8}$ | 6.6633 × 10$^{-8}$ | 0.0000 | 1.0000 |
| 11 | 0.0100 | 5.2870 × 10$^{-8}$ | 5.0627 × 10$^{-8}$ | 0.0000 | 1.0000 |
| 12 | 0.0100 | 5.7521 × 10$^{-8}$ | 5.5200 × 10$^{-8}$ | 0.0000 | 1.0000 |
| 13 | 0.0100 | 6.0213 × 10$^{-8}$ | 5.7539 × 10$^{-8}$ | 0.0000 | 1.0000 |
| 14 | 0.0100 | 5.1157 × 10$^{-8}$ | 4.7916 × 10$^{-8}$ | 0.0000 | 1.0000 |
| 15 | 0.0100 | 5.4094 × 10$^{-8}$ | 5.2121 × 10$^{-8}$ | 0.0000 | 1.0000 |
| 16 | 0.0110 | 5.5807 × 10$^{-8}$ | 5.1379 × 10$^{-8}$ | 0.0000 | 1.0000 |

An artificial fracture was created along the longitudinal axis using an electric saw for each core piece. Teflon spacers with 0.001 m in width were placed along two edges of the fracture to maintain a fracture aperture. Then, the core halves were carefully put together with the Teflon spacers placed in the fracture, wrapped with a Teflon tube and placed inside a horizontally-oriented core holder, with the fracture vertically-oriented. Teflon spacer was not placed in the space between core pieces. FIG. 58 shows core pieces #1-#5 were put together for Case 1 with initial water in the core, and core pieces #6-#16 were put together for Case 2 without initial water in the core. When assembling the core pieces for Case 1, core pieces were put so that oil saturation changes monotonically. Table 20 summarizes the properties of the core pieces of #1-#5 and core pieces of #6-#16. Qualitatively, the longitudinal fracture served as a propped fracture and the fractures normal to it served as unpropped fractures in terms of hydraulic paths.

TABLE 20

Properties of core pieces #1-#5 and core pieces #6-#16.

| | Core pieces #1-#5 (Case 1) | Core pieces #6-#16 (Case 2) |
|---|---|---|
| Oil volume in matrix at 347 K and atmospheric pressure, m$^3$ | $0.2351 \times 10^{-6}$ | $0.6268 \times 10^{-6}$ |
| Pressure drop along the core at 500 cm$^3$/hr, kPa | 4.0272 | 6.5845 |
| Overburden pressure, kPa | 6895 | 6205 |
| The propped fracture aperture, m | $0.8788 \times 10^{-4}$ | $0.9742 \times 10^{-4}$ |
| The propped fracture permeability, D | 652 | 801 |

FIG. 59 presents a schematic of the experimental set-up for the flooding/soaking experiment. It consisted of accumulators for crude oil, reservoir brine (RB), and surfactant solution (2-EH-4PO-15EO), a pump, a Hassler-type coreholder, a hydraulic manual pump to maintain the overburden pressure, a differential pressure gauge, cylinders, and an oven. After a fractured core was placed in the core holder, the oven temperature was increased to reservoir temperature (347 K). Then, the system was evacuated for 10 seconds to remove any air trapped in the fractures. After that, the core was flooded with crude oil to measure the fracture permeability by using the flow rate of 500 cm$^3$/hr under certain overburden pressure. Table 20 provides the pressure drops along the cores at a certain flow rate and the overburden pressures used.

The propped fracture permeabilities were calculated. The equation for flow between parallel plates $$b = (3\pi d k_e)^{\frac{1}{3}} \quad (3)$$

was used to estimate a fracture aperture, where b is the fracture aperture, d is the core diameter, and $k_e$ is the effective oil permeability of the fractured core. The fracture apertures are provided in Table 20. A fracture permeability can be calculated from the fracture aperture by the following equation:

$$k_f = b^2/12. \quad (4)$$

During flooding/soaking experiments, the RB was injected at 6 ml/hr until no more oil production was observed. Then, the surfactant solution was injected at 6 ml/hr to fill the volume from the inlet of the coreholder until the outlet line of the coreholder, which was followed by a 10-hour soaking period. After that, the surfactant solution was injected at 6 ml/hr to chase the fluid in the system and to recover the produced oil during the first soaking period. The system was then shut-in for a second 10-hour soaking period. RB was then injected at 6 ml/hr to chase the fluid in the system and to recover the produced oil during the second soaking period. Finally, the system was shut-in for a 12-hour soaking period, followed by RB injection to chase the fluid in the system until no oil production.

The effluent was collected in plastic graduating cylinders at room temperature. The 2-EH-4PO-15EO concentration in the produced aqueous phase was measured by the HPLC method. The concentration data were used to analyze the material balance for each flooding/soaking experiment.

Material Balance for a Fractured Core. The flooding/soaking experiment results were analyzed by the material balance for (pseudo)components: brine, oil, and chemical. The main focus of the analysis was on the fractional amount of the injected component (brine or chemical) that was imbibed into the matrix from the fracture.

The material balance for (pseudo)component i (i=1 for brine, 2 for oil, and 3 for chemical) for the dynamic imbibition (FIG. 60) was based on the following assumptions:

The system volume consists of two subvolumes, the fracture volume ($V_f$) and the matrix volume ($V_m$).
The fracture volume is connected to the injector (source) and the producer (sink).
The system is closed except for the injector and producer.
No chemical reaction.

For a given time interval $\Delta t$, $$\Delta M_{fi} = M_{ti} + M_{Ii} + M_{Pi} \quad (5)$$

$$\Delta M_{mi} = -M_{ti} \quad (6)$$

where $\Delta M_{fi}$ and $\Delta M_{mi}$ are the accumulation of component i in $V_f$ and $V_m$, respectively. Min is the amount of component i going into $V_f$ through the injector for $\Delta t$, $M_{Pi}$ is the amount of component i going into $V_f$ through the producer for $\Delta t$, and $M_{ti}$ is the amount of component i transferred from $V_m$ to $V_f$ through the matrix/fracture interface for $\Delta t$.

When this material balance is applied to a time interval $\Delta t$, during which flow in $V_f$ is a (pseudo) steady state, $\Delta M_{fi}$ are zero for all i. Then, $M_{ti}$ can be calculated from $M_{Ii}$ and $M_{Pi}$, which are measurable. How much of the injected amount is actually imbibed into $V_m$ is quantified by the imbibed fraction for component i ($F_i$). $F_i$ is defined for $\Delta t$ as $$F_i = -M_{ti}/M_{Ii} \quad (7)$$

for i=1 and 3. This imbibed fraction is an "apparent" value because $M_{ti}$ is the net amount of mass transfer from $V_m$ to $V_f$, as the gross amounts of mass transfer between $V_m$ and $V_f$ for $\Delta t$ are unknown in general. $F_i$ for surfactant was easy to obtain based on the surfactant amount in the produced aqueous phase measured by the HPLC method.

Experimental Results and Material Balance Analysis. This section presents the main results of the flooding/soaking experiments with the 2-EH-4PO-15EO solutions for the two cases. Case 1 was the flooding/soaking experiment with initial water in the core, and Case 2 without initial water in the core. The material balance analysis was used to interpret the results.

Table 21 shows the cumulative improved oil recovery factors by surfactant injection and chase RB injection for Case 1, which were calculated by using the original oil amount in the matrix (OOIM). The incremental oil recovery was 33.48% OOIM after the 1$^{st}$ soaking period, 29.55% OOIM after the 2$^{nd}$ soaking period, and 13.09% OOIM after the 3$^{rd}$ soaking period. The total improved oil recovery was 76.11% OOIM. It is clear that surfactant increased oil recovery beyond what the RB injection could recover.

TABLE 21

Experimental results and material balance analysis for Case 1 (with initial water in the matrix). Fi is defined in Equation 7. SW stands for water saturation.

| | Cumulative improved oil recovery factor by surfactant solution | $F_1$ | $F_3$ | Sw |
|---|---|---|---|---|
| After the 1st soaking period | 0.3348 | 0.0180 | 0.4961 | 0.4658 |
| After the 2nd soaking period | 0.6303 | 0.0175 | 0.2131 | 0.7031 |
| After the 3rd soaking period | 0.7611 | 0.0061 | | 0.8082 |

Table 22 presents the cumulative improved oil recovery factors by surfactant injection and chase RB injection for Case 2. During the surfactant injection before the $1^{st}$ soaking period, the injected volume exceeded the volume between the inlet and the outlet line of the coreholder by $0.67 \times 10^{-6}$ m$^3$. Similarly, during the chase RB injection after the $2^{nd}$ soaking period, the injected volume exceeded by $0.57 \times 10^{-6}$ m$^3$. These additional injected volumes and the oil recovery associated with them were considered for the subsequent soaking period for oil recovery calculation and mass balance calculation. The incremental oil recovery was 35.55% OOIM after the 1st soaking period, 30.92% OOIM after the $2^{nd}$ soaking period, and 11.95% OOIM after the $3^{rd}$ soaking period. The total improved oil recovery was 78.42% OOIM. The improved oil recovery factors of Case 1 and Case 2 were similar to each other, assuming that the effect of the additional injection that occurred for Case 2 was insignificant.

TABLE 22

Experimental results and material balance analysis for Case 2 (without initial water in the matrix). Fi is defined in Equation 7. SW stands for water saturation.

| | Cumulative improved oil recovery Factor by surfactant solution | $F_1$ | $F_3$ | Sw |
|---|---|---|---|---|
| After the 1st soaking period | 0.3555 | 0.0451 | 0.4213 | 0.3555 |
| After the 2nd soaking period | 0.6647 | 0.0454 | 0.2492 | 0.6647 |
| After the 3rd soaking period | 0.7842 | 0.0117 | | 0.7842 |

Figure 61A:
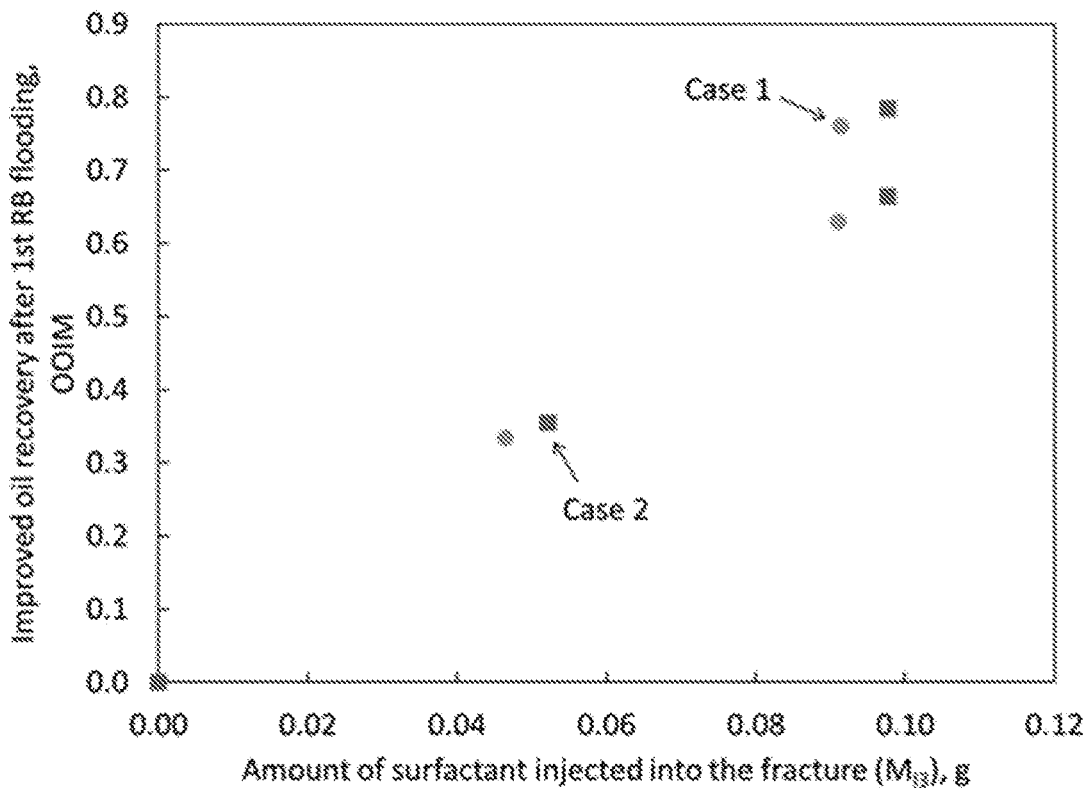
FIG. 61A provides plots showing improved oil recovery with respect to the amount of surfactant injected during coreflooding tests.
Figure 61B:
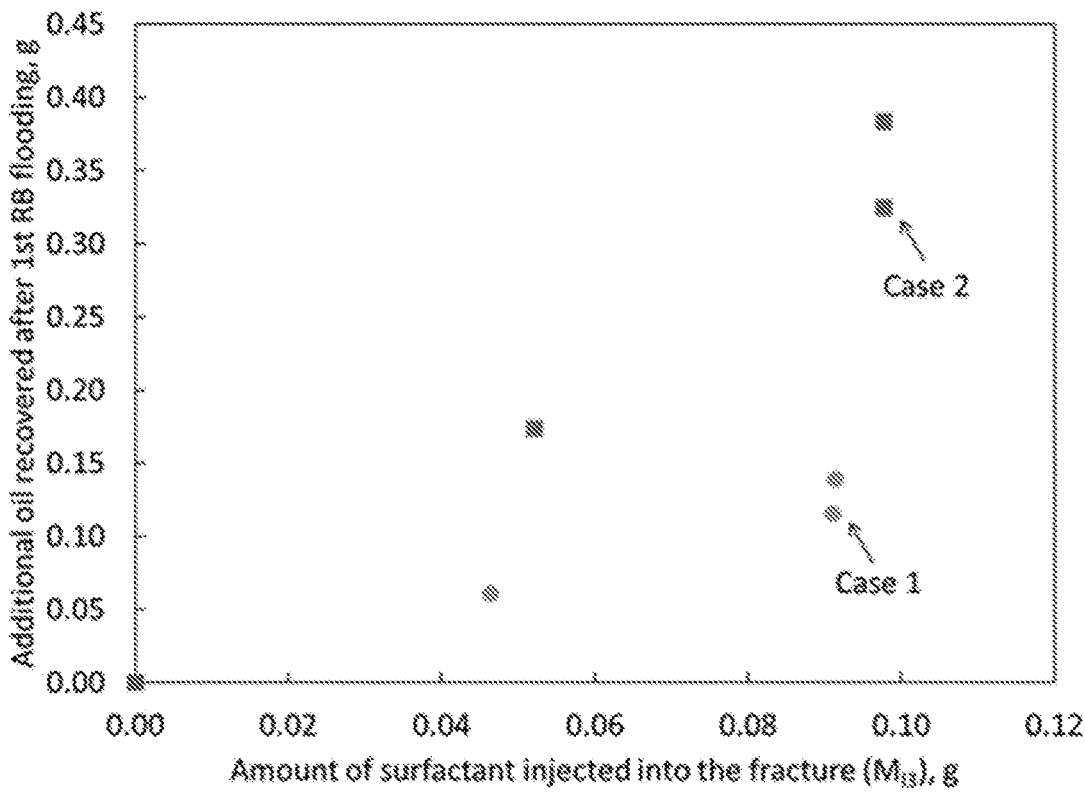
FIG. 61B provides plots showing improved oil recovery with respect to the amount of surfactant injected during coreflooding tests.

FIG. 61A shows the improved oil recovery factors with respect to $M_{f3}$ for both cases. $M_{f3}$ was calculated on a cumulative basis, for which the time interval ($\Delta t$) started at the beginning of the surfactant solution injection. $M_{f3}$ for Case 2 was higher, because there was the additional injected volume of surfactant solution ($0.67 \times 10^{-6}$ m$^3$) before the $1^{st}$ soaking period as previously mentioned. FIG. 61B shows that the use of the surfactant was more efficient for a given amount of oil recovery with no initial water in the matrix. Also, the vertical increase in oil recovery in FIG. 61A and FIG. 61B indicates that the imbibition of brine continued during the soaking period after the chase RB injection.

Tables 21 and 22 also provide the $F_1$ and $F_3$ values from the material balance for both cases. The calculation of $F_1$ was done separately for each soaking period. For Case 1, $F_3$ was 0.4961 after the $1^{st}$ soaking period, and 0.2131 after the $2^{nd}$ soaking period. For Case 2, $F_3$ was 0.4213 after the 1st soaking period, and 0.2492 after the $2^{nd}$ soaking period. The efficiency of the surfactant imbibition into the matrix decreased after each soaking period for both cases. $F_3$ values of Case 2 were slightly lower than that of Case 1 after the $1^{st}$ soaking period, indicating the initial efficiency of the surfactant imbibition increased when brine was initially present in the matrix.

For Case 1, $F_1$ was 0.0180 after the 1st soaking period, 0.0175 after the $2^{nd}$ soaking period, and 0.0061 after the $3^{rd}$ soaking period. For Case 2, $F_1$ was 0.0451 after the 1st soaking period, 0.0454 after the $2^{nd}$ soaking period, and 0.0117 after the $3^{rd}$ soaking period. These results confirmed that the imbibition of brine continued after the surfactant injection was terminated. Also, $F_1$ values of Case 1 were systematically lower than those of Case 2. The imbibition of RB was more efficient when there was no initial water in the matrix. A possible reason is that the presence of initial water in the matrix increased the initial efficiency of the surfactant imbibition, resulting in higher surfactant concentration in the matrix. However, the efficiency of RB imbibition was decreased when the IFT between the oleic and aqueous phases was reduced by the larger amount of surfactant imbibed into the matrix. Another possible reason is that capillary force was decreased because of the presence of initial water in the matrix, resulting in weaker RB imbibition. The water saturation results given in Tables 21 and 22 indicate that the two cases reached similar values of final water saturation; that is, the surfactant injection for a given amount of oil recovery was more efficient for Case 2 as shown in FIG. 61B.

Conclusions. The main objective of this research was to evaluate how the presence of initial water affects the oil recovery from tight matrices by the imbibition of surfactant solution. Two flooding/soaking experiments with 1.0-wt % non-ionic surfactant solution were performed with/without initial water in the matrix. Experimental results were analyzed by the material balance for components: oil, brine, and surfactant. The analysis enabled us to quantitatively evaluate the imbibed fraction of the components injected (brine and chemical). The main conclusions are as follows:

The surfactant enhanced the brine imbibition into the matrix through wettability alteration. It increased oil recovery beyond what the RB injection could recover.

The initial efficiency of the surfactant imbibition increased when brine was initially present in the matrix. For example, $F_3$ after the $1^{st}$ soaking period was 0.4961 for Case 1 and 0.4213 for Case 2.

RB imbibition was more efficient with no initial water in the matrix. A possible reason is that the presence of initial water in the matrix was able to increase the initial efficiency of the surfactant imbibition; however, the increased amount of surfactant in the matrix lowered the interfacial tension between the aqueous and oleic phases; therefore, the efficiency of RB imbibition was reduced. Another possible reason is that capillary force was lower in the presence of initial water in the matrix, resulting in weaker imbibition of brine.

The two cases (with/without initial water in the matrix) showed different characteristics of the mass transfer through fracture/matrix interface. However, they resulted in similar values of final water saturation. That is, the surfactant injection was more efficient for a given amount of oil recovery when there was no initial water in the matrix.

Nomenclature for Example 5.

Roman Symbols
  b fracture aperture
  d core diameter
  F apparent imbibed fraction k permeability
M mass
S saturation
t duration
V volume
Greek Symbols
  ρ density
Subscripts
  e effective
  i index for pseudo component
  I injected
  f fracture
  m matrix
  oleic phase
  P produced
  t transfer
  w aqueous phase
Abbreviations
  EH ethyhexanol
  EO ethylene oxide
  IFT interfacial tension
  OOIM original oil volume in matrix
  PO propylene oxide
  PV pore volume
  RB reservoir brine
  TOC total organic content
  HPLC high performance liquid chromatography Figure Captions for Example 5. FIG. 57. Schematic of the brine-flooding system.

Figure 58A:
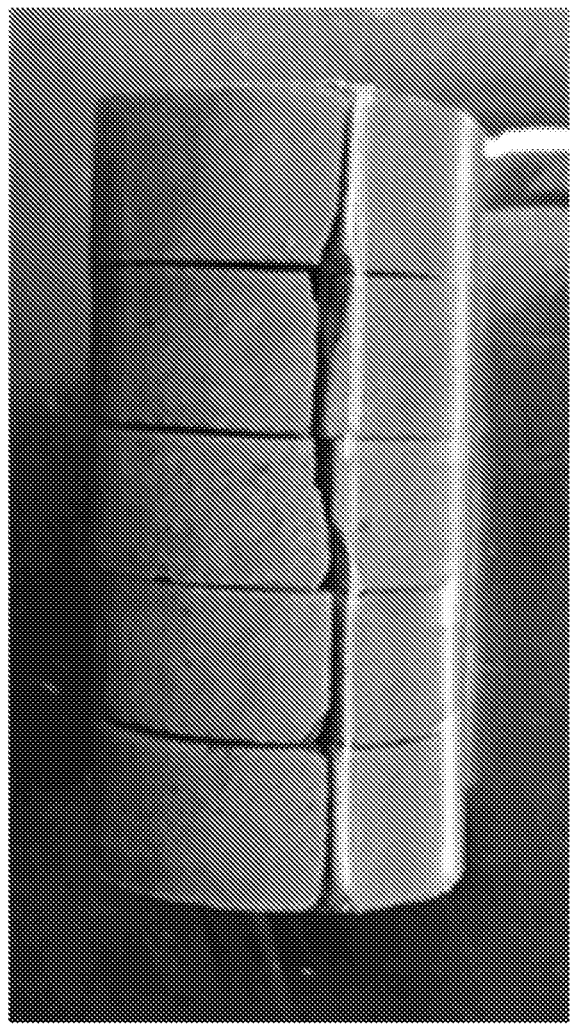
FIG. 58A provides a photograph of assembled cores for flooding/soaking tests.
Figure 58B:
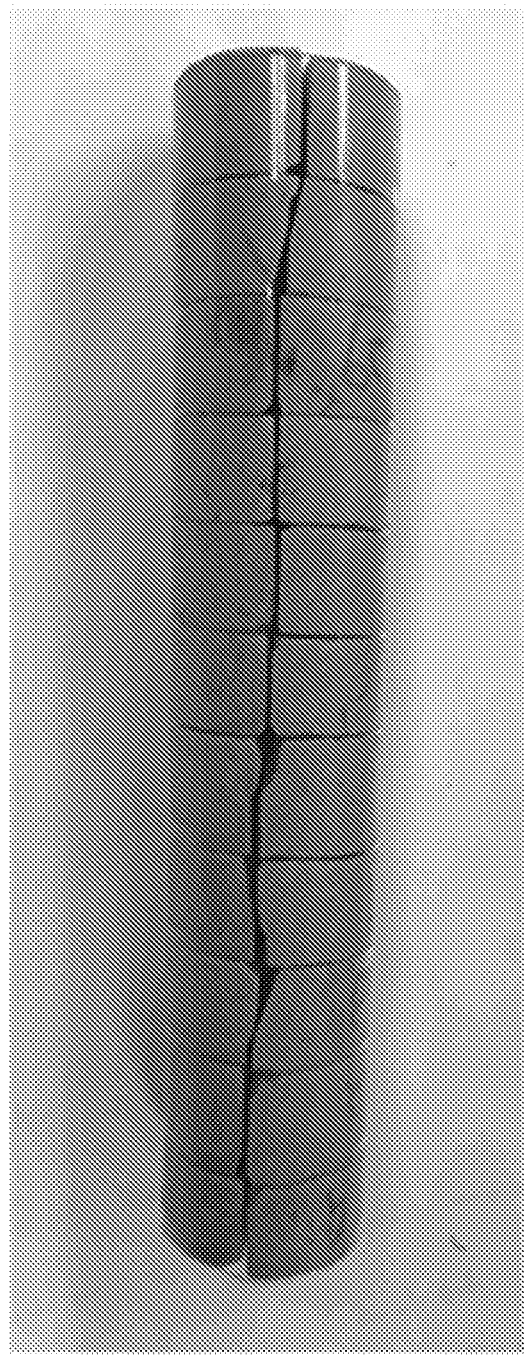
FIG. 58B provides a photograph of assembled cores for flooding/soaking tests.

FIG. 58A and FIG. 58B. Assembled cores for two flooding/soaking experiments. (a) Core pieces #1-#5 were put together for the case with initial water in the matrix (Case 1). (b) Core pieces #6-#16 were put together for the case without initial water in the matrix (Case 2).

FIG. 59. Schematic of the experimental set up for flooding/soaking experiments.

Figure 60:
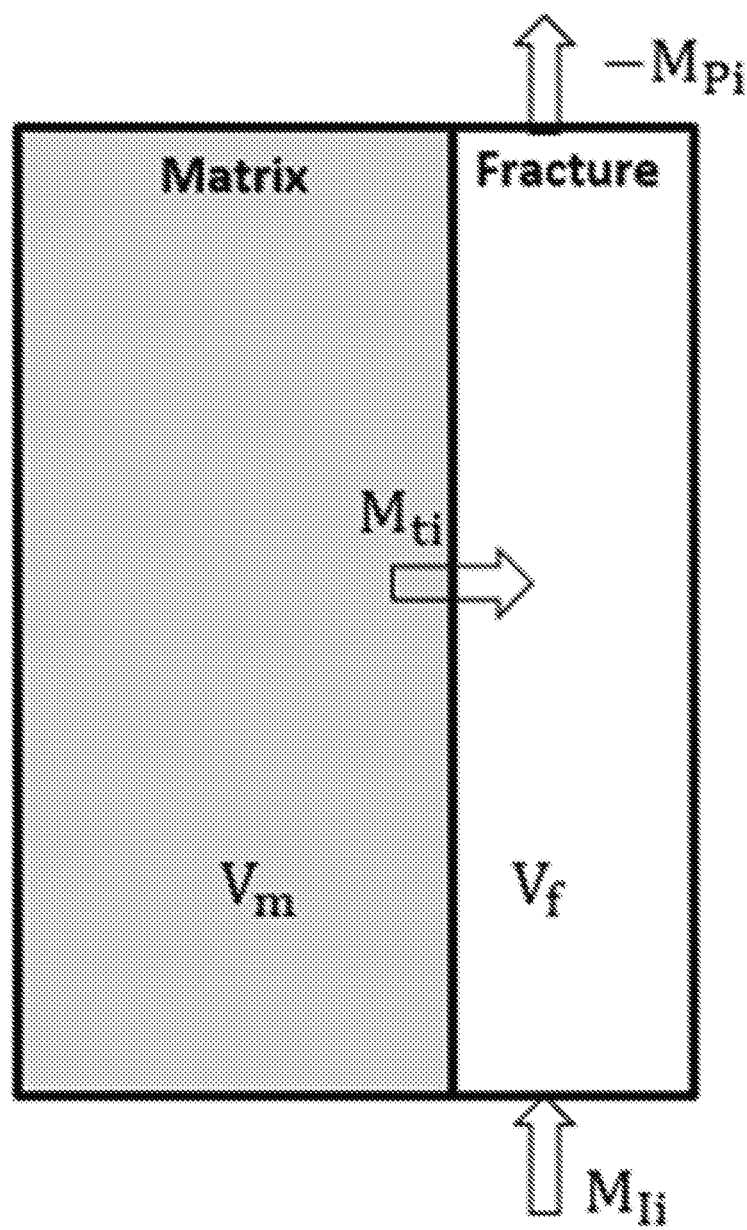
FIG. 60 provides a schematic illustration of flooding/soaking testing.

FIG. 60. Schematic of the flooding/soaking experiment. The system consists of two subvolumes, the fracture and matrix volumes. The fracture volume is connected to the injector (source) and the producer (sink).

FIG. 61A and FIG. 61B. Oil recovery with respect to the amount of surfactant injected into the fracture for Case 1 and 2; (a) oil recovery factor with respect to original oil in the matrix (OOIM), (b) oil recovery in gram.

REFERENCES

Adibhatla, B.; Mohanty, K. K. Parametric Analysis of Surfactant-Aided Imbibition in Fractured Carbonates. J. Colloid Interface Sci. 2008, 317 (02), 513-522.

Akin, S., Schembre, J. M., Bhat, S. K., and Kovscek, A. R. 2000. Spontaneous Imbibition Characteristics of Diatomite. Journal of Petroleum Science and Engineering 25: 149-165.

Alfarge, D., Wei, M., & Bai, B. 2017. IOR Methods in Unconventional Reservoirs of North America: Comprehensive Review. Presented at SPE Western Regional Meeting, Bakersfield, California, USA, 23-27 Apr. 2017.

Alfarge, D., Alsaba, M., Wei, M., & Bai, B. 2018. Miscible Gases Based EOR in Unconventional Liquids Rich Reservoirs: What We Can Learn. Presented at SPE International Heavy Oil Conference and Exhibition, Kuwait City, Kuwait, 10-12 Dec. 2018.

Alfarge, D.; Wei, M.; Bai, B. IOR Methods in Unconventional Reservoirs of North America: Comprehensive Review. Proceedings of the SPE Western Regional Meeting; Bakersfield, CA, Apr. 23-27, 2017; SPE-185640-MS, DOI: 10.2118/185640-MS.

Alharthy, N., Teklu, T., Kazemi, H., Graves, R., Hawthorne, S., Braunberger, J., & Kurtoglu, B. 2015. Enhanced Oil Recovery in Liquid-Rich Shale Reservoirs: Laboratory to Field. Presented at SPE annual technical conference and exhibition, Houston, Texas, USA, 28-30 Sep. 2015.

Alvarez, J. O., Neog, A., Jais, A., & Schechter, D. S. 2014. Impact of Surfactants for Wettability Alteration in Stimulation Fluids and the Potential for Surfactant EOR in Unconventional Liquid Reservoirs. Presented at SPE Unconventional Resources Conference, The Woodlands, Texas, USA, 1-3 Apr. 2014.

Alvarez, J. O., & Schechter, D. S. 2016. Wettability, Oil and Rock Characterization of the Most Important Unconventional Liquid Reservoirs in the United States and the Impact on Oil Recovery. Presented at Unconventional Resources Technology Conference, San Antonio, Texas, USA, 1-3 August. 2016.

Alvarez, J. O., & Schechter, D. S. 2017. Wettability Alteration and Spontaneous Imbibition in Unconventional Liquid Reservoirs by Surfactant Additives. SPE Reservoir Evaluation & Engineering, 20(01): 107-117.

Alvarez, J. O., Tovar, F. D., & Schechter, D. S. 2018a. Improving Oil Recovery in the Wolfcamp Reservoir by Soaking/Flowback Production Schedule With Surfactant Additives. SPE Reservoir Evaluation & Engineering, 21(04): 1-083.

Alvarez, J. O., Saputra, I. W. R., & Schechter, D. S. 2018b. The Impact of Surfactant Imbibition and Adsorption for Improving Oil Recovery in the Wolfcamp and Eagle Ford Reservoirs. SPE Journal, 23(06): 2103-2117.

Anderson, W. G. 1986a. Wettability Literature Survey—Part 1: Rock/Oil/Brine Interactions and the Effects of Core Handling on Wettability. Journal of Petroleum Technology 38(10): 1125-1144.

Anderson, W. G. 1986b. Wettability Literature Survey—Part 2: Wettability Measurement. Journal of Petroleum Technology 38(11): 1246-1262.

Baek, K.; Argüelles-Vivas, F. J.; Abeykoon, G. A.; Okuno, R.; Weerasooriya, U. P. Application of Ultra-Short Hydrophobe Surfactants with Cosolvent Characters for Heavy Oil Recovery. Energy Fuels 2019, 33 (9), 8241-8249.

Barba, R. E. 2015. Liquids Rich Organic Shale Recovery Factor Application. Presented at SPE Annual Technical Conference and Exhibition, Houston, Texas, USA, 28-30 Sep. 2015.

Barnes et al., U.S. Patent Application Publication No. US 2012/0160487, Jun. 28, 2012.

Bernard, U.S. Pat. No. 3,163,213, Dec. 29, 1964.

Bowker, K. A. 2003. Recent developments of the Barnett shale play. Fort Worth Basin: West Texas Geological Society Bulletin 42(6): 4-11.

Buckley, J. S.; Liu, Y.; Monsterleet, S. Mechanisms of Wetting Alteration by Crude Oils. SPE J. 1998, 3 (01), 54-61.

Champagne et al., U.S. Patent Application Publication No. US 2014/0284057, Sep. 25, 2014.

Chahardowli, M.; Farajzadeh, R.; Masalmeh, S. K.; Mahani, H.; Bruining, H. A Novel Enhanced Oil Recovery Technology Using Dimethyl Ether/Brine: Spontaneous Imbibition in Sandstone and Carbonate Rocks. Proceedings of the SPE Annual Technical Conference and Exhibition; Dubai, United Arab Emirates, Sep. 26-28, 2016; SPE-181340-MS, DOI: 10.2118/181340-MS.

Chahardowli, M.; Zholdybayeva, A.; Farajzadeh, R.; Bruining, H. Solvent-Enhanced Spontaneous Imbibition in Fractured Reservoirs. Proceedings of the EAGE Annual Conference & Exhibition Incorporating SPE Europec; London, U.K., Jun. 10-13, 2013; SPE-164908-MS, DOI: 10.2118/164908-MS.

Chen, C., Balhoff, M. T., & Mohanty, K. K. 2014. Effect of Reservoir Heterogeneity on Primary Recovery and CO2 Huff'n'Puff Recovery in Shale-Oil Reservoirs. SPE Reservoir Evaluation & Engineering, 17(03): 404-413.

Cil, M., Reis, J. C., Miller, M. A., and Misra, D. 1998. An Examination of Countercurrent Capillary Imbibition Recovery from Single Matrix Blocks and Recovery Predictions by Analytical Matrix/fracture Transfer Functions. Presented at the SPE Annual Technical Conference and Exhibition, New Orleans, Louisiana, USA, 27-30 September SPE-49005-MS.

Clark, A. J. 2009. Determination of Recovery Factor in the Bakken Formation, Mountrail County, ND Presented at SPE Annual Technical Conference and Exhibition, New Orleans, Louisiana, USA, 4-7 Oct. 2009.

Cobb, U.S. Pat. No. 7,559,372, Jul. 14, 2009.

Cronin, M., Emami-Meybodi, H., & Johns, R. T. 2018. Diffusion-Dominated Proxy Model for Solvent Injection in Ultratight Oil Reservoirs. SPE Journal.

Csazar, U.S. Pat. No. 3,163,214, Dec. 29, 1964.

Curtis, M. E., Sondergeld, C. H., Ambrose, R. J., & Rai, C. S. 2012. Microstructural Investigation of Gas Shales in Two and Three Dimensions Using Nanometer-Scale Resolution Imaging Microstructure of Gas Shales. AAPG Bulletin, 96(4): 665-677.

Danner, R. P., & Daubert, T. E. 1985. Data Compilation Tables of Properties of Pure Compounds. AIChE.

Dawson, U.S. Patent Application Publication No. US 2015/0167437, Jun. 18, 2015.

DOE, 2009. Modern Shale Gas Development in the United States: A Primer. U.S. Department of Energy.

Dwarakanath et al., PCT International Application Publication No. WO 2017/040903, Mar. 9, 2017.

Gamadi, T. D., Sheng, J. J., & Soliman, M. Y. 2013. An Experimental Study of Cyclic Gas Injection to Improve Shale Oil Recovery. Presented at SPE annual technical conference and exhibition, New Orleans, Louisiana, USA, 30 Sep.-2 Oct. 2013.

Gao, Z., and Hu, Q. 2016. Initial water saturation and imbibition fluid affect spontaneous imbibition into Barnett shale samples. Journal of Natural Gas Science and Engineering 34: 541-551.

Ghanbari, E., and Dehghanpour, H. 2015. Impact of rock fabric on water imbibition and salt diffusion in gas shales. International Journal of Coal Geology 138: 55-67.

Gupta, R.; Mohanty, K. K. Temperature Effects on Surfactant-Aided Imbibition into Fractured Carbonates. SPE J. 2010, 15 (03), 588-597.

Hawthorne, S. B., Gorecki, C. D., Sorensen, J. A., Steadman, E. N., Harju, J. A., & Melzer, S. 2013. Hydrocarbon Mobilization Mechanisms From Upper, Middle, and Lower Bakken Reservoir Rocks Exposed to CO2. Presented at SPE Unconventional Resources Conference Canada, Calgary, Alberta, Canada, 5-7 Nov. 2013.

Hoffman, B. T. 2018. Huff-N-Puff Gas Injection Pilot Projects in the Eagle Ford. Presented at SPE Canada Unconventional Resources Conference, Calgary, Alberta, Canada, 13-14 Mar. 2018.

Hurley, U.S. Pat. No. 9,412,023, Aug. 9, 2016.

Huron, M. J., & Vidal, J. 1979. New Mixing Rules in Simple Equations of State for Representing Vapour-Liquid Equilibria of Strongly Non-Ideal Mixtures. Fluid Phase Equilibria, 3(4): 255-271.

Kalpakci et al., U.S. Pat. No. 4,979,564, Dec. 25, 1990.

Kathel, P., & Mohanty, K. K. 2013. Wettability Alteration in a Tight Oil Reservoir. Energy & Fuels, 27(11): 6460-6468.

Kontogeorgis, G. M., & Folas, G. K. 2009. Thermodynamic Models for Industrial Applications: From Classical and Advanced Mixing Rules to Association Theories. John Wiley & Sons.

Lake, L. W.; Johns, R. T.; Rossen, W. R.; Pope, G. A. Fundamentals of Enhanced Oil Recovery; Society of Petroleum Engineers: Richardson, TX, 2014.

Lashgari, H. R., Sun, A., Zhang, T., Pope, G. A., & Lake, L. W. 2018. Evaluation of Carbon Dioxide Storage and Miscible Gas EOR in Shale Oil Reservoirs. Fuel.

Leverett, M. C. Capillary Behavior in Porous Solids. Trans. Soc. Pet. Eng. 1941, 142 (01), 152-169.

Li, K., and Li, Y. 2014. Effect of initial water saturation on crude oil recovery and water cut in water-wet reservoirs. International Journal of Energy Research 38: 1599-1607.

Li, K., Chow, K., and Horne R. N. 2006. Influence of Initial Water Saturation on Recovery by Spontaneous Imbibition in Gas/Water/Rock Systems and the Calculation of Relative Permeability. SPE Reservoir Evaluation & Engineering 9(04): 295-301.

Liang, T. 2016. Water Block from Hydraulic Fracturing in Low Permeability Rocks: Experimental Studies on Causes and Potential Mitigation Methods (Doctoral dissertation).

Liang, T., Longoria, R. A., Lu, J., Nguyen, Q. P., & DiCarlo, D. A. 2017. Enhancing Hydrocarbon Permeability after Hydraulic Fracturing: Laboratory Evaluations of Shut-ins and Surfactant Additives. SPE Journal, 22(04): 1-011.

Liu, J.; Sheng, J. J.; Wang, X.; Ge, H.; Yao, E. Experimental Study of Wettability Alteration and Spontaneous Imbibition in Chinese Shale Oil Reservoirs Using Anionic and Nonionic Surfactants. J. Pet. Sci. Eng. 2019, 175, 624-633.

Lu, Najafabadi, and Firoozabadi, 2019, Effect of Low-Concentration of 1-Pentanol on the Wettability of Petroleum Fluid-Brine-Rock Systems; Langmuir; DOI: 10.1021/acs.langmuir.9b00099; Mar. 1, 2019.

Lu, J.; Britton, C.; Solairaj, S.; Liyanage, P. J.; Kim, D. H.; Adkins, S.; Pinnawala Arachchilage, G. W.; Weerasooriya, U.; Pope, G. A. Novel Large-Hydrophobe Alkoxy Carboxylate Surfactants for Enhanced Oil Recovery. SPE J. 2014, 19 (06), 1024-1034.

Lu, Y.; Najafabadi, N. F.; Firoozabadi, A. Effect of Low-Concentration of 1-Pentanol on the Wettability of Petroleum Fluid-Brine-Rock Systems. Langmuir 2019, 35 (12), 4263-4269.

Ma, S. Morrow, N. R. and Zhang, X. 1995. Generalized Scaling of Spontaneous Imbibition Data for Strongly Water-Wet Systems. Paper presented at the 6th Petroleum Conference of the South Saskatchewan Section, the Petroleum Society of CIM, Regina, Saskatchewan, Canada, 16-18 Oct. 1995.

Mason, G.; Morrow, N. R. Developments in Spontaneous Imbibition and Possibilities for Future Work. J. Pet. Sci. Eng. 2013, 110, 268-293.

Mejia, M. Experimental Investigation of Surfactant Flooding in Fractured Limestones. M. S. Thesis, The University of Texas at Austin, Austin, TX, December 2018.

Miller et al., U.S. Pat. No. 9,845,669, Dec. 19, 2017.

Mirzaei, M., DiCarlo, D. A., Pope, G. A. 2016. Visualization and Analysis of Surfactant Imbibition Into Oil-Wet Fractured Cores. SPE Journal. 21(01): 101-111.

Mobilia, M., Lieskovsky, J., Yan, R. 2016. Initial Production Rates in Tight Oil Formations Continue to Rise. EIA.

Morsy, S., Sheng, J. J., and Soliman, M. Y. 2013. Waterflooding in the Eagle Ford Shale Formation: Experimental and Simulation Study. Presented at SPE Unconventional Resources Conference and Exhibition-Asia Pacific, Brisbane, Australia, 11-13 November SPE-167056-MS.

Mullen, J. 2010. Petrophysical Characterization of the Eagle Ford Shale in South Texas. Presented at Canadian Unconventional Resources and International Petroleum Conference, Calgary, Alberta, Canada, 19-21 Oct. 2010.

Nelson, P. H. 2009. Pore-Throat Sizes in Sandstones, Tight Sandstones, and Shales. AAPG bulletin, 93(3): 329-340.

Nguyen, D., Wang, D., Oladapo, A., Zhang, J., Sickorez, J., Butler, R., & Mueller, B. 2014. Evaluation of Surfactants for Oil Recovery Potential in Shale Reservoirs. Presented at SPE Improved Oil Recovery Symposium, Tulsa, Oklahoma, USA, 12-16 Apr. 2014.

Pettit, J., Tavallali, M., and Muirhead, M. 2016. Permian Basin technical issues: (Part 1) How to manage water cut. HIS Markit.

Rassenfoss, S. 2018. Rising Tide of Produced Water Could Pinch Permian Growth. Journal of Petroleum Technology.

Sanchez-Rivera, D., Mohanty, K., & Balhoff, M. 2015. Reservoir Simulation and Optimization of Huff-and-Puff Operations in the Bakken Shale. Fuel, 147: 82-94.

Savins et al., U.S. Pat. No. 4,042,030, Aug. 16, 1977.

Schechter, D. S., Zhou, D., & Orr, Jr. F. M. 1994. Low IFT Drainage and Imbibition. Petroleum Science & Engineering. 11: 283-300.

Sharma, G., & Mohanty, K. 2013. Wettability Alteration in High-Temperature and High-Salinity Carbonate Reservoirs. SPE Journal. Vol 18(4): 646-655. SPE-147306-PA.

Sharma, S., & Sheng, J. J. 2017. A Comparative Study of Huff-n-Puff Gas and Solvent Injection in a Shale Gas Condensate Core. Journal of Natural Gas Science and Engineering, 38: 549-565.

Shen, Y., Pang, Y., Shen, Z., Tian, Y., and Ge, H. 2018. Multiparameter Analysis of Gas Transport Phenomena in Shale Gas Reservoirs: Apparent Permeability Characterization. Scientific Reports 8, 2601.

Shpakoff et al., U.S. Patent Application Publication No. US 2004/0177958, Sep. 16, 2004.

Shuler, P. J.; Tang, H.; Lu, Z.; Tang, Y. Chemical Process for Improved Oil Recovery from Bakken Shale. Proceedings of the Canadian Unconventional Resources Conference; Calgary, Alberta, Canada, Nov. 15-17, 2011; SPE-147531-MS, DOI: 10.2118/147531-MS.

Siriwardane, H., Gondle, R., Bromhal, G. 2016. Extent of Hydraulic Fractures in Shales. NETL Technical Report Series; U.S. Department of Energy, National Energy Technology Laboratory: Morgantown, W V, 2016; p 55.

Stephenson, R. M. 1992. Mutual Solubilities: Water-Ketones, Water-Ethers, and Water-Gasoline-Alcohols. Journal of Chemical and Engineering Data, 37(1): 80-95.

Swanson, C. et al. 2018. Post-Frac-Hit Mitigation and Well Remediation of Woodford Horizontal Wells with Solvent/ Surfactant Chemistry Blend. Presented at SPE/AAPG/ SEG Unconventional Resources Technology Conference, 23-25 Jul. 2018, Houston, Texas, USA Todd, H. B., & Evans, J. G. 2016. Improved Oil Recovery IOR Pilot Projects in the Bakken Formation. Presented at SPE Low Perm Symposium, Denver, Colorado, USA, 5-6 May 2016.

Tong, Z., Xie, X., and Morrow, N. R. 2001. Scaling of Viscosity Ratio for Oil Recovery by Imbibition from Mixed-Wet Rocks. Paper SCA 2001-21, proceedings of the International Symposium of the Society of Core Analysis, Edinburgh, UK, 17-19 Sep. 2001.

Tovar, F. D., Barrufet, M. A. and Schechter, D. S. 2018. Gas Injection for EOR in Organic Rich Shale. Part 1: Operational Philosophy. Presented at the SPE Improved Oil Recovery Conference, Tulsa, Oklahoma, USA, 14-18 Apr. 2018.

Viksund, B. G., Morrow, N. R., Ma, S., Wang, W., and Graue, A. 1998. Initial water saturation and oil recovery from chalk and sandstone by spontaneous imbibition. Paper SCA-9814, proceedings of the International Symposium of the Society of Core Analysts, the Hague, Netherlands, 14-16 Sep. 1998.

Wan, T., Sheng, J. J., & Soliman, M. Y. 2013. Evaluate EOR Potential in Fractured Shale Oil Reservoirs by Cyclic Gas Injection. Presented at Unconventional Resources Technology Conference, Denver, Colorado, USA, 12-14 Aug. 2013.

Wang, D., Butler, R., Zhang, J., & Seright, R. 2012. Wettability Survey in Bakken Shale with Surfactant-Formulation Imbibition. SPE Reservoir Evaluation & Engineering, 15(06): 695-705.

Wang, D., Zhang, J., Butler, R., & Olatunji, K. 2015. Scaling Laboratory Data Surfactant Imbibition Rates to the Field in Fractured Shale Formations. In Unconventional Resources Technology Conference, San Antonio, Texas, 20-22 Jul. 2015.

Wang, M.; Abeykoon, G. A.; Argüelles-Vivas, F. J.; Okuno, R. Ketone Solvent as a Wettability Modifier for Improved Oil Recovery from Oil-Wet Porous Media. Fuel 2019, 258, 116195.

Wang, L., Tian, Y., Yu, X., Wang, C., Yao, B., Wang, S., Winterfeld, P. H., Wang, X., Yang, Z., Wang, Y., Cui, J., Wu. Y. 2017. Advances in Improved/Enhanced Oil Recovery Technologies for Tight and Shale Reservoirs. *Fuel* 210: 425-445

Wang, M., Baek, K., Abeykoon, G. A., Argüelles-Vivas, F. J., and Okuno, R. 2019b. Comparative Study of Ketone and Surfactant for Enhancement of Water Imbibition in Fractured Porous Media. Accepted December 2019 for publication in *Energy & Fuels.*

Wang, M., Baek, K., Abeykoon, G. A., Argüelles-Vivas, F. J. Okuno, R. 2019. Oxygenated Solvent as a Novel Additive for Improved Oil Recovery in Tight Oil Reservoirs. Presented at SPE Annual Technical Conference and Exhibition, Calgary, Alberta, Canada, 30 Sep.-2 Oct. 2019. SPE-195871-MS.

Yan, R., Lieskovsky, J. and Gorgen, S. 2014. New Eagle Ford Wells Continue to Show Higher Production. EIA.

Yousef A., Al-Saleh, S., Al-Kaabi, A., & Al-Jawfi, M. 2011. Laboratory investigation of the impact of Injection-Water Salinity and Ionic Content on Oil Recovery From Carbonate Reservoirs. SPE reservoir Evaluation & Engineering. Vol 14(5): 548-593. SPE-137634-PA.

Yu, W., Lashgari, H. R., Wu, K., & Sepehrnoori, K. 2015. CO2 Injection for Enhanced Oil Recovery in Bakken Tight Oil Reservoirs. Fuel, 159: 354-363.

Zeng, T.; Miller, C. S.; Mohanty, K. K. Application of Surfactants in Shale Chemical EOR at High Temperatures. Proceedings of the SPE Improved Oil Recovery Conference; Tulsa, OK, Apr. 14-18, 2018; SPE-190318-MS, DOI: 10.2118/190318-MS.

Zhou, D. and Stenby, E. H. 1989. Immiscible Displacement in a Porous Medium Simulated by a Statistical Model. In:

Buller et al. (Editors), North Sea Oil and Gas Reservoirs—II. Graham and Tortman, London, UK, pp. 271-280.

Zhang, J., Kamenov, A., Zhu, D., and Hill, A. D. 2015. Development of new testing procedures to measure propped fracture conductivity considering water damage in clay-rich shale reservoirs: An example of the Barnett Shale. Journal of Petroleum Science and Engineering 135:352-359.

Zhou, X., Morrow, N. R., and Ma, S. 2000. Interrelationship of wettability, initial water saturation, aging time, and oil recovery by spontaneous imbibition and waterflooding. SPE Journal 5(2): 199-207. SPE-62507-PA.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of producing hydrocarbons from a subterranean formation, the method comprising:
    developing a model for the subterranean formation, wherein the model uses ketone aqueous- and oil-phase partitioning characteristics, and wherein the subterranean formation comprises a shale formation or a carbonate formation;
    using the model to determine injection characteristics for injecting a fluid comprising one or more ketones and a carrier fluid into the subterranean formation,
        wherein the one or more ketones are selected from the group consisting of 3-pentanone, 2-hexanone, 3-hexanone, 2-heptanone, 3-heptanone, 4-heptanone, 2-octanone, 3-octanone, and 4-octanone;
    injecting the fluid into the subterranean formation according to the determined injection characteristics;
        wherein the one or more ketones in the fluid injected into the subterranean formation modify a wettability of rock in the subterranean formation to a more water-wet condition, and
        wherein the one or more ketones in the fluid injected into the subterranean formation partition into an aqueous phase liquid;
    using the model to determine production characteristics for producing the hydrocarbons from the subterranean formation; and
    producing hydrocarbons from the subterranean formation according to the determined production characteristics.

2. The method of claim 1, wherein the one or more ketones in the fluid injected into the subterranean formation reduce a viscosity or a density of the hydrocarbons in the subterranean formation.

3. The method of claim 1, wherein the one or more ketones in the fluid injected into the subterranean formation results in swelling of the hydrocarbons.

4. The method of claim 1, wherein the one or more ketones in the fluid injected into the subterranean formation reduce an interfacial tension between an aqueous phase liquid in the subterranean formation and an oil phase liquid in the subterranean formation.

5. The method of claim 1, wherein the fluid further comprises a surfactant.

6. The method of claim 5, wherein the surfactant comprises at least one of 2-ethylhexanol (EH)-4 propylene oxide (PO)-15 ethylene oxide (EO), 2-EH-4PO-20EO, 2-EH-4PO-25EO, and 2-EH-7PO-20EO.

7. The method of claim 1, wherein the step of developing the model for the subterranean formation further uses:
ketone physical properties, subterranean formation characteristics, and hydrocarbon physical properties.

8. The method of claim 1, wherein the carrier fluid is a gas.

9. The method of claim 8, wherein the gas comprises $CO_2$, $N_2$, a hydrocarbon gas, or any combination of these.

10. The method of claim 1, wherein the carrier fluid comprises supercritical $CO_2$.

11. The method of claim 1, wherein the carrier fluid comprises water.

12. The method of claim 1, wherein a concentration of the one or more ketones in the fluid is less than an aqueous solubility limit of the one or more ketones.

13. The method of claim 1, wherein the one or more ketones comprises at least a symmetrical linear ketone having at least 4 carbons.

14. A system for producing hydrocarbons from a subterranean formation, the system comprising:
a source of a fluid, wherein the fluid comprises one or more ketones and a carrier fluid,
wherein the one or more ketones are selected from the group consisting of 3-pentanone, 2-hexanone, 3-hexanone, 2-heptanone, 3-heptanone, 4-heptanone, 2-octanone, 3-octanone, and 4-octanone;
an injection system in fluid communication with the source, the injection system further in fluid communication with the subterranean formation;
a hydrocarbon production system in fluid communication with the subterranean formation;
a processor; and
a non-transitory computer-readable storage medium in data communication with the processor, the non-transitory computer-readable storage medium storing processor executable instructions that, when executed by the processor, cause the processor to execute operations of a model for the subterranean formation, wherein the model uses ketone aqueous- and oil-phase partitioning characteristics, wherein the non-transitory computer-readable storage medium storing processor executable instructions that, when executed by the processor, cause the processor to perform operations including:
determining injection characteristics for the injection system;
generating, based on the injection characteristics, a control signal to the injection system, wherein the control signal controls the injection system for injecting the fluid into the subterranean formation based on the determined injection characteristics;
wherein the one or more ketones in the fluid injected into the subterranean formation modify a wettability of rock in the subterranean formation to a more water-wet condition, and
wherein the one or more ketones in the fluid injected into the subterranean formation partition into an aqueous phase liquid;
determining production characteristics for producing the hydrocarbons from the subterranean formation; and
generating, based on the production characteristics, a control signal for the hydrocarbon production system, wherein the control signal controls the hydrocarbon production system, causing the production hydrocarbon system to produce hydrocarbons from the subterranean formation according to the determined production characteristics, wherein the subterranean formation is a shale formation or a carbonate formation.

15. The system of claim 14, wherein the fluid consists of the one or more ketones and the carrier fluid.

16. The system of claim 14, wherein the carrier fluid is a gas-phase fluid.

17. The system of claim 14, wherein the carrier fluid comprises a gas-phase hydrocarbon, methane, ethane, natural gas, carbon dioxide, nitrogen, or any combination of these from any sources.

18. The system of claim 14, wherein the one or more ketones are present in the fluid in the gas-phase.

19. The system of claim 14, wherein the fluid comprises a liquid-phase fluid, and wherein the liquid-phase fluid does not comprise or include a surfactant.

20. The system of claim 14, wherein the one or more ketones are present in the fluid in the liquid-phase.

21. The system of claim 14, wherein the carrier fluid comprises water.

* * * * *